US012783287B1

(12) United States Patent
Gaiser et al.

(10) Patent No.: US 12,783,287 B1
(45) Date of Patent: Nov. 3, 2026

(54) UPDATING CHILD GRAPH NODES

(71) Applicant: NVIDIA Corporation, Santa Clara, CA (US)

(72) Inventors: Jason David Gaiser, Campbell, CA (US); Steven Arthur Gurfinkel, San Francisco, CA (US); Sally Tessa Stevenson, Broomfield, CO (US); David Anthony Fontaine, Mountain View, CA (US); Vladislav Zhurba, San Jose, CA (US); Stephen Anthony Bernard Jones, San Francisco, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 17/477,392

(22) Filed: Sep. 16, 2021

(51) Int. Cl.
*G06F 9/48* (2006.01)
*G06F 9/54* (2006.01)
*G06F 16/901* (2019.01)

(52) U.S. Cl.
CPC ............ *G06F 9/4843* (2013.01); *G06F 9/541* (2013.01); *G06F 16/9024* (2019.01)

(58) Field of Classification Search
CPC ..... G06F 9/541; G06F 9/4843; G06F 16/9024
See application file for complete search history.

(56) References Cited

U.S. PATENT DOCUMENTS 10,409,560 B1 * 9/2019 Bebee .................... G06F 8/4441
10,684,966 B1 * 6/2020 Hamman ............ G06F 13/1668
2014/0368515 A1 * 12/2014 Fortini ...................... G06T 1/20 345/505
2015/0339209 A1 * 11/2015 Kerr .................... G06F 11/3452 717/131
2016/0093012 A1 * 3/2016 Rao ........................... G06T 1/60 345/522
2016/0210724 A1 * 7/2016 Taylor ....................... G06T 1/20
2018/0367557 A1 * 12/2018 Brown .............. G06F 16/90335
2020/0089528 A1 * 3/2020 Gutierrez .............. G06F 9/3877
2020/0226124 A1 * 7/2020 Chishti ............... G06F 16/9024
2020/0371761 A1 * 11/2020 Gupta ................. G06F 15/7807
2021/0232969 A1 * 7/2021 Hu .......................... G06N 20/00
2021/0382754 A1 12/2021 Nimmagadda et al.

FOREIGN PATENT DOCUMENTS

WO WO-2011134942 A1 * 11/2011 ............. G06F 9/485
WO WO2018132112 A1 * 8/2013 ............. G06F 17/30
WO WO-2020246965 A1 * 12/2020 ........... G06F 9/4881

OTHER PUBLICATIONS

IEEE, "IEEE Standard 754-2008 (Revision of IEEE Standard 754-1985): IEEE Standard for Floating-Point Arithmetic," Aug. 29, 2008, 70 pages.
NVIDIA, "CUDA Driver API Graph Management," retrieved from https://docs.nvidia.com/cuda/cuda-driver-api/group_CUDA_GRAPH.html, Sep. 7, 2021, 67 pages.

* cited by examiner

*Primary Examiner* — Charles E Anya
(74) *Attorney, Agent, or Firm* — Davis Wright Tremaine LLP

(57) ABSTRACT

Apparatuses, systems, and techniques to facilitate execution graph updates. In at least one embodiment, an application programming interface is used to execute instructions to modify graph nodes of an execution graph that are instantiated within nodes of the execution graph.

26 Claims, 53 Drawing Sheets

FIG. 26B
GENERAL-PURPOSE GRAPHICS PROCESSING UNIT 2630
MEMORY CONTROLLER 2642B
MEMORY 2644B
HOST INTERFACE 2632
GLOBAL SCHEDULER 2634
COMPUTE CLUSTER 2636A
COMPUTE CLUSTER 2636B
COMPUTE CLUSTER 2636C
COMPUTE CLUSTER 2636D
CACHE MEMORY 2638
COMPUTE CLUSTER 2636E
COMPUTE CLUSTER 2636F
COMPUTE CLUSTER 2636G
COMPUTE CLUSTER 2636H
I/O HUB 2639
GPU LINK 2640
MEMORY CONTROLLER 2642A
MEMORY 2644A

UPDATING CHILD GRAPH NODES

FIELD

At least one embodiment pertains to processing resources used to execute one or more CUDA programs. For example, at least one embodiment pertains to processors or computing systems used to execute one or more CUDA programs that are instantiated using execution graphs and updating nodes that represent child graphs during that execution.

BACKGROUND

Performing computational operations sequentially can use significant memory, time, or computing resources, particularly when such computational operations have to idly wait for other operations to finish. An amount of memory, time, or computing resources used to perform computation operations can be improved by using an instantiated execution graph to configure a GPU to perform computational operations efficiently and/or in parallel.

DETAILED DESCRIPTION

Figure 1:
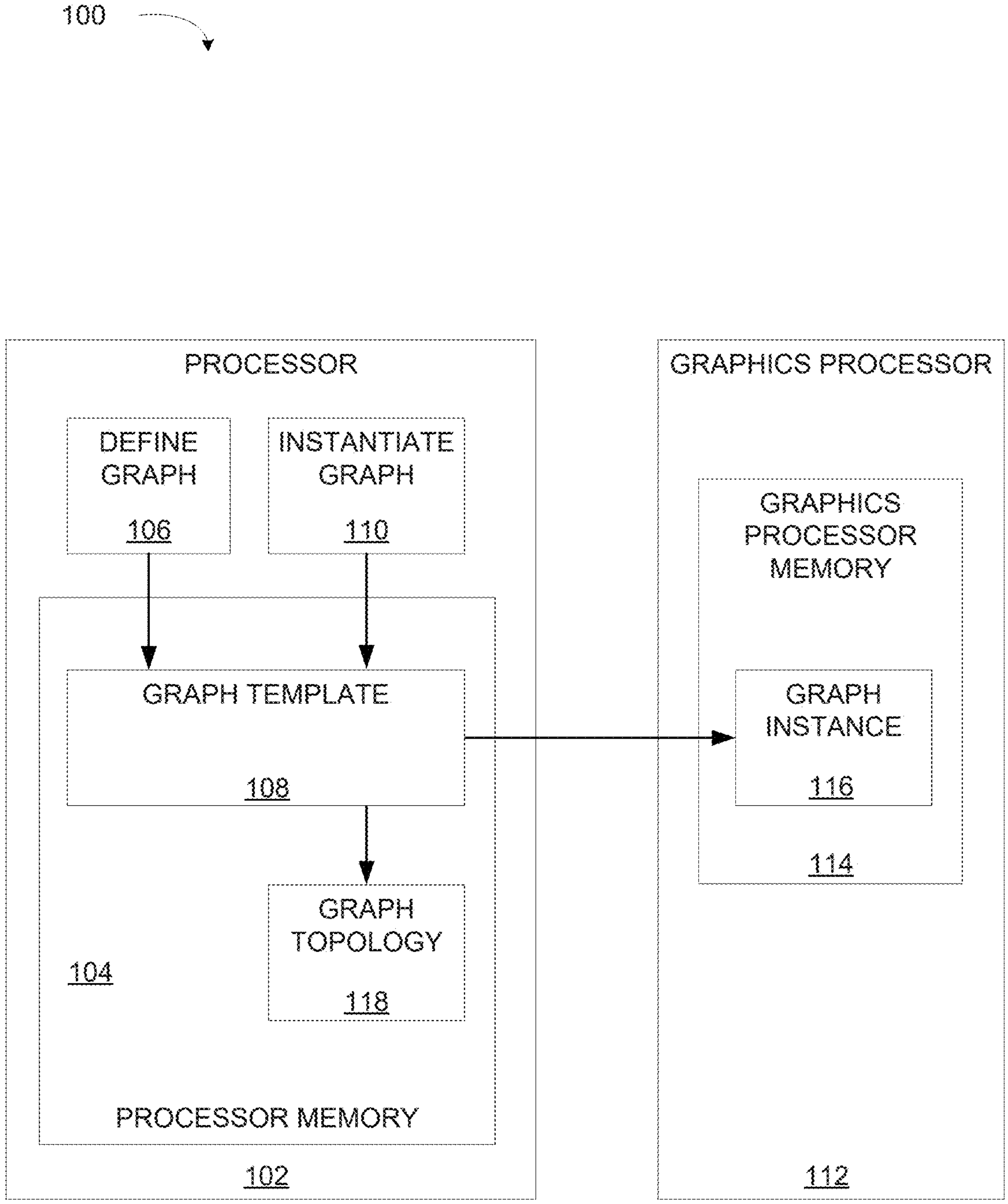
FIG. 1 illustrates an example computing system for defining and instantiating an execution graph, in accordance with at least one embodiment.

FIG. 1 illustrates an example computing system 100 for defining and instantiating an execution graph, in accordance with at least one embodiment. In at least one embodiment, a processor 102 includes processor memory 104. In at least one embodiment, processor 102 is a single-core processor. In at least one embodiment, processor 102 is a multi-core processor. In at least one embodiment, one or more additional processors, not shown, are connected to processor memory 104. In at least one embodiment, processor 102 is an element of a processing system such as processing system 1700 described herein. In at least one embodiment, processor 102 is an element of a computer system such as computer system 1800 described herein. In at least one embodiment, processor 102 is an element of a system such as system 1900 described herein. In at least one embodiment, processor 102 is an element of a computing system such as computing system 2100 described herein. In at least one embodiment, processor 102 is an element of a compute unit such as compute unit 4540 described herein.

In at least one embodiment, processor 102 has included thereon, instructions that, when executed, perform an application programming interface ("API") to modify one or more second graph nodes within one or more first graph nodes.

In at least one embodiment, processor 102 has included thereon, instructions that, when executed, define an execution graph 106. In at least one embodiment, instructions that, when executed, define execution graph 106 are loaded from processor memory 104. In at least one embodiment, instructions that, when executed, define execution graph 106 are loaded from example computing system 100. In at least one embodiment, instructions for processor 102 that, when executed, define execution graph 106, are stored in processor memory 104. In at least one embodiment, instructions that, when executed, define execution graph 106, are executed by a process, processor, thread, thread group, or some other such entity where that process, processor, thread, thread group, or some other such entity has access to processor memory 104. In at least one embodiment, instructions for a process, processor, thread, thread group, or some other such entity that, when executed, define execution graph 106, are stored in processor memory 104. In at least one embodiment, when instructions are executed that define execution graph 106, a graph template 108 is created. In at least one embodiment, graph template 108 is a representation of execution graph 106 that includes one or more of: a description of nodes of execution graph 106, a description of relationships or dependencies between nodes of execution graph 106, and parameters for nodes of execution graph 106. In at least one embodiment, graph template 108 is stored in processor memory 104. In at least one embodiment, graph template 108 is stored in other memory associated with processor 102 including, for example, an external storage device associated with processor 102.

In at least one embodiment, processor 102 has included thereon, instructions that, when executed, instantiate 110 an execution graph. In at least one embodiment, instructions for processor 102 that, when executed, instantiate 110 an execution graph, are stored in processor memory 104. In at least one embodiment, instructions that, when executed, instantiate 110 an execution graph, are executed by a process, processor, thread, thread group, or some other such entity where that process, processor, thread, thread group, or some other such entity has access to processor memory 104. In at least one embodiment, instructions for a process, processor, thread, thread group, or some other such entity that, when executed, instantiate 110 an execution graph, are stored in processor memory 104. In at least one embodiment, when instructions are executed that instantiate 110 an execution graph, graph template 108 is used to instantiate a graph instance 116. In at least one embodiment, instructions that, when executed, instantiate a graph instance 116, cause creation of an executable instance of an execution graph that is based on graph template 108. In at least one embodiment, instructions that, when executed, instantiate a graph instance 116, cause creation of an executable instance of an execution graph from a graph instantiation API. In at least one embodiment, instructions that, when executed, instantiate a graph instance 116, cause creation of an executable instance of an execution graph from an execution stream.

In at least one embodiment, when instructions that instantiate 110 an execution graph are executed, a graph topology 118 is generated from an execution graph template 108. In at least one embodiment, graph topology 118 includes shape information of an execution graph template 108 including, but not limited to, information about the type of nodes in execution graph template 108, information about connections between nodes in execution graph template 108, information about node dependencies for execution graph template 108, and/or information about subgraph nodes of execution graph template 108.

In at least one embodiment, when instructions that instantiate 110 an execution graph are executed, graph instance 116 is instantiated in graphics processor memory 114 of graphics processor 112. In at least one embodiment, when instructions that instantiate 110 an execution graph are executed, graph instance 116 is instantiated outside of graphics processor memory 114 of graphics processor 112 and then stored in graphics processor memory 114. In at least one embodiment, graphics processor 112 is a single-core processor. In at least one embodiment, graphics processor 112 is a multi-core processor. In at least one embodiment, one or more additional processors, not shown, are connected to graphics processor memory 114. In at least one embodiment, graphics processor 112 is an element of a processing system such as processing system 1700 described herein. In at least one embodiment, a graphics processor 112 is an element of a computer system such as computer system 1800 described herein. In at least one embodiment, graphics processor 112 is an element of a system such as system 1900 described herein. In at least one embodiment, graphics processor 112 is an element of an integrated circuit such as integrated circuit 2000 described herein. In at least one embodiment, graphics processor 112 is an element of a computing system such as computing system 2100 described herein. In at least one embodiment, graphics processor 112 is a graphics processor 2510 described herein. In at least one embodiment, graphics processor 112 is a graphics processor 2540 described herein. In at least one embodiment, graphics processor 112 is a graphics multiprocessor 2734 described herein. In at least one embodiment, graphics processor 112 is a graphics processor 2800 described herein. In at least one embodiment, graphics processor 112 is a graphics processor 3008 described herein. In at least one embodiment, graphics processor 112 is a GPU 4592 described herein.

Figure 2:
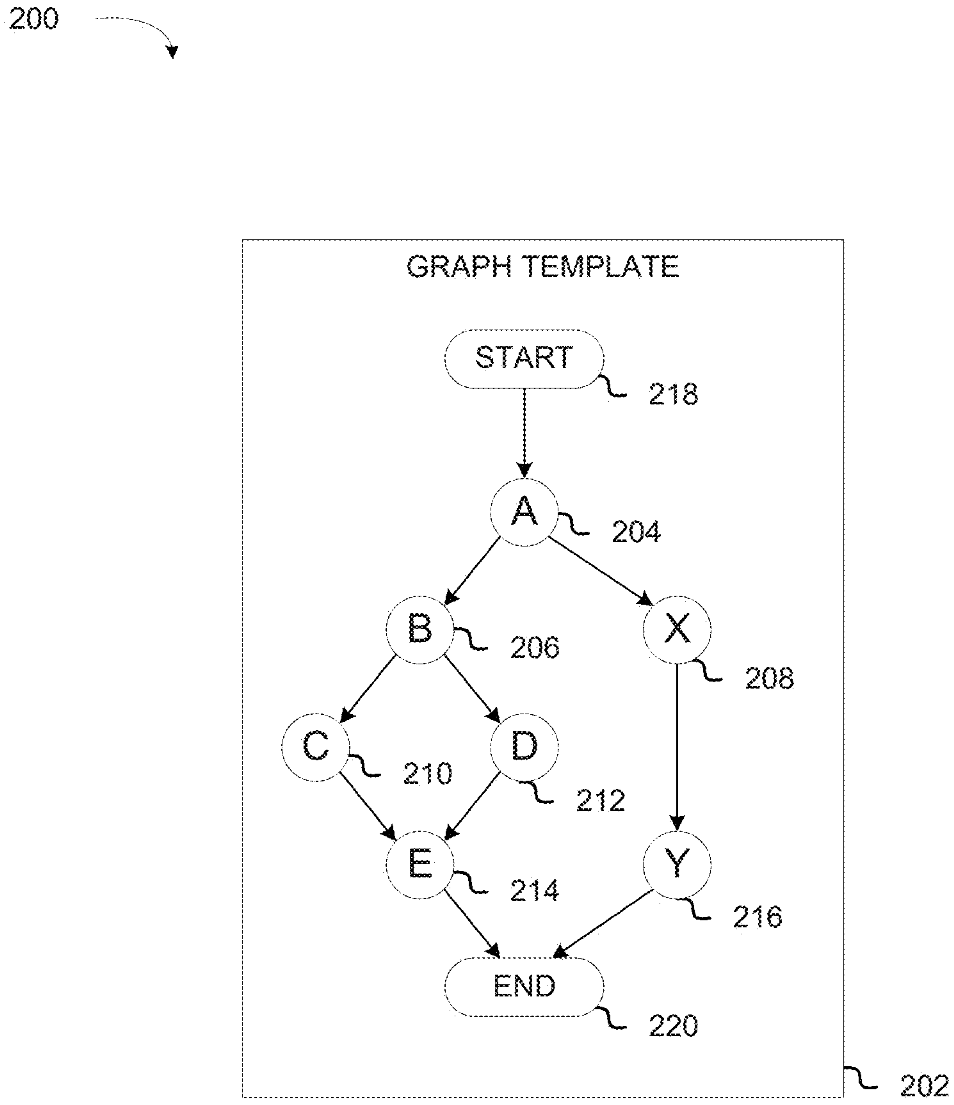
FIG. 2 illustrates an example execution graph template, in accordance with at least one embodiment.

FIG. 2 illustrates an example execution graph template 200, in accordance with at least one embodiment. In at least one embodiment, an execution graph template 202 includes one or more nodes and one or more relationships between those one or more nodes. In at least one embodiment, an execution graph template 202 includes node "A" 204, node "B" 206, node "C" 210, node "D" 212, node "E" 214, node "X" 208, and node "Y" 216. In at least one embodiment, an execution graph template 202 includes a start node 218 and an end node 220. In at least one embodiment, an execution graph template 202 is a directed acyclic graph. In at least one embodiment, an execution graph template 202 is a representation of an execution graph that indicates node types of nodes in an execution graph template 202. In at least one embodiment, an execution graph template 202 is a representation of an execution graph that indicates links between nodes to indicate an execution order and/or dependencies between operations represented by nodes of an execution graph template 202.

In at least one embodiment, an execution order of an execution graph template 202 is indicated by edges of an execution graph template 202. In at least one embodiment, a dependency between nodes of an execution graph template 202 is indicated by edges of an execution graph template 202. In at least one embodiment, an edge between, for example, node "A" 204 and node "B" 206 is an indication that node "B" 206 executes after node "A" 204 completes. In at least one embodiment, an edge between, for example, node "A" 204 and node "B" 206 is an indication that node "B" 206 depends on node "A" 204.

In at least one embodiment, a node of an execution graph template 202 has a single incoming edge (node "B" 206). In at least one embodiment, a node of an execution graph template with a single incoming edge is a node with a single dependency. In at least one embodiment, for example, node "B" 206 is dependent only on node "A" 204. In at least one embodiment, a node of an execution graph template 202 has a plurality of incoming edges (node "E" 214). In at least one embodiment, a node of an execution graph template with a plurality of incoming edges is a node with a plurality of dependencies. In at least one embodiment, for example, node "E" 214 is dependent on node "C" 210 and on node "D" 212. In at least one embodiment, a node of an execution graph template 202 has no incoming edges (start node 218). In at least one embodiment, a node with no incoming edges has no dependencies. In at least one embodiment, a node with no dependencies may be a start node or root node of an execution graph template 202. In at least one embodiment, a node with no incoming edges may also have no outgoing edges such that a single node, representing a single operation, is a complete graph.

In at least one embodiment, a node of an execution graph template 202 has a single outgoing edge (node "X" 208). In at least one embodiment, a node of an execution graph template with a single outgoing edge is a node with a single dependent. In at least one embodiment, for example, node "X" 208 has a single dependent in node "Y" 216. In at least one embodiment, a node of an execution graph template 202 has a plurality of outgoing edges (node "B" 206). In at least one embodiment, a node of an execution graph template with a plurality of outgoing edges is a node with a plurality of dependents. In at least one embodiment, for example, node "B" 206 has a first dependent in node "C" 210 and a second dependent in node "D" 212. In at least one embodiment, a node of an execution graph template 202 has no outgoing edges (end node 220). In at least one embodiment, a node with no outgoing edges has no dependents. In at least one embodiment, a node with no dependents may be an end node or leaf node of an execution graph template 202. In at least one embodiment, an execution graph template 202 may have a plurality of end nodes.

In at least one embodiment, an execution graph node is a child graph node, which is a node that represents an embedded (or child) graph. In at least one embodiment, a child graph node represents a new execution graph which may be substituted for a child graph node when an execution graph template 202 is instantiated. In at least one embodiment, a child graph node has zero, one, or a plurality of incoming edges and zero, one, or a plurality outgoing edges. In at least one embodiment, a child graph node with, for example, a single incoming edge is dependent on a single node. In at least one embodiment, for example, if node "B" 206 is a child graph node, node "B" 206 is dependent on node "A" 204 and after node "A" 204 completes, a graph that node "B" 206 represents may then execute.

In at least one embodiment, an execution graph includes no child graph nodes. In at least one embodiment, an execution graph includes one or more child graph nodes. In at least one embodiment, a child graph node is added to an execution graph using an API that receives, as inputs, a graph node, an execution graph, a set of node dependents, a number of node dependents, and a child graph. In at least one embodiment, an API that adds a child graph node to an execution graph returns an error code to a calling process that indicates a success or failure of an operation to add a child graph node to an execution graph. In at least one embodiment, an API that adds a child graph node to an execution graph stores topology information of an execution graph when adding a child graph node. In at least one embodiment, an API that adds a child graph node to an execution graph stores topology information of a child graph or sub-graph that is represented by a child graph node when adding a child graph node.

In at least one embodiment, an execution graph node is an event record node, which is a node that records an event. In at least one embodiment, a node that records an event may be used to signal other processes that an operation has completed or that a stage of execution of an execution graph has been reached. In at least one embodiment, an event record node may record an event that one or more external processes are waiting for. In at least one embodiment, a recorded event may be used to signal other processes on a GPU and/or on a CPU. In at least one embodiment, node "E"

214 may, for example, be an event record node that serves as a signal to an external process that operations of node "C" 210 and node "D" 212 have completed.

In at least one embodiment, an execution graph includes no event record nodes. In at least one embodiment, an execution graph includes one or more event record nodes. In at least one embodiment, an event record node is added to an execution graph using an API that receives, as inputs, a graph node, an execution graph, a set of node dependents, a number of node dependents, and an event. In at least one embodiment, an API that adds an event record node to an execution graph returns an error code to a calling process that indicates a success or failure of an operation to add an event record node to an execution graph. In at least one embodiment, an API that adds an event record node to an execution graph stores topology information of an execution graph when adding an event record node.

In at least one embodiment, an execution graph node is an event wait node, which is a node that waits for an event. In at least one embodiment, a node that waits for an event may be used by an execution graph to pause execution until an event is recorded. In at least one embodiment, an event wait node may wait for an event that recorded by an external process. In at least one embodiment, an event wait node may wait for an event from other processes on a GPU and/or on a CPU. In at least one embodiment, node "B" 206 may, for example, be an event wait node that waits for a signal from an external process before operations of node "C" 210 and node "D" 212 may begin. In at least one embodiment, an event record node of a first execution graph may be received by an event wait node of a second execution graph.

In at least one embodiment, an execution graph includes no event wait nodes. In at least one embodiment, an execution graph includes one or more event wait nodes. In at least one embodiment, an event wait node is added to an execution graph using an API that receives, as inputs, a graph node, an execution graph, a set of node dependents, a number of node dependents, and an event. In at least one embodiment, an API that adds an event wait node to an execution graph returns an error code to a calling process that indicates a success or failure of an operation to add an event wait node to an execution graph. In at least one embodiment, an API that adds an event wait node to an execution graph stores topology information of an execution graph when adding an event wait node.

In at least one embodiment, an execution graph node is semaphore signal node, which is a node that has similar functionality as an event record node, but is a node that signals execution status using a semaphore. In at least one embodiment, a semaphore signal node sends a semaphore signal to one or more other processes that are configured to receive a semaphore signal. In at least one embodiment, a semaphore signal node may be used to signal other processes that an operation has completed or that a stage of execution of an execution graph has been reached. In at least one embodiment, node "E" 214 may, for example, be a semaphore signal node that sends a semaphore signal to external processes to indicate that operations of node "C" 210 and node "D" 212 have completed.

In at least one embodiment, an execution graph includes no semaphore signal nodes. In at least one embodiment, an execution graph includes one or more semaphore signal nodes. In at least one embodiment, a semaphore signal node is added to an execution graph using an API that receives, as inputs, a graph node, an execution graph, a set of node dependents, a number of node dependents, and a set of semaphore signal node parameters. In at least one embodiment, an API that adds a semaphore signal node to an execution graph returns an error code to a calling process that indicates a success or failure of an operation to add a semaphore signal node to an execution graph. In at least one embodiment, an API that adds a semaphore signal node to an execution graph stores topology information of an execution graph when adding a semaphore signal node.

In at least one embodiment, an execution graph node is a semaphore wait node, which is a node that has similar functionality as an event wait node, but is a node that waits for a semaphore. In at least one embodiment, a node that waits for a semaphore may be used by an execution graph to pause execution until a semaphore is signaled. In at least one embodiment, an event wait node may wait for an event that recorded by an external process. In at least one embodiment, a semaphore wait node may wait for a semaphore from other processes on a GPU and/or on a CPU. In at least one embodiment, node "B" 206 may, for example, be semaphore wait node that waits for a semaphore from an external process before operations of node "C" 210 and node "D" 212 may begin. In at least one embodiment, a semaphore signal node of a first execution graph may be received by a semaphore wait node of a second execution graph.

In at least one embodiment, an execution graph includes no semaphore wait nodes. In at least one embodiment, an execution graph includes one or more semaphore wait nodes. In at least one embodiment, a semaphore wait node is added to an execution graph using an API that receives, as inputs, a graph node, an execution graph, a set of node dependents, a number of node dependents, and a set of semaphore signal node parameters. In at least one embodiment, an API that adds a semaphore wait node to an execution graph returns an error code to a calling process that indicates a success or failure of an operation to add a semaphore wait node to an execution graph. In at least one embodiment, an API that adds a semaphore wait node to an execution graph stores topology information of an execution graph when adding a semaphore wait node.

In at least one embodiment, an execution graph node is host node, which is a node that executes one or more operations on a host CPU. In at least one embodiment, a host node executes a function on a host CPU by adding a function to an execution stream, described herein. In at least one embodiment, a host node executes a function after currently enqueued stream operations complete. In at least one embodiment, a host node blocks subsequently enqueued stream operations until after a function associated with a host node completes. In at least one embodiment, node "D" 212 may, for example, be a host node that executes a function on a host CPU by adding a function to an execution stream.

In at least one embodiment, an execution graph includes no host nodes. In at least one embodiment, an execution graph includes one or more host nodes. In at least one embodiment, a host node is added to an execution graph using an API that receives, as inputs, a graph node, an execution graph, a set of node dependents, a number of node dependents, and a set of host node parameters. In at least one embodiment, an API that adds a host node to an execution graph returns an error code to a calling process that indicates a success or failure of an operation to add a host node to an execution graph. In at least one embodiment, an API that adds a host node to an execution graph stores topology information of an execution graph when adding a host node.

In at least one embodiment, an execution graph node is kernel node, which is a node that executes one or more operations on a GPU. In at least one embodiment, a kernel node invokes a kernel function on a GPU by executing a kernel function using a thread block, described herein. In at least one embodiment, node "C" 210 may, for example, be a kernel node that invokes a kernel function on a GPU by executing a kernel function using a thread block.

In at least one embodiment, an execution graph includes no kernel nodes. In at least one embodiment, an execution graph includes one or more kernel nodes. In at least one embodiment, a kernel node is added to an execution graph using an API that receives, as inputs, a graph node, an execution graph, a set of node dependents, a number of node dependents, and a set of kernel node parameters. In at least one embodiment, an API that adds a kernel node to an execution graph returns an error code to a calling process that indicates a success or failure of an operation to add a kernel node to an execution graph. In at least one embodiment, an API that adds a kernel node to an execution graph stores topology information of an execution graph when adding a kernel node.

In at least one embodiment, an execution graph node is a memory allocation node, which is a node that allocates memory for use by GPU operations. In at least one embodiment, an execution graph node is a memory free node, which is a node that frees memory allocated by a memory allocation node. In at least one embodiment, memory allocated by a memory allocation node of an execution graph may be freed by a corresponding memory free node. In at least one embodiment, memory allocated by a memory allocation node may be used until freed by a corresponding memory free node. In at least one embodiment, for example, if node "A" 204 is a memory allocation node and node "E" 214 is a corresponding memory free node, then node "B" 206, node "C" 210, and node "D" 212 may use memory allocated in node "A" 204 and freed in node "E" 214. In at least one embodiment, node "X" 208 may use memory allocated in node "A" 204 if node "X" 208 executes before node "E" 214. In at least one embodiment, node "Y" 216 may also use memory allocated in node "A" 204 if node "Y" 216 executes before node "E" 214. In at least one embodiment, memory allocated with a memory allocation node that is not freed by a corresponding memory free node may be used by any nodes in an execution graph that execute after memory allocation. In at least one embodiment, memory allocated with a memory allocation node that is not freed by a corresponding memory free node may be used by streams outside of an execution graph until freed. In at least one embodiment, memory allocated with a memory allocation node may be freed by an external memory free operation.

In at least one embodiment, an execution graph includes no memory allocation nodes. In at least one embodiment, an execution graph includes one or more memory allocation nodes. In at least one embodiment, a memory allocation node is added to an execution graph using an API that receives, as inputs, a graph node, an execution graph, a set of node dependents, a number of node dependents, and a set of memory allocation node parameters. In at least one embodiment, an API that adds a memory allocation node to an execution graph returns an error code to a calling process that indicates a success or failure of an operation to add a memory allocation node to an execution graph. In at least one embodiment, an API that adds a memory allocation node to an execution graph stores topology information of an execution graph when adding a memory allocation node.

In at least one embodiment, an execution graph includes no memory free nodes. In at least one embodiment, an execution graph includes one or more memory free nodes. In at least one embodiment, a memory free node is added to an execution graph using an API that receives, as inputs, a graph node, an execution graph, a set of node dependents, a number of node dependents, and a location of memory to free. In at least one embodiment, memory to free may be memory allocated by a memory allocation node. In at least one embodiment, an API that adds a memory free node to an execution graph returns an error code to a calling process that indicates a success or failure of an operation to add a memory free node to an execution graph. In at least one embodiment, an API that adds a memory free node to an execution graph stores topology information of an execution graph when adding a memory free node.

In at least one embodiment, is a memory management node. In at least one embodiment, a memory management node is a memory copy node, which is a node that copies memory data between GPU objects. In at least one embodiment, a memory copy node may copy memory from a first GPU object such as a texture object to a second GPU object. In at least one embodiment, a memory copy node copies one-dimensional data between GPU objects. In at least one embodiment, a memory copy node copies memory from a location on a GPU specified by a named symbol. In at least one embodiment, a memory copy node copies memory to a location on a GPU specified by a named symbol. In at least one embodiment, a memory management node is a memory set node, which is a node that sets a collection of memory data on a GPU to an initial value and/or updates a collection of memory data on a GPU to an updated value.

In at least one embodiment, an execution graph includes no memory copy nodes. In at least one embodiment, an execution graph includes one or more memory copy nodes. In at least one embodiment, a memory copy node is added to an execution graph using an API that receives, as inputs, a graph node, an execution graph, a set of node dependents, a number of node dependents, and a set of memory copy parameters. In at least one embodiment, a memory copy node is added to an execution graph using an API that receives, as inputs, a graph node, an execution graph, a set of node dependents, a number of node dependents, a destination, a source, a size in bytes to copy, and a type of transfer. In at least one embodiment, a memory copy node is added to an execution graph using an API that receives, as inputs, a graph node, an execution graph, a set of node dependents, a number of node dependents, a destination, a device symbol to copy from, a size in bytes to copy, an offset from a start of a device symbol, and a type of transfer. In at least one embodiment, a memory copy node is added to an execution graph using an API that receives, as inputs, a graph node, an execution graph, a set of node dependents, a number of node dependents, a device symbol to copy to, a source, a size in bytes to copy, an offset from a start of a device symbol, and a type of transfer. In at least one embodiment, an API that adds a memory code node to an execution graph returns an error code to a calling process that indicates a success or failure of an operation to add a memory copy node to an execution graph. In at least one embodiment, an API that adds a memory copy node to an execution graph stores topology information of an execution graph when adding a memory copy node.

In at least one embodiment, an execution graph includes no memory set nodes. In at least one embodiment, an execution graph includes one or more memory set nodes. In at least one embodiment, a memory set node is added to an execution graph using an API that receives, as inputs, a graph node, an execution graph, a set of node dependents, a number of node dependents, and memory set parameters. In at least one embodiment, an API that adds a memory set node to an execution graph returns an error code to a calling process that indicates a success or failure of an operation to add a memory set node to an execution graph. In at least one embodiment, an API that adds a memory set node to an execution graph stores topology information of an execution graph when adding a memory set node.

In at least one embodiment, an execution graph node is an empty node, which is a node that has no associated operation. In at least one embodiment, an empty node may be used for graph execution flow control. In at least one embodiment, for example, an empty node may be used to ensure a plurality of operations complete before continuing operation by creating an empty node as a dependent to node representing a plurality of operations.

In at least one embodiment, an execution graph includes no empty nodes. In at least one embodiment, an execution graph includes one or more empty nodes. In at least one embodiment, an empty node is added to an execution graph using an API that receives, as inputs, a graph node, an execution graph, a set of node dependents, and a number of node dependents. In at least one embodiment, an API that adds an empty node to an execution graph returns an error code to a calling process that indicates a success or failure of an operation to add an empty node to an execution graph. In at least one embodiment, an API that adds an empty node to an execution graph stores topology information of an execution graph when adding an empty node.

Figure 3:
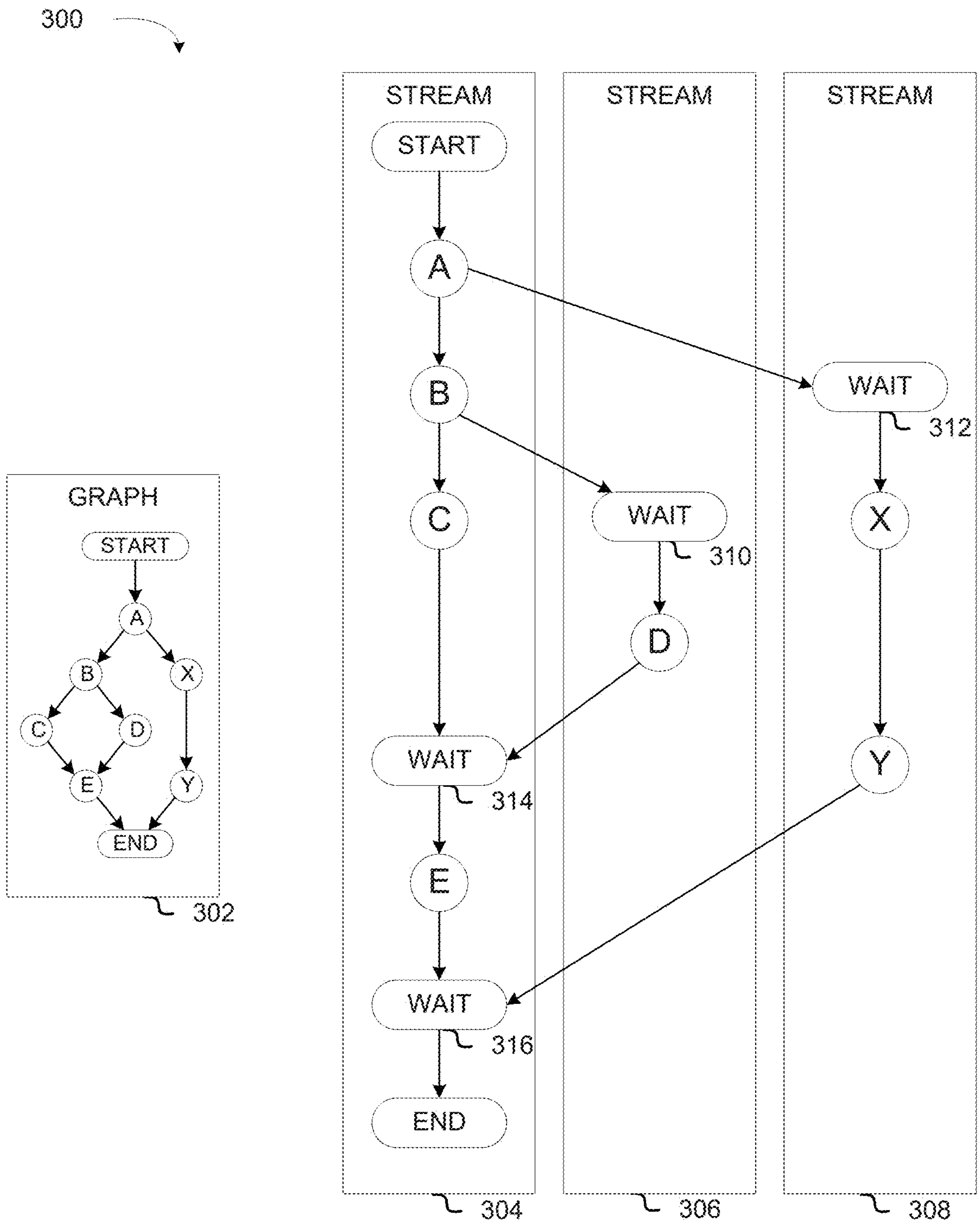
FIG. 3 illustrates an example stream diagram of an instantiated execution graph, in accordance with at least one embodiment.

FIG. 3 illustrates an example stream diagram 300 of an instantiated execution graph, in accordance with at least one embodiment. In at least one embodiment, an execution graph 302 is an instantiation of execution graph template 202, described herein. In at least one embodiment, an example stream diagram 300 illustrates dependencies of an execution graph 302. In at least one embodiment, stream 304 includes a first dependency path of execution graph 302. In at least one embodiment, stream 306 includes a second dependency path of execution graph 302. In at least one embodiment, stream 308 includes a third dependency path of execution graph 302.

In at least one embodiment, stream 304 begins with a start node (start node 218) and then executes an operation represented by node "A" 204. In at least one embodiment, stream 306 begins with a wait node 310 because stream 306 may not begin execution until other dependencies from other streams are satisfied. In at least one embodiment, stream 308 begins with a wait node 312 because stream 308 also may not begin execution until other dependencies from other streams are satisfied.

In at least one embodiment, a first dependency of node "A" 204 is node "B" 206. In at least one embodiment, an operation represented by node "B" 206 may execute in stream 304 after an operation represented by node "A" 204 completes. In at least one embodiment, a second dependency of node "A" 204 is node "X" 208. In at least one embodiment, an operation represented by node "X" 208 may execute in stream 308 after an operation represented by node "A" 204 completes. In at least one embodiment, wait node 312 of stream 308 receives a completion signal from node "A" 204, allowing an operation represented by node "X" 208 to execute in stream 308. In at least one embodiment, an operation represented by node "Y" 216 executes in stream 308 after an operation represented by node "X" 208 completes.

In at least one embodiment, a first dependency of node "B" 206 is node "C" 210. In at least one embodiment, an operation represented by node "C" 210 may execute in stream 304 after an operation represented by node "B" 206 completes. In at least one embodiment, a second dependency of node "B" 206 is node "D" 212. In at least one embodiment, an operation represented by node "D" 212 may execute in stream 306 after an operation represented by node "B" 206 completes. In at least one embodiment, wait node 310 of stream 306 receives a completion signal from node "B" 206, allowing an operation represented by node "D" 212 to execute in stream 306.

In at least one embodiment, after execution of an operation represented by node "C" 210 completes in stream 304, stream 304 waits for completion of an operation represented by node "D" 212 executing in stream 306. In at least one embodiment, a wait node 314 in stream 304 receives a completion signal from node "D" 212 after completion of an operation represented by node "D" 212. In at least one embodiment, after wait node 314 in stream 304 receives a completion signal from node "D" 212, an operation represented by node "E" 214 may execute in stream 304.

In at least one embodiment, after execution of an operation represented by node "E" 214 completes in stream 304, stream 304 waits for completion of an operation represented by node "Y" 216 executing in stream 308. In at least one embodiment, a wait node 316 in stream 304 receives a completion signal from node "Y" 216 after completion of an operation represented by node "Y" 216. In at least one embodiment, after wait node 316 in stream 304 receives a completion signal from node "Y" 216, execution of stream 304 completes with an end node (end node 220). In at least one embodiment, execution of stream 306 completes after sending a completion signal to wait node 314. In at least one embodiment, execution of stream 308 ends after sending a completion signal to wait node 316.

Figure 4:
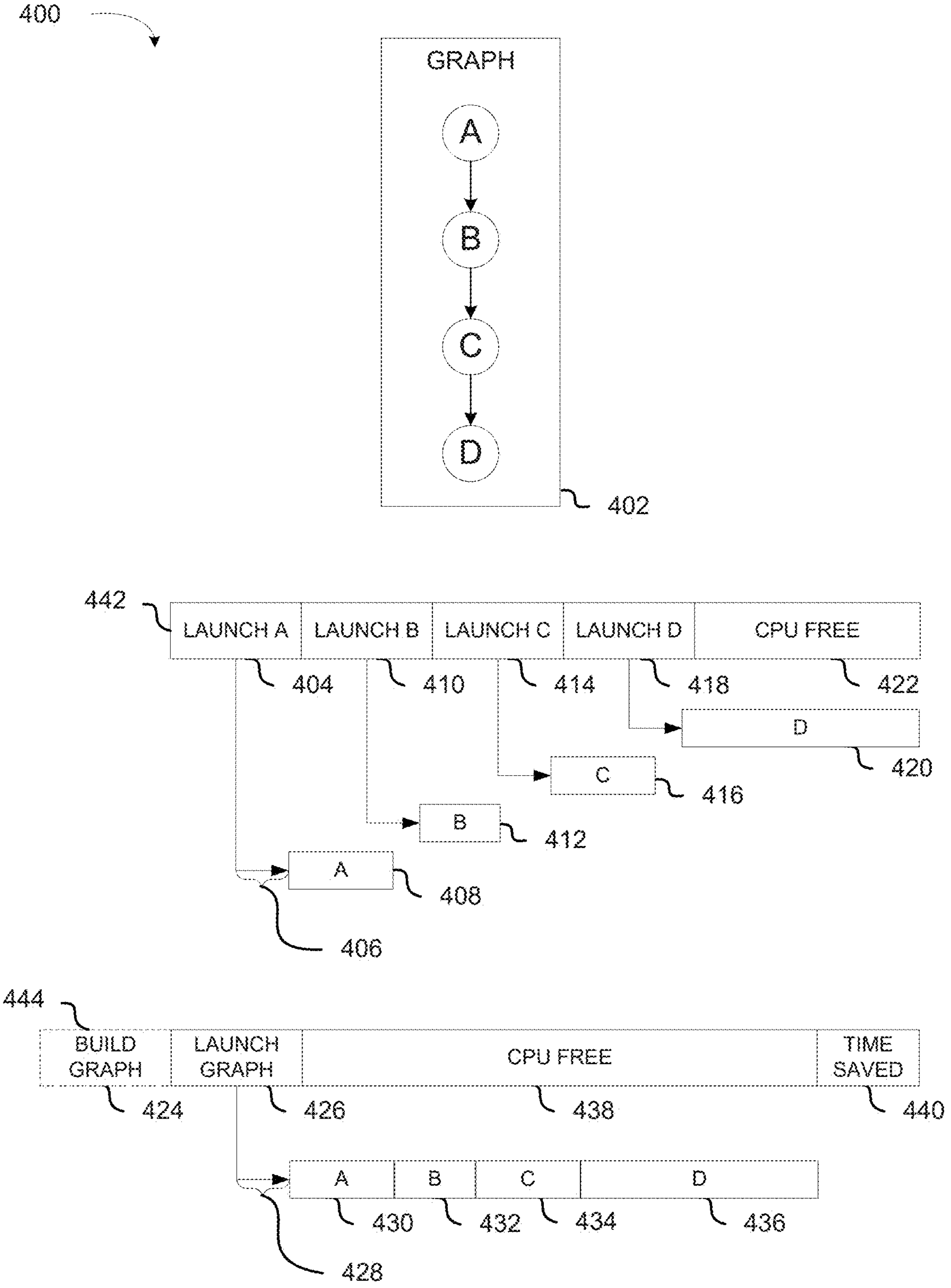
FIG. 4 illustrates example launch sequences of an instantiated execution graph, in accordance with at least one embodiment.

FIG. 4 illustrates example launch sequences 400 of an instantiated execution graph, in accordance with at least one embodiment. In at least one embodiment, a template execution graph 402 includes a simple graph with four nodes "A"-"D" and a simple dependency path from "A" to "B" to "C" to "D." In at least one embodiment, a stream 442 shows a launch sequence where operations represented by nodes "A"-"D" are launched sequentially, not using an execution graph. In at least one embodiment, a stream 444 shows a launch sequence where operations represented by nodes "A"-"D" are launched using an execution graph.

In at least one embodiment, a command 404 to launch an operation represented by node "A" is issued. In at least one embodiment, after an execution delay 406, an operation 408 represented by node "A" is executed on stream 442. In at least one embodiment, a command 410 to launch an operation represented by node "B" is issued. In at least one embodiment, after an execution delay, an operation 412 represented by node "B" is executed on stream 442. In at least one embodiment, an operation 412 represented by node "B" may not execute on stream 442 before an operation 408 represented by node "A" completes. In at least one embodiment, a command 414 to launch an operation represented by node "C" is issued. In at least one embodiment, after an execution delay, an operation 416 represented by node "C" is executed on stream 442. In at least one embodiment, an operation 416 represented by node "C" may not execute on stream 442 before an operation 412 represented by node "B" completes. In at least one embodiment, a command 418 to launch an operation represented by node "D" is issued. In at least one embodiment, after an execution delay, an operation 420 represented by node "D" is executed on stream 442. In at least one embodiment, an operation 420 represented by node "D" may not execute on stream 442 before an operation 416 represented by node "C" completes. In at least one embodiment, after a command 418 to launch an operation represented by node "D" is issued, a CPU is free 422 to perform other operations while an operation 420 represented by node "D" is executing on stream 442.

In at least one embodiment, a command 424 to build an execution graph for operations represented by nodes "A"-"D" from an execution graph template is executed. In at least one embodiment, a command 424 to build an execution graph for operations represented by nodes "A"-"D" from an execution graph template may be executed previously and/or using a different process, processor, thread, thread group, or stream. In at least one embodiment, a command 426 to launch an execution graph for operations represented by nodes "A"-"D" is issued. In at least one embodiment, after an execution delay 428, an operation 430 represented by node "A" is executed on stream 444. In at least one embodiment, after completion of an operation 430 represented by node "A" is executed on stream 444, an operation 432 represented by node "B" is immediately executed on stream 444. In at least one embodiment, after completion of an operation 432 represented by node "B" is executed on stream 444, an operation 434 represented by node "C" is immediately executed on stream 444. In at least one embodiment, after completion of an operation 434 represented by node "C" is executed on stream 444, an operation 436 represented by node "D" is immediately executed on stream 444. In at least one embodiment, after a command 426 to launch an execution graph for operations represented by nodes "A"-"D" is issued, a CPU is free 438 to perform other operations while an operation 436 represented by node "D" is executing on stream 444. In at least one embodiment, an operation 436 represented by node "D" that executes as a result of launching an execution graph for operations represented by nodes "A"-"D" on stream 444 completes sooner than an operation 420 represented by node "D" that executes as a result of launching operations represented by nodes "A"-"D" sequentially on stream 442, resulting in time saved 440.

Figure 5:
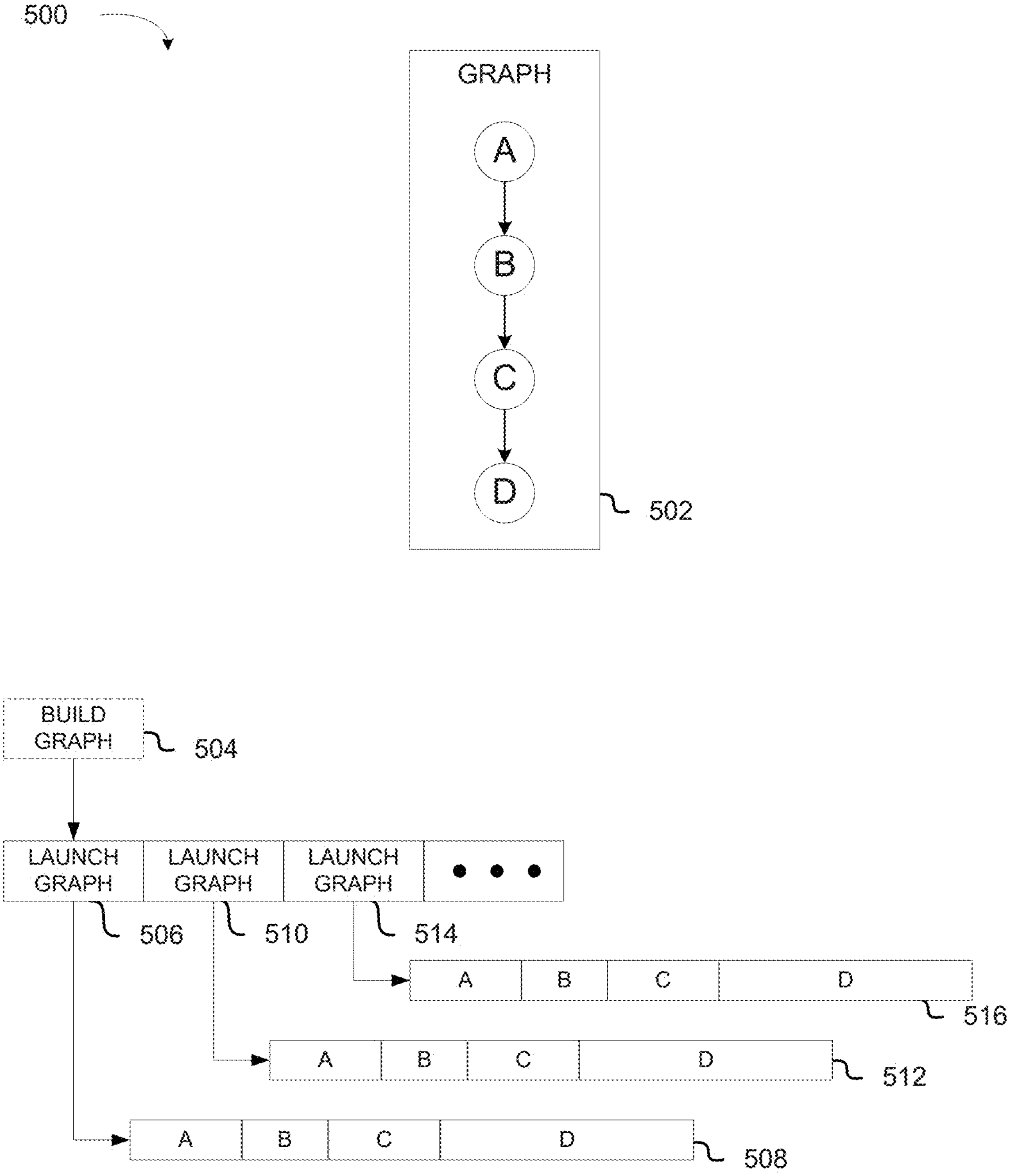
FIG. 5 illustrates an example repeated launch sequence of an instantiated execution graph, in accordance with at least one embodiment.

FIG. 5 illustrates an example repeated launch sequence 500 of an instantiated execution graph, in accordance with at least one embodiment. In at least one embodiment, a template execution graph 502 includes a simple graph with four nodes "A"-"D" and a simple dependency path from "A" to "B" to "C" to "D." In at least one embodiment, an example repeated launch sequence 500 illustrates a stream for a launch sequence where operations represented by nodes "A"-"D" are repeatedly launched using an execution graph.

In at least one embodiment, a command 504 to build an execution graph for operations represented by nodes "A"-"D" from an execution graph template is executed. In at least one embodiment, a command 504 to build an execution graph for operations represented by nodes "A"-"D" from an execution graph template may be executed previously and/or using a different process, processor, thread, thread group, or stream.

In at least one embodiment, a first command 506 to launch an execution graph for operations represented by nodes "A"-"D" is issued. In at least one embodiment, a first command 506 to launch an execution graph for operations represented by nodes "A"-"D" may execute in a first stream 508. In at least one embodiment, as a result of a first command 506 to launch an execution graph for operations represented by nodes "A"-"D," an operation represented by node "A" is executed on stream 508. In at least one embodiment, after completion of an operation represented by node "A" is executed, an operation represented by node "B" is executed on stream 508. In at least one embodiment, after completion of an operation represented by node "B" is executed, an operation represented by node "C" is executed on stream 508. In at least one embodiment, after completion of an operation represented by node "C" is executed, an operation represented by node "D" is executed on stream 508.

In at least one embodiment, a second command 510 to launch an execution graph for operations represented by nodes "A"-"D" is issued. In at least one embodiment, a second command 510 to launch an execution graph for operations represented by nodes "A"-"D" may be issued immediately after a first command 506 to launch an execution graph for operations represented by nodes "A"-"D" is issued. In at least one embodiment, a second command 510 to launch an execution graph for operations represented by nodes "A"-"D" may be issued simultaneously with issuing a first command 506 to launch an execution graph for operations represented by nodes "A"-"D." In at least one embodiment, a second command 510 to launch an execution graph for operations represented by nodes "A"-"D" may be issued in parallel with a first command 506 to launch an execution graph for operations represented by nodes "A"-"D."

In at least one embodiment, a second command 510 to launch an execution graph for operations represented by nodes "A"-"D" may execute in a second stream 512. In at least one embodiment, operations represented by nodes "A"-"D" may execute in a first stream 508 simultaneously with operations represented by nodes "A"-"D" executing in a second stream. In at least one embodiment, operations represented by nodes "A"-"D" may execute in a first stream 508 in parallel with operations represented by nodes "A"-"D" executing in a second stream 512. In at least one embodiment, operations represented by node "A" are executed in a second stream 512, followed by execution of operations represented by node "B," followed by execution of operations represented by node "C," and followed by execution of operations represented by node "D."

In at least one embodiment, a third command 514 to launch an execution graph for operations represented by nodes "A"-"D" may execute in a third stream 516. In at least one embodiment, operations represented by node "A" are executed on a third stream 516, followed by execution of operations represented by node "B," followed by execution of operations represented by node "C," and followed by execution of operations represented by node "D." In at least one embodiment, operations represented by nodes "A"-"D" may execute in a third stream 516 simultaneously with operations represented by nodes "A"-"D" executing in a second stream 512 and/or simultaneously with operations represented by nodes "A"-"D" executing in a first stream 508.

In at least one embodiment, not shown in FIG. 5, subsequent commands to launch execution graphs for operations represented by nodes "A"-"D" may execute in additional streams. In at least one embodiment, not shown in FIG. 5, subsequent commands to launch execution graphs for operations represented by nodes "A"-"D" may execute in stream 508, in stream 512, and/or in stream 516 after completion of previously executed operations represented by nodes "A"-"D." In at least one embodiment, not shown in FIG. 5, subsequent commands to launch execution graphs for operations represented by nodes "A"-"D" may execute when stream 508 completes execution of operations represented by node "D", or when stream 512 execution of operations represented by node "D", or when stream 516 complete execution of operations represented by node "D."

Figure 6:
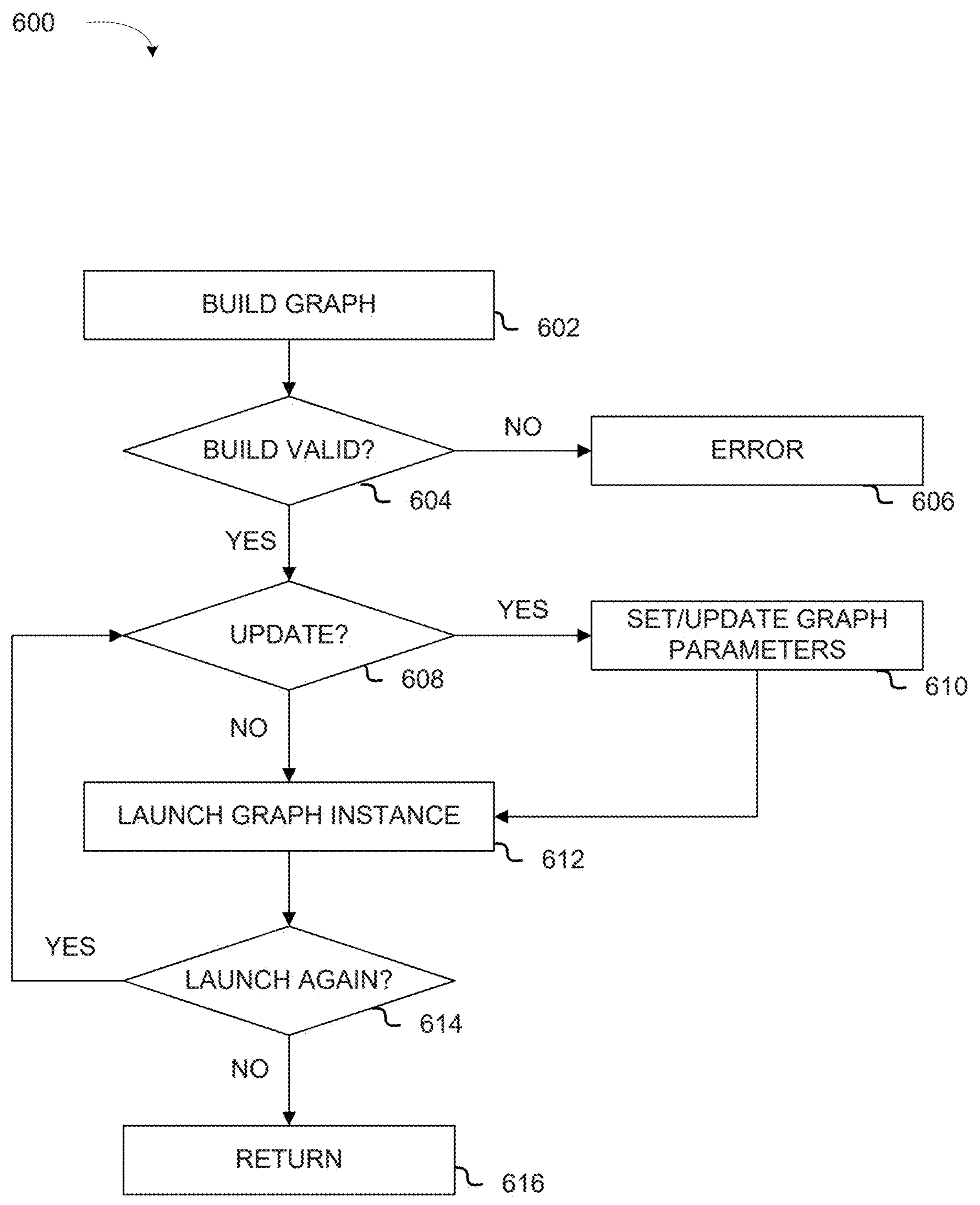
FIG. 6 illustrates an example process for building and launching an execution graph, in accordance with at least one embodiment.

FIG. 6 illustrates an example process 600 for building and launching an execution graph, in accordance with at least one embodiment. In at least one embodiment, a processor such as processor 102 performs example process 600 illustrated in FIG. 6. In at least one embodiment, at block 602, an execution graph is built using systems and methods such as those described herein. In at least one embodiment, an execution graph is built from an execution graph template. In at least one embodiment, an execution graph is built using a graph construction API. In at least one embodiment, an execution graph is built from an execution stream. In at least one embodiment, after block 602, execution advances to block 604.

In at least one embodiment, at block 604, it is determined whether an execution graph is a valid execution graph. In at least one embodiment, at block 604, it is determined whether an execution graph is a valid execution graph by traversing an execution graph to determine whether nodes of an execution graph are valid nodes. In at least one embodiment, it is determined whether an execution graph is a valid execution graph by traversing an execution graph to determine whether dependencies between nodes of an execution graph are valid dependencies. In at least one embodiment, it is determined whether an execution graph is a valid execution graph by evaluating a topology of an execution graph. In at least one embodiment, it is determined whether an execution graph is a valid execution graph by evaluating a topology of an execution graph by evaluating shape information associated with an execution graph.

In at least one embodiment, if at block 604, it is determined that an execution graph is not a valid execution graph (the "NO" branch), execution advances to block 606. In at least one embodiment, if at block 604, it is determined that an execution graph is a valid execution graph (the "YES" branch), execution advances to block 608.

In at least one embodiment, at block 606, an error is returned. In at least one embodiment, an error is returned to a calling process. In at least one embodiment, an error is returned using an error reporting API. In at least one embodiment, an error is returned by using a signal. In at least one embodiment, an error is returned by using a semaphore. In at least one embodiment, an error is returned by using a sentinel value. In at least one embodiment, after block 606, execution of example process 600 terminates.

In at least one embodiment, at block 608, it is determined whether to update an execution graph using systems and methods such as those described herein. In at least one embodiment, it is determined whether to update an execution graph based on receiving an instruction to update execution graph parameters before launching a graph instance of an execution graph. In at least one embodiment, an instruction to update execution graph parameters is received from a calling process. In at least one embodiment, a calling process that sends an instruction to update execution graph parameters is a process executing on a CPU. In at least one embodiment, a calling process that sends an instruction to update execution graph parameters is a process executing on a GPU.

In at least one embodiment, at block 608, it is determined whether to update an execution graph when an instruction to update execution graph parameters is received from a calling process. In at least one embodiment, at block 608, it is determined whether to update an execution graph when an instruction to update execution graph parameters is received using an API. In at least one embodiment, an instruction to update execution graph parameters is received using a signal. In at least one embodiment, an instruction to update execution graph parameters is received using a semaphore. In at least one embodiment, an instruction to update execution graph parameters is received using a sentinel value.

In at least one embodiment, at block 608, it is determined whether to update execution graph parameters based on a parameter associated with an execution graph. In at least one embodiment, at block 608, it is determined whether to update execution graph parameters based on a policy associated with an execution graph. In at least one embodiment, at block 608, it is determined whether to update execution graph parameters based on a flag associated with an execution graph. In at least one embodiment, at block 608, it is determined whether to update execution graph parameters based on receiving an updated template execution graph.

In at least one embodiment, if at block 608, it is determined that an execution graph should be updated (the "YES" branch), execution advances to block 610. In at least one embodiment, if at block 608, it is determined that an execution graph should not be updated (the "NO" branch), execution advances to block 612 to launch an execution graph instance.

In at least one embodiment, at block 610, an execution graph has parameters set or updated using systems and methods such as those described herein. In at least one embodiment, an execution graph has parameters set or updated using an updated template execution graph. In at least one embodiment, an execution graph has parameters set or updated using a graph update API. In at least one embodiment, after block 610, execution advances to block 612 to launch an execution graph instance.

In at least one embodiment, at block 612, an execution graph instance is launched from an execution graph. In at least one embodiment, an execution graph instance is launched on a GPU. In at least one embodiment, an execution graph instance is launched as a result of receiving a command to launch an execution graph instance. In at least one embodiment, command to launch an execution graph instance is received from a calling process. In at least one embodiment, a command to launch an execution graph instance is received from a calling process executing on a CPU. In at least one embodiment, a command to launch an execution graph instance is received from a calling process executing on a GPU. In at least one embodiment, a command to launch an execution graph instance is received from a calling process using an API. In at least one embodiment, after block 612, execution advances to block 614.

In at least one embodiment, at block 614, it is determined whether to relaunch an execution graph using systems and methods such as those described herein. In at least one embodiment, it is determined whether to relaunch an execution graph based on receiving an instruction to launch a new graph instance of an execution graph. In at least one embodiment, an instruction to relaunch an execution graph is received from a calling process. In at least one embodiment, a calling process that sends an instruction to relaunch an execution graph is a process executing on a CPU. In at least one embodiment, a calling process that sends an instruction to relaunch an execution graph is a process executing on a GPU.

In at least one embodiment, if at block 614, it is determined to relaunch an execution graph (the "YES" branch), execution returns to block 608 where it is determined whether to update an execution graph as described above. In at least one embodiment, an execution graph may be relaunched with unchanged parameters as a result of determining, at block 608, not to update an execution graph. In at least one embodiment, an execution graph may be relaunched after updating graph parameters (as a result of determining, at block 608, to update an execution graph. In at least one embodiment, an execution graph may be relaunched with unchanged parameters in some instantiations and may be relaunched with updated parameters in some instantiations.

In at least one embodiment, if at block 614, it is determined to not relaunch an execution graph (the "NO" branch), execution advances to block 616. In at least one embodiment, at block 616, example process 600 returns. In at least one embodiment, at block 616, an indication of successful completion of process 600 is returned. In at least one embodiment, an indication of successful completion of process 600 is returned to a calling process. In at least one embodiment, an indication of successful completion of process 600 is returned using a reporting API. In at least one embodiment, an indication of successful completion of process 600 is returned using a signal. In at least one embodiment, an indication of successful completion of process 600 is returned using a semaphore. In at least one embodiment, an indication of successful completion of process 600 is returned using a sentinel value. In at least one embodiment, after block 616, execution of example process 600 terminates.

Figure 7:
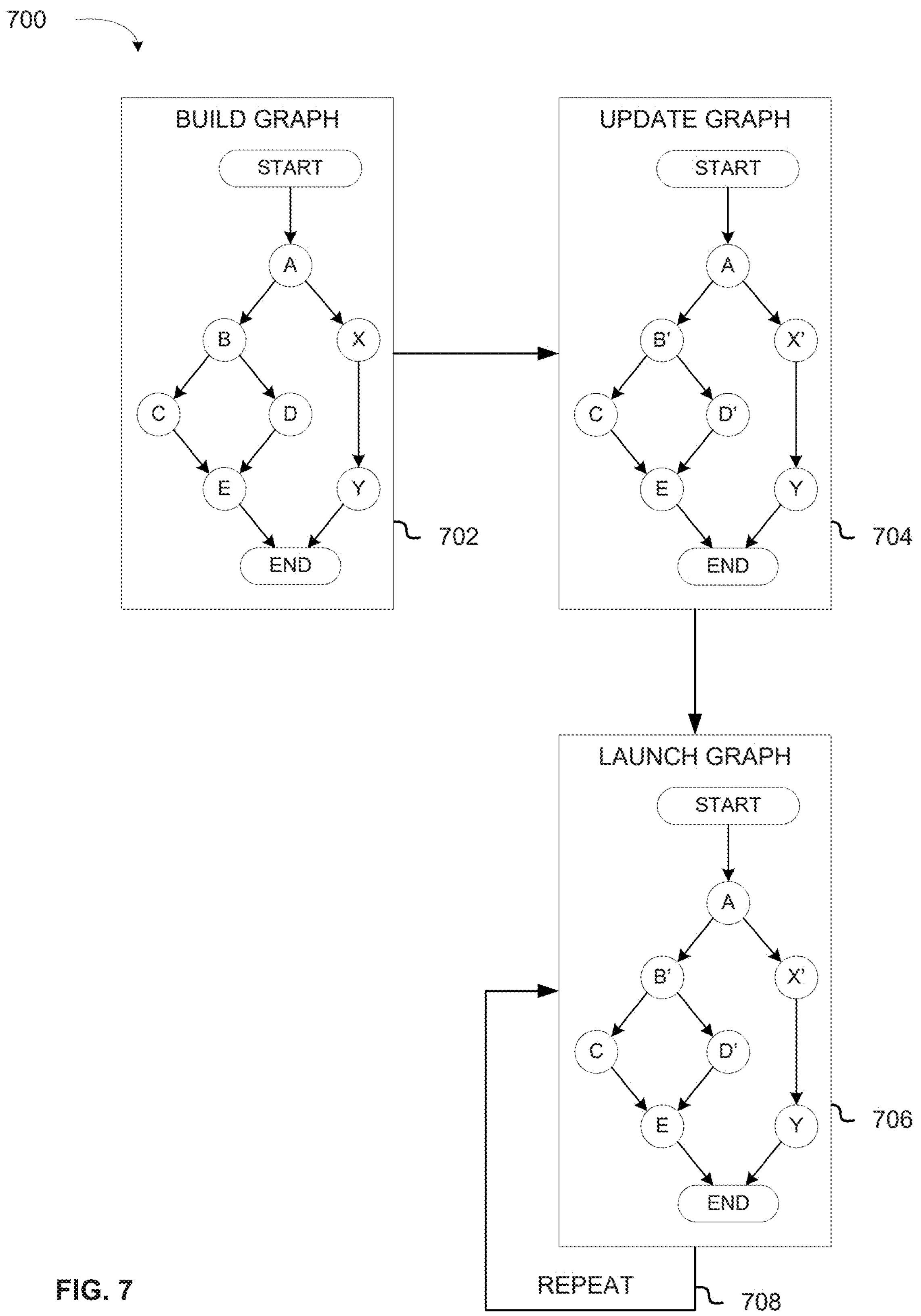
FIG. 7 illustrates an example environment where an execution graph is built, updated, and repeatedly launched, in accordance with at least one embodiment.

FIG. 7 illustrates an example environment 700 where an execution graph is built, updated, and repeatedly launched, in accordance with at least one embodiment. In at least one embodiment, an execution graph 702 is built using systems and methods such as those described herein. In at least one embodiment, a computer system builds an execution graph from an execution graph template. In at least one embodiment, a computer system builds an execution graph using a graph construction API. In at least one embodiment, a computer system builds an execution graph from an execution stream.

In at least one embodiment, an execution graph is updated 704. In at least one embodiment, parameters of nodes of an execution graph are updated 704 before an execution graph is launched. In at least one embodiment, for example, parameters of an operation represented by node "B" are updated (denoted as "B'" in FIG. 7). In at least one embodiment, for example, parameters of an operation represented by node "D" are updated (denoted as "D" in FIG. 7). In at least one embodiment, for example, parameters of an operation represented by node "X" are updated (denoted as "X'" in FIG. 7).

In at least one embodiment, for example, an execution graph may have a kernel node that updates a texture object on a GPU. In at least one embodiment, a kernel node that updates a texture object on a GPU may update a texture based on a parameter associated with an update to a texture node. In at least one embodiment, for example, a kernel node may update a level of detail of a texture based on an environment parameter. In at least one embodiment, parameters of nodes of an execution graph may be updated before a graph instance is launched.

In at least one embodiment, an execution graph is updated 704 using an execution graph template. In at least one embodiment, an execution graph template includes one or more new parameters for nodes of an execution graph. In at least one embodiment, an execution graph is updated 704 using an API. In at least one embodiment, an execution graph is updated 704 as a result of receiving an instruction to perform an update. In at least one embodiment, an instruction to perform an update is received from a calling process. In at least one embodiment, an instruction to perform an update is received from a calling process running on a CPU. In at least one embodiment, an instruction to perform an update is received from a calling process running on a GPU.

In at least one embodiment, an updated graph is launched 706 with new parameters. In at least one embodiment, an execution graph is launched 706 using an API. In at least one embodiment, an execution graph is launched 706 as a result of receiving an instruction to launch an instance of an execution graph. In at least one embodiment, an instruction to launch an instance of an execution graph is received from a calling process. In at least one embodiment, an instruction to launch an instance of an execution graph is received from a calling process running on a CPU. In at least one embodiment, an instruction to launch an instance of an execution graph is received from a calling process running on a GPU.

In at least one embodiment, an updated graph is repeatedly launched 708. In at least one embodiment, an updated graph is repeatedly launched 708 a predetermined number of times. In at least one embodiment, an updated graph is repeatedly launched 708 until a terminating condition occurs. In at least one embodiment, an updated graph is repeatedly launched 708 until notification of a terminating condition is received. In at least one embodiment, a notification of a terminating condition is received using an API. In at least one embodiment, a notification of a terminating condition is received from a calling process. In at least one embodiment, a notification of a terminating condition is received from a calling process running on a CPU. In at least one embodiment, a notification of a terminating condition is received from a calling process running on a GPU. In at least one embodiment, an updated graph is repeatedly launched 708 until a signal is received. In at least one embodiment, an updated graph is repeatedly launched 708 until a semaphore is received. In at least one embodiment, an updated graph is repeatedly launched 708 until a sentinel value is received.

Figure 8:
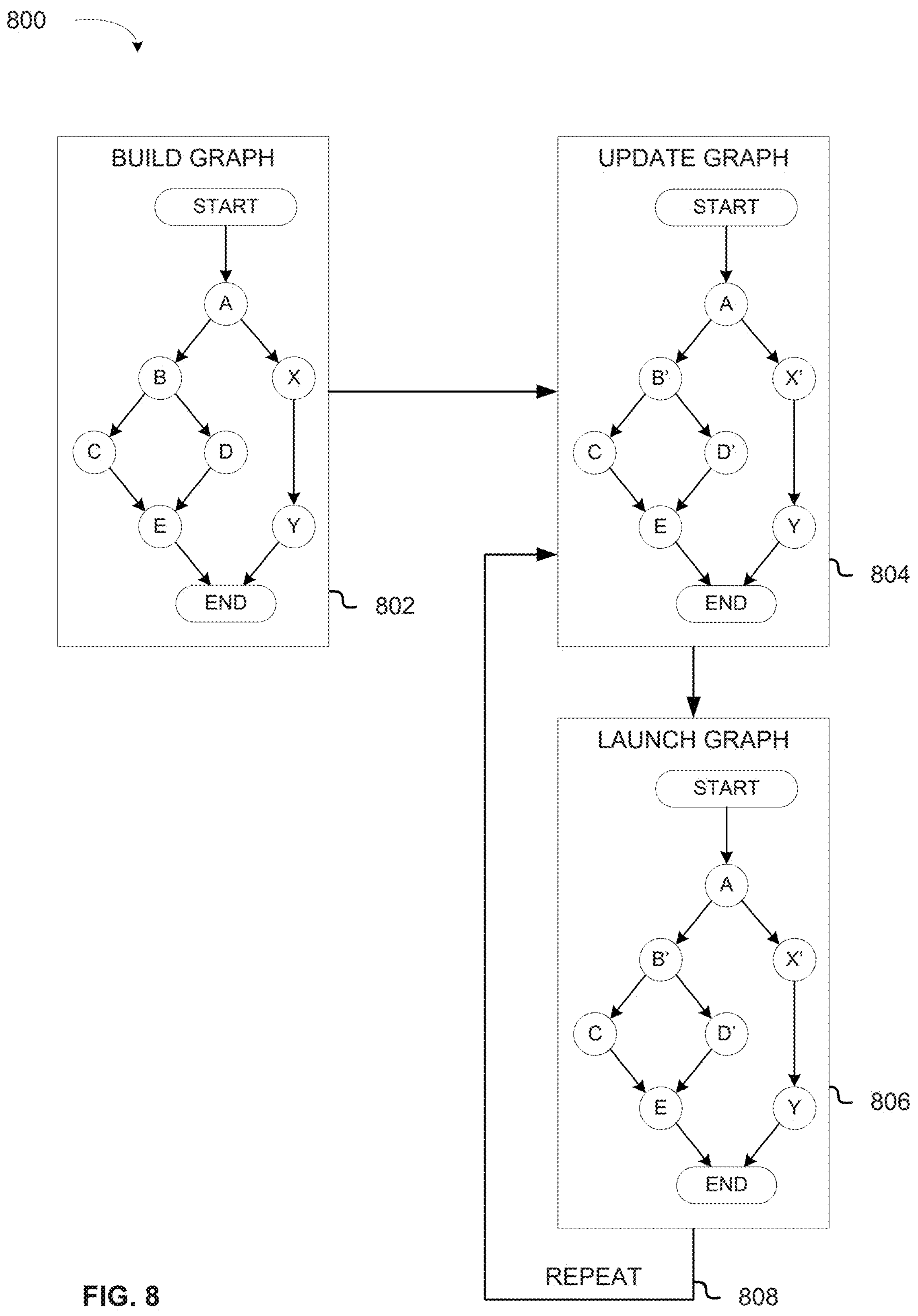
FIG. 8 illustrates an example environment where an execution graph is built and repeatedly updated and relaunched, in accordance with at least one embodiment.

FIG. 8 illustrates an example environment 800 where an execution graph is built and repeatedly updated and relaunched, in accordance with at least one embodiment. In at least one embodiment, an execution graph is built 802 using systems and methods such as those described herein. In at least one embodiment, an execution graph is built 802 from an execution graph template. In at least one embodiment, an execution graph is built 802 using a graph construction API. In at least one embodiment, an execution graph is built 802 from an execution stream.

In at least one embodiment, an execution graph is updated 804. In at least one embodiment, parameters of nodes of an execution graph are updated. In at least one embodiment, for example, parameters of an operation represented by node "B" are updated (denoted as "B'" in FIG. 8), parameters of an operation represented by node "D" are updated (denoted as "D" in FIG. 8), and parameters of an operation represented by node "X" are updated (denoted as "X" in FIG. 8). In at least one embodiment, for example, an execution graph may have a kernel node that updates a texture object on a GPU. In at least one embodiment, a kernel node that updates a texture object on a GPU may update a texture based on a parameter associated with an update to a texture node. In at least one embodiment, for example, a kernel node may update a level of detail of a texture based on an environment parameter.

In at least one embodiment, an execution graph is updated 804 using an execution graph template. In at least one embodiment, an execution graph template includes one or more new parameters for nodes of an execution graph. In at least one embodiment, an execution graph is updated 804 using an API. In at least one embodiment, an execution graph is updated 804 as a result of receiving an instruction to perform an update. In at least one embodiment, an instruction to perform an update is received from a calling process. In at least one embodiment, an instruction to perform an update is received from a calling process running on a CPU. In at least one embodiment, an instruction to perform an update is received from a calling process running on a GPU.

In at least one embodiment, an updated graph is launched 806 with new parameters. In at least one embodiment, an execution graph is launched 806 using an API. In at least one embodiment, an execution graph is launched 806 as a result of receiving an instruction to launch an instance of an execution graph. In at least one embodiment, an instruction to launch an instance of an execution graph is received from a calling process. In at least one embodiment, an instruction to launch an instance of an execution graph is received from a calling process running on a CPU. In at least one embodiment, an instruction to launch an instance of an execution graph is received from a calling process running on a GPU.

In at least one embodiment, an updated graph is repeatedly 808 updated 804 and launched 806. In at least one embodiment, an updated graph is repeatedly 808 updated 804 and launched 806 a predetermined number of times. In at least one embodiment, an updated graph is repeatedly 808 updated 804 and launched 806 until a terminating condition occurs. In at least one embodiment, an updated graph is repeatedly 808 updated 804 and launched 806 until notification of a terminating condition is received. In at least one embodiment, a notification of a terminating condition is received using an API In at least one embodiment, a notification of a terminating condition is received from a calling process. In at least one embodiment, a notification of a terminating condition is received from a calling process running on a CPU. In at least one embodiment, a notification of a terminating condition is received from a calling process running on a GPU. In at least one embodiment, an updated graph is repeatedly 808 updated 804 and launched 806 until a signal is received. In at least one embodiment, an updated graph is repeatedly 808 updated 804 and launched 806 until a semaphore is received. In at least one embodiment, an updated graph is repeatedly 808 updated 804 and launched 806 until a sentinel value is received.

In at least one embodiment, an execution graph is updated 804 before being launched 806 for a first time. In at least one embodiment, an execution graph is not updated 804 before being launched 806 for a first time. In at least one embodiment, when an updated graph is repeatedly 808 updated 804 and launched 806, an update may not alter any parameters. In at least one embodiment, for example, an update may not update parameters and may instead re-launch an execution graph with identical parameters. In at least one embodiment, when an updated graph is repeatedly 808 updated 804 and launched 806, an update may update a subset of a set of parameters. In at least one embodiment, for example, a first update may update a first subset of a set of parameters of an execution graph and a second update may update a second subset of a set of parameters.

Figure 9:
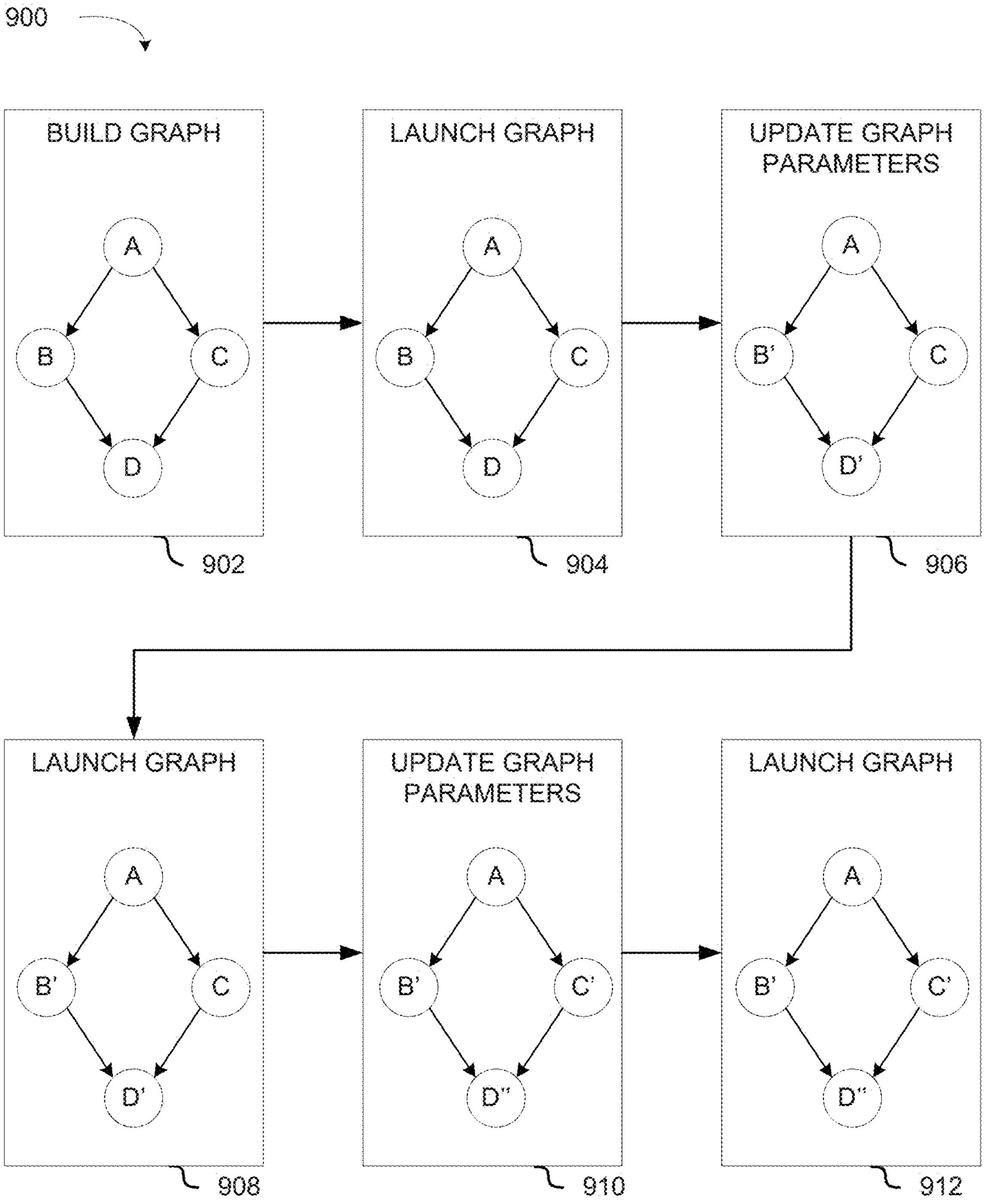
FIG. 9 illustrates an example environment where an execution graph is built, launched, and updated, in accordance with at least one embodiment.

FIG. 9 illustrates an example environment 900 where an execution graph is built, launched, and updated, in accordance with at least one embodiment. In at least one embodiment, an execution graph is built 902 using systems and methods such as those described herein. In at least one embodiment, an execution graph is launched 904 using systems and methods such as those described herein. In at least one embodiment, for example, an execution graph is launched 904 and an operation represented by node "A" is executed, followed by an operation represented by node "B" and an operation represented by node "C" and then, after both operations complete, an operation represented by node "D" is executed.

In at least one embodiment, after execution, an execution graph is updated 906 using systems and methods such as those described herein. In at least one embodiment, for example, parameters of an operation represented by node "B" are updated (denoted as "B"' in FIG. 9) and parameters of an operation represented by node "D" are also updated (denoted as "D" in FIG. 9).

In at least one embodiment, an execution graph is relaunched 908 with updated parameters. In at least one embodiment, for example, an execution graph is relaunched 908 and an operation represented by node "A" is executed, followed by an operation represented by node "B" and an operation represented by node "C" and then, after both operations complete, an operation represented by node "D" is executed.

In at least one embodiment, after execution, an execution graph is reupdated 910 using systems and methods such as those described herein. In at least one embodiment, for example, parameters of an operation represented by node "C" are updated (denoted as "C" in FIG. 9) and parameters of an operation represented by node "D" are updated again (denoted as "D" in FIG. 9).

In at least one embodiment, an execution graph is relaunched 912 with reupdated parameters. In at least one embodiment, for example, an execution graph is relaunched 912 and an operation represented by node "A" is executed, followed by an operation represented by node "B" and an operation represented by node "C" and then, after both operations complete, an operation represented by node "D" is executed.

Figure 10:
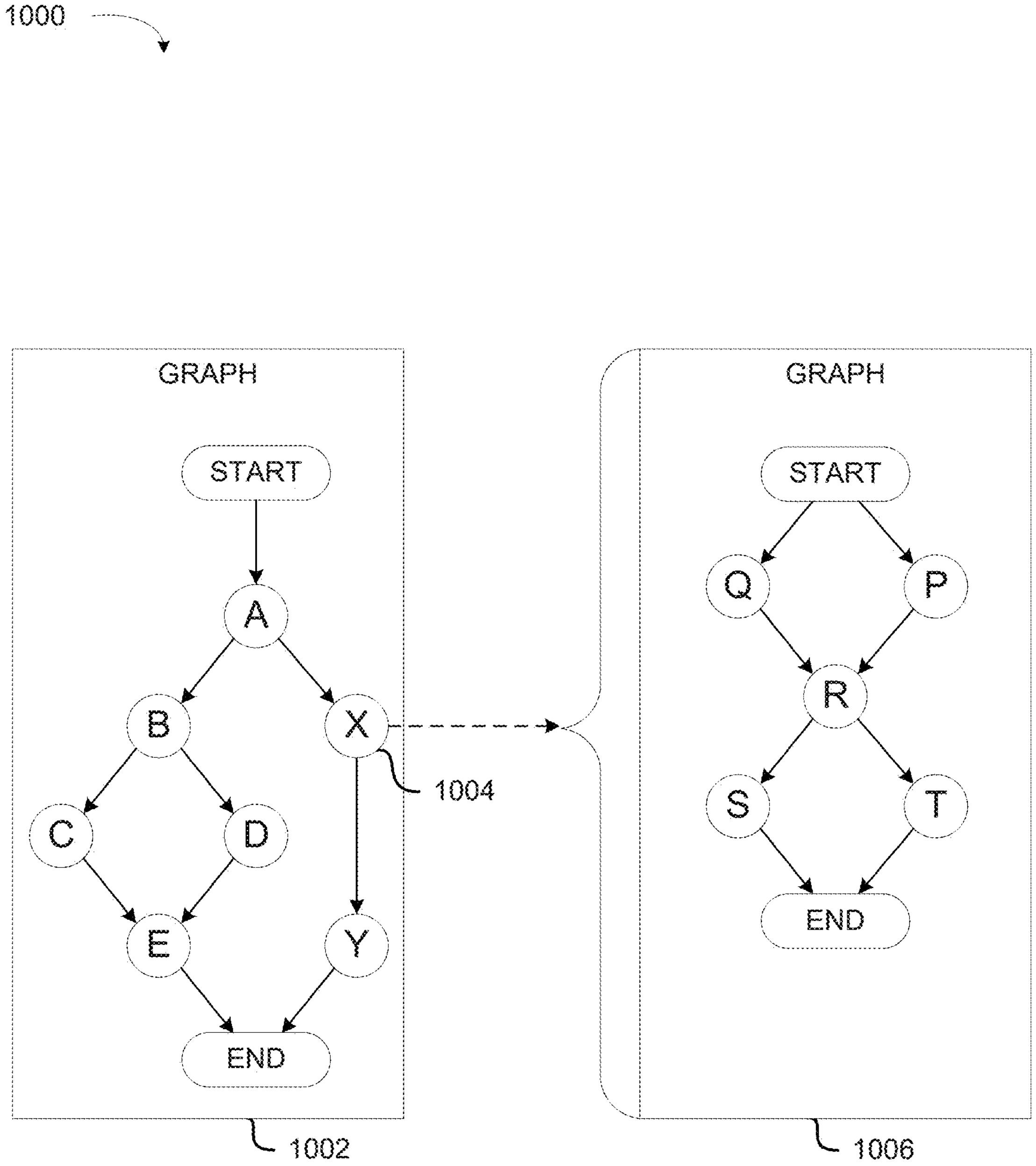
FIG. 10 illustrates an example execution graph template of an execution graph with a child graph node, in accordance with at least one embodiment.

FIG. 10 illustrates an example execution graph template 1000 of an execution graph with a child graph node, in accordance with at least one embodiment. In at least one embodiment, an execution graph template 1002 has a set of nodes and edges that represent operations and dependencies between operations, as described herein. In at least one embodiment, an execution graph template 1002 includes a graph node 1004, which is a node of a graph that represents a sub-graph 1006.

In at least one embodiment, for example, an execution graph template 1002 includes a node "A" with dependent nodes "B" and "X." In at least one embodiment, as described herein, an operation represented by node "B" may execute after an operation represented by node "A" completes. In at least one embodiment, an operation represented by node "X" may also execute after an operation represented by node "A" completes. In at least one embodiment, when an execution graph template 1002 includes a graph node 1004 (node "X") that represents a sub-graph 1006, a sub-graph 1006 may execute after an operation represented by node "A" completes. In at least one embodiment, an operation represented by node "Q" and an operation represented by node "R" of sub-graph 1006 may execute after an operation represented by node "A" completes.

In at least one embodiment, an execution graph template 1002 includes a node "X" with dependent node "Y." In at least one embodiment, an operation represented by node "Y" may execute after an operation represented by node "X" completes, as described herein. In at least one embodiment, when an execution graph template 1002 includes a graph node 1004 (node "X") that represents a sub-graph 1006, an operation represented by node "Y" may execute after execution of a sub-graph 1006 completes. In at least one embodiment, an operation represented by node "Y" may execute after an operation represented by node "S" complete and an operation represented by node "T" of sub-graph 1006 both complete.

Figure 11:
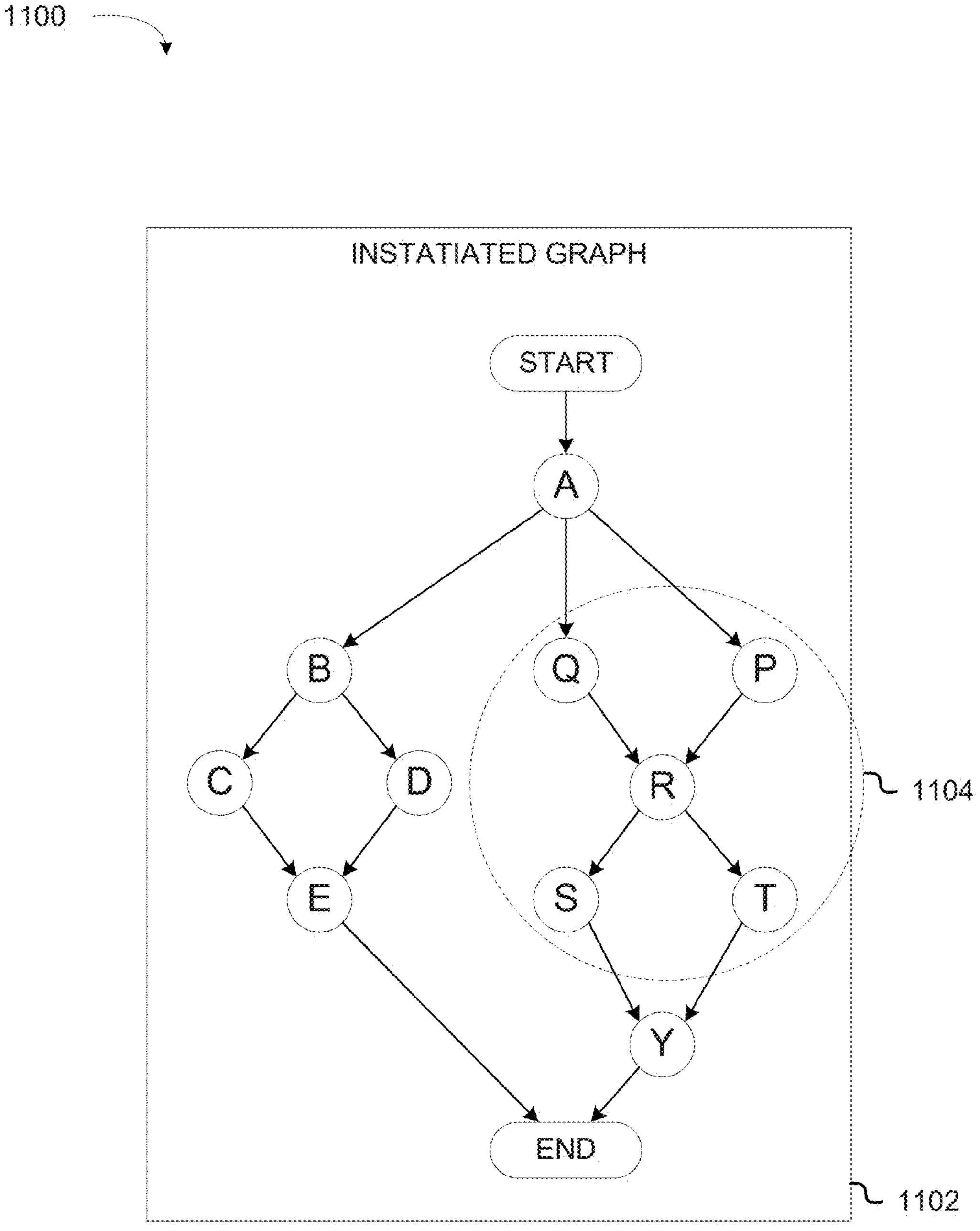
FIG. 11 illustrates an example flattened graph template of an execution graph with a child graph node, in accordance with at least one embodiment.

FIG. 11 illustrates an example flattened graph template 1100 of an execution graph with a child graph node, in accordance with at least one embodiment. In at least one embodiment, an execution graph template 1102 has a set of nodes and edges that represent operations and dependencies between operations, as described herein. In at least one embodiment, an execution graph template 1102 shows an execution graph that results from replacing a graph node (node 1004) with a sub-graph (sub-graph 1006). In at least one embodiment, a sub-graph 1104 is inserted into an execution graph in place of a graph node.

In at least one embodiment, for example, an operation represented by node "B," and operation represented by node "Q," and an operation represented by node "P" may execute after execute after an operation represented by node "A" completes and an operation represented by node "Y" may execute after an operation represented by node "S" and an operation represented by node "T" both complete. In at least one embodiment, topology information of an execution graph with a child graph node has been lost when a graph node (node 1004) is replaced with a sub-graph (sub-graph 1006). In at least one embodiment, for example, node "A" has an additional child, nodes "Q" and "P" have a different parent (node "A"), node "Y" has different parents (nodes "S" and "T"), and node "X" is no longer present.

Figure 12:
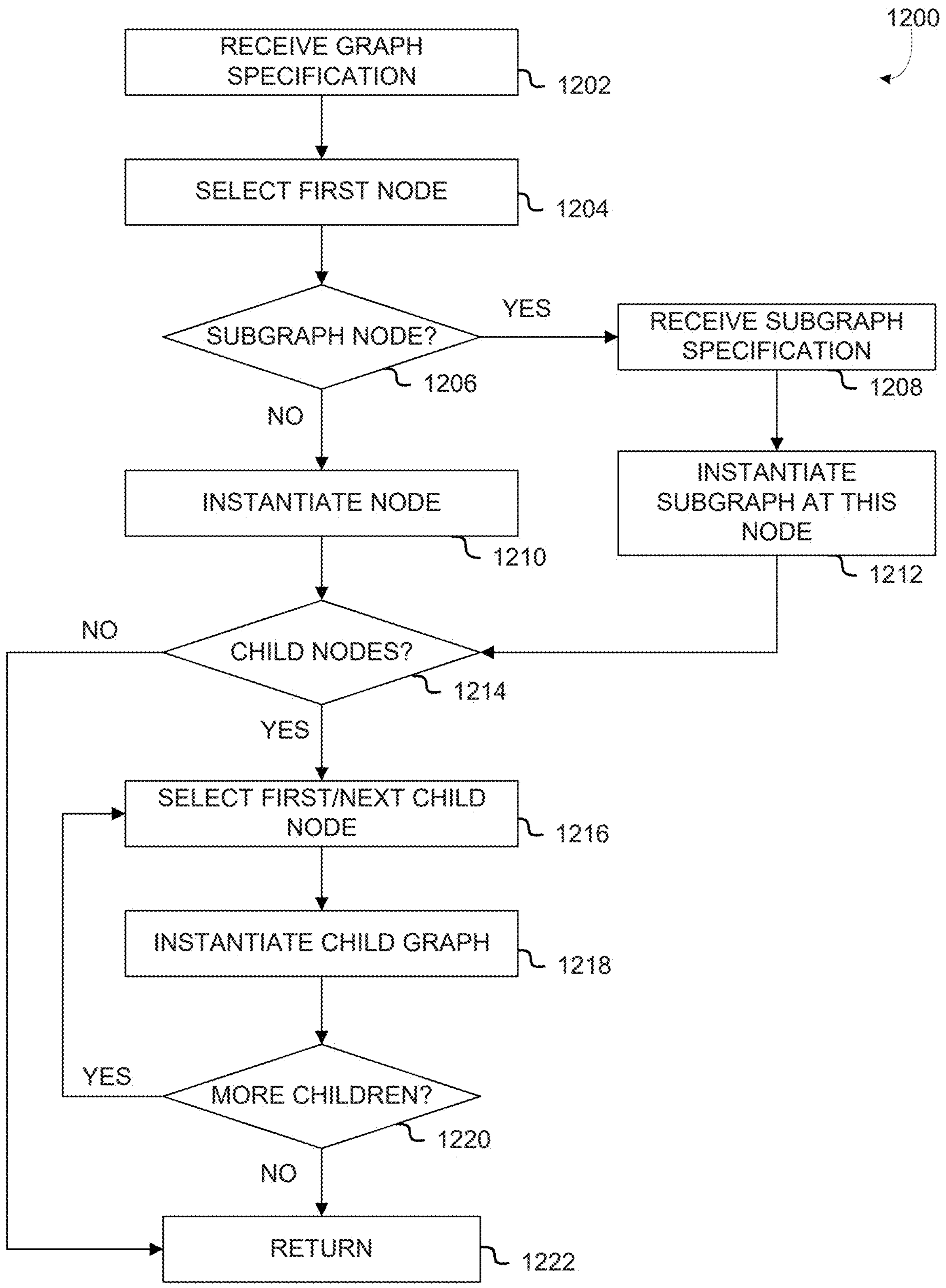
FIG. 12 illustrates an example process for instantiating an execution graph with a child graph node, in accordance with at least one embodiment.

FIG. 12 illustrates an example process 1200 for instantiating an execution graph with a child graph node, in accordance with at least one embodiment. In at least one embodiment, a processor such as processor 102 performs example process 1200 illustrated in FIG. 12. In at least one embodiment, at block 1202, an execution graph specification is received. In at least one embodiment, at block 1202, an execution graph specification is received from a calling process. In at least one embodiment, at block 1202, an execution graph specification is received from a CPU. In at least one embodiment, at block 1202, an execution graph specification is received from a GPU. In at least one embodiment, after execution of block 1202, execution advances to block 1204.

In at least one embodiment, at block 1204, a first node of an execution graph specification is selected for processing. In at least one embodiment, after execution of block 1204, execution advances to block 1206.

In at least one embodiment, at block 1206, it is determined whether a node of an execution graph specification is a graph node. In at least one embodiment, if at block 1206, it is determined that a node of an execution graph specification is a graph node (the "YES" branch), execution advances to block 1210. In at least one embodiment, if at block 1206, it is determined that a node of an execution graph specification is not a graph node (the "NO" branch), execution advances to block 1208.

In at least one embodiment, at block 1208, a non-sub-graph node is instantiated using systems and methods such as those described herein. In at least one embodiment, after execution of block 1208, execution advances to block 1214.

In at least one embodiment, at block 1210, an execution graph specification for a sub-graph represented by a graph node is received. In at least one embodiment, an execution graph specification for a sub-graph represented by a graph node is received from a calling process. In at least one embodiment, an execution graph specification for a sub-graph represented by a graph node is received from a CPU. In at least one embodiment, an execution graph specification for a sub-graph represented by a graph node is received from a GPU. In at least one embodiment, after execution of block 1210, execution advances to block 1212.

In at least one embodiment, at block 1212, a sub-graph represented by an execution graph specification is instantiated at a location in a graph represented by a graph node, using systems and methods such as those described herein. In at least one embodiment, after execution of block 1212, execution advances to block 1214.

In at least one embodiment, at block 1214, it is determined whether there are child nodes of a current node to process. In at least one embodiment, if at block 1206, it is determined that there are child nodes of a current node to process (the "YES" branch), execution advances to block 1216. In at least one embodiment, if at block 1206, it is determined there are not child nodes of a current node to process (the "NO" branch), execution advances to block 1222.

In at least one embodiment, at block 1216, a first child node of a current node is selected. In at least one embodiment, after execution of block 1216, execution advances to block 1218. In at least one embodiment, at block 1218, a graph with descendants at a location in a graph at a selected child node is instantiated. In at least one embodiment, at block 1218, a graph with descendants at a location in a graph at a selected child node is recursively instantiated. In at least one embodiment, after execution of block 1218, execution advances to block 1220.

In at least one embodiment, at block 1220, it is determined whether there are more child nodes to process. In at least one embodiment, if at block 1220, it is determined that there are more child nodes to process (the "YES" branch), execution continues at block 1214 and a next child node is selected. In at least one embodiment, if at block 1220, it is determined that there are no more child nodes to process (the "NO" branch), execution advances to block 1222.

In at least one embodiment, at block 1222, example process 1200 returns. In at least one embodiment, at block 1222, an indication of successful completion of process 1200 is returned. In at least one embodiment, an indication of successful completion is returned to a calling process. In at least one embodiment, an indication of successful completion is returned using a reporting API. In at least one embodiment, an indication of successful completion is returned using a signal. In at least one embodiment, an indication of successful completion is returned using a semaphore. In at least one embodiment, an indication of successful completion is returned using a sentinel value. In at least one embodiment, after block 1222, execution of example process 1200 terminates.

Figure 13:
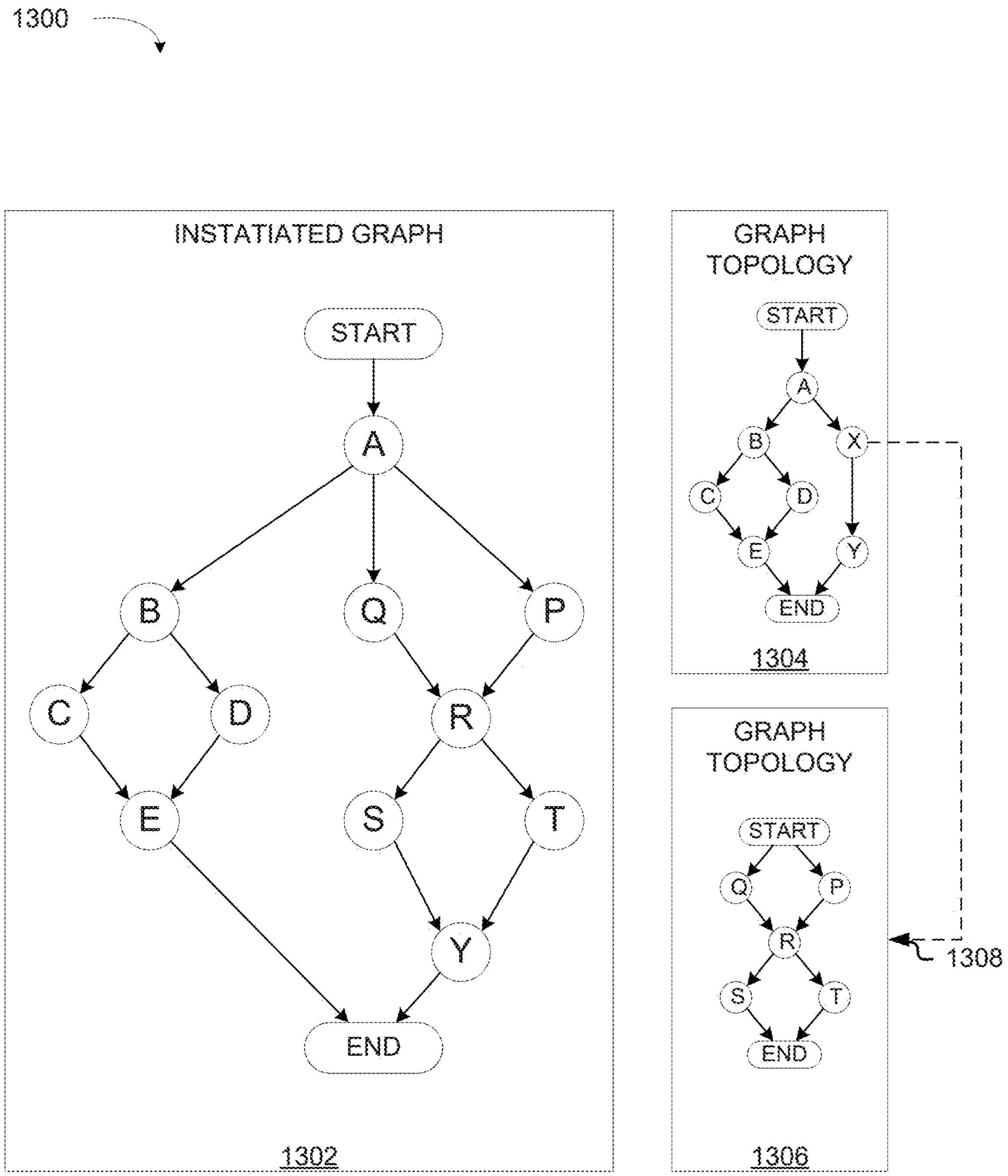
FIG. 13 illustrates an example environment where topology information for an execution graph with a child graph node is saved, in accordance with at least one embodiment.

FIG. 13 illustrates an example environment 1300 where topology information for an execution graph with a child graph node is saved, in accordance with at least one embodiment. In at least one embodiment, an execution graph template 1302 has a set of nodes and edges that represent operations and dependencies between operations, as described herein. In at least one embodiment, an execution graph template 1302 shows an execution graph that results from replacing a graph node 1004 with a sub-graph 1006, as illustrated in FIG. 10.

In at least one embodiment, a computer system stores topology information 1304 for an execution graph template with a node (node "X") that represents a sub-graph. In at least one embodiment, when a computer system stores topology information 1304 for an execution graph template that includes a node (node "X") that represents a sub-graph, a computer system also stores 1308 topology information 1306 for a sub-graph.

In at least one embodiment, when a computer system stores 1308 topology information 1306 for sub-graph, a computer system stores 1308 topology information 1306 for a sub-graph separately from stored topology information 1304 for a graph with a node (node "X") that represents a sub-graph.

Figure 14:
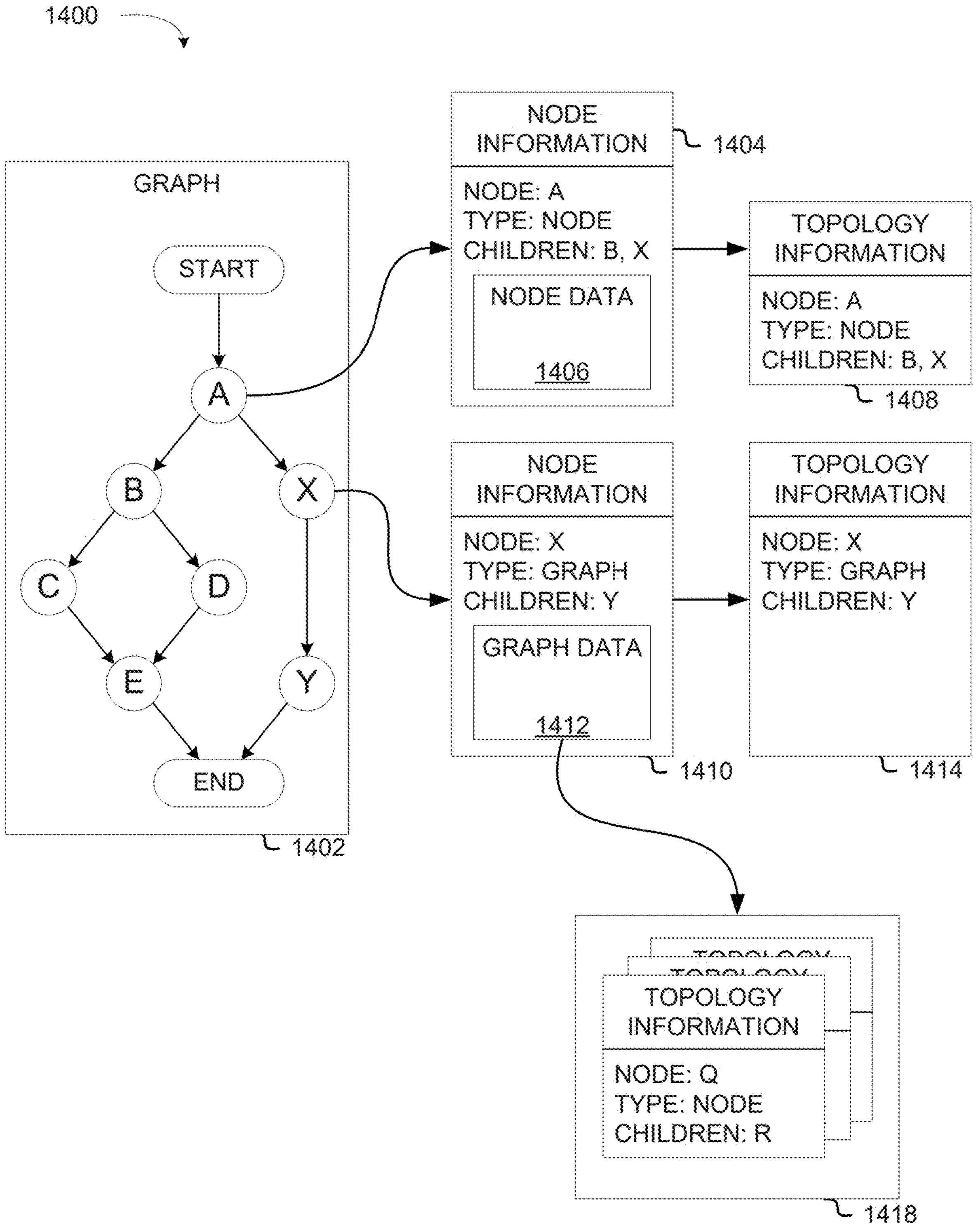
FIG. 14 illustrates an example data structure where topology information for an execution graph with a child graph node is saved, in accordance with at least one embodiment.

FIG. 14 illustrates an example data structure 1400 where topology information for an execution graph with a child graph node is saved, in accordance with at least one embodiment. In at least one embodiment, an execution graph template 1402 has a set of nodes and edges that represent operations and dependencies between operations, as described herein. In at least one embodiment, an execution graph template 1402 shows an execution graph that includes a graph node (graph 1002).

In at least one embodiment, a computer system stores node information 1404 for a node (a kernel node "A"). In at least one embodiment, node information 1404 for a node includes a node identifier. In at least one embodiment, node information 1404 for a node includes a node type (a kernel node). In at least one embodiment, node information 1404 for a node includes a list of one or more dependent nodes. In at least one embodiment, node information 1404 for a node includes a set of other node data 1406 that may not be related to topology information for a node.

In at least one embodiment, a computer system stores topology information 1408 for a node (a kernel node "A"). In at least one embodiment, topology information 1408 for a node includes a node identifier, a node type (a kernel node), and/or a list of one or more dependent nodes. In at least one embodiment, topology information 1408 for a node does not include a set of other node data 1406 that may not be related to topology information for a node.

In at least one embodiment, a computer system stores node information 1410 for a graph node (a graph node "X"). In at least one embodiment, node information 1410 for a graph node includes a node identifier. In at least one embodiment, node information 1410 for a graph node includes a node type (a graph node). In at least one embodiment, node information 1404 for a graph node includes a list of one or more dependent nodes. In at least one embodiment, node information for a graph node includes a set of graph data 1412. In at least one embodiment, a set of graph data 1412 is used to store topology information 1418 for a subgraph of a graph node.

In at least one embodiment, a computer system stores topology information 1414 for a graph node (a graph node "X"). In at least one embodiment, topology information 1414 for a graph node includes a node identifier, a node type (a graph node), and/or a list of one or more dependent nodes.

Figure 15:
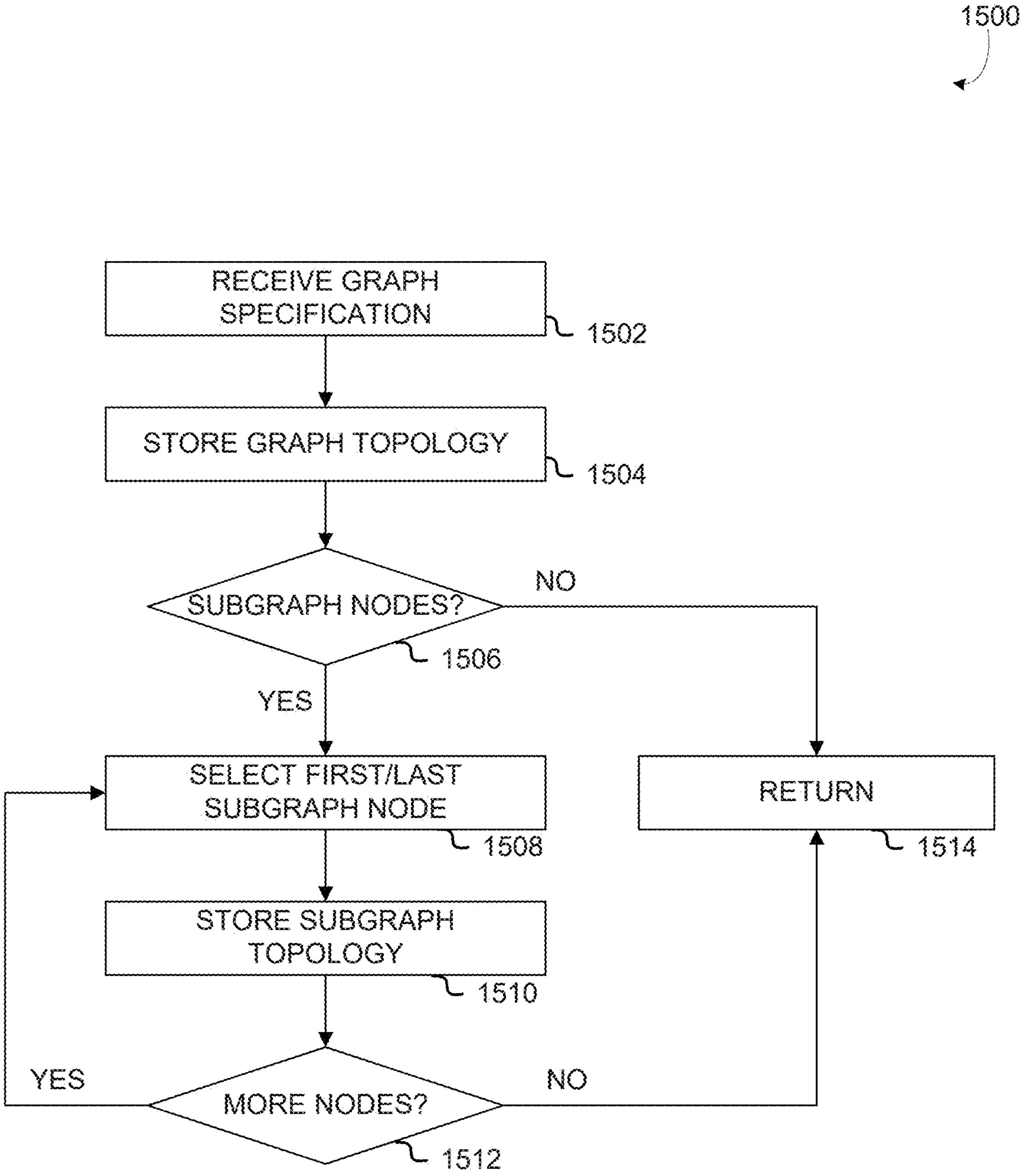
FIG. 15 illustrates an example process for saving topology information for an execution graph with a child graph node, in accordance with at least one embodiment.

FIG. 15 illustrates an example process 1500 for saving topology information for an execution graph with a child graph node, in accordance with at least one embodiment. In at least one embodiment, a processor such as processor 102 performs example process 1500 illustrated in FIG. 15. In at least one embodiment, at block 1502, an execution graph specification is received. In at least one embodiment, an execution graph specification is received from a calling process. In at least one embodiment, an execution graph specification is received from a CPU. In at least one embodiment, an execution graph specification is received from a GPU. In at least one embodiment, after execution of block 1502, execution advances to block 1504.

In at least one embodiment, at block 1504, topology information for an execution graph specification is stored. In at least one embodiment, topology information that includes a description of nodes and dependencies of an execution graph is stored. In at least one embodiment, for example, a type and a list of nodes that depend from a node is stored with topology information for each node in an execution graph specification. In at least one embodiment, a list of parent nodes is stored with topology information for each node in an execution graph. In at least one embodiment, after execution of block 1504, execution advances to block 1506.

In at least one embodiment, at block 1506, it is determined whether a node of an execution graph specification is a graph node. In at least one embodiment, if at block 1506, it is determined that a node of an execution graph specification is a sub-graph node (the "YES" branch), execution advances to block 1508. In at least one embodiment, if at block 1506, it is determined that a node of an execution graph specification is not a sub-graph node (the "NO" branch), execution advances to block 1514.

In at least one embodiment, at block 1508, a first node of an execution graph specification that is a graph node is selected. In at least one embodiment, after execution of block 1508, execution advances to block 1510. In at least one embodiment, at block 1510, a sub-graph topology for a sub-graph represented by a graph node is stored. In at least one embodiment, at block 1510, a sub-graph topology for a sub-graph represented by a graph node is recursively stored. In at least one embodiment, after execution of block 1510, execution advances to block 1512.

In at least one embodiment, at block 1512, it is determined whether there are more nodes of an execution graph specification that are graph nodes. In at least one embodiment, if at block 1506, it is determined that there are more nodes of an execution graph specification that are graph nodes (the "YES" branch), execution continues at block 1508 and a next node to process is selected. In at least one embodiment, if at block 1512, it is determined that there are not more nodes of an execution graph specification that are graph nodes (the "NO" branch), execution advances to block 1514.

In at least one embodiment, at block 1514, example process 1500 returns. In at least one embodiment, at block 1514, an indication of successful completion of process 1500 is returned. In at least one embodiment, an indication of successful completion is returned to a calling process. In at least one embodiment, an indication of successful completion is returned using a reporting API. In at least one embodiment, an indication of successful completion is returned using a signal. In at least one embodiment, an indication of successful completion is returned using a semaphore. In at least one embodiment, an indication of successful completion is returned using a sentinel value. In at least one embodiment, after block 1514, execution of example process 1500 terminates.

In the following description, numerous specific details are set forth to provide a more thorough understanding of at least one embodiment. However, it will be apparent to one skilled in the art that the inventive concepts may be practiced without one or more of these specific details.

Data Center

In at least one embodiment, a computer system in a data center is equipped with processors. In at least one embodiment, processors of a computer system are accessed via an application programming interface ("API"). In at least one embodiment, a data center may be data center 1600 or processing system 1700. In at least one embodiment, performance of an API causes instructions to be performed that instantiate an execution graph with a child graph node. In at least one embodiment, performance of an API causes instructions to be performed that update an execution graph with a child graph node using systems and methods such as those described herein. In at least one embodiment, performance of an API causes instructions to be performed that store topology information for an execution graph with a child graph node.

Figure 16:
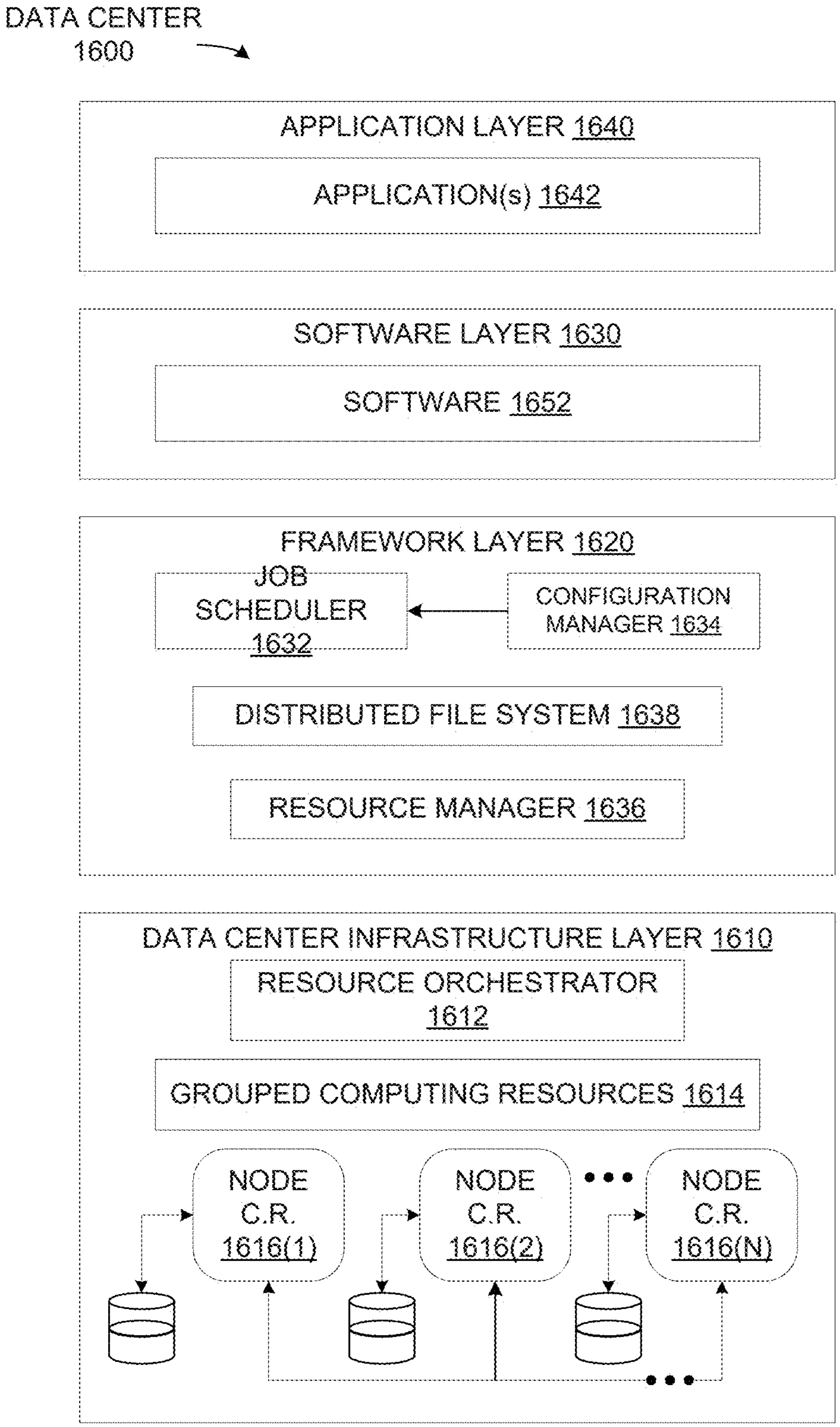
FIG. 16 illustrates an exemplary data center, in accordance with at least one embodiment.

FIG. 16 illustrates an exemplary data center 1600, in accordance with at least one embodiment. In at least one embodiment, data center 1600 includes, without limitation, a data center infrastructure layer 1610, a framework layer 1620, a software layer 1630 and an application layer 1640.

In at least one embodiment, as shown in FIG. 16, data center infrastructure layer 1610 may include a resource orchestrator 1612, grouped computing resources 1614, and node computing resources ("node C.R.s") 1616(1)-1616(N), where "N" represents any whole, positive integer. In at least one embodiment, node C.R.s 1616(1)-1616(N) may include, but are not limited to, any number of central processing units ("CPUs") or other processors (including accelerators, field programmable gate arrays ("FPGAs"), data processing units ("DPUs") in network devices, graphics processors, etc.), memory devices (e.g., dynamic read-only memory), storage devices (e.g., solid state or disk drives), network input/output ("NW I/O") devices, network switches, virtual machines ("VMs"), power modules, and cooling modules, etc. In at least one embodiment, one or more node C.R.s from among node C.R.s 1616(1)-1616(N) may be a server having one or more of above-mentioned computing resources.

In at least one embodiment, grouped computing resources 1614 may include separate groupings of node C.R.s housed within one or more racks (not shown), or many racks housed in data centers at various geographical locations (also not shown). In at least one embodiment, separate groupings of node C.R.s within grouped computing resources 1614 may include grouped compute, network, memory or storage resources that may be configured or allocated to support one or more workloads. In at least one embodiment, several node C.R.s including CPUs or processors may grouped within one or more racks to provide compute resources to support one or more workloads. In at least one embodiment, one or more racks may also include any number of power modules, cooling modules, and network switches, in any combination.

In at least one embodiment, resource orchestrator 1612 may configure or otherwise control one or more node C.R.s 1616(1)-1616(N) and/or grouped computing resources 1614. In at least one embodiment, resource orchestrator 1612 may include a software design infrastructure ("SDI") management entity for data center 1600. In at least one embodiment, resource orchestrator 1612 may include hardware, software or some combination thereof.

In at least one embodiment, as shown in FIG. 16, framework layer 1620 includes, without limitation, a job scheduler 1632, a configuration manager 1634, a resource manager 1636 and a distributed file system 1638. In at least one embodiment, framework layer 1620 may include a framework to support software 1652 of software layer 1630 and/or one or more application(s) 1642 of application layer 1640. In at least one embodiment, software 1652 or application(s) 1642 may respectively include web-based service software or applications, such as those provided by Amazon Web Services, Google Cloud and Microsoft Azure. In at least one embodiment, framework layer 1620 may be, but is not limited to, a type of free and open-source software web application framework such as Apache Spark™ (hereinafter "Spark") that may utilize distributed file system 1638 for large-scale data processing (e.g., "big data"). In at least one embodiment, job scheduler 1632 may include a Spark driver to facilitate scheduling of workloads supported by various layers of data center 1600. In at least one embodiment, configuration manager 1634 may be capable of configuring different layers such as software layer 1630 and framework layer 1620, including Spark and distributed file system 1638 for supporting large-scale data processing. In at least one embodiment, resource manager 1636 may be capable of managing clustered or grouped computing resources mapped to or allocated for support of distributed file system 1638 and job scheduler 1632. In at least one embodiment, clustered or grouped computing resources may include grouped computing resource 1614 at data center infrastructure layer 1610. In at least one embodiment, resource manager 1636 may coordinate with resource orchestrator 1612 to manage these mapped or allocated computing resources.

In at least one embodiment, software 1652 included in software layer 1630 may include software used by at least portions of node C.R.s 1616(1)-1616(N), grouped computing resources 1614, and/or distributed file system 1638 of framework layer 1620. One or more types of software may include, but are not limited to, Internet web page search software, e-mail virus scan software, database software, and streaming video content software.

In at least one embodiment, application(s) 1642 included in application layer 1640 may include one or more types of applications used by at least portions of node C.R.s 1616(1)-1616(N), grouped computing resources 1614, and/or distributed file system 1638 of framework layer 1620. In at least one or more types of applications may include, without limitation, CUDA applications.

In at least one embodiment, any of configuration manager 1634, resource manager 1636, and resource orchestrator 1612 may implement any number and type of self-modifying actions based on any amount and type of data acquired in any technically feasible fashion. In at least one embodiment, self-modifying actions may relieve a data center operator of data center 1600 from making possibly bad configuration decisions and possibly avoiding underutilized and/or poor performing portions of a data center.

Computer-Based Systems

The following figures set forth, without limitation, exemplary computer-based systems that can be used to implement at least one embodiment.

In at least one embodiment, a computer system with one or more processors implements an application programming interface ("API"). In at least one embodiment, computer system may be processing system 1700, computer system 1800, system 1900, computing system 2100, or compute unit 4540. In at least one embodiment, performance of an API causes instructions to be performed that instantiate an execution graph with a child graph node. In at least one embodiment, performance of an API causes instructions to be performed that update an execution graph with a child graph node using systems and methods such as those described herein. In at least one embodiment, performance of an API causes instructions to be performed that store topology information for an execution graph with a child graph node.

Figure 17:
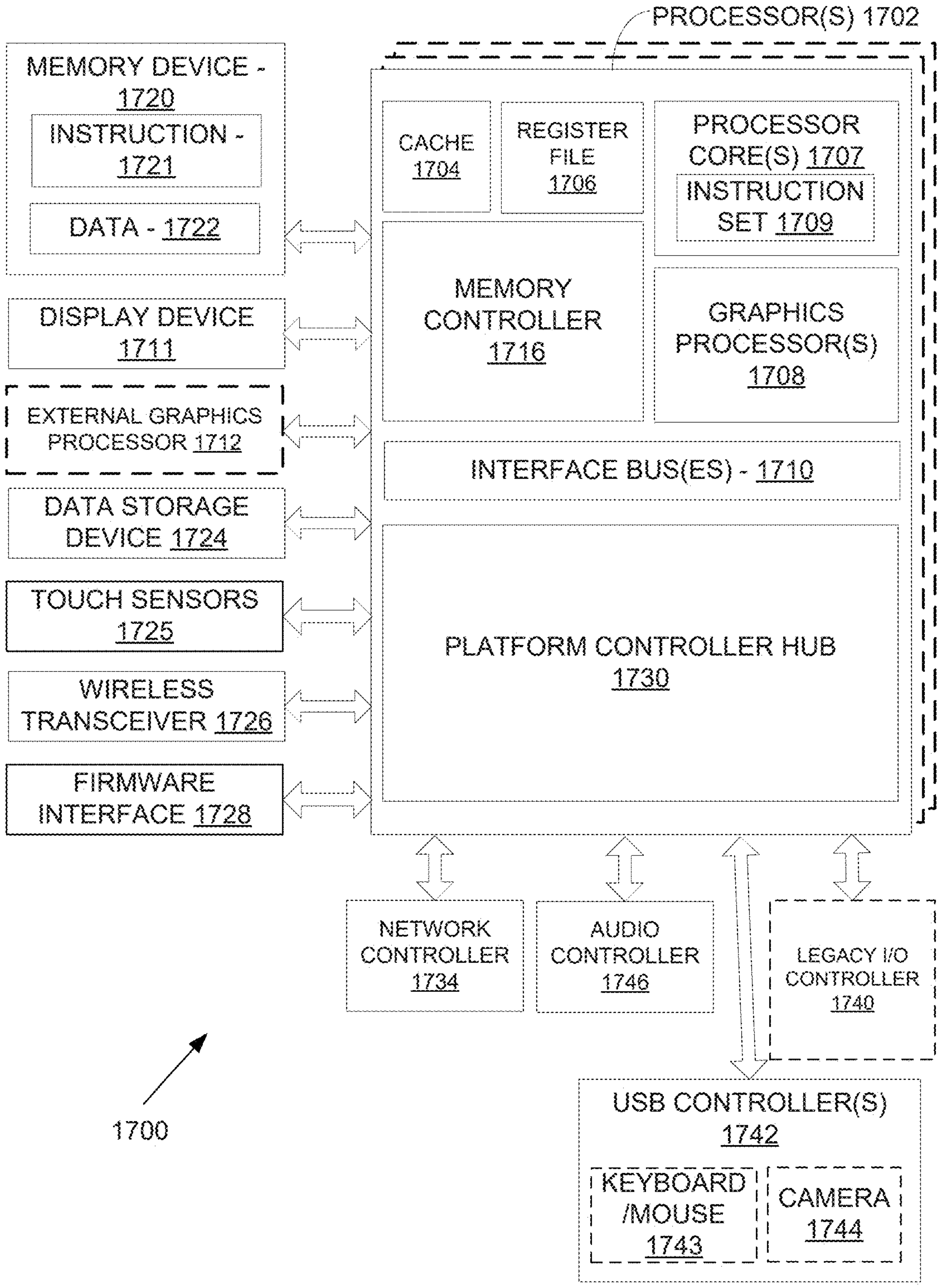
FIG. 17 illustrates a processing system, in accordance with at least one embodiment.

FIG. 17 illustrates a processing system 1700, in accordance with at least one embodiment. In at least one embodiment, processing system 1700 includes one or more processors 1702 and one or more graphics processors 1708, and may be a single processor desktop system, a multiprocessor workstation system, or a server system having a large number of processors 1702 or processor cores 1707. In at least one embodiment, processing system 1700 is a processing platform incorporated within a system-on-a-chip ("SoC") integrated circuit for use in mobile, handheld, or embedded devices.

In at least one embodiment, processing system 1700 can include, or be incorporated within a server-based gaming platform, a game console, a media console, a mobile gaming console, a handheld game console, or an online game console. In at least one embodiment, processing system 1700 is a mobile phone, smart phone, tablet computing device or mobile Internet device. In at least one embodiment, processing system 1700 can also include, couple with, or be integrated within a wearable device, such as a smart watch wearable device, smart eyewear device, augmented reality device, or virtual reality device. In at least one embodiment, processing system 1700 is a television or set top box device having one or more processors 1702 and a graphical interface generated by one or more graphics processors 1708.

In at least one embodiment, one or more processors 1702 each include one or more processor cores 1707 to process instructions which, when executed, perform operations for system and user software. In at least one embodiment, each of one or more processor cores 1707 is configured to process a specific instruction set 1709. In at least one embodiment, instruction set 1709 may facilitate Complex Instruction Set Computing ("CISC"), Reduced Instruction Set Computing ("RISC"), or computing via a Very Long Instruction Word ("VLIW"). In at least one embodiment, processor cores 1707 may each process a different instruction set 1709, which may include instructions to facilitate emulation of other instruction sets. In at least one embodiment, processor core 1707 may also include other processing devices, such as a digital signal processor ("DSP").

In at least one embodiment, processor 1702 includes cache memory ('cache") 1704. In at least one embodiment, processor 1702 can have a single internal cache or multiple levels of internal cache. In at least one embodiment, cache memory is shared among various components of processor 1702. In at least one embodiment, processor 1702 also uses an external cache (e.g., a Level 3 ("L3") cache or Last Level Cache ("LLC")) (not shown), which may be shared among processor cores 1707 using known cache coherency techniques. In at least one embodiment, register file 1706 is additionally included in processor 1702 which may include different types of registers for storing different types of data (e.g., integer registers, floating point registers, status registers, and an instruction pointer register). In at least one embodiment, register file 1706 may include general-purpose registers or other registers.

In at least one embodiment, one or more processor(s) 1702 are coupled with one or more interface bus(es) 1710 to transmit communication signals such as address, data, or control signals between processor 1702 and other components in processing system 1700. In at least one embodiment interface bus 1710, in one embodiment, can be a processor bus, such as a version of a Direct Media Interface ("DMI") bus. In at least one embodiment, interface bus 1710 is not limited to a DMI bus, and may include one or more Peripheral Component Interconnect buses (e.g., "PCI," PCI Express ("PCIe")), memory buses, or other types of interface buses. In at least one embodiment processor(s) 1702 include an integrated memory controller 1716 and a platform controller hub 1730. In at least one embodiment, memory controller 1716 facilitates communication between a memory device and other components of processing system 1700, while platform controller hub ("PCH") 1730 provides connections to Input/Output ("I/O") devices via a local I/O bus.

In at least one embodiment, memory device 1720 can be a dynamic random access memory ("DRAM") device, a static random access memory ("SRAM") device, flash memory device, phase-change memory device, or some other memory device having suitable performance to serve as processor memory. In at least one embodiment memory device 1720 can operate as system memory for processing system 1700, to store data 1722 and instructions 1721 for use when one or more processors 1702 executes an application or process. In at least one embodiment, memory controller 1716 also couples with an optional external graphics processor 1712, which may communicate with one or more graphics processors 1708 in processors 1702 to perform graphics and media operations. In at least one embodiment, a display device 1711 can connect to processor(s) 1702. In at least one embodiment display device 1711 can include one or more of an internal display device, as in a mobile electronic device or a laptop device or an external display device attached via a display interface (e.g., DisplayPort, etc.). In at least one embodiment, display device 1711 can include a head mounted display ("HMD") such as a stereoscopic display device for use in virtual reality ("VR") applications or augmented reality ("AR") applications.

In at least one embodiment, platform controller hub 1730 enables peripherals to connect to memory device 1720 and processor 1702 via a high-speed I/O bus. In at least one embodiment, I/O peripherals include, but are not limited to, an audio controller 1746, a network controller 1734, a firmware interface 1728, a wireless transceiver 1726, touch sensors 1725, a data storage device 1724 (e.g., hard disk drive, flash memory, etc.). In at least one embodiment, data storage device 1724 can connect via a storage interface (e.g., SATA) or via a peripheral bus, such as PCI, or PCIe. In at least one embodiment, touch sensors 1725 can include touch screen sensors, pressure sensors, or fingerprint sensors. In at least one embodiment, wireless transceiver 1726 can be a Wi-Fi transceiver, a Bluetooth transceiver, or a mobile network transceiver such as a 3G, 4G, or Long Term Evolution ("LTE") transceiver. In at least one embodiment, firmware interface 1728 enables communication with system firmware, and can be, for example, a unified extensible firmware interface ("UEFI"). In at least one embodiment, network controller 1734 can enable a network connection to a wired network. In at least one embodiment, a high-performance network controller (not shown) couples with interface bus 1710. In at least one embodiment, audio controller 1746 is a multi-channel high definition audio controller. In at least one embodiment, processing system 1700 includes an optional legacy I/O) controller 1740 for coupling legacy (e.g., Personal System 2 ("PS/2")) devices to processing system 1700. In at least one embodiment, platform controller hub 1730 can also connect to one or more Universal Serial Bus ("USB") controllers 1742 connect input devices, such as keyboard and mouse 1743 combinations, a camera 1744, or other USB input devices.

In at least one embodiment, an instance of memory controller 1716 and platform controller hub 1730 may be integrated into a discreet external graphics processor, such as external graphics processor 1712. In at least one embodiment, platform controller hub 1730 and/or memory controller 1716 may be external to one or more processor(s) 1702. For example, in at least one embodiment, processing system 1700 can include an external memory controller 1716 and platform controller bub 1730, which may be configured as a memory controller hub and peripheral controller hub within a system chipset that is in communication with processor(s) 1702.

Figure 18:
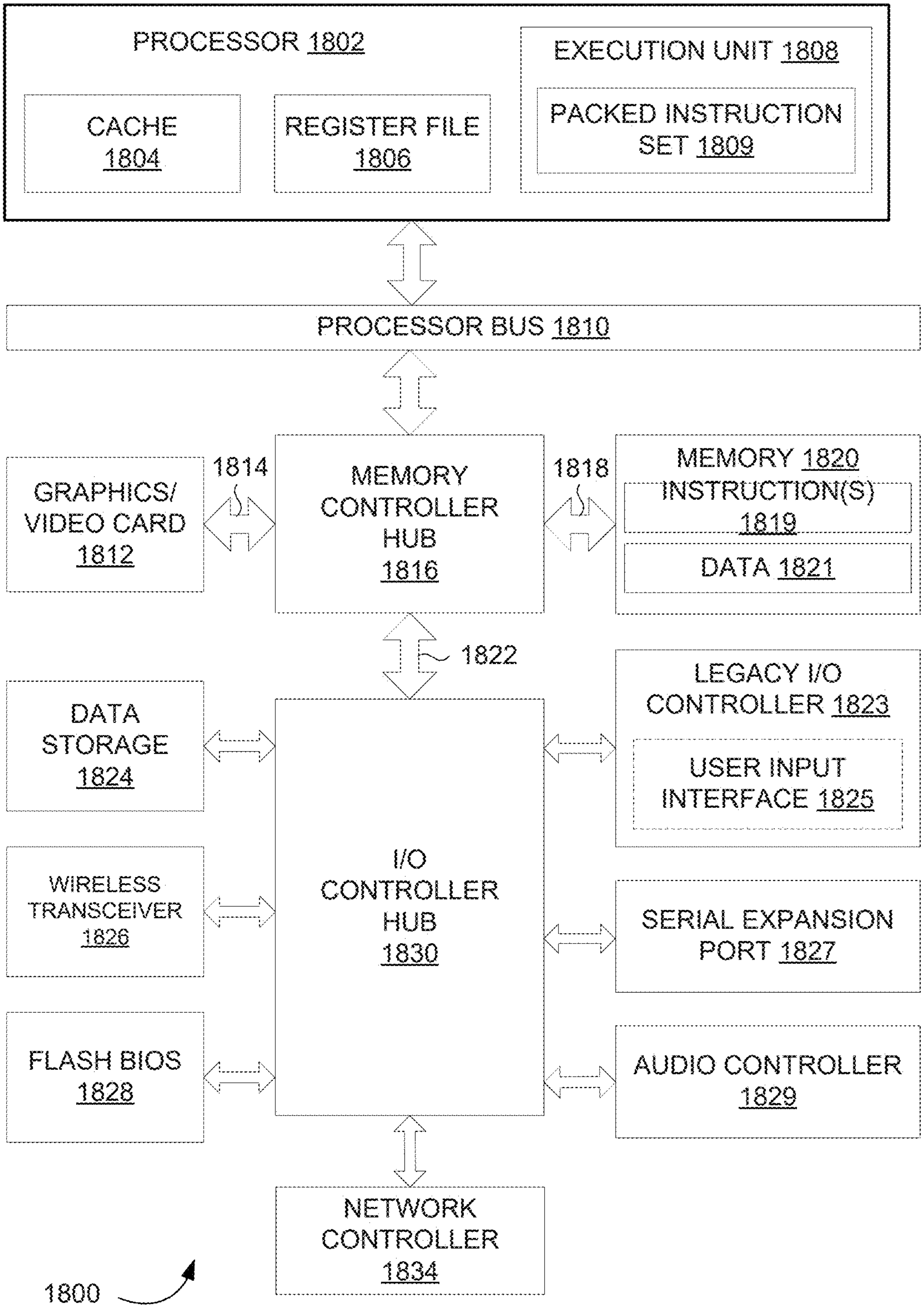
FIG. 18 illustrates a computer system, in accordance with at least one embodiment.

FIG. 18 illustrates a computer system 1800, in accordance with at least one embodiment. In at least one embodiment, computer system 1800 may be a system with interconnected devices and components, an SOC, or some combination. In at least on embodiment, computer system 1800 is formed with a processor 1802 that may include execution units to execute an instruction. In at least one embodiment, computer system 1800 may include, without limitation, a component, such as processor 1802 to employ execution units including logic to perform algorithms for processing data. In at least one embodiment, computer system 1800 may include processors, such as PENTIUM® Processor family, Xeon™, Itanium® XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 1800 may execute a version of WINDOWS' operating system available from Microsoft Corporation of Redmond, Wash., although other operating systems (UNIX and Linux for example), embedded software, and/or graphical user interfaces, may also be used.

In at least one embodiment, computer system 1800 may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor (DSP), an SoC, network computers ("NetPCs"), set-top boxes, network hubs, wide area network ("WAN") switches, or any other system that may perform one or more instructions.

In at least one embodiment, computer system 1800 may include, without limitation, processor 1802 that may include, without limitation, one or more execution units 1808 that may be configured to execute a Compute Unified Device Architecture ("CUDA") (CUDA® is developed by NVIDIA Corporation of Santa Clara, CA) program. In at least one embodiment, a CUDA program is at least a portion of a software application written in a CUDA programming language. In at least one embodiment, computer system 1800 is a single processor desktop or server system. In at least one embodiment, computer system 1800 may be a multiprocessor system. In at least one embodiment, processor 1802 may include, without limitation, a CISC microprocessor, a RISC microprocessor, a VLIW microprocessor, a processor implementing a combination of instruction sets, or any other processor device, such as a digital signal processor, for example. In at least one embodiment, processor 1802 may be coupled to a processor bus 1810 that may transmit data signals between processor 1802 and other components in computer system 1800.

In at least one embodiment, processor 1802 may include, without limitation, a Level 1 ("L1") internal cache memory ("cache") 1804. In at least one embodiment, processor 1802 may have a single internal cache or multiple levels of internal cache. In at least one embodiment, cache memory may reside external to processor 1802. In at least one embodiment, processor 1802 may also include a combination of both internal and external caches. In at least one embodiment, a register file 1806 may store different types of data in various registers including, without limitation, integer registers, floating point registers, status registers, and instruction pointer register.

In at least one embodiment, execution unit 1808, including, without limitation, logic to perform integer and floating point operations, also resides in processor 1802. Processor 1802 may also include a microcode ("ucode") read only memory ("ROM") that stores microcode for certain macro instructions. In at least one embodiment, execution unit 1808 may include logic to handle a packed instruction set 1809. In at least one embodiment, by including packed instruction set 1809 in an instruction set of a general-purpose processor 1802, along with associated circuitry to execute instructions, operations used by many multimedia applications may be performed using packed data in a general-purpose processor 1802. In at least one embodiment, many multimedia applications may be accelerated and executed more efficiently by using full width of a processor's data bus for performing operations on packed data, which may eliminate a need to transfer smaller units of data across a processor's data bus to perform one or more operations one data element at a time.

In at least one embodiment, execution unit 1808 may also be used in microcontrollers, embedded processors, graphics devices, DSPs, and other types of logic circuits. In at least one embodiment, computer system 1800 may include, without limitation, a memory 1820. In at least one embodiment, memory 1820 may be implemented as a DRAM device, an SRAM device, flash memory device, or other memory device. Memory 1820 may store instruction(s) 1819 and/or data 1821 represented by data signals that may be executed by processor 1802.

In at least one embodiment, a system logic chip may be coupled to processor bus 1810 and memory 1820. In at least one embodiment, the system logic chip may include, without limitation, a memory controller hub ("MCH") 1816, and processor 1802 may communicate with MCH 1816 via processor bus 1810. In at least one embodiment, MCH 1816 may provide a high bandwidth memory path 1818 to memory 1820 for instruction and data storage and for storage of graphics commands, data and textures. In at least one embodiment, MCH 1816 may direct data signals between processor 1802, memory 1820, and other components in computer system 1800 and to bridge data signals between processor bus 1810, memory 1820, and a system I/O 1822. In at least one embodiment, system logic chip may provide a graphics port for coupling to a graphics controller. In at least one embodiment, MCH 1816 may be coupled to memory 1820 through high bandwidth memory path 1818 and graphics/video card 1812 may be coupled to MCH 1816 through an Accelerated Graphics Port ("AGP") interconnect 1814.

In at least one embodiment, computer system 1800 may use system I/O 1822 that is a proprietary hub interface bus to couple MCH 1816 to I/O controller hub ("ICH") 1830. In at least one embodiment, ICH 1830 may provide direct connections to some I/O devices via a local I/O bus. In at least one embodiment, local I/O bus may include, without limitation, a high-speed I/O bus for connecting peripherals to memory 1820, a chipset, and processor 1802. Examples may include, without limitation, an audio controller 1829, a firmware hub ("flash BIOS") 1828, a wireless transceiver 1826, a data storage 1824, a legacy I/O controller 1823 containing a user input interface 1825 and a keyboard interface, a serial expansion port 1827, such as a USB, and a network controller 1834. Data storage 1824 may comprise a hard disk drive, a floppy disk drive, a CD-ROM device, a flash memory device, or other mass storage device.

In at least one embodiment, FIG. 18 illustrates a system, which includes interconnected hardware devices or "chips." In at least one embodiment, FIG. 18 may illustrate an exemplary SoC. In at least one embodiment, devices illustrated in FIG. 18 may be interconnected with proprietary interconnects, standardized interconnects (e.g., PCIe), or some combination thereof. In at least one embodiment, one or more components of system 1800 are interconnected using compute express link ("CXL") interconnects.

Figure 19:
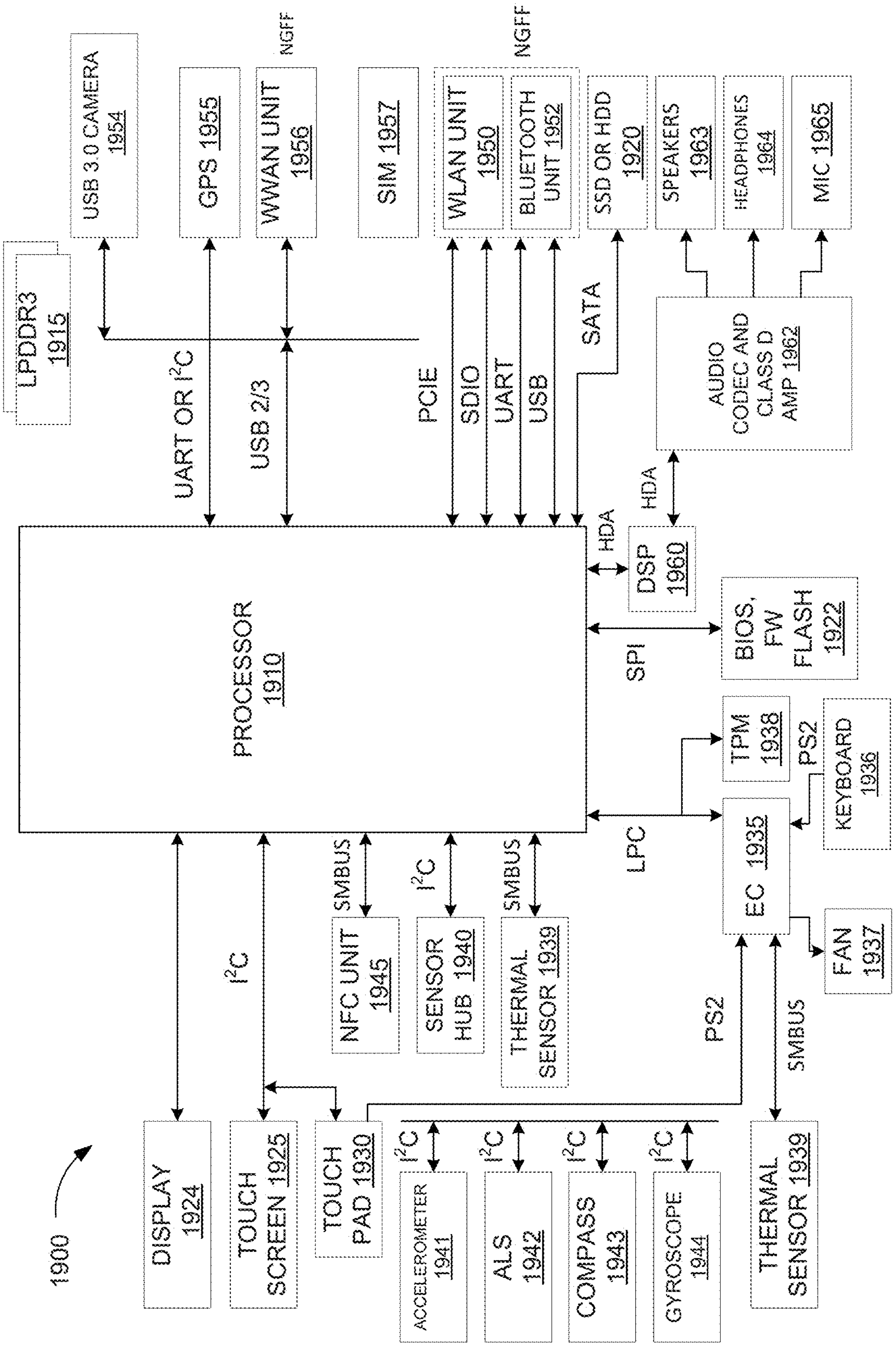
FIG. 19 illustrates a system, in accordance with at least one embodiment.

FIG. 19 illustrates a system 1900, in accordance with at least one embodiment. In at least one embodiment, system 1900 is an electronic device that utilizes a processor 1910. In at least one embodiment, system 1900 may be, for example and without limitation, a notebook, a tower server, a rack server, a blade server, an edge device communicatively coupled to one or more on-premise or cloud service providers, a laptop, a desktop, a tablet, a mobile device, a phone, an embedded computer, or any other suitable electronic device.

In at least one embodiment, system 1900 may include, without limitation, processor 1910 communicatively coupled to any suitable number or kind of components, peripherals, modules, or devices. In at least one embodiment, processor 1910 is coupled using a bus or interface, such as an I2C bus, a System Management Bus ("SMBus"), a Low Pin Count ("LPC") bus, a Serial Peripheral Interface ("SPI"), a High Definition Audio ("HDA") bus, a Serial Advance Technology Attachment ("SATA") bus, a USB (versions 1, 2, 3), or a Universal Asynchronous Receiver/Transmitter ("UART") bus. In at least one embodiment, FIG. 19 illustrates a system which includes interconnected hardware devices or "chips." In at least one embodiment, FIG. 19 may illustrate an exemplary SoC. In at least one embodiment, devices illustrated in FIG. 19 may be interconnected with proprietary interconnects, standardized interconnects (e.g., PCIe) or some combination thereof. In at least one embodiment, one or more components of FIG. 19 are interconnected using CXL interconnects.

In at least one embodiment, FIG. 19 may include a display 1924, a touch screen 1925, a touch pad 1930, a Near Field Communications unit ("NFC") 1945, a sensor hub 1940, a thermal sensor 1946, an Express Chipset ("EC") 1935, a Trusted Platform Module ("TPM") 1938, BIOS/firmware/flash memory ("BIOS, FW Flash") 1922, a DSP 1960, a Solid State Disk ("SSD") or Hard Disk Drive ("HDD") 1920, a wireless local area network unit ("WLAN") 1950, a Bluetooth unit 1952, a Wireless Wide Area Network unit ("WWAN") 1956, a Global Positioning System ("GPS") 1955, a camera ("USB 3.0 camera") 1954 such as a USB 3.0 camera, or a Low Power Double Data Rate ("LPDDR") memory unit ("LPDDR3") 1915 implemented in, for example, LPDDR3 standard. These components may each be implemented in any suitable manner.

In at least one embodiment, other components may be communicatively coupled to processor 1910 through components discussed above. In at least one embodiment, an accelerometer 1941, an Ambient Light Sensor ("ALS") 1942, a compass 1943, and a gyroscope 1944 may be communicatively coupled to sensor hub 1940. In at least one embodiment, a thermal sensor 1939, a fan 1937, a keyboard 1936, and a touch pad 1930 may be communicatively coupled to EC 1935. In at least one embodiment, a speaker 1963, a headphones 1964, and a microphone ("mic") 1965 may be communicatively coupled to an audio unit ("audio codec and class d amp") 1962, which may in turn be communicatively coupled to DSP 1960. In at least one embodiment, audio unit 1962 may include, for example and without limitation, an audio coder/decoder ("codec") and a class D amplifier. In at least one embodiment, a SIM card ("SIM") 1957 may be communicatively coupled to WWAN unit 1956. In at least one embodiment, components such as WLAN unit 1950 and Bluetooth unit 1952, as well as WWAN unit 1956 may be implemented in a Next Generation Form Factor ("NGFF").

Figure 20:
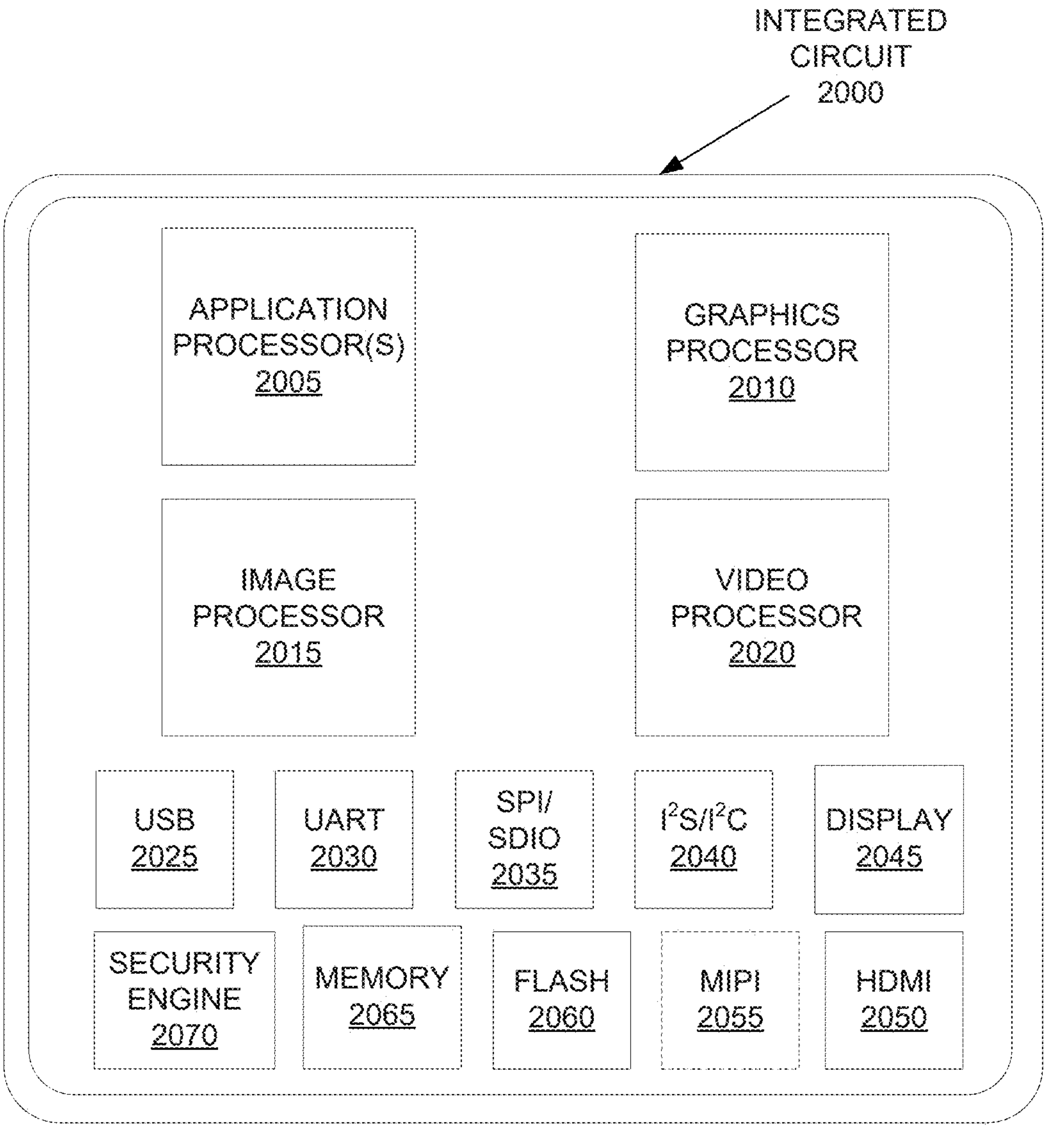
FIG. 20 illustrates an exemplary integrated circuit, in accordance with at least one embodiment.

FIG. 20 illustrates an exemplary integrated circuit 2000, in accordance with at least one embodiment. In at least one embodiment, exemplary integrated circuit 2000 is an SoC that may be fabricated using one or more IP cores. In at least one embodiment, integrated circuit 2000 includes one or more application processor(s) 2005 (e.g., CPUs, DPUs), at least one graphics processor 2010, and may additionally include an image processor 2015 and/or a video processor 2020, any of which may be a modular IP core. In at least one embodiment, integrated circuit 2000 includes peripheral or bus logic including a USB controller 2025, a UART controller 2030, an SPI/SDIO controller 2035, and an $I^2S/I^2C$ controller 2040. In at least one embodiment, integrated circuit 2000 can include a display device 2045 coupled to one or more of a high-definition multimedia interface ("HDMI") controller 2050 and a mobile industry processor interface ("MIPI") display interface 2055. In at least one embodiment, storage may be provided by a flash memory subsystem 2060 including flash memory and a flash memory controller. In at least one embodiment, a memory interface may be provided via a memory controller 2065 for access to SDRAM or SRAM memory devices. In at least one embodiment, some integrated circuits additionally include an embedded security engine 2070.

Figure 21:
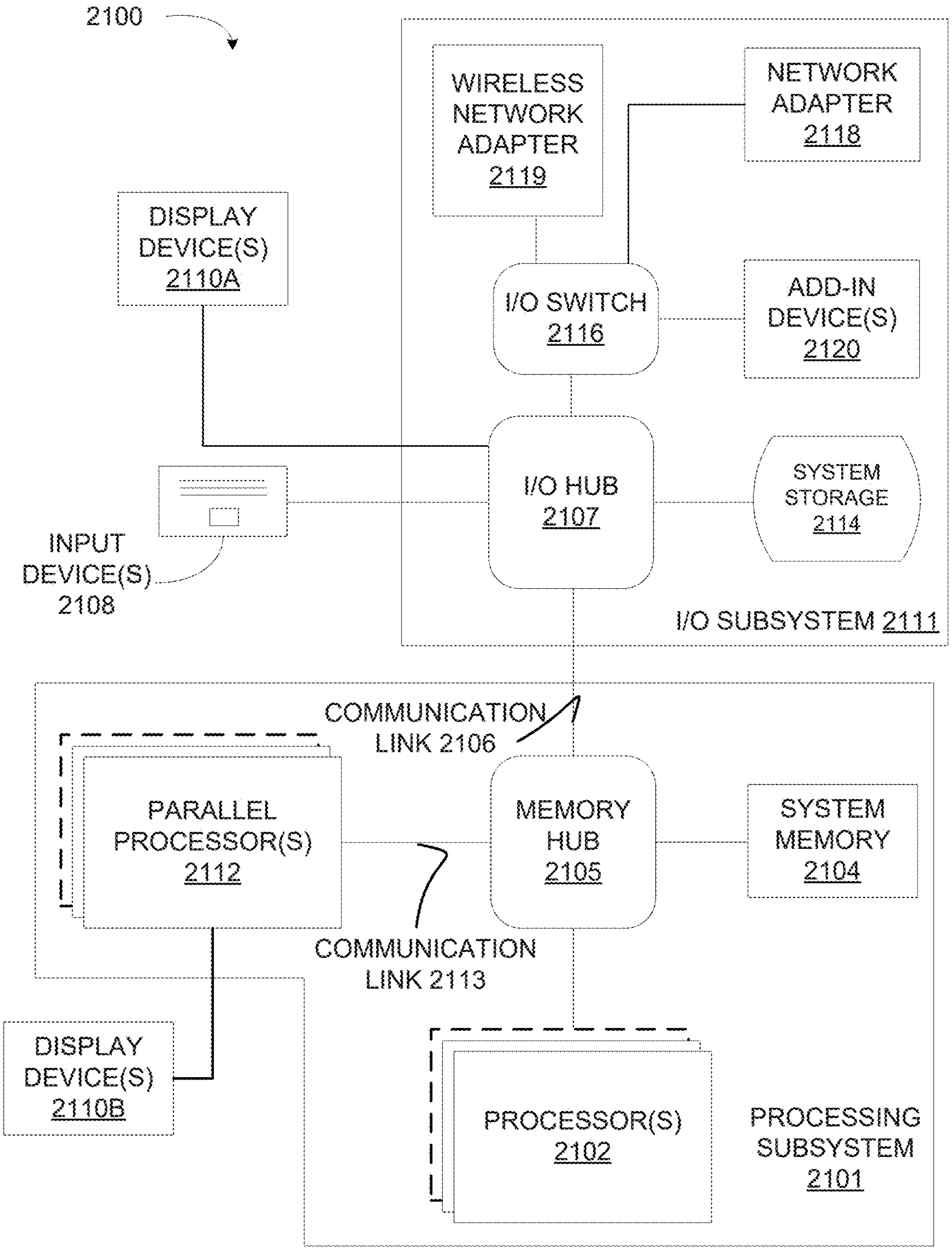
FIG. 21 illustrates a computing system, according to at least one embodiment.

FIG. 21 illustrates a computing system 2100, according to at least one embodiment; In at least one embodiment, computing system 2100 includes a processing subsystem 2101 having one or more processor(s) 2102 and a system memory 2104 communicating via an interconnection path that may include a memory hub 2105. In at least one embodiment, memory hub 2105 may be a separate component within a chipset component or may be integrated within one or more processor(s) 2102. In at least one embodiment, memory hub 2105 couples with an I/O subsystem 2111 via a communication link 2106. In at least one embodiment, I/O subsystem 2111 includes an I/O hub 2107 that can enable computing system 2100 to receive input from one or more input device(s) 2108. In at least one embodiment, I/O hub 2107 can enable a display controller, which may be included in one or more processor(s) 2102, to provide outputs to one or more display device(s) 2110A. In at least one embodiment, one or more display device(s) 2110A coupled with I/O hub 2107 can include a local, internal, or embedded display device.

In at least one embodiment, processing subsystem 2101 includes one or more parallel processor(s) 2112 coupled to memory hub 2105 via a bus or other communication link 2113. In at least one embodiment, communication link 2113 may be one of any number of standards based communication link technologies or protocols, such as, but not limited to PCIe, or may be a vendor specific communications interface or communications fabric. In at least one embodiment, one or more parallel processor(s) 2112 form a computationally focused parallel or vector processing system that can include a large number of processing cores and/or processing clusters, such as a many integrated core processor. In at least one embodiment, one or more parallel processor(s) 2112 form a graphics processing subsystem that can output pixels to one of one or more display device(s) 2110A coupled via I/O Hub 2107. In at least one embodiment, one or more parallel processor(s) 2112 can also include a display controller and display interface (not shown) to enable a direct connection to one or more display device(s) 2110B.

In at least one embodiment, a system storage unit 2114 can connect to I/O hub 2107 to provide a storage mechanism for computing system 2100. In at least one embodiment, an I/O switch 2116 can be used to provide an interface mechanism to enable connections between I/O hub 2107 and other components, such as a network adapter 2118 and/or wireless network adapter 2119 that may be integrated into a platform, and various other devices that can be added via one or more add-in device(s) 2120. In at least one embodiment, network adapter 2118 can be an Ethernet adapter or another wired network adapter. In at least one embodiment, wireless network adapter 2119 can include one or more of a Wi-Fi, Bluetooth, NFC, or other network device that includes one or more wireless radios.

In at least one embodiment, computing system 2100 can include other components not explicitly shown, including USB or other port connections, optical storage drives, video capture devices, and the like, that may also be connected to I/O hub 2107. In at least one embodiment, communication paths interconnecting various components in FIG. 21 may be implemented using any suitable protocols, such as PCI based protocols (e.g., PCIe), or other bus or point-to-point communication interfaces and/or protocol(s), such as NVLink high-speed interconnect, or interconnect protocols.

In at least one embodiment, one or more parallel processor(s) 2112 incorporate circuitry optimized for graphics and video processing, including, for example, video output circuitry, and constitutes a graphics processing unit ("GPU"). In at least one embodiment, one or more parallel processor(s) 2112 incorporate circuitry optimized for general purpose processing. In at least embodiment, components of computing system 2100 may be integrated with one or more other system elements on a single integrated circuit. For example, in at least one embodiment, one or more parallel processor(s) 2112, memory hub 2105, processor(s) 2102, and I/O hub 2107 can be integrated into an SoC integrated circuit. In at least one embodiment, components of computing system 2100 can be integrated into a single package to form a system in package ("SIP") configuration. In at least one embodiment, at least a portion of the components of computing system 2100 can be integrated into a multi-chip module ("MCM"), which can be interconnected with other multi-chip modules into a modular computing system. In at least one embodiment, I/O subsystem 2111 and display devices 2110B are omitted from computing system 2100.

Processing Systems

The following figures set forth, without limitation, exemplary processing systems that can be used to implement at least one embodiment.

In at least one embodiment, one or more processors are part of a computer system that implements an application programming interface ("API"). In at least one embodiment, one or more processors may be exemplary integrated circuit 2000, APU 2200, CPU 2300, exemplary graphics processor 2510, graphics core 2600, parallel processor 2700, graphics processor 2800, processor 2900, processor 3000, graphics processor core 3100, PPU 3200, GPC 3300, or SM 3400. In at least one embodiment, performance of an API causes instructions to be performed that instantiate an execution graph with a child graph node. In at least one embodiment, performance of an API causes instructions to be performed that update an execution graph with a child graph node using systems and methods such as those described herein. In at least one embodiment, performance of an API causes instructions to be performed that store topology information for an execution graph with a child graph node.

Figure 22:
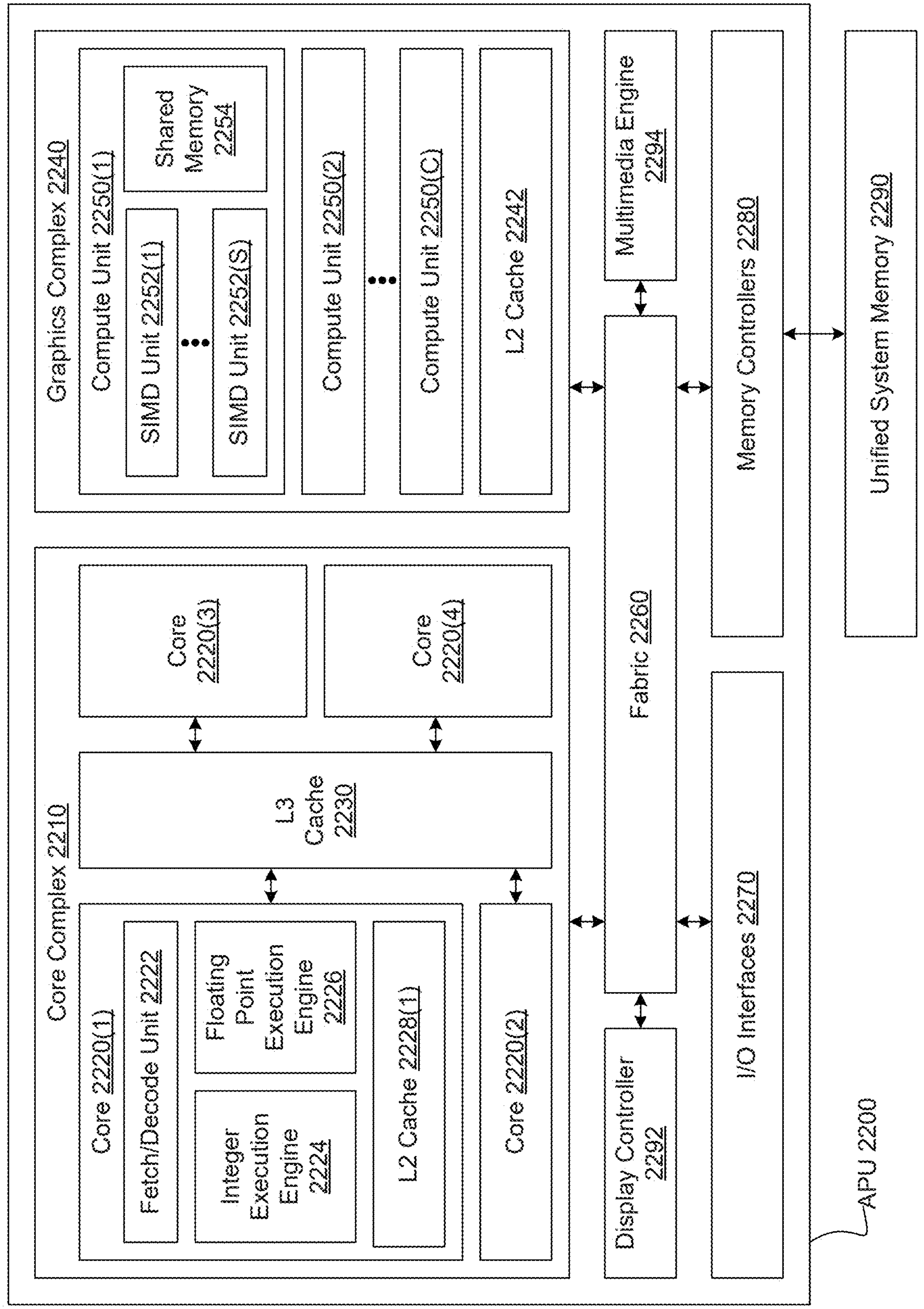
FIG. 22 illustrates an APU, in accordance with at least one embodiment.

FIG. 22 illustrates an accelerated processing unit ("APU") 2200, in accordance with at least one embodiment. In at least one embodiment, APU 2200 is developed by AMD Corporation of Santa Clara, CA. In at least one embodiment, APU 2200 can be configured to execute an application program, such as a CUDA program. In at least one embodiment, APU 2200 includes, without limitation, a core complex 2210, a graphics complex 2240, fabric 2260, I/O interfaces 2270, memory controllers 2280, a display controller 2292, and a multimedia engine 2294. In at least one embodiment, APU 2200 may include, without limitation, any number of core complexes 2210, any number of graphics complexes 2250, any number of display controllers 2292, and any number of multimedia engines 2294 in any combination. For explanatory purposes, multiple instances of like objects are denoted herein with reference numbers identifying the object and parenthetical numbers identifying the instance where needed.

In at least one embodiment, core complex 2210 is a CPU, graphics complex 2240 is a GPU, and APU 2200 is a processing unit that integrates, without limitation, 2210 and 2240 onto a single chip. In at least one embodiment, some tasks may be assigned to core complex 2210 and other tasks may be assigned to graphics complex 2240. In at least one embodiment, core complex 2210 is configured to execute main control software associated with APU 2200, such as an operating system. In at least one embodiment, core complex 2210 is the master processor of APU 2200, controlling and coordinating operations of other processors. In at least one embodiment, core complex 2210 issues commands that control the operation of graphics complex 2240. In at least one embodiment, core complex 2210 can be configured to execute host executable code derived from CUDA source code, and graphics complex 2240 can be configured to execute device executable code derived from CUDA source code.

In at least one embodiment, core complex 2210 includes, without limitation, cores 2220(1)-2220(4) and an L3 cache 2230. In at least one embodiment, core complex 2210 may include, without limitation, any number of cores 2220 and any number and type of caches in any combination. In at least one embodiment, cores 2220 are configured to execute instructions of a particular instruction set architecture ("ISA"). In at least one embodiment, each core 2220 is a CPU core.

In at least one embodiment, each core 2220 includes, without limitation, a fetch/decode unit 2222, an integer execution engine 2224, a floating point execution engine 2226, and an L2 cache 2228. In at least one embodiment, fetch/decode unit 2222 fetches instructions, decodes such instructions, generates micro-operations, and dispatches separate micro-instructions to integer execution engine 2224 and floating point execution engine 2226. In at least one embodiment, fetch/decode unit 2222 can concurrently dispatch one micro-instruction to integer execution engine 2224 and another micro-instruction to floating point execution engine 2226. In at least one embodiment, integer execution engine 2224 executes, without limitation, integer and memory operations. In at least one embodiment, floating point engine 2226 executes, without limitation, floating point and vector operations. In at least one embodiment, fetch-decode unit 2222 dispatches micro-instructions to a single execution engine that replaces both integer execution engine 2224 and floating point execution engine 2226.

In at least one embodiment, each core 2220(*i*), where i is an integer representing a particular instance of core 2220, may access L2 cache 2228(*i*) included in core 2220(*i*). In at least one embodiment, each core 2220 included in core complex 2210(*j*), where j is an integer representing a particular instance of core complex 2210, is connected to other cores 2220 included in core complex 2210(1) via L3 cache 2230(*j*) included in core complex 2210(*j*). In at least one embodiment, cores 2220 included in core complex 2210(*j*), where j is an integer representing a particular instance of core complex 2210, can access all of L3 cache 2230(*j*) included in core complex 2210(*j*). In at least one embodiment, L3 cache 2230 may include, without limitation, any number of slices.

In at least one embodiment, graphics complex 2240 can be configured to perform compute operations in a highly-parallel fashion. In at least one embodiment, graphics complex 2240 is configured to execute graphics pipeline operations such as draw commands, pixel operations, geometric computations, and other operations associated with rendering an image to a display. In at least one embodiment, graphics complex 2240 is configured to execute operations unrelated to graphics. In at least one embodiment, graphics complex 2240 is configured to execute both operations related to graphics and operations unrelated to graphics.

In at least one embodiment, graphics complex 2240 includes, without limitation, any number of compute units 2250 and an L2 cache 2242. In at least one embodiment, compute units 2250 share L2 cache 2242. In at least one embodiment, L2 cache 2242 is partitioned. In at least one embodiment, graphics complex 2240 includes, without limitation, any number of compute units 2250 and any number (including zero) and type of caches. In at least one embodiment, graphics complex 2240 includes, without limitation, any amount of dedicated graphics hardware.

In at least one embodiment, each compute unit 2250 includes, without limitation, any number of SIMD units 2252 and a shared memory 2254. In at least one embodiment, each SIMD unit 2252 implements a SIMD architecture and is configured to perform operations in parallel. In at least one embodiment, each compute unit 2250 may execute any number of thread blocks, but each thread block executes on a single compute unit 2250. In at least one embodiment, a thread block includes, without limitation, any number of threads of execution. In at least one embodiment, a workgroup is a thread block. In at least one embodiment, each SIMD unit 2252 executes a different warp. In at least one embodiment, a warp is a group of threads (e.g., 16 threads), where each thread in the warp belongs to a single thread block and is configured to process a different set of data based on a single set of instructions. In at least one embodiment, predication can be used to disable one or more threads in a warp. In at least one embodiment, a lane is a thread. In at least one embodiment, a work item is a thread. In at least one embodiment, a wavefront is a warp. In at least one embodiment, different wavefronts in a thread block may synchronize together and communicate via shared memory 2254.

In at least one embodiment, fabric 2260 is a system interconnect that facilitates data and control transmissions across core complex 2210, graphics complex 2240, I/O interfaces 2270, memory controllers 2280, display controller 2292, and multimedia engine 2294. In at least one embodiment, APU 2200 may include, without limitation, any amount and type of system interconnect in addition to or instead of fabric 2260 that facilitates data and control transmissions across any number and type of directly or indirectly linked components that may be internal or external to APU 2200. In at least one embodiment, I/O interfaces 2270 are representative of any number and type of I/O interfaces (e.g., PCI, PCI-Extended ("PCI-X"), PCIe, gigabit Ethernet ("GBE"), USB, etc.). In at least one embodiment, various types of peripheral devices are coupled to I/O interfaces 2270 In at least one embodiment, peripheral devices that are coupled to I/O interfaces 2270 may include, without limitation, keyboards, mice, printers, scanners, joysticks or other types of game controllers, media recording devices, external storage devices, network interface cards, and so forth.

In at least one embodiment, display controller AMD92 displays images on one or more display device(s), such as a liquid crystal display ("LCD") device. In at least one embodiment, multimedia engine 2294 includes, without limitation, any amount and type of circuitry that is related to multimedia, such as a video decoder, a video encoder, an image signal processor, etc. In at least one embodiment, memory controllers 2280 facilitate data transfers between APU 2200 and a unified system memory 2290. In at least one embodiment, core complex 2210 and graphics complex 2240 share unified system memory 2290.

In at least one embodiment, APU 2200 implements a memory subsystem that includes, without limitation, any amount and type of memory controllers 2280 and memory devices (e.g., shared memory 2254) that may be dedicated to one component or shared among multiple components. In at least one embodiment, APU 2200 implements a cache subsystem that includes, without limitation, one or more cache memories (e.g., L2 caches 2328, L3 cache 2230, and L2 cache 2242) that may each be private to or shared between any number of components (e.g., cores 2220, core complex 2210, SIMD units 2252, compute units 2250, and graphics complex 2240).

Figure 23:
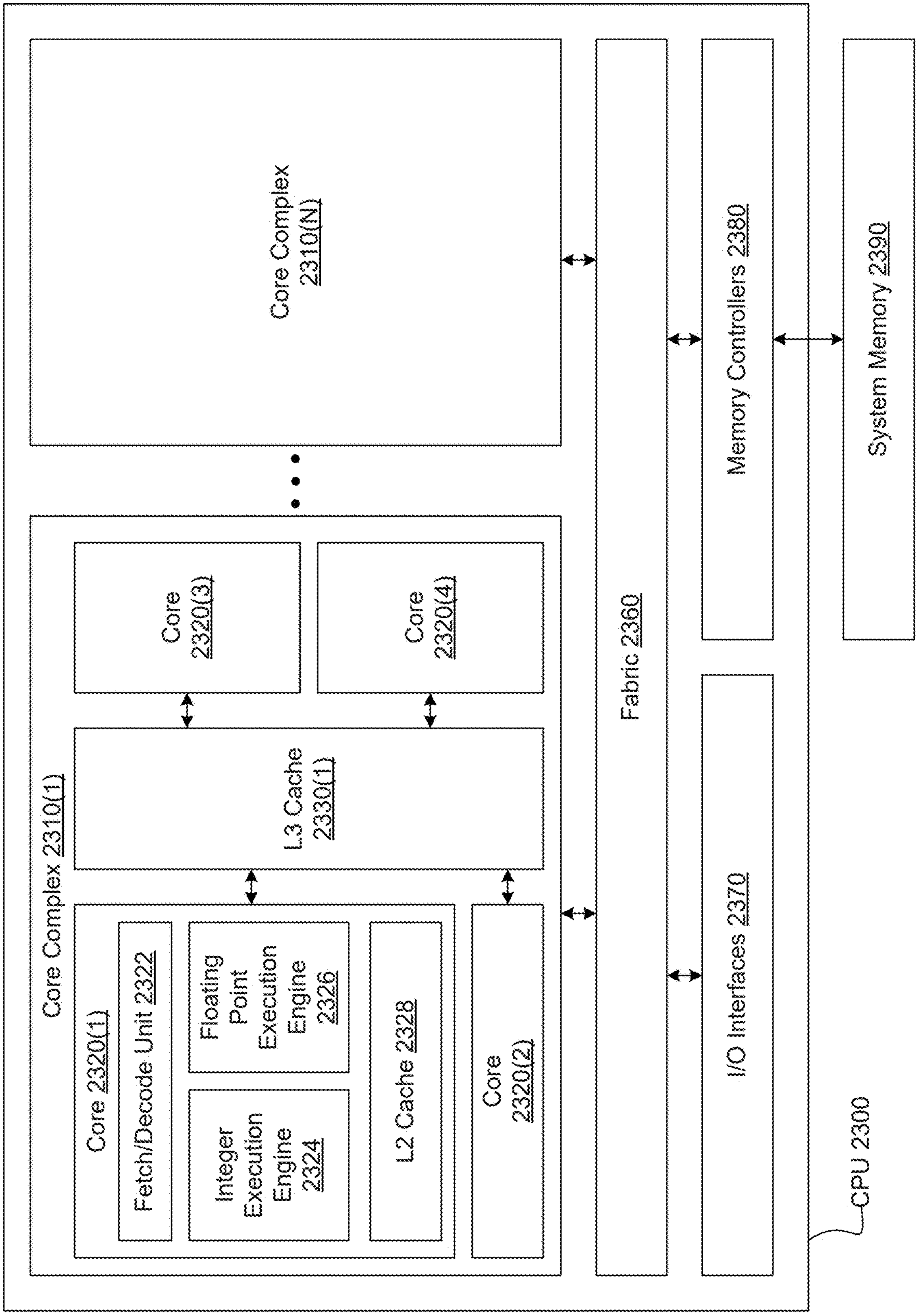
FIG. 23 illustrates a CPU, in accordance with at least one embodiment.

FIG. 23 illustrates a CPU 2300, in accordance with at least one embodiment. In at least one embodiment, CPU 2300 is developed by AMD Corporation of Santa Clara, CA. In at least one embodiment, CPU 2300 can be configured to execute an application program. In at least one embodiment, CPU 2300 is configured to execute main control software, such as an operating system. In at least one embodiment, CPU 2300 issues commands that control the operation of an external GPU (not shown). In at least one embodiment, CPU 2300 can be configured to execute host executable code derived from CUDA source code, and an external GPU can be configured to execute device executable code derived from such CUDA source code. In at least one embodiment, CPU 2300 includes, without limitation, any number of core complexes 2310, fabric 2360, I/O interfaces 2370, and memory controllers 2380.

In at least one embodiment, core complex 2310 includes, without limitation, cores 2320(1)-2320(4) and an L3 cache 2330. In at least one embodiment, core complex 2310 may include, without limitation, any number of cores 2320 and any number and type of caches in any combination. In at least one embodiment, cores 2320 are configured to execute instructions of a particular ISA. In at least one embodiment, each core 2320 is a CPU core.

In at least one embodiment, each core 2320 includes, without limitation, a fetch/decode unit 2322, an integer execution engine 2324, a floating point execution engine 2326, and an L2 cache 2328. In at least one embodiment, fetch/decode unit 2322 fetches instructions, decodes such instructions, generates micro-operations, and dispatches separate micro-instructions to integer execution engine 2324 and floating point execution engine 2326. In at least one embodiment, fetch/decode unit 2322 can concurrently dispatch one micro-instruction to integer execution engine 2324 and another micro-instruction to floating point execution engine 2326. In at least one embodiment, integer execution engine 2324 executes, without limitation, integer and memory operations. In at least one embodiment, floating point engine 2326 executes, without limitation, floating point and vector operations. In at least one embodiment, fetch-decode unit 2322 dispatches micro-instructions to a single execution engine that replaces both integer execution engine 2324 and floating point execution engine 2326.

In at least one embodiment, each core 2320(1), where i is an integer representing a particular instance of core 2320, may access L2 cache 2328(*i*) included in core 2320(1). In at least one embodiment, each core 2320 included in core complex 2310(*j*), where j is an integer representing a particular instance of core complex 2310, is connected to other cores 2320 in core complex 2310(*j*) via L3 cache 2330(*j*) included in core complex 2310(*j*). In at least one embodiment, cores 2320 included in core complex 2310(*j*), where j is an integer representing a particular instance of core complex 2310, can access all of L3 cache 2330(*j*) included in core complex 2310(*j*). In at least one embodiment, L3 cache 2330 may include, without limitation, any number of slices.

In at least one embodiment, fabric 2360 is a system interconnect that facilitates data and control transmissions across core complexes 2310(1)-2310(N) (where N is an integer greater than zero), I/O interfaces 2370, and memory controllers 2380. In at least one embodiment, CPU 2300 may include, without limitation, any amount and type of system interconnect in addition to or instead of fabric 2360 that facilitates data and control transmissions across any number and type of directly or indirectly linked components that may be internal or external to CPU 2300. In at least one embodiment, I/O interfaces 2370 are representative of any number and type of I/O interfaces (e.g., PCI, PCI-X, PCIe, GBE, USB, etc.). In at least one embodiment, various types of peripheral devices are coupled to I/O interfaces 2370 In at least one embodiment, peripheral devices that are coupled to I/O interfaces 2370 may include, without limitation, displays, keyboards, mice, printers, scanners, joysticks or other types of game controllers, media recording devices, external storage devices, network interface cards, and so forth.

In at least one embodiment, memory controllers 2380 facilitate data transfers between CPU 2300 and a system memory 2390. In at least one embodiment, core complex 2310 and graphics complex 2340 share system memory 2390. In at least one embodiment, CPU 2300 implements a memory subsystem that includes, without limitation, any amount and type of memory controllers 2380 and memory devices that may be dedicated to one component or shared among multiple components. In at least one embodiment, CPU 2300 implements a cache subsystem that includes, without limitation, one or more cache memories (e.g., L2 caches 2328 and L3 caches 2330) that may each be private to or shared between any number of components (e.g., cores 2320 and core complexes 2310).

Figure 24:
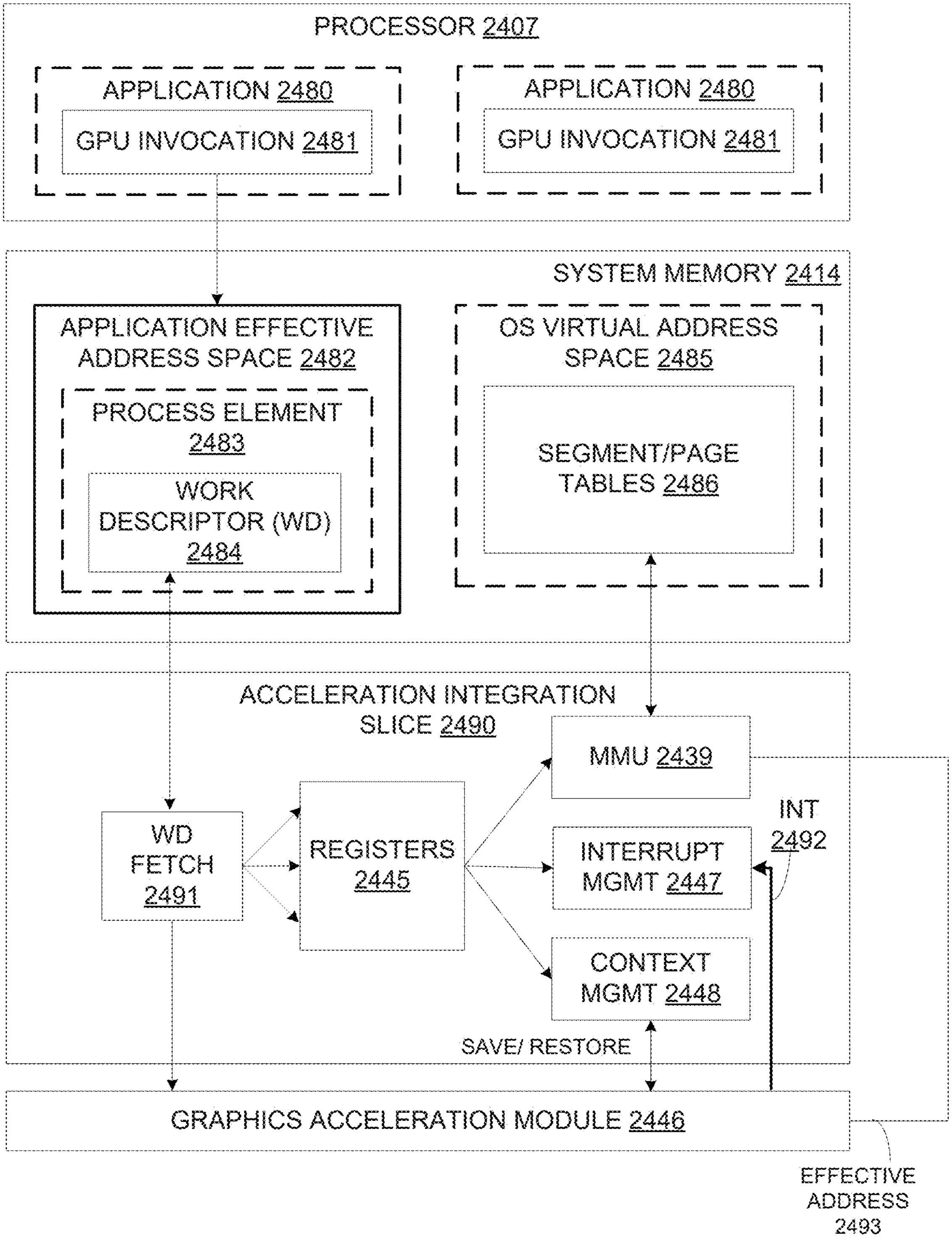
FIG. 24 illustrates an exemplary accelerator integration slice, in accordance with at least one embodiment.

FIG. 24 illustrates an exemplary accelerator integration slice 2490, in accordance with at least one embodiment. As used herein, a "slice" comprises a specified portion of processing resources of an accelerator integration circuit. In at least one embodiment, the accelerator integration circuit provides cache management, memory access, context management, and interrupt management services on behalf of multiple graphics processing engines included in a graphics acceleration module. The graphics processing engines may each comprise a separate GPU. Alternatively, the graphics processing engines may comprise different types of graphics processing engines within a GPU such as graphics execution units, media processing engines (e.g., video encoders/decoders), samplers, and blit engines. In at least one embodiment, the graphics acceleration module may be a GPU with multiple graphics processing engines. In at least one embodiment, the graphics processing engines may be individual GPUs integrated on a common package, line card, or chip.

An application effective address space 2482 within system memory 2414 stores process elements 2483. In one embodiment, process elements 2483 are stored in response to GPU invocations 2481 from applications 2480 executed on processor 2407. A process element 2483 contains process state for corresponding application 2480. A work descriptor ("WD") 2484 contained in process element 2483 can be a single job requested by an application or may contain a pointer to a queue of jobs. In at least one embodiment, WD 2484 is a pointer to a job request queue in application effective address space 2482.

Graphics acceleration module 2446 and/or individual graphics processing engines can be shared by all or a subset of processes in a system. In at least one embodiment, an infrastructure for setting up process state and sending WD 2484 to graphics acceleration module 2446 to start a job in a virtualized environment may be included.

In at least one embodiment, a dedicated-process programming model is implementation-specific. In this model, a single process owns graphics acceleration module 2446 or an individual graphics processing engine. Because graphics acceleration module 2446 is owned by a single process, a hypervisor initializes an accelerator integration circuit for an owning partition and an operating system initializes accelerator integration circuit for an owning process when graphics acceleration module 2446 is assigned.

In operation, a WD fetch unit 2491 in accelerator integration slice 2490 fetches next WD 2484 which includes an indication of work to be done by one or more graphics processing engines of graphics acceleration module 2446. Data from WD 2484 may be stored in registers 2445 and used by a memory management unit ("MMU") 2439, interrupt management circuit 2447 and/or context management circuit 2448 as illustrated. For example, one embodiment of MMU 2439 includes segment/page walk circuitry for accessing segment/page tables 2486 within OS virtual address space 2485. Interrupt management circuit 2447 may process interrupt events ("INT") 2492 received from graphics acceleration module 2446. When performing graphics operations, an effective address 2493 generated by a graphics processing engine is translated to a real address by MMU 2439.

In one embodiment, a same set of registers 2445 are duplicated for each graphics processing engine and/or graphics acceleration module 2446 and may be initialized by a hypervisor or operating system. Each of these duplicated registers may be included in accelerator integration slice 2490. Exemplary registers that may be initialized by a hypervisor are shown in Table 1.

TABLE 1

| Hypervisor Initialized Registers | |
|---|---|
| 1 | Slice Control Register |
| 2 | Real Address (RA) Scheduled Processes Area Pointer |
| 3 | Authority Mask Override Register |
| 4 | Interrupt Vector Table Entry Offset |
| 5 | Interrupt Vector Table Entry Limit |
| 6 | State Register |
| 7 | Logical Partition ID |
| 8 | Real address (RA) Hypervisor Accelerator Utilization Record Pointer |
| 9 | Storage Description Register |

Exemplary registers that may be initialized by an operating system are shown in Table 2.

TABLE 2

| Operating System Initialized Registers | |
|---|---|
| 1 | Process and Thread Identification |
| 2 | Effective Address (EA) Context Save/Restore Pointer |
| 3 | Virtual Address (VA) Accelerator Utilization Record Pointer |
| 4 | Virtual Address (VA) Storage Segment Table Pointer |
| 5 | Authority Mask |
| 6 | Work descriptor |

In one embodiment, each WD 2484 is specific to a particular graphics acceleration module 2446 and/or a particular graphics processing engine. It contains all information required by a graphics processing engine to do work or it can be a pointer to a memory location where an application has set up a command queue of work to be completed.

Figure 25A:
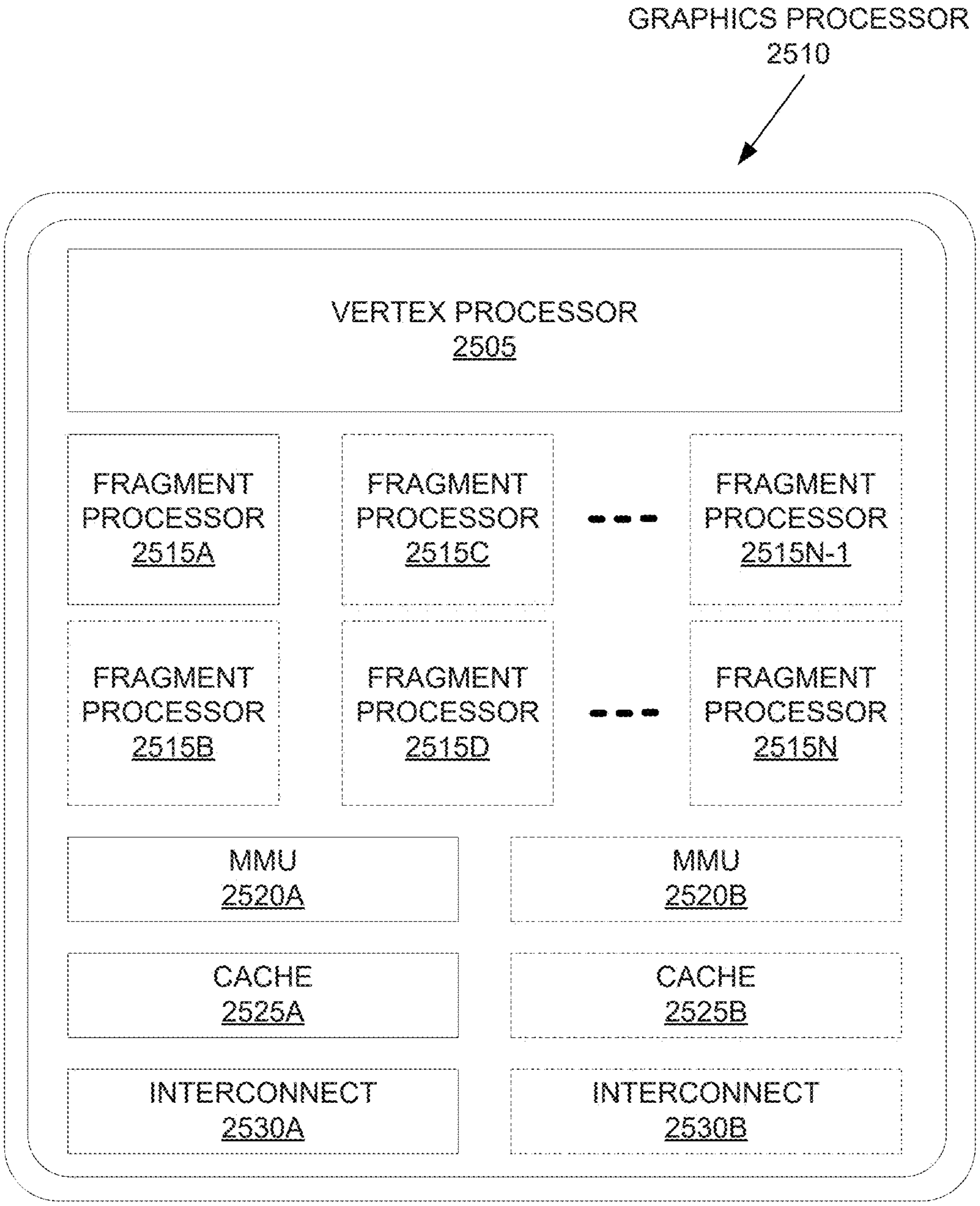
FIGS. 25A and 25B illustrate exemplary graphics processors, in accordance with at least one embodiment.
Figure 25B:
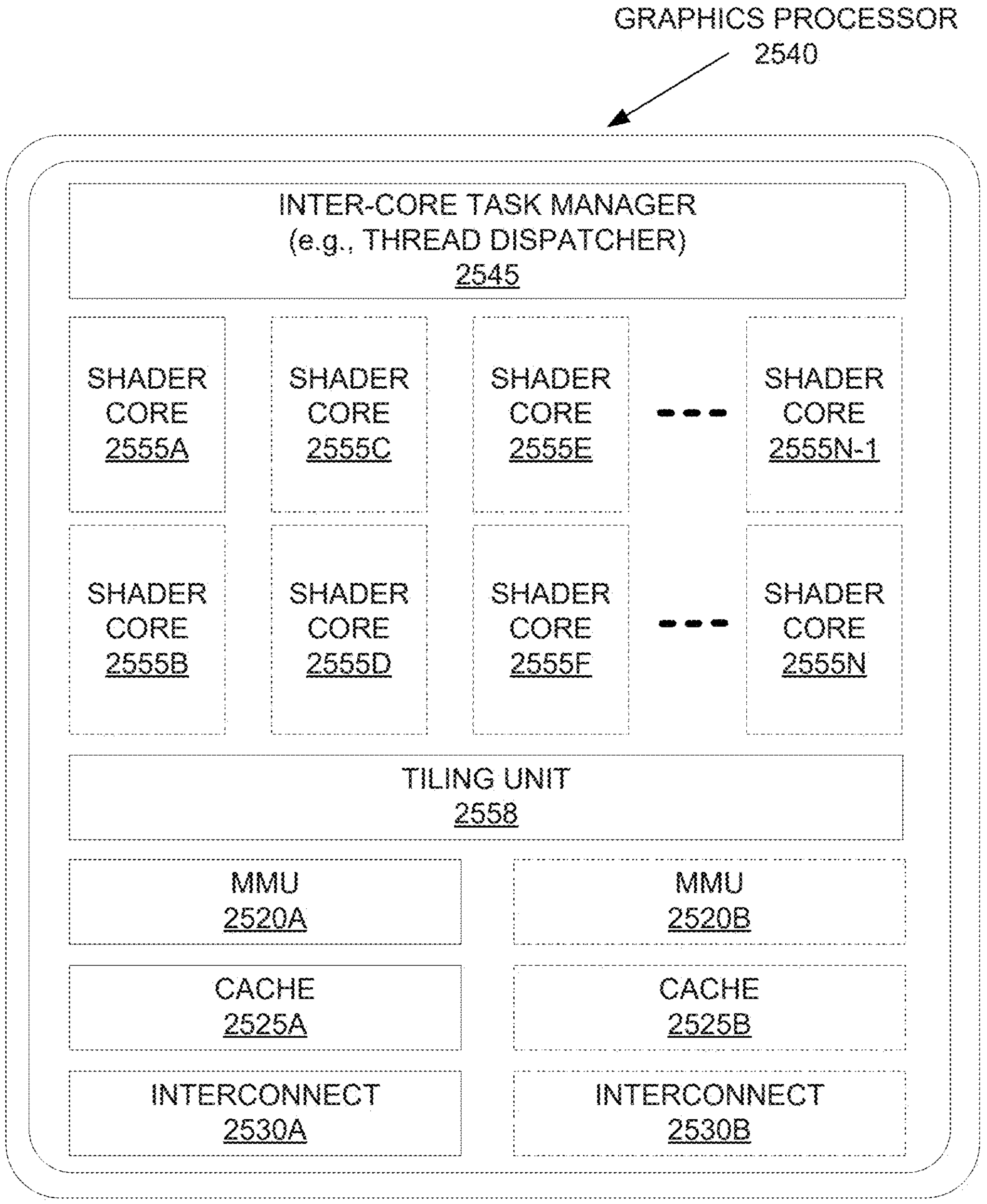

FIGS. 25A-25B illustrate exemplary graphics processors, in accordance with at least one embodiment. In at least one embodiment, any of the exemplary graphics processors may be fabricated using one or more IP cores. In addition to what is illustrated, other logic and circuits may be included in at least one embodiment, including additional graphics processors/cores, peripheral interface controllers, or general-purpose processor cores. In at least one embodiment, the exemplary graphics processors are for use within an SoC.

FIG. 25A illustrates an exemplary graphics processor 2510 of an SoC integrated circuit that may be fabricated using one or more IP cores, in accordance with at least one embodiment. FIG. 25B illustrates an additional exemplary graphics processor 2540 of an SoC integrated circuit that may be fabricated using one or more IP cores, in accordance with at least one embodiment. In at least one embodiment, graphics processor 2510 of FIG. 25A is a low power graphics processor core. In at least one embodiment, graphics processor 2540 of FIG. 25B is a higher performance graphics processor core. In at least one embodiment, each of graphics processors 2510, 2540 can be variants of graphics processor 2010 of FIG. 20.

In at least one embodiment, graphics processor 2510 includes a vertex processor 2505 and one or more fragment processor(s) 2515A-2515N (e.g., 2515A, 2515B, 2515C, 2515D, through 2515N-1, and 2515N). In at least one embodiment, graphics processor 2510 can execute different shader programs via separate logic, such that vertex processor 2505 is optimized to execute operations for vertex shader programs, while one or more fragment processor(s) 2515A-2515N execute fragment (e.g., pixel) shading operations for fragment or pixel shader programs. In at least one embodiment, vertex processor 2505 performs a vertex processing stage of a 3D graphics pipeline and generates primitives and vertex data. In at least one embodiment, fragment processor(s) 2515A-2515N use primitive and vertex data generated by vertex processor 2505 to produce a framebuffer that is displayed on a display device. In at least one embodiment, fragment processor(s) 2515A-2515N are optimized to execute fragment shader programs as provided for in an OpenGL API, which may be used to perform similar operations as a pixel shader program as provided for in a Direct 3D API.

In at least one embodiment, graphics processor 2510 additionally includes one or more MMU(s) 2520A-2520B, cache(s) 2525A-2525B, and circuit interconnect(s) 2530A-2530B. In at least one embodiment, one or more MMU(s) 2520A-2520B provide for virtual to physical address mapping for graphics processor 2510, including for vertex processor 2505 and/or fragment processor(s) 2515A-2515N, which may reference vertex or image/texture data stored in memory, in addition to vertex or image/texture data stored in one or more cache(s) 2525A-2525B. In at least one embodiment, one or more MMU(s) 2520A-2520B may be synchronized with other MMUs within a system, including one or more MMUs associated with one or more application processor(s) 2005, image processors 2015, and/or video processors 2020 of FIG. 20, such that each processor 2005-2020 can participate in a shared or unified virtual memory system. In at least one embodiment, one or more circuit interconnect(s) 2530A-2530B enable graphics processor 2510 to interface with other IP cores within an SoC, either via an internal bus of the SoC or via a direct connection.

In at least one embodiment, graphics processor 2540 includes one or more MMU(s) 2520A-2520B, caches 2525A-2525B, and circuit interconnects 2530A-2530B of graphics processor 2510 of FIG. 25A. In at least one embodiment, graphics processor 2540 includes one or more shader core(s) 2555A-2555N (e.g., 2555A, 2555B, 2555C, 2555D, 2555E, 2555F, through 2555N-1, and 2555N), which provides for a unified shader core architecture in which a single core or type or core can execute all types of programmable shader code, including shader program code to implement vertex shaders, fragment shaders, and/or compute shaders. In at least one embodiment, a number of shader cores can vary. In at least one embodiment, graphics processor 2540 includes an inter-core task manager 2545, which acts as a thread dispatcher to dispatch execution threads to one or more shader cores 2555A-2555N and a tiling unit 2558 to accelerate tiling operations for tile-based rendering, in which rendering operations for a scene are subdivided in image space, for example to exploit local spatial coherence within a scene or to optimize use of internal caches.

Figure 26A:
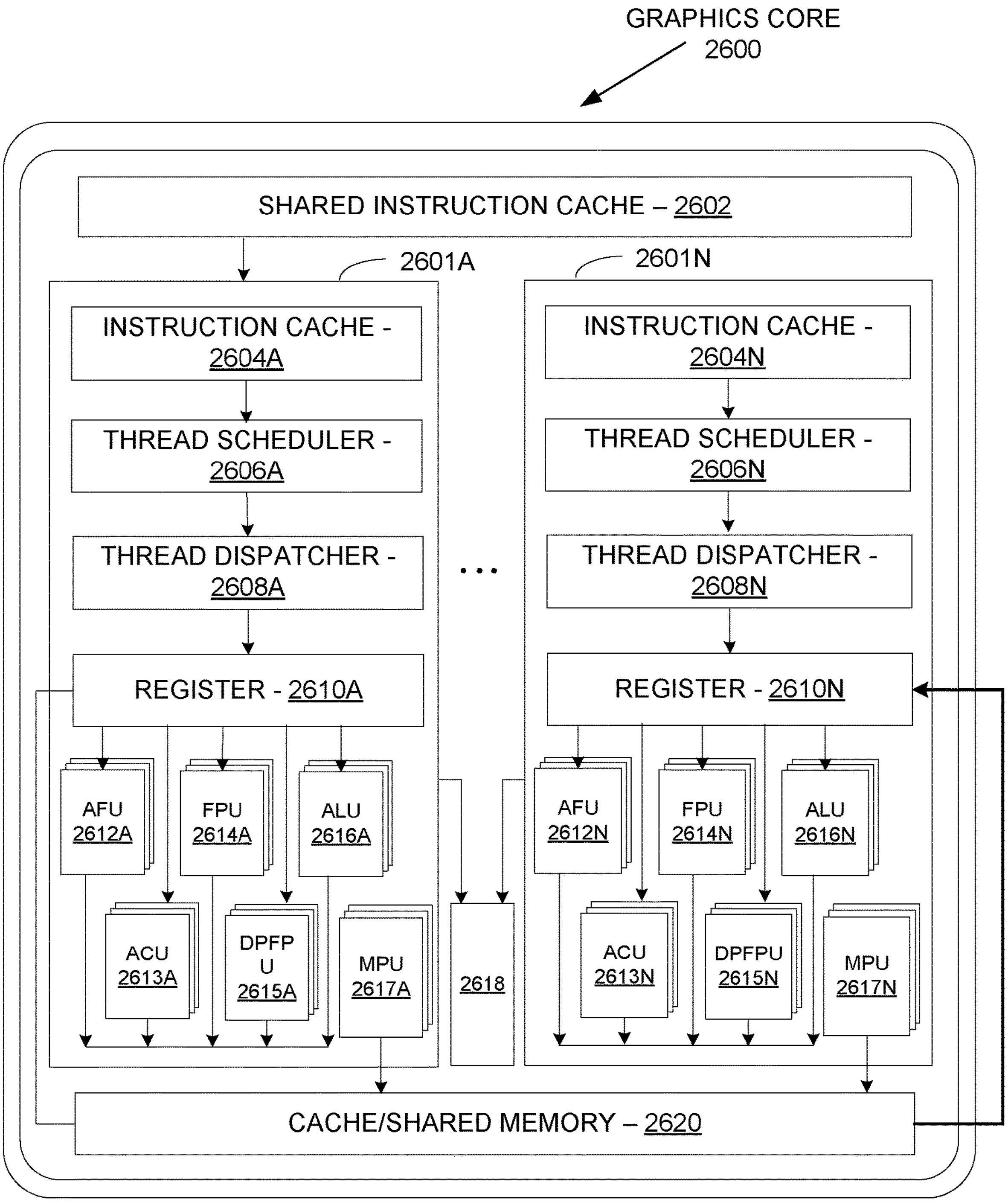
FIG. 26A illustrates a graphics core, in accordance with at least one embodiment.

FIG. 26A illustrates a graphics core 2600, in accordance with at least one embodiment. In at least one embodiment, graphics core 2600 may be included within graphics processor 2010 of FIG. 20. In at least one embodiment, graphics core 2600 may be a unified shader core 2555A-2555N as in FIG. 25B. In at least one embodiment, graphics core 2600 includes a shared instruction cache 2602, a texture unit 2618, and a cache/shared memory 2620 that are common to execution resources within graphics core 2600. In at least one embodiment, graphics core 2600 can include multiple slices 2601A-2601N or partition for each core, and a graphics processor can include multiple instances of graphics core 2600. Slices 2601A-2601N can include support logic including a local instruction cache 2604A-2604N, a thread scheduler 2606A-2606N, a thread dispatcher 2608A-2608N, and a set of registers 2610A-2610N. In at least one embodiment, slices 2601A-2601N can include a set of additional function units ("AFUs") 2612A-2612N, floating-point units ("FPUs") 2614A-2614N, integer arithmetic logic units ("ALUs") 2616-2616N, address computational units ("ACUs") 2613A-2613N, double-precision floating-point units ("DPFPUs") 2615A-2615N, and matrix processing units ("MPUs") 2617A-2617N.

In at least one embodiment, FPUs 2614A-2614N can perform single-precision (32-bit) and half-precision (16-bit) floating point operations, while DPFPUs 2615A-2615N perform double precision (64-bit) floating point operations. In at least one embodiment, ALUs 2616A-2616N can perform variable precision integer operations at 8-bit, 16-bit, and 32-bit precision, and can be configured for mixed precision operations. In at least one embodiment, MPUs 2617A-2617N can also be configured for mixed precision matrix operations, including half-precision floating point and 8-bit integer operations. In at least one embodiment, MPUs 2617-2617N can perform a variety of matrix operations to accelerate CUDA programs, including enabling support for accelerated general matrix to matrix multiplication ("GEMM"). In at least one embodiment, AFUs 2612A-2612N can perform additional logic operations not supported by floating-point or integer units, including trigonometric operations (e.g., Sine, Cosine, etc.).

Figure 26B:
FIG. 26B illustrates a GPGPU, in accordance with at least one embodiment.

FIG. 26B illustrates a general-purpose graphics processing unit ("GPGPU") 2630, in accordance with at least one embodiment. In at least one embodiment, GPGPU 2630 is highly-parallel and suitable for deployment on a multi-chip module. In at least one embodiment, GPGPU 2630 can be configured to enable highly-parallel compute operations to be performed by an array of GPUs. In at least one embodiment, GPGPU 2630 can be linked directly to other instances of GPGPU 2630 to create a multi-GPU cluster to improve execution time for CUDA programs. In at least one embodiment, GPGPU 2630 includes a host interface 2632 to enable a connection with a host processor. In at least one embodiment, host interface 2632 is a PCIe interface. In at least one embodiment, host interface 2632 can be a vendor specific communications interface or communications fabric. In at least one embodiment, GPGPU 2630 receives commands from a host processor and uses a global scheduler 2634 to distribute execution threads associated with those commands to a set of compute clusters 2636A-2636H. In at least one embodiment, compute clusters 2636A-2636H share a cache memory 2638. In at least one embodiment, cache memory 2638 can serve as a higher-level cache for cache memories within compute clusters 2636A-2636H.

In at least one embodiment, GPGPU 2630 includes memory 2644A-2644B coupled with compute clusters 2636A-2636H via a set of memory controllers 2642A-2642B. In at least one embodiment, memory 2644A-2644B can include various types of memory devices including DRAM or graphics random access memory, such as synchronous graphics random access memory ("SGRAM"), including graphics double data rate ("GDDR") memory.

In at least one embodiment, compute clusters 2636A-2636H each include a set of graphics cores, such as graphics core 2600 of FIG. 26A, which can include multiple types of integer and floating point logic units that can perform computational operations at a range of precisions including suited for computations associated with CUDA programs. For example, in at least one embodiment, at least a subset of floating point units in each of compute clusters 2636A-2636H can be configured to perform 16-bit or 32-bit floating point operations, while a different subset of floating point units can be configured to perform 64-bit floating point operations.

In at least one embodiment, multiple instances of GPGPU 2630 can be configured to operate as a compute cluster. Compute clusters 2636A-2636H may implement any technically feasible communication techniques for synchronization and data exchange. In at least one embodiment, multiple instances of GPGPU 2630 communicate over host interface 2632. In at least one embodiment, GPGPU 2630 includes an I/O hub 2639 that couples GPGPU 2630 with a GPU link 2640 that enables a direct connection to other instances of GPGPU 2630. In at least one embodiment, GPU link 2640 is coupled to a dedicated GPU-to-GPU bridge that enables communication and synchronization between multiple instances of GPGPU 2630. In at least one embodiment GPU link 2640 couples with a high speed interconnect to transmit and receive data to other GPGPUs 2630 or parallel processors. In at least one embodiment, multiple instances of GPGPU 2630 are located in separate data processing systems and communicate via a network device that is accessible via host interface 2632. In at least one embodiment GPU link 2640 can be configured to enable a connection to a host processor in addition to or as an alternative to host interface 2632. In at least one embodiment, GPGPU 2630 can be configured to execute a CUDA program.

Figure 27A:
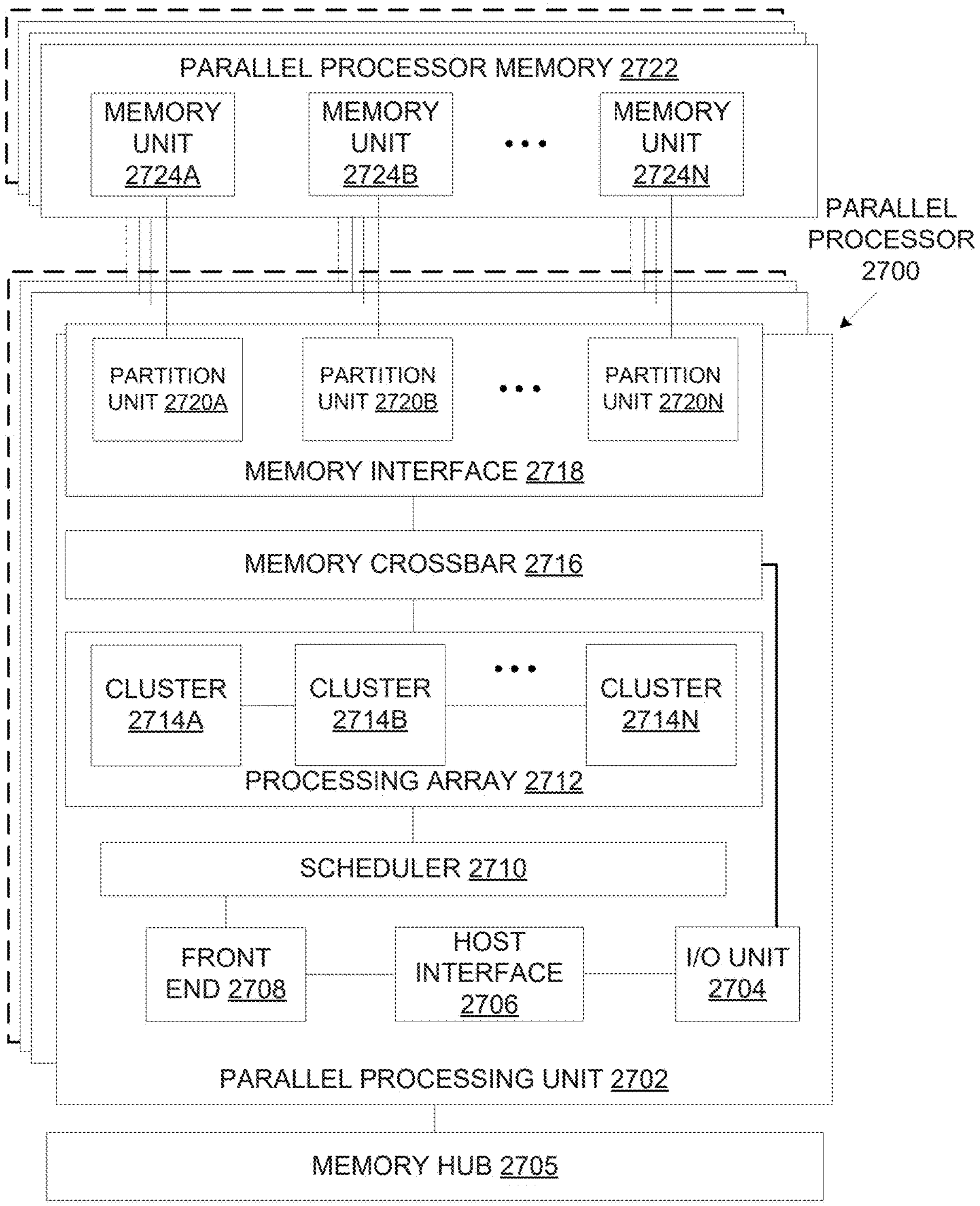
FIG. 27A illustrates a parallel processor, in accordance with at least one embodiment.

FIG. 27A illustrates a parallel processor 2700, in accordance with at least one embodiment. In at least one embodiment, various components of parallel processor 2700 may be implemented using one or more integrated circuit devices, such as programmable processors, application specific integrated circuits ("ASICs"), or FPGAs.

In at least one embodiment, parallel processor 2700 includes a parallel processing unit 2702. In at least one embodiment, parallel processing unit 2702 includes an I/O unit 2704 that enables communication with other devices, including other instances of parallel processing unit 2702. In at least one embodiment, I/O unit 2704 may be directly connected to other devices. In at least one embodiment, I/O unit 2704 connects with other devices via use of a hub or switch interface, such as memory hub 2705. In at least one embodiment, connections between memory hub 2705 and I/O unit 2704 form a communication link. In at least one embodiment, I/O unit 2704 connects with a host interface 2706 and a memory crossbar 2716, where host interface 2706 receives commands directed to performing processing operations and memory crossbar 2716 receives commands directed to performing memory operations.

In at least one embodiment, when host interface 2706 receives a command buffer via I/O unit 2704, host interface 2706 can direct work operations to perform those commands to a front end 2708. In at least one embodiment, front end 2708 couples with a scheduler 2710, which is configured to distribute commands or other work items to a processing array 2712. In at least one embodiment, scheduler 2710 ensures that processing array 2712 is properly configured and in a valid state before tasks are distributed to processing array 2712. In at least one embodiment, scheduler 2710 is implemented via firmware logic executing on a microcontroller. In at least one embodiment, microcontroller implemented scheduler 2710 is configurable to perform complex scheduling and work distribution operations at coarse and fine granularity, enabling rapid preemption and context switching of threads executing on processing array 2712. In at least one embodiment, host software can prove workloads for scheduling on processing array 2712 via one of multiple graphics processing doorbells. In at least one embodiment, workloads can then be automatically distributed across processing array 2712 by scheduler 2710 logic within a microcontroller including scheduler 2710.

In at least one embodiment, processing array 2712 can include up to "N" clusters (e.g., cluster 2714A, cluster 2714B, through cluster 2714N). In at least one embodiment, each cluster 2714A-2714N of processing array 2712 can execute a large number of concurrent threads. In at least one embodiment, scheduler 2710 can allocate work to clusters 2714A-2714N of processing array 2712 using various scheduling and/or work distribution algorithms, which may vary depending on the workload arising for each type of program or computation. In at least one embodiment, scheduling can be handled dynamically by scheduler 2710, or can be assisted in part by compiler logic during compilation of program logic configured for execution by processing array 2712. In at least one embodiment, different clusters 2714A-2714N of processing array 2712 can be allocated for processing different types of programs or for performing different types of computations.

In at least one embodiment, processing array 2712 can be configured to perform various types of parallel processing operations. In at least one embodiment, processing array 2712 is configured to perform general-purpose parallel compute operations. For example, in at least one embodiment, processing array 2712 can include logic to execute processing tasks including filtering of video and/or audio data, performing modeling operations, including physics operations, and performing data transformations.

In at least one embodiment, processing array 2712 is configured to perform parallel graphics processing operations. In at least one embodiment, processing array 2712 can include additional logic to support execution of such graphics processing operations, including, but not limited to texture sampling logic to perform texture operations, as well as tessellation logic and other vertex processing logic. In at least one embodiment, processing array 2712 can be configured to execute graphics processing related shader programs such as, but not limited to vertex shaders, tessellation shaders, geometry shaders, and pixel shaders. In at least one embodiment, parallel processing unit 2702 can transfer data from system memory via I/O unit 2704 for processing. In at least one embodiment, during processing, transferred data can be stored to on-chip memory (e.g., a parallel processor memory 2722) during processing, then written back to system memory.

In at least one embodiment, when parallel processing unit 2702 is used to perform graphics processing, scheduler 2710 can be configured to divide a processing workload into approximately equal sized tasks, to better enable distribution of graphics processing operations to multiple clusters 2714A-2714N of processing array 2712. In at least one embodiment, portions of processing array 2712 can be configured to perform different types of processing. For example, in at least one embodiment, a first portion may be configured to perform vertex shading and topology generation, a second portion may be configured to perform tessellation and geometry shading, and a third portion may be configured to perform pixel shading or other screen space operations, to produce a rendered image for display. In at least one embodiment, intermediate data produced by one or more of clusters 2714A-2714N may be stored in buffers to allow intermediate data to be transmitted between clusters 2714A-2714N for further processing.

In at least one embodiment, processing array 2712 can receive processing tasks to be executed via scheduler 2710, which receives commands defining processing tasks from front end 2708. In at least one embodiment, processing tasks can include indices of data to be processed, e.g., surface (patch) data, primitive data, vertex data, and/or pixel data, as well as state parameters and commands defining how data is to be processed (e.g., what program is to be executed). In at least one embodiment, scheduler 2710 may be configured to fetch indices corresponding to tasks or may receive indices from front end 2708. In at least one embodiment, front end 2708 can be configured to ensure processing array 2712 is configured to a valid state before a workload specified by incoming command buffers (e.g., batch-buffers, push buffers, etc.) is initiated.

In at least one embodiment, each of one or more instances of parallel processing unit 2702 can couple with parallel processor memory 2722. In at least one embodiment, parallel processor memory 2722 can be accessed via memory crossbar 2716, which can receive memory requests from processing array 2712 as well as I/O unit 2704. In at least one embodiment, memory crossbar 2716 can access parallel processor memory 2722 via a memory interface 2718. In at least one embodiment, memory interface 2718 can include multiple partition units (e.g., a partition unit 2720A, partition unit 2720B, through partition unit 2720N) that can each couple to a portion (e.g., memory unit) of parallel processor memory 2722. In at least one embodiment, a number of partition units 2720A-2720N is configured to be equal to a number of memory units, such that a first partition unit 2720A has a corresponding first memory unit 2724A, a second partition unit 2720B has a corresponding memory unit 2724B, and an Nth partition unit 2720N has a corresponding Nth memory unit 2724N. In at least one embodiment, a number of partition units 2720A-2720N may not be equal to a number of memory devices.

In at least one embodiment, memory units 2724A-2724N can include various types of memory devices, including DRAM or graphics random access memory, such as SGRAM, including GDDR memory. In at least one embodiment, memory units 2724A-2724N may also include 3D stacked memory, including but not limited to high bandwidth memory ("HBM"). In at least one embodiment, render targets, such as frame buffers or texture maps may be stored across memory units 2724A-2724N, allowing partition units 2720A-2720N to write portions of each render target in parallel to efficiently use available bandwidth of parallel processor memory 2722. In at least one embodiment, a local instance of parallel processor memory 2722 may be excluded in favor of a unified memory design that utilizes system memory in conjunction with local cache memory.

In at least one embodiment, any one of clusters 2714A-2714N of processing array 2712 can process data that will be written to any of memory units 2724A-2724N within parallel processor memory 2722. In at least one embodiment, memory crossbar 2716 can be configured to transfer an output of each cluster 2714A-2714N to any partition unit 2720A-2720N or to another cluster 2714A-2714N, which can perform additional processing operations on an output. In at least one embodiment, each cluster 2714A-2714N can communicate with memory interface 2718 through memory crossbar 2716 to read from or write to various external memory devices. In at least one embodiment, memory crossbar 2716 has a connection to memory interface 2718 to communicate with I/O unit 2704, as well as a connection to a local instance of parallel processor memory 2722, enabling processing units within different clusters 2714A-2714N to communicate with system memory or other memory that is not local to parallel processing unit 2702. In at least one embodiment, memory crossbar 2716 can use virtual channels to separate traffic streams between clusters 2714A-2714N and partition units 2720A-2720N.

In at least one embodiment, multiple instances of parallel processing unit 2702 can be provided on a single add-in card, or multiple add-in cards can be interconnected. In at least one embodiment, different instances of parallel processing unit 2702 can be configured to inter-operate even if different instances have different numbers of processing cores, different amounts of local parallel processor memory, and/or other configuration differences. For example, in at least one embodiment, some instances of parallel processing unit 2702 can include higher precision floating point units relative to other instances. In at least one embodiment, systems incorporating one or more instances of parallel processing unit 2702 or parallel processor 2700 can be implemented in a variety of configurations and form factors, including but not limited to desktop, laptop, or handheld personal computers, servers, workstations, game consoles, and/or embedded systems.

Figure 27B:
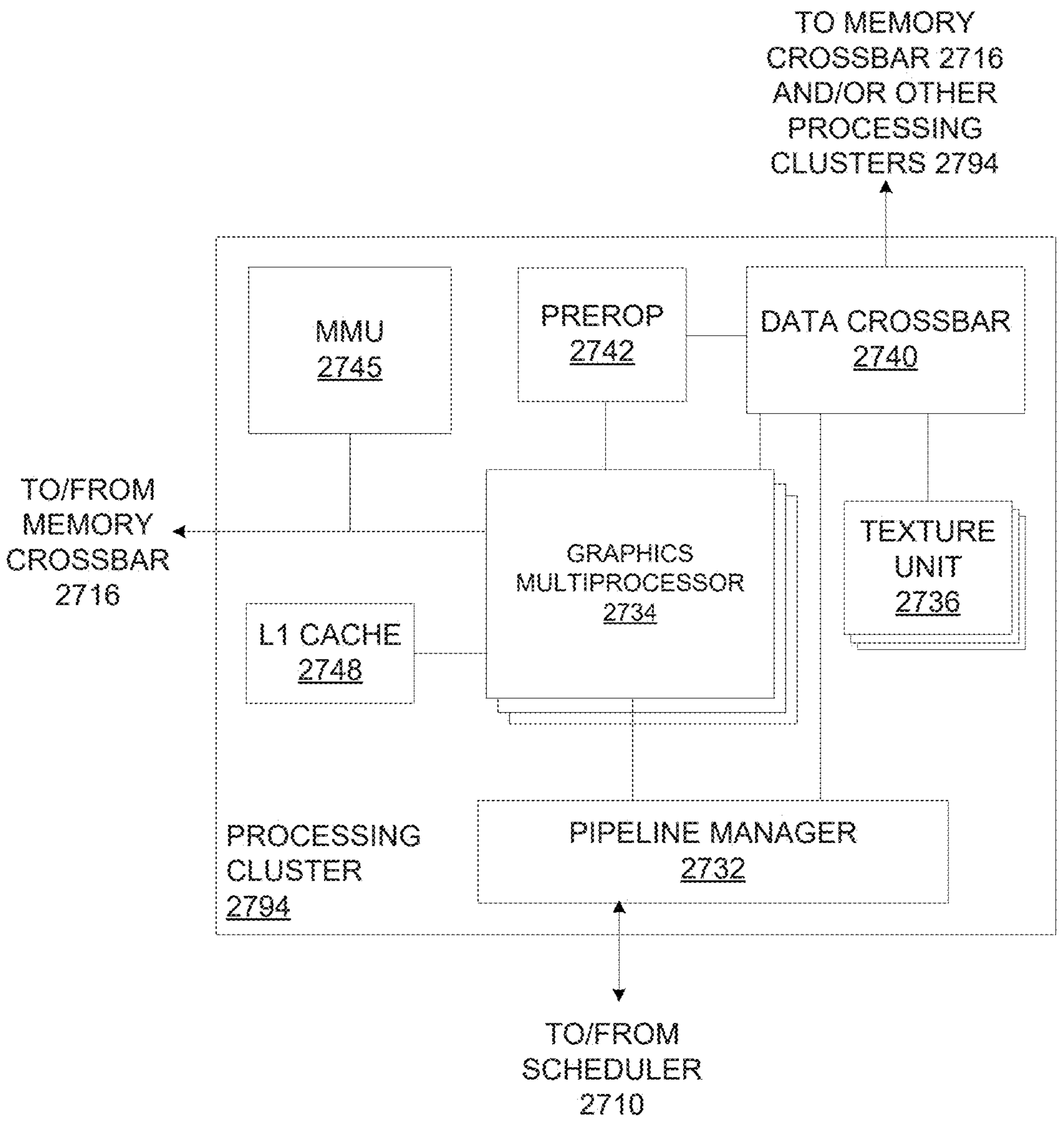
FIG. 27B illustrates a processing cluster, in accordance with at least one embodiment.

FIG. 27B illustrates a processing cluster 2794, in accordance with at least one embodiment. In at least one embodiment, processing cluster 2794 is included within a parallel processing unit. In at least one embodiment, processing cluster 2794 is one of processing clusters 2714A-2714N of FIG. 27. In at least one embodiment, processing cluster 2794 can be configured to execute many threads in parallel, where the term "thread" refers to an instance of a particular program executing on a particular set of input data. In at least one embodiment, single instruction, multiple data ("SIMD") instruction issue techniques are used to support parallel execution of a large number of threads without providing multiple independent instruction units. In at least one embodiment, single instruction, multiple thread ("SIMT") techniques are used to support parallel execution of a large number of generally synchronized threads, using a common instruction unit configured to issue instructions to a set of processing engines within each processing cluster 2794.

In at least one embodiment, operation of processing cluster 2794 can be controlled via a pipeline manager 2732 that distributes processing tasks to SIMT parallel processors. In at least one embodiment, pipeline manager 2732 receives instructions from scheduler 2710 of FIG. 27 and manages execution of those instructions via a graphics multiprocessor 2734 and/or a texture unit 2736. In at least one embodiment, graphics multiprocessor 2734 is an exemplary instance of a SIMT parallel processor. However, in at least one embodiment, various types of SIMT parallel processors of differing architectures may be included within processing cluster 2794. In at least one embodiment, one or more instances of graphics multiprocessor 2734 can be included within processing cluster 2794. In at least one embodiment, graphics multiprocessor 2734 can process data and a data crossbar 2740 can be used to distribute processed data to one of multiple possible destinations, including other shader units. In at least one embodiment, pipeline manager 2732 can facilitate distribution of processed data by specifying destinations for processed data to be distributed via data crossbar 2740.

In at least one embodiment, each graphics multiprocessor 2734 within processing cluster 2794 can include an identical set of functional execution logic (e.g., arithmetic logic units, load/store units ("LSUs"), etc.). In at least one embodiment, functional execution logic can be configured in a pipelined manner in which new instructions can be issued before previous instructions are complete. In at least one embodiment, functional execution logic supports a variety of operations including integer and floating point arithmetic, comparison operations, Boolean operations, bit-shifting, and computation of various algebraic functions. In at least one embodiment, same functional-unit hardware can be leveraged to perform different operations and any combination of functional units may be present.

In at least one embodiment, instructions transmitted to processing cluster 2794 constitute a thread. In at least one embodiment, a set of threads executing across a set of parallel processing engines is a thread group. In at least one embodiment, a thread group executes a program on different input data. In at least one embodiment, each thread within a thread group can be assigned to a different processing engine within graphics multiprocessor 2734. In at least one embodiment, a thread group may include fewer threads than a number of processing engines within graphics multiprocessor 2734. In at least one embodiment, when a thread group includes fewer threads than a number of processing engines, one or more of the processing engines may be idle during cycles in which that thread group is being processed. In at least one embodiment, a thread group may also include more threads than a number of processing engines within graphics multiprocessor 2734. In at least one embodiment, when a thread group includes more threads than the number of processing engines within graphics multiprocessor 2734, processing can be performed over consecutive clock cycles. In at least one embodiment, multiple thread groups can be executed concurrently on graphics multiprocessor 2734.

In at least one embodiment, graphics multiprocessor 2734 includes an internal cache memory to perform load and store operations. In at least one embodiment, graphics multiprocessor 2734 can forego an internal cache and use a cache memory (e.g., L1 cache 2748) within processing cluster 2794. In at least one embodiment, each graphics multiprocessor 2734 also has access to Level 2 ("L2") caches within partition units (e.g., partition units 2720A-2720N of FIG. 27A) that are shared among all processing clusters 2794 and may be used to transfer data between threads. In at least one embodiment, graphics multiprocessor 2734 may also access off-chip global memory, which can include one or more of local parallel processor memory and/or system memory. In at least one embodiment, any memory external to parallel processing unit 2702 may be used as global memory. In at least one embodiment, processing cluster 2794 includes multiple instances of graphics multiprocessor 2734 that can share common instructions and data, which may be stored in L1 cache 2748.

In at least one embodiment, each processing cluster 2794 may include an MMU 2745 that is configured to map virtual addresses into physical addresses. In at least one embodiment, one or more instances of MMU 2745 may reside within memory interface 2718 of FIG. 27. In at least one embodiment, MMU 2745 includes a set of page table entries ("PTEs") used to map a virtual address to a physical address of a tile and optionally a cache line index. In at least one embodiment, MMU 2745 may include address translation lookaside buffers ("TLBs") or caches that may reside within graphics multiprocessor 2734 or L1 cache 2748 or processing cluster 2794. In at least one embodiment, a physical address is processed to distribute surface data access locality to allow efficient request interleaving among partition units. In at least one embodiment, a cache line index may be used to determine whether a request for a cache line is a hit or miss.

In at least one embodiment, processing cluster 2794 may be configured such that each graphics multiprocessor 2734 is coupled to a texture unit 2736 for performing texture mapping operations, e.g., determining texture sample positions, reading texture data, and filtering texture data. In at least one embodiment, texture data is read from an internal texture L1 cache (not shown) or from an L1 cache within graphics multiprocessor 2734 and is fetched from an L2 cache, local parallel processor memory, or system memory, as needed. In at least one embodiment, each graphics multiprocessor 2734 outputs a processed task to data crossbar 2740 to provide the processed task to another processing cluster 2794 for further processing or to store the processed task in an L2 cache, a local parallel processor memory, or a system memory via memory crossbar 2716. In at least one embodiment, a pre-raster operations unit ("preROP") 2742 is configured to receive data from graphics multiprocessor 2734, direct data to ROP units, which may be located with partition units as described herein (e.g., partition units 2720A-2720N of FIG. 27). In at least one embodiment, PreROP 2742 can perform optimizations for color blending, organize pixel color data, and perform address translations.

Figure 27C:
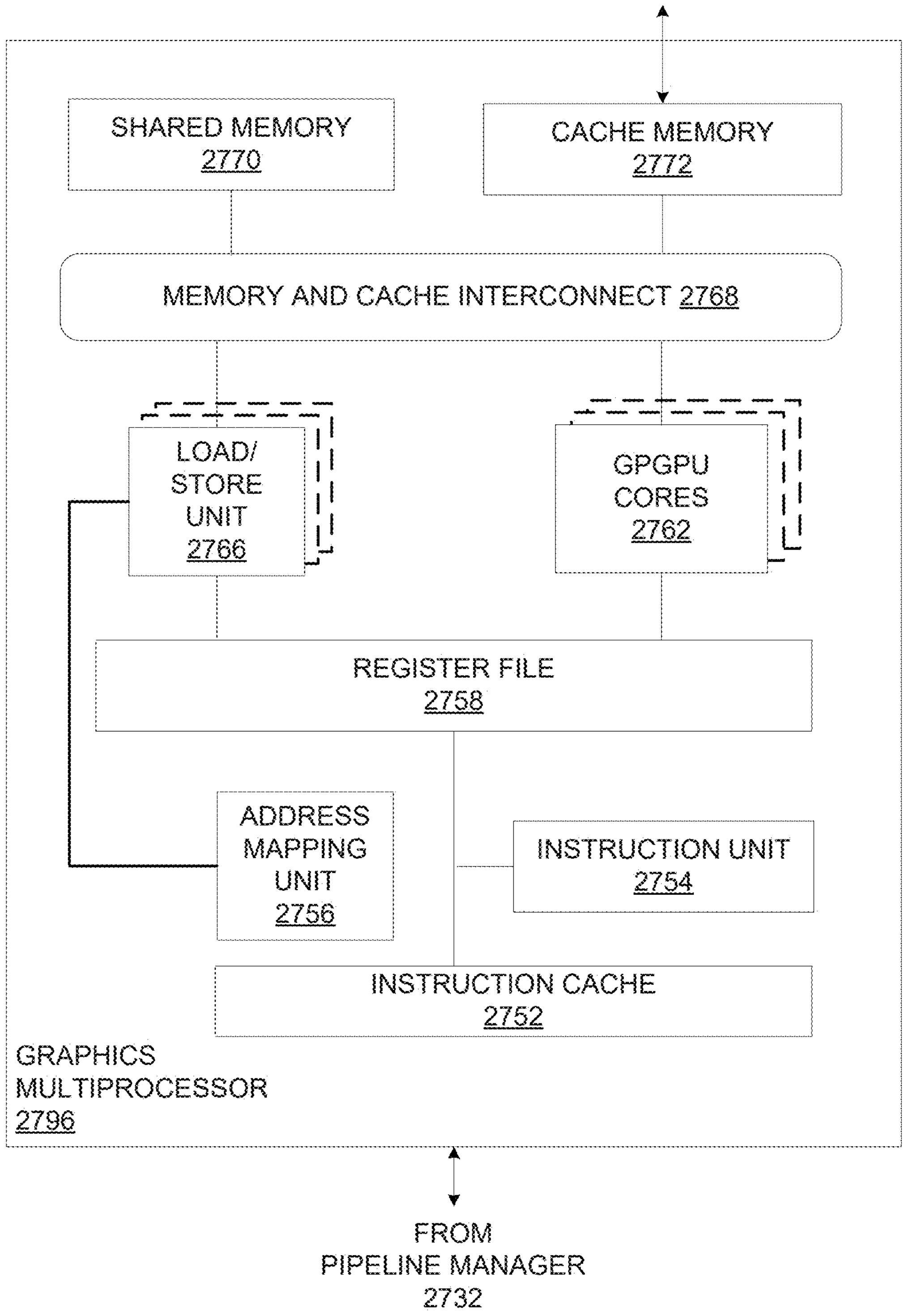
FIG. 27C illustrates a graphics multiprocessor, in accordance with at least one embodiment.

FIG. 27C illustrates a graphics multiprocessor 2796, in accordance with at least one embodiment. In at least one embodiment, graphics multiprocessor 2796 is graphics multiprocessor 2734 of FIG. 27B. In at least one embodiment, graphics multiprocessor 2796 couples with pipeline manager 2732 of processing cluster 2794. In at least one embodiment, graphics multiprocessor 2796 has an execution pipeline including but not limited to an instruction cache 2752, an instruction unit 2754, an address mapping unit 2756, a register file 2758, one or more GPGPU cores 2762, and one or more LSUs 2766. GPGPU cores 2762 and LSUs 2766 are coupled with cache memory 2772 and shared memory 2770 via a memory and cache interconnect 2768.

In at least one embodiment, instruction cache 2752 receives a stream of instructions to execute from pipeline manager 2732. In at least one embodiment, instructions are cached in instruction cache 2752 and dispatched for execution by instruction unit 2754. In at least one embodiment, instruction unit 2754 can dispatch instructions as thread groups (e.g., warps), with each thread of a thread group assigned to a different execution unit within GPGPU core 2762. In at least one embodiment, an instruction can access any of a local, shared, or global address space by specifying an address within a unified address space. In at least one embodiment, address mapping unit 2756 can be used to translate addresses in a unified address space into a distinct memory address that can be accessed by LSUs 2766.

In at least one embodiment, register file 2758 provides a set of registers for functional units of graphics multiprocessor 2796. In at least one embodiment, register file 2758 provides temporary storage for operands connected to data paths of functional units (e.g., GPGPU cores 2762, LSUs 2766) of graphics multiprocessor 2796. In at least one embodiment, register file 2758 is divided between each of functional units such that each functional unit is allocated a dedicated portion of register file 2758. In at least one embodiment, register file 2758 is divided between different thread groups being executed by graphics multiprocessor 2796.

In at least one embodiment, GPGPU cores 2762 can each include FPUs and/or integer ALUs that are used to execute instructions of graphics multiprocessor 2796. GPGPU cores 2762 can be similar in architecture or can differ in architecture. In at least one embodiment, a first portion of GPGPU cores 2762 include a single precision FPU and an integer ALU while a second portion of GPGPU cores 2762 include a double precision FPU. In at least one embodiment, FPUs can implement IEEE 754-2008 standard for floating point arithmetic or enable variable precision floating point arithmetic. In at least one embodiment, graphics multiprocessor 2796 can additionally include one or more fixed function or special function units to perform specific functions such as copy rectangle or pixel blending operations. In at least one embodiment one or more of GPGPU cores 2762 can also include fixed or special function logic.

In at least one embodiment, GPGPU cores 2762 include SIMD logic capable of performing a single instruction on multiple sets of data. In at least one embodiment GPGPU cores 2762 can physically execute SIMD4, SIMD8, and SIMD16 instructions and logically execute SIMD1, SIMD2, and SIMD32 instructions. In at least one embodiment, SIMD instructions for GPGPU cores 2762 can be generated at compile time by a shader compiler or automatically generated when executing programs written and compiled for single program multiple data ("SPMD") or SIMT architectures. In at least one embodiment, multiple threads of a program configured for an SIMT execution model can executed via a single SIMD instruction. For example, in at least one embodiment, eight SIMT threads that perform the same or similar operations can be executed in parallel via a single SIMD8 logic unit.

In at least one embodiment, memory and cache interconnect 2768 is an interconnect network that connects each functional unit of graphics multiprocessor 2796 to register file 2758 and to shared memory 2770. In at least one embodiment, memory and cache interconnect 2768 is a crossbar interconnect that allows LSU 2766 to implement load and store operations between shared memory 2770 and register file 2758. In at least one embodiment, register file 2758 can operate at a same frequency as GPGPU cores 2762, thus data transfer between GPGPU cores 2762 and register file 2758 is very low latency. In at least one embodiment, shared memory 2770 can be used to enable communication between threads that execute on functional units within graphics multiprocessor 2796. In at least one embodiment, cache memory 2772 can be used as a data cache for example, to cache texture data communicated between functional units and texture unit 2736. In at least one embodiment, shared memory 2770 can also be used as a program managed cached. In at least one embodiment, threads executing on GPGPU cores 2762 can programmatically store data within shared memory in addition to automatically cached data that is stored within cache memory 2772.

In at least one embodiment, a parallel processor or GPGPU as described herein is communicatively coupled to host/processor cores to accelerate graphics operations, machine-learning operations, pattern analysis operations, and various general purpose GPU (GPGPU) functions. In at least one embodiment, a GPU may be communicatively coupled to host processor/cores over a bus or other interconnect (e.g., a high speed interconnect such as PCIe or NVLink). In at least one embodiment, a GPU may be integrated on the same package or chip as cores and communicatively coupled to cores over a processor bus/interconnect that is internal to a package or a chip. In at least one embodiment, regardless of the manner in which a GPU is connected, processor cores may allocate work to the GPU in the form of sequences of commands/instructions contained in a WD. In at least one embodiment, the GPU then uses dedicated circuitry/logic for efficiently processing these commands/instructions.

Figure 28:
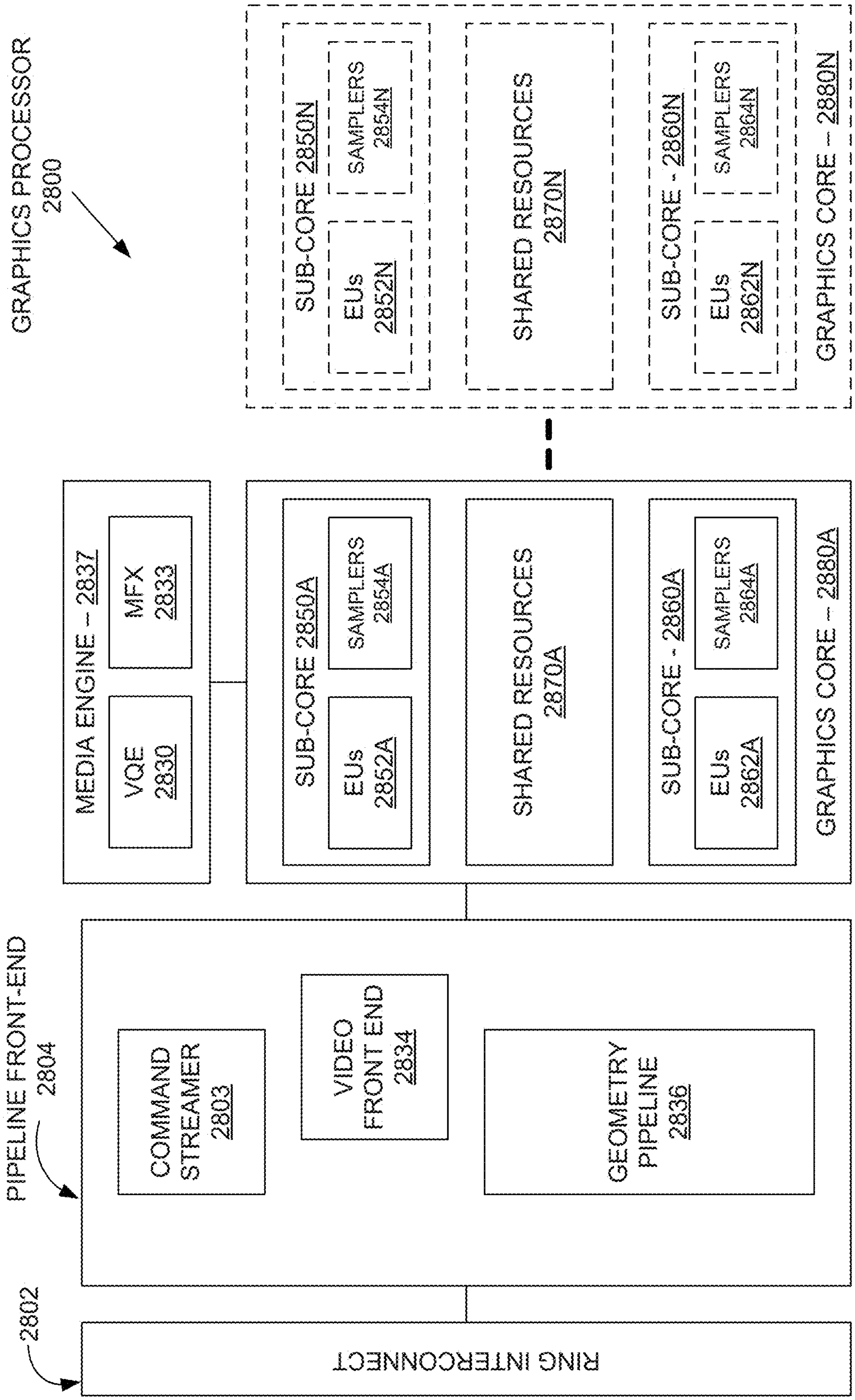
FIG. 28 illustrates a graphics processor, in accordance with at least one embodiment.

FIG. 28 illustrates a graphics processor 2800, in accordance with at least one embodiment. In at least one embodiment, graphics processor 2800 includes a ring interconnect 2802, a pipeline front-end 2804, a media engine 2837, and graphics cores 2880A-2880N. In at least one embodiment, ring interconnect 2802 couples graphics processor 2800 to other processing units, including other graphics processors or one or more general-purpose processor cores. In at least one embodiment, graphics processor 2800 is one of many processors integrated within a multi-core processing system.

In at least one embodiment, graphics processor 2800 receives batches of commands via ring interconnect 2802. In at least one embodiment, incoming commands are interpreted by a command streamer 2803 in pipeline front-end 2804. In at least one embodiment, graphics processor 2800 includes scalable execution logic to perform 3D geometry processing and media processing via graphics core(s) 2880A-2880N. In at least one embodiment, for 3D geometry processing commands, command streamer 2803 supplies commands to geometry pipeline 2836. In at least one embodiment, for at least some media processing commands, command streamer 2803 supplies commands to a video front end 2834, which couples with a media engine 2837. In at least one embodiment, media engine 2837 includes a Video Quality Engine ("VQE") 2830 for video and image post-processing and a multi-format encode/decode ("MEX") engine 2833 to provide hardware-accelerated media data encode and decode. In at least one embodiment, geometry pipeline 2836 and media engine 2837 each generate execution threads for thread execution resources provided by at least one graphics core 2880A.

In at least one embodiment, graphics processor 2800 includes scalable thread execution resources featuring modular graphics cores 2880A-2880N (sometimes referred to as core slices), each having multiple sub-cores 2850A-550N, 2860A-2860N (sometimes referred to as core sub-slices). In at least one embodiment, graphics processor 2800 can have any number of graphics cores 2880A through 2880N. In at least one embodiment, graphics processor 2800 includes a graphics core 2880A having at least a first sub-core 2850A and a second sub-core 2860A. In at least one embodiment, graphics processor 2800 is a low power processor with a single sub-core (e.g., sub-core 2850A). In at least one embodiment, graphics processor 2800 includes multiple graphics cores 2880A-2880N, each including a set of first sub-cores 2850A-2850N and a set of second sub-cores 2860A-2860N. In at least one embodiment, each sub-core in first sub-cores 2850A-2850N includes at least a first set of execution units ("EUs") 2852A-2852N and media/texture samplers 2854A-2854N. In at least one embodiment, each sub-core in second sub-cores 2860A-2860N includes at least a second set of execution units 2862A-2862N and samplers 2864A-2864N. In at least one embodiment, each sub-core 2850A-2850N, 2860A-2860N shares a set of shared resources 2870A-2870N. In at least one embodiment, shared resources 2870 include shared cache memory and pixel operation logic.

Figure 29:
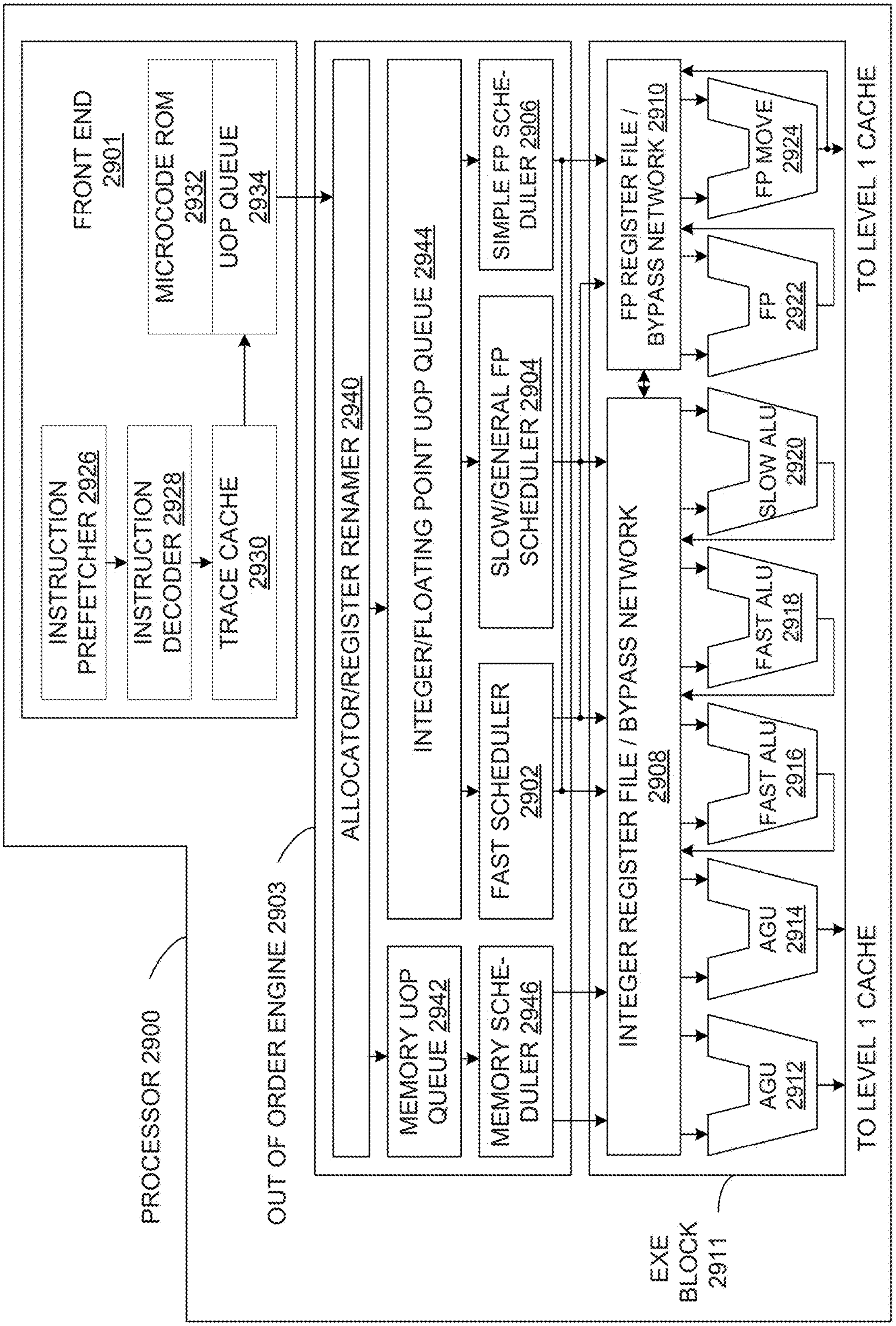
FIG. 29 illustrates a processor, in accordance with at least one embodiment.

FIG. 29 illustrates a processor 2900, in accordance with at least one embodiment. In at least one embodiment, processor 2900 may include, without limitation, logic circuits to perform instructions. In at least one embodiment, processor 2900 may perform instructions, including x86 instructions, ARM instructions, specialized instructions for ASICs, etc. In at least one embodiment, processor 2910 may include registers to store packed data, such as 64-bit wide MMX™ registers in microprocessors enabled with MMX technology from Intel Corporation of Santa Clara, Calif. In at least one embodiment, MMX registers, available in both integer and floating point forms, may operate with packed data elements that accompany SIMD and streaming SIMD extensions ("SSE") instructions. In at least one embodiment, 128-bit wide XMM registers relating to SSE2, SSE3, SSE4, AVX, or beyond (referred to generically as "SSEx") technology may hold such packed data operands. In at least one embodiment, processors 2910 may perform instructions to accelerate CUDA programs.

In at least one embodiment, processor 2900 includes an in-order front end ("front end") 2901 to fetch instructions to be executed and prepare instructions to be used later in processor pipeline. In at least one embodiment, front end 2901 may include several units. In at least one embodiment, an instruction prefetcher 2926 fetches instructions from memory and feeds instructions to an instruction decoder 2928 which in turn decodes or interprets instructions. For example, in at least one embodiment, instruction decoder 2928 decodes a received instruction into one or more operations called "micro-instructions" or "micro-operations" (also called "micro ops" or "uops") for execution. In at least one embodiment, instruction decoder 2928 parses instruction into an opcode and corresponding data and control fields that may be used by micro-architecture to perform operations. In at least one embodiment, a trace cache 2930 may assemble decoded uops into program ordered sequences or traces in a uop queue 2934 for execution. In at least one embodiment, when trace cache 2930 encounters a complex instruction, a microcode ROM 2932 provides uops needed to complete an operation.

In at least one embodiment, some instructions may be converted into a single micro-op, whereas others need several micro-ops to complete full operation. In at least one embodiment, if more than four micro-ops are needed to complete an instruction, instruction decoder 2928 may access microcode ROM 2932 to perform instruction. In at least one embodiment, an instruction may be decoded into a small number of micro-ops for processing at instruction decoder 2928. In at least one embodiment, an instruction may be stored within microcode ROM 2932 should a number of micro-ops be needed to accomplish operation. In at least one embodiment, trace cache 2930 refers to an entry point programmable logic array ("PLA") to determine a correct micro-instruction pointer for reading microcode sequences to complete one or more instructions from microcode ROM 2932. In at least one embodiment, after microcode ROM 2932 finishes sequencing micro-ops for an instruction, front end 2901 of machine may resume fetching micro-ops from trace cache 2930.

In at least one embodiment, out-of-order execution engine ("out of order engine") 2903 may prepare instructions for execution. In at least one embodiment, out-of-order execution logic has a number of buffers to smooth out and re-order the flow of instructions to optimize performance as they go down a pipeline and get scheduled for execution. Out-of-order execution engine 2903 includes, without limitation, an allocator/register renamer 2940, a memory uop queue 2942, an integer/floating point uop queue 2944, a memory scheduler 2946, a fast scheduler 2902, a slow/general floating point scheduler ("slow/general FP scheduler") 2904, and a simple floating point scheduler ("simple FP scheduler") 2906. In at least one embodiment, fast schedule 2902, slow/general floating point scheduler 2904, and simple floating point scheduler 2906 are also collectively referred to herein as "uop schedulers 2902, 2904, 2906."

Allocator/register renamer 2940 allocates machine buffers and resources that each uop needs in order to execute. In at least one embodiment, allocator/register renamer 2940 renames logic registers onto entries in a register file. In at least one embodiment, allocator/register renamer 2940 also allocates an entry for each uop in one of two uop queues, memory uop queue 2942 for memory operations and integer/floating point uop queue 2944 for non-memory operations, in front of memory scheduler 2946 and uop schedulers 2902, 2904, 2906. In at least one embodiment, uop schedulers 2902, 2904, 2906, determine when a uop is ready to execute based on readiness of their dependent input register operand sources and availability of execution resources uops need to complete their operation. In at least one embodiment, fast scheduler 2902 of at least one embodiment may schedule on each half of main clock cycle while slow/general floating point scheduler 2904 and simple floating point scheduler 2906 may schedule once per main processor clock cycle. In at least one embodiment, uop schedulers 2902, 2904, 2906 arbitrate for dispatch ports to schedule uops for execution.

In at least one embodiment, execution block 2911 includes, without limitation, an integer register file/bypass network 2908, a floating point register file/bypass network ("FP register file/bypass network") 2910, address generation units ("AGUs") 2912 and 2914, fast ALUs 2916 and 2918, a slow ALU 2920, a floating point ALU ("FP") 2922, and a floating point move unit ("FP move") 2924. In at least one embodiment, integer register file/bypass network 2908 and floating point register file/bypass network 2910 are also referred to herein as "register files 2908, 2910." In at least one embodiment, AGUs 2912 and 2914, fast ALUs 2916 and 2918, slow ALU 2920, floating point ALU 2922, and floating point move unit 2924 are also referred to herein as "execution units 2912, 2914, 2916, 2918, 2920, 2922, and 2924." In at least one embodiment, an execution block may include, without limitation, any number (including zero) and type of register files, bypass networks, address generation units, and execution units, in any combination.

In at least one embodiment, register files 2908, 2910 may be arranged between uop schedulers 2902, 2904, 2906, and execution units 2912, 2914, 2916, 2918, 2920, 2922, and 2924. In at least one embodiment, integer register file/bypass network 2908 performs integer operations. In at least one embodiment, floating point register file/bypass network 2910 performs floating point operations. In at least one embodiment, each of register files 2908, 2910 may include, without limitation, a bypass network that may bypass or forward just completed results that have not yet been written into register file to new dependent uops. In at least one embodiment, register files 2908, 2910 may communicate data with each other. In at least one embodiment, integer register file/bypass network 2908 may include, without limitation, two separate register files, one register file for low-order thirty-two bits of data and a second register file for high order thirty-two bits of data. In at least one embodiment, floating point register file/bypass network 2910 may include, without limitation, 128-bit wide entries because floating point instructions typically have operands from 64 to 128 bits in width.

In at least one embodiment, execution units 2912, 2914, 2916, 2918, 2920, 2922, 2924 may execute instructions. In at least one embodiment, register files 2908, 2910 store integer and floating point data operand values that micro-instructions need to execute. In at least one embodiment, processor 2900 may include, without limitation, any number and combination of execution units 2912, 2914, 2916, 2918, 2920, 2922, 2924. In at least one embodiment, floating point ALU 2922 and floating point move unit 2924 may execute floating point, MMX, SIMD, AVX and SSE, or other operations. In at least one embodiment, floating point ALU 2922 may include, without limitation, a 64-bit by 64-bit floating point divider to execute divide, square root, and remainder micro ops. In at least one embodiment, instructions involving a floating point value may be handled with floating point hardware. In at least one embodiment, ALU operations may be passed to fast ALUs 2916, 2918. In at least one embodiment, fast ALUS 2916, 2918 may execute fast operations with an effective latency of half a clock cycle. In at least one embodiment, most complex integer operations go to slow ALU 2920 as slow ALU 2920 may include, without limitation, integer execution hardware for long-latency type of operations, such as a multiplier, shifts, flag logic, and branch processing. In at least one embodiment, memory load/store operations may be executed by AGUs 2912, 2914. In at least one embodiment, fast ALU 2916, fast ALU 2918, and slow ALU 2920 may perform integer operations on 64-bit data operands. In at least one embodiment, fast ALU 2916, fast ALU 2918, and slow ALU 2920 may be implemented to support a variety of data bit sizes including sixteen, thirty-two, 128, 256, etc. In at least one embodiment, floating point ALU 2922 and floating point move unit 2924 may be implemented to support a range of operands having bits of various widths. In at least one embodiment, floating point ALU 2922 and floating point move unit 2924 may operate on 128-bit wide packed data operands in conjunction with SIMD and multimedia instructions.

In at least one embodiment, uop schedulers 2902, 2904, 2906 dispatch dependent operations before parent load has finished executing. In at least one embodiment, as uops may be speculatively scheduled and executed in processor 2900, processor 2900 may also include logic to handle memory misses. In at least one embodiment, if a data load misses in a data cache, there may be dependent operations in flight in pipeline that have left a scheduler with temporarily incorrect data. In at least one embodiment, a replay mechanism tracks and re-executes instructions that use incorrect data. In at least one embodiment, dependent operations might need to be replayed and independent ones may be allowed to complete. In at least one embodiment, schedulers and replay mechanisms of at least one embodiment of a processor may also be designed to catch instruction sequences for text string comparison operations.

In at least one embodiment, the term "registers" may refer to on-board processor storage locations that may be used as part of instructions to identify operands. In at least one embodiment, registers may be those that may be usable from outside of a processor (from a programmer's perspective). In at least one embodiment, registers might not be limited to a particular type of circuit. Rather, in at least one embodiment, a register may store data, provide data, and perform functions described herein. In at least one embodiment, registers described herein may be implemented by circuitry within a processor using any number of different techniques, such as dedicated physical registers, dynamically allocated physical registers using register renaming, combinations of dedicated and dynamically allocated physical registers, etc. In at least one embodiment, integer registers store 32-bit integer data. A register file of at least one embodiment also contains eight multimedia SIMD registers for packed data.

Figure 30:
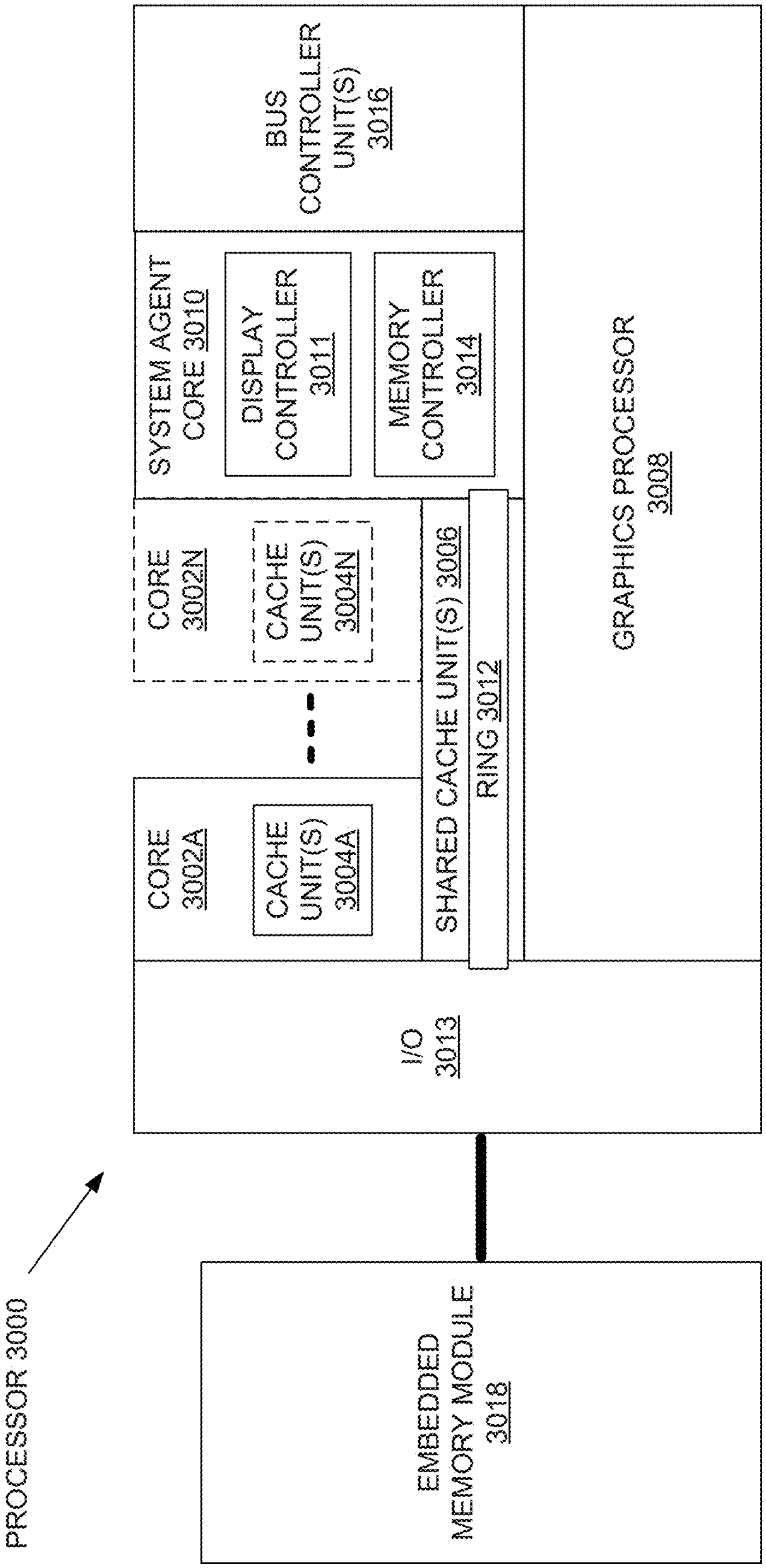
FIG. 30 illustrates a processor, in accordance with at least one embodiment.

FIG. 30 illustrates a processor 3000, in accordance with at least one embodiment. In at least one embodiment, processor 3000 includes, without limitation, one or more processor cores ("cores") 3002A-3002N, an integrated memory controller 3014, and an integrated graphics processor 3008. In at least one embodiment, processor 3000 can include additional cores up to and including additional processor core 3002N represented by dashed lined boxes. In at least one embodiment, each of processor cores 3002A-3002N includes one or more internal cache units 3004A-3004N. In at least one embodiment, each processor core also has access to one or more shared cached units 3006.

In at least one embodiment, internal cache units 3004A-3004N and shared cache units 3006 represent a cache memory hierarchy within processor 3000. In at least one embodiment, cache memory units 3004A-3004N may include at least one level of instruction and data cache within each processor core and one or more levels of shared mid-level cache, such as an L2, L3, Level 4 ("L4"), or other levels of cache, where a highest level of cache before external memory is classified as an LLC. In at least one embodiment, cache coherency logic maintains coherency between various cache units 3006 and 3004A-3004N.

In at least one embodiment, processor 3000 may also include a set of one or more bus controller units 3016 and a system agent core 3010. In at least one embodiment, one or more bus controller units 3016 manage a set of peripheral buses, such as one or more PCI or PCI express buses. In at least one embodiment, system agent core 3010 provides management functionality for various processor components. In at least one embodiment, system agent core 3010 includes one or more integrated memory controllers 3014 to manage access to various external memory devices (not shown).

In at least one embodiment, one or more of processor cores 3002A-3002N include support for simultaneous multi-threading. In at least one embodiment, system agent core 3010 includes components for coordinating and operating processor cores 3002A-3002N during multi-threaded processing. In at least one embodiment, system agent core 3010 may additionally include a power control unit ("PCU"), which includes logic and components to regulate one or more power states of processor cores 3002A-3002N and graphics processor 3008.

In at least one embodiment, processor 3000 additionally includes graphics processor 3008 to execute graphics processing operations. In at least one embodiment, graphics processor 3008 couples with shared cache units 3006, and system agent core 3010, including one or more integrated memory controllers 3014. In at least one embodiment, system agent core 3010 also includes a display controller 3011 to drive graphics processor output to one or more coupled displays. In at least one embodiment, display controller 3011 may also be a separate module coupled with graphics processor 3008 via at least one interconnect, or may be integrated within graphics processor 3008.

In at least one embodiment, a ring based interconnect unit 3012 is used to couple internal components of processor 3000. In at least one embodiment, an alternative interconnect unit may be used, such as a point-to-point interconnect, a switched interconnect, or other techniques. In at least one embodiment, graphics processor 3008 couples with ring interconnect 3012 via an I/O link 3013.

In at least one embodiment, I/O link 3013 represents at least one of multiple varieties of I/O interconnects, including an on package I/O interconnect which facilitates communication between various processor components and a high-performance embedded memory module 3018, such as an eDRAM module. In at least one embodiment, each of processor cores 3002A-3002N and graphics processor 3008 use embedded memory modules 3018 as a shared LLC.

In at least one embodiment, processor cores 3002A-3002N are homogeneous cores executing a common instruction set architecture. In at least one embodiment, processor cores 3002A-3002N are heterogeneous in terms of ISA, where one or more of processor cores 3002A-3002N execute a common instruction set, while one or more other cores of processor cores 3002A-30-02N executes a subset of a common instruction set or a different instruction set. In at least one embodiment, processor cores 3002A-3002N are heterogeneous in terms of microarchitecture, where one or more cores having a relatively higher power consumption couple with one or more cores having a lower power consumption. In at least one embodiment, processor 3000 can be implemented on one or more chips or as an SoC integrated circuit.

Figure 31:
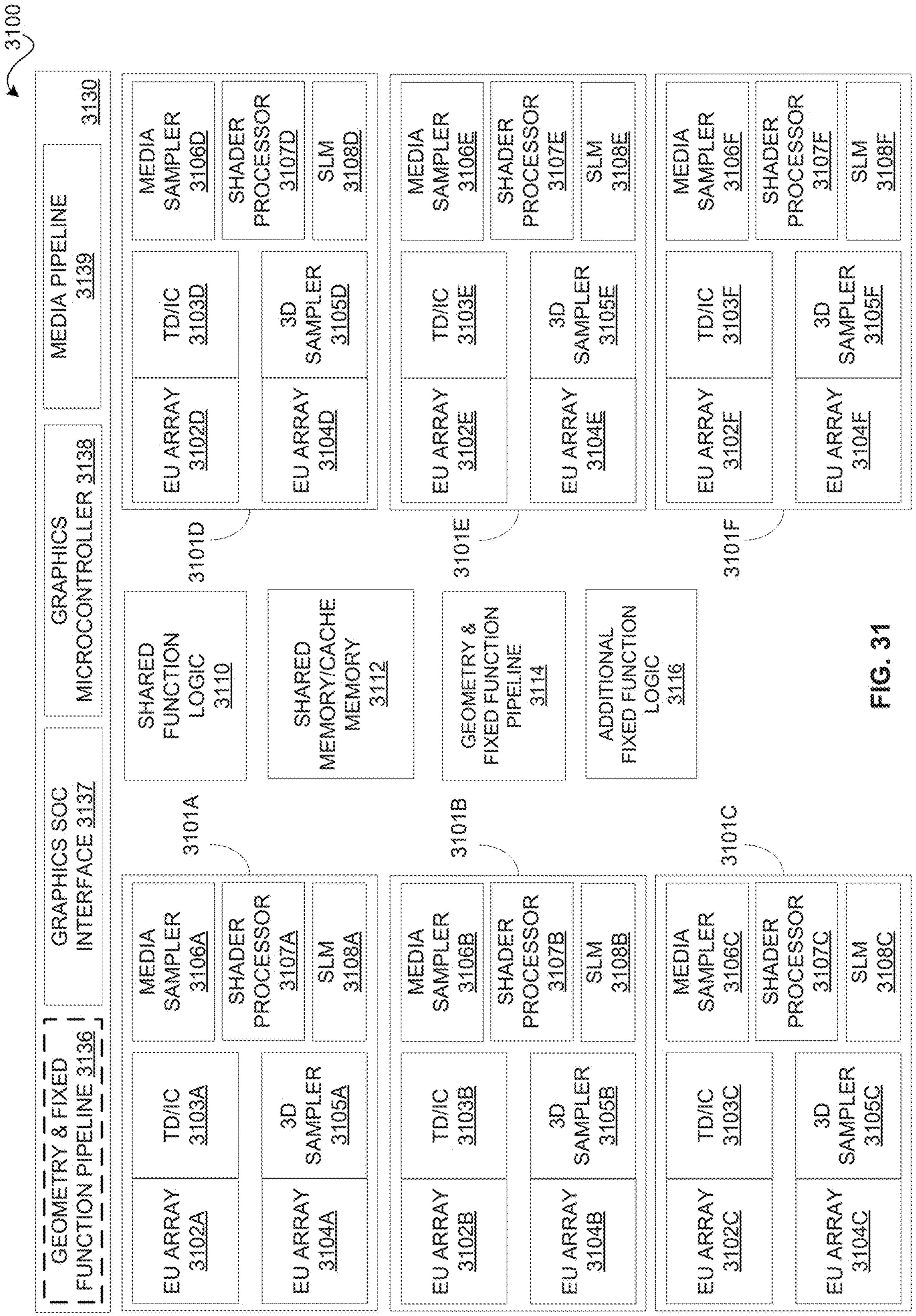
FIG. 31 illustrates a graphics processor core, in accordance with at least one embodiment.

FIG. 31 illustrates a graphics processor core 3100, in accordance with at least one embodiment described. In at least one embodiment, graphics processor core 3100 is included within a graphics core array. In at least one embodiment, graphics processor core 3100, sometimes referred to as a core slice, can be one or multiple graphics cores within a modular graphics processor. In at least one embodiment, graphics processor core 3100 is exemplary of one graphics core slice, and a graphics processor as described herein may include multiple graphics core slices based on target power and performance envelopes. In at least one embodiment, each graphics core 3100 can include a fixed function block 3130 coupled with multiple sub-cores 3101A-3101F, also referred to as sub-slices, that include modular blocks of general-purpose and fixed function logic.

In at least one embodiment, fixed function block 3130 includes a geometry/fixed function pipeline 3136 that can be shared by all sub-cores in graphics processor 3100, for example, in lower performance and/or lower power graphics processor implementations. In at least one embodiment, geometry/fixed function pipeline 3136 includes a 3D fixed function pipeline, a video front-end unit, a thread spawner and thread dispatcher, and a unified return buffer manager, which manages unified return buffers.

In at least one embodiment, fixed function block 3130 also includes a graphics SoC interface 3137, a graphics microcontroller 3138, and a media pipeline 3139. Graphics SoC interface 3137 provides an interface between graphics core 3100 and other processor cores within an SoC integrated circuit. In at least one embodiment, graphics microcontroller 3138 is a programmable sub-processor that is configurable to manage various functions of graphics processor 3100, including thread dispatch, scheduling, and pre-emption. In at least one embodiment, media pipeline 3139 includes logic to facilitate decoding, encoding, preprocessing, and/or post-processing of multimedia data, including image and video data. In at least one embodiment, media pipeline 3139 implements media operations via requests to compute or sampling logic within sub-cores 3101-3101F.

In at least one embodiment, SoC interface 3137 enables graphics core 3100 to communicate with general-purpose application processor cores (e.g., CPUs) and/or other components within an SoC, including memory hierarchy elements such as a shared LLC memory, system RAM, and/or embedded on-chip or on-package DRAM. In at least one embodiment, SoC interface 3137 can also enable communication with fixed function devices within an SoC, such as camera imaging pipelines, and enables use of and/or implements global memory atomics that may be shared between graphics core 3100 and CPUs within an SoC. In at least one embodiment, SoC interface 3137 can also implement power management controls for graphics core 3100 and enable an interface between a clock domain of graphic core 3100 and other clock domains within an SoC. In at least one embodiment, SoC interface 3137 enables receipt of command buffers from a command streamer and global thread dispatcher that are configured to provide commands and instructions to each of one or more graphics cores within a graphics processor. In at least one embodiment, commands and instructions can be dispatched to media pipeline 3139, when media operations are to be performed, or a geometry and fixed function pipeline (e.g., geometry and fixed function pipeline 3136, geometry and fixed function pipeline 3114) when graphics processing operations are to be performed.

In at least one embodiment, graphics microcontroller 3138 can be configured to perform various scheduling and management tasks for graphics core 3100. In at least one embodiment, graphics microcontroller 3138 can perform graphics and/or compute workload scheduling on various graphics parallel engines within execution unit (EU) arrays 3102A-3102F, 3104A-3104F within sub-cores 3101A-3101F. In at least one embodiment, host software executing on a CPU core of an SoC including graphics core 3100 can submit workloads one of multiple graphic processor doorbells, which invokes a scheduling operation on an appropriate graphics engine. In at least one embodiment, scheduling operations include determining which workload to run next, submitting a workload to a command streamer, preempting existing workloads running on an engine, monitoring progress of a workload, and notifying host software when a workload is complete. In at least one embodiment, graphics microcontroller 3138 can also facilitate low-power or idle states for graphics core 3100, providing graphics core 3100 with an ability to save and restore registers within graphics core 3100 across low-power state transitions independently from an operating system and/or graphics driver software on a system.

In at least one embodiment, graphics core 3100 may have greater than or fewer than illustrated sub-cores 3101A-3101F, up to N modular sub-cores. For each set of N sub-cores, in at least one embodiment, graphics core 3100 can also include shared function logic 3110, shared and/or cache memory 3112, a geometry/fixed function pipeline 3114, as well as additional fixed function logic 3116 to accelerate various graphics and compute processing operations. In at least one embodiment, shared function logic 3110 can include logic units (e.g., sampler, math, and/or inter-thread communication logic) that can be shared by each N sub-cores within graphics core 3100. Shared and/or cache memory 3112 can be an LLC for N sub-cores 3101A-3101F within graphics core 3100 and can also serve as shared memory that is accessible by multiple sub-cores. In at least one embodiment, geometry/fixed function pipeline 3114 can be included instead of geometry/fixed function pipeline 3136 within fixed function block 3130 and can include same or similar logic units.

In at least one embodiment, graphics core 3100 includes additional fixed function logic 3116 that can include various fixed function acceleration logic for use by graphics core 3100. In at least one embodiment, additional fixed function logic 3116 includes an additional geometry pipeline for use in position only shading. In position-only shading, at least two geometry pipelines exist, whereas in a full geometry pipeline within geometry/fixed function pipeline 3116, 3136, and a cull pipeline, which is an additional geometry pipeline which may be included within additional fixed function logic 3116. In at least one embodiment, cull pipeline is a trimmed down version of a full geometry pipeline. In at least one embodiment, a full pipeline and a cull pipeline can execute different instances of an application, each instance having a separate context. In at least one embodiment, position only shading can hide long cull runs of discarded triangles, enabling shading to be completed earlier in some instances. For example, in at least one embodiment, cull pipeline logic within additional fixed function logic 3116 can execute position shaders in parallel with a main application and generally generates critical results faster than a full pipeline, as a cull pipeline fetches and shades position attribute of vertices, without performing rasterization and rendering of pixels to a frame buffer. In at least one embodiment, a cull pipeline can use generated critical results to compute visibility information for all triangles without regard to whether those triangles are culled. In at least one embodiment, a full pipeline (which in this instance may be referred to as a replay pipeline) can consume visibility information to skip culled triangles to shade only visible triangles that are finally passed to a rasterization phase.

In at least one embodiment, additional fixed function logic 3116 can also include general purpose processing acceleration logic, such as fixed function matrix multiplication logic, for accelerating CUDA programs.

In at least one embodiment, each graphics sub-core 3101A-3101F includes a set of execution resources that may be used to perform graphics, media, and compute operations in response to requests by graphics pipeline, media pipeline, or shader programs. In at least one embodiment, graphics sub-cores 3101A-3101F include multiple EU arrays 3102A-3102F, 3104A-3104F, thread dispatch and inter-thread communication ("TD/IC") logic 3103A-3103F, a 3D (e.g., texture) sampler 3105A-3105F, a media sampler 3106A-3106F, a shader processor 3107A-3107F, and shared local memory ("SLM") 3108A-3108F. EU arrays 3102A-3102F, 3104A-3104F each include multiple execution units, which are GPGPUs capable of performing floating-point and integer/fixed-point logic operations in service of a graphics, media, or compute operation, including graphics, media, or compute shader programs. In at least one embodiment, TD/IC logic 3103A-3103F performs local thread dispatch and thread control operations for execution units within a sub-core and facilitate communication between threads executing on execution units of a sub-core. In at least one embodiment, 3D sampler 3105A-3105F can read texture or other 3D graphics related data into memory. In at least one embodiment, 3D sampler can read texture data differently based on a configured sample state and texture format associated with a given texture. In at least one embodiment, media sampler 3106A-3106F can perform similar read operations based on a type and format associated with media data. In at least one embodiment, each graphics sub-core 3101A-3101F can alternately include a unified 3D and media sampler. In at least one embodiment, threads executing on execution units within each of sub-cores 3101A-3101F can make use of shared local memory 3108A-3108F within each sub-core, to enable threads executing within a thread group to execute using a common pool of on-chip memory.

Figure 32:
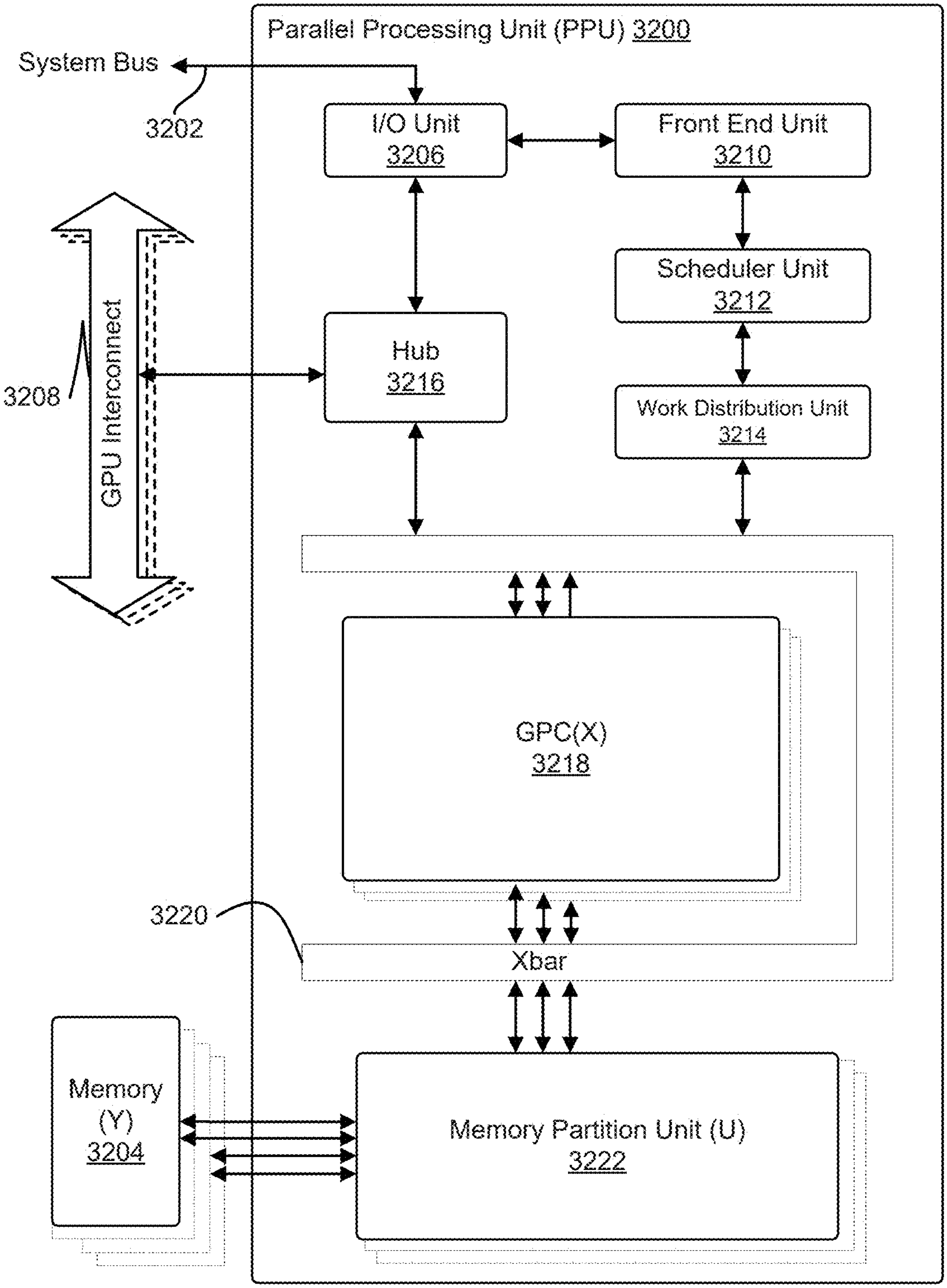
FIG. 32 illustrates a PPU, in accordance with at least one embodiment.

FIG. 32 illustrates a parallel processing unit ("PPU") 3200, in accordance with at least one embodiment. In at least one embodiment, PPU 3200 is configured with machine-readable code that, if executed by PPU 3200, causes PPU 3200 to perform some or all of processes and techniques described herein. In at least one embodiment, PPU 3200 is a multi-threaded processor that is implemented on one or more integrated circuit devices and that utilizes multithreading as a latency-hiding technique designed to process computer-readable instructions (also referred to as machine-readable instructions or simply instructions) on multiple threads in parallel. In at least one embodiment, a thread refers to a thread of execution and is an instantiation of a set of instructions configured to be executed by PPU 3200. In at least one embodiment, PPU 3200 is a GPU configured to implement a graphics rendering pipeline for processing three-dimensional ("3D") graphics data in order to generate two-dimensional ("2D") image data for display on a display device such as an LCD device. In at least one embodiment, PPU 3200 is utilized to perform computations such as linear algebra operations and machine-learning operations. FIG. 32 illustrates an example parallel processor for illustrative purposes only and should be construed as a non-limiting example of a processor architecture that may be implemented in at least one embodiment.

In at least one embodiment, one or more PPUs 3200 are configured to accelerate High Performance Computing ("HPC"), data center, and machine learning applications. In at least one embodiment, one or more PPUs 3200 are configured to accelerate CUDA programs. In at least one embodiment, PPU 3200 includes, without limitation, an I/O unit 3206, a front-end unit 3210, a scheduler unit 3212, a work distribution unit 3214, a hub 3216, a crossbar ("Xbar") 3220, one or more general processing clusters ("GPCs") 3218, and one or more partition units ("memory partition units") 3222. In at least one embodiment, PPU 3200 is connected to a host processor or other PPUs 3200 via one or more high-speed GPU interconnects ("GPU interconnects") 3208. In at least one embodiment, PPU 3200 is connected to a host processor or other peripheral devices via a system bus or interconnect 3202. In at least one embodiment, PPU 3200 is connected to a local memory comprising one or more memory devices ("memory") 3204. In at least one embodiment, memory devices 3204 include, without limitation, one or more dynamic random access memory (DRAM) devices. In at least one embodiment, one or more DRAM devices are configured and/or configurable as high-bandwidth memory ("HBM") subsystems, with multiple DRAM dies stacked within each device.

In at least one embodiment, high-speed GPU interconnect 3208 may refer to a wire-based multi-lane communications link that is used by systems to scale and include one or more PPUs 3200 combined with one or more CPUs, supports cache coherence between PPUs 3200 and CPUs, and CPU mastering. In at least one embodiment, data and/or commands are transmitted by high-speed GPU interconnect 3208 through hub 3216 to/from other units of PPU 3200 such as one or more copy engines, video encoders, video decoders, power management units, and other components which may not be explicitly illustrated in FIG. 32.

In at least one embodiment, I/O unit 3206 is configured to transmit and receive communications (e.g., commands, data) from a host processor (not illustrated in FIG. 32) over system bus 3202. In at least one embodiment, I/O unit 3206 communicates with host processor directly via system bus 3202 or through one or more intermediate devices such as a memory bridge. In at least one embodiment, I/O unit 3206 may communicate with one or more other processors, such as one or more of PPUs 3200 via system bus 3202. In at least one embodiment, I/O unit 3206 implements a PCIe interface for communications over a PCIe bus. In at least one embodiment, I/O unit 3206 implements interfaces for communicating with external devices.

In at least one embodiment, I/O unit 3206 decodes packets received via system bus 3202. In at least one embodiment, at least some packets represent commands configured to cause PPU 3200 to perform various operations. In at least one embodiment, I/O unit 3206 transmits decoded commands to various other units of PPU 3200 as specified by commands. In at least one embodiment, commands are transmitted to front-end unit 3210 and/or transmitted to hub 3216 or other units of PPU 3200 such as one or more copy engines, a video encoder, a video decoder, a power management unit, etc. (not explicitly illustrated in FIG. 32). In at least one embodiment, I/O unit 3206 is configured to route communications between and among various logical units of PPU 3200.

In at least one embodiment, a program executed by host processor encodes a command stream in a buffer that provides workloads to PPU 3200 for processing. In at least one embodiment, a workload comprises instructions and data to be processed by those instructions. In at least one embodiment, buffer is a region in a memory that is accessible (e.g., read/write) by both a host processor and PPU 3200—a host interface unit may be configured to access buffer in a system memory connected to system bus 3202 via memory requests transmitted over system bus 3202 by I/O unit 3206. In at least one embodiment, a host processor writes a command stream to a buffer and then transmits a pointer to the start of the command stream to PPU 3200 such that front-end unit 3210 receives pointers to one or more command streams and manages one or more command streams, reading commands from command streams and forwarding commands to various units of PPU 3200.

In at least one embodiment, front-end unit 3210 is coupled to scheduler unit 3212 that configures various GPCs 3218 to process tasks defined by one or more command streams. In at least one embodiment, scheduler unit 3212 is configured to track state information related to various tasks managed by scheduler unit 3212 where state information may indicate which of GPCs 3218 a task is assigned to, whether task is active or inactive, a priority level associated with task, and so forth. In at least one embodiment, scheduler unit 3212 manages execution of a plurality of tasks on one or more of GPCs 3218.

In at least one embodiment, scheduler unit 3212 is coupled to work distribution unit 3214 that is configured to dispatch tasks for execution on GPCs 3218. In at least one embodiment, work distribution unit 3214 tracks a number of scheduled tasks received from scheduler unit 3212 and work distribution unit 3214 manages a pending task pool and an active task pool for each of GPCs 3218. In at least one embodiment, pending task pool comprises a number of slots (e.g., 32 slots) that contain tasks assigned to be processed by a particular GPC 3218; active task pool may comprise a number of slots (e.g., 4 slots) for tasks that are actively being processed by GPCs 3218 such that as one of GPCs 3218 completes execution of a task, that task is evicted from active task pool for GPC 3218 and one of other tasks from pending task pool is selected and scheduled for execution on GPC 3218. In at least one embodiment, if an active task is idle on GPC 3218, such as while waiting for a data dependency to be resolved, then the active task is evicted from GPC 3218 and returned to a pending task pool while another task in the pending task pool is selected and scheduled for execution on GPC 3218.

In at least one embodiment, work distribution unit 3214 communicates with one or more GPCs 3218 via XBar 3220. In at least one embodiment, XBar 3220 is an interconnect network that couples many units of PPU 3200 to other units of PPU 3200 and can be configured to couple work distribution unit 3214 to a particular GPC 3218. In at least one embodiment, one or more other units of PPU 3200 may also be connected to XBar 3220 via hub 3216.

In at least one embodiment, tasks are managed by scheduler unit 3212 and dispatched to one of GPCs 3218 by work distribution unit 3214. GPC 3218 is configured to process task and generate results. In at least one embodiment, results may be consumed by other tasks within GPC 3218, routed to a different GPC 3218 via XBar 3220, or stored in memory 3204. In at least one embodiment, results can be written to memory 3204 via partition units 3222, which implement a memory interface for reading and writing data to/from memory 3204. In at least one embodiment, results can be transmitted to another PPU 3204 or CPU via high-speed GPU interconnect 3208. In at least one embodiment, PPU 3200 includes, without limitation, a number U of partition units 3222 that is equal to number of separate and distinct memory devices 3204 coupled to PPU 3200.

In at least one embodiment, a host processor executes a driver kernel that implements an application programming interface ("API") that enables one or more applications executing on host processor to schedule operations for execution on PPU 3200. In at least one embodiment, multiple compute applications are simultaneously executed by PPU 3200 and PPU 3200 provides isolation, quality of service ("QoS"), and independent address spaces for multiple compute applications. In at least one embodiment, an application generates instructions (e.g., in the form of API calls) that cause a driver kernel to generate one or more tasks for execution by PPU 3200 and the driver kernel outputs tasks to one or more streams being processed by PPU 3200. In at least one embodiment, each task comprises one or more groups of related threads, which may be referred to as a warp. In at least one embodiment, a warp comprises a plurality of related threads (e.g., 32 threads) that can be executed in parallel. In at least one embodiment, cooperating threads can refer to a plurality of threads including instructions to perform a task and that exchange data through shared memory.

Figure 33:
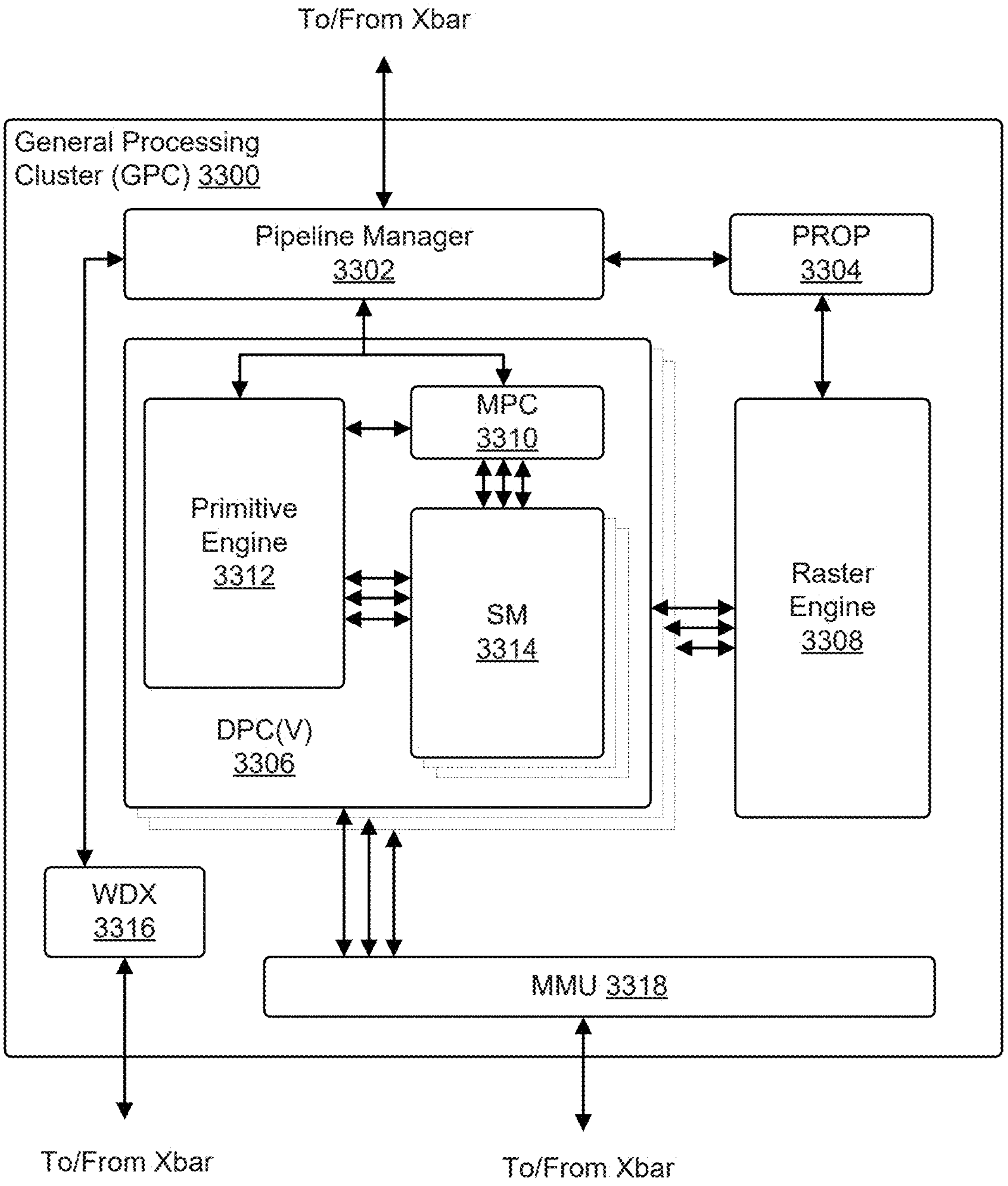
FIG. 33 illustrates a GPC, in accordance with at least one embodiment.

FIG. 33 illustrates a GPC 3300, in accordance with at least one embodiment. In at least one embodiment, GPC 3300 is GPC 3218 of FIG. 32. In at least one embodiment, each GPC 3300 includes, without limitation, a number of hardware units for processing tasks and each GPC 3300 includes, without limitation, a pipeline manager 3302, a pre-raster operations unit ("PROP") 3304, a raster engine 3308, a work distribution crossbar ("WDX") 3316, an MMU 3318, one or more Data Processing Clusters ("DPCs") 3306, and any suitable combination of parts.

In at least one embodiment, operation of GPC 3300 is controlled by pipeline manager 3302. In at least one embodiment, pipeline manager 3302 manages configuration of one or more DPCs 3306 for processing tasks allocated to GPC 3300. In at least one embodiment, pipeline manager 3302 configures at least one of one or more DPCs 3306 to implement at least a portion of a graphics rendering pipeline. In at least one embodiment, DPC 3306 is configured to execute a vertex shader program on a programmable streaming multiprocessor ("SM") 3314. In at least one embodiment, pipeline manager 3302 is configured to route packets received from a work distribution unit to appropriate logical units within GPC 3300 and, in at least one embodiment, some packets may be routed to fixed function hardware units in PROP 3304 and/or raster engine 3308 while other packets may be routed to DPCs 3306 for processing by a primitive engine 3312 or SM 3314. In at least one embodiment, pipeline manager 3302 configures at least one of DPCs 3306 to implement a computing pipeline. In at least one embodiment, pipeline manager 3302 configures at least one of DPCs 3306 to execute at least a portion of a CUDA program.

In at least one embodiment, PROP unit 3304 is configured to route data generated by raster engine 3308 and DPCs 3306 to a Raster Operations ("ROP") unit in a partition unit, such as memory partition unit 3222 described in more detail above in conjunction with FIG. 32. In at least one embodiment, PROP unit 3304 is configured to perform optimizations for color blending, organize pixel data, perform address translations, and more. In at least one embodiment, raster engine 3308 includes, without limitation, a number of fixed function hardware units configured to perform various raster operations and, in at least one embodiment, raster engine 3308 includes, without limitation, a setup engine, a coarse raster engine, a culling engine, a clipping engine, a fine raster engine, a tile coalescing engine, and any suitable combination thereof. In at least one embodiment, a setup engine receives transformed vertices and generates plane equations associated with geometric primitive defined by vertices; plane equations are transmitted to a coarse raster engine to generate coverage information (e.g., an x, y coverage mask for a tile) for a primitive; the output of the coarse raster engine is transmitted to a culling engine where fragments associated with a primitive that fail a z-test are culled, and transmitted to a clipping engine where fragments lying outside a viewing frustum are clipped. In at least one embodiment, fragments that survive clipping and culling are passed to a fine raster engine to generate attributes for pixel fragments based on plane equations generated by a setup engine. In at least one embodiment, the output of raster engine 3308 comprises fragments to be processed by any suitable entity such as by a fragment shader implemented within DPC 3306.

In at least one embodiment, each DPC 3306 included in GPC 3300 comprise, without limitation, an M-Pipe Controller ("MPC") 3310; primitive engine 3312; one or more SMs 3314; and any suitable combination thereof. In at least one embodiment, MPC 3310 controls operation of DPC 3306, routing packets received from pipeline manager 3302 to appropriate units in DPC 3306. In at least one embodiment, packets associated with a vertex are routed to primitive engine 3312, which is configured to fetch vertex attributes associated with vertex from memory; in contrast, packets associated with a shader program may be transmitted to SM 3314.

In at least one embodiment, SM 3314 comprises, without limitation, a programmable streaming processor that is configured to process tasks represented by a number of threads. In at least one embodiment, SM 3314 is multi-threaded and configured to execute a plurality of threads (e.g., 32 threads) from a particular group of threads concurrently and implements a SIMD architecture where each thread in a group of threads (e.g., a warp) is configured to process a different set of data based on same set of instructions. In at least one embodiment, all threads in group of threads execute same instructions. In at least one embodiment, SM 3314 implements a SIMT architecture wherein each thread in a group of threads is configured to process a different set of data based on same set of instructions, but where individual threads in group of threads are allowed to diverge during execution. In at least one embodiment, a program counter, a call stack, and an execution state is maintained for each warp, enabling concurrency between warps and serial execution within warps when threads within a warp diverge. In another embodiment, a program counter, a call stack, and an execution state is maintained for each individual thread, enabling equal concurrency between all threads, within and between warps. In at least one embodiment, an execution state is maintained for each individual thread and threads executing the same instructions may be converged and executed in parallel for better efficiency. At least one embodiment of SM 3314 is described in more detail in conjunction with FIG. 34.

In at least one embodiment, MMU 3318 provides an interface between GPC 3300 and a memory partition unit (e.g., partition unit 3222 of FIG. 32) and MMU 3318 provides translation of virtual addresses into physical addresses, memory protection, and arbitration of memory requests. In at least one embodiment, MMU 3318 provides one or more translation lookaside buffers (TLBs) for performing translation of virtual addresses into physical addresses in memory.

Figure 34:
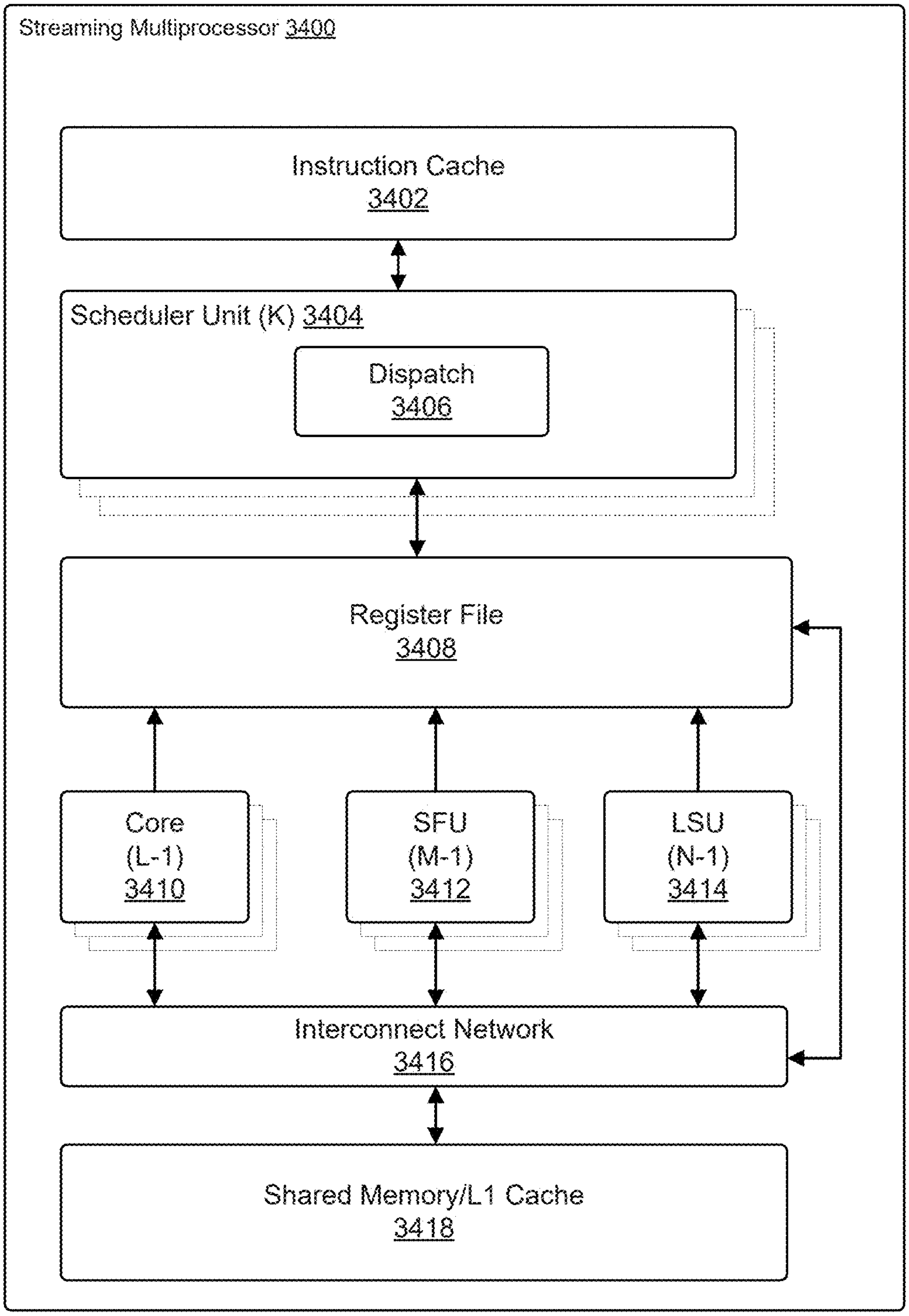
FIG. 34 illustrates a streaming multiprocessor, in accordance with at least one embodiment.

FIG. 34 illustrates a streaming multiprocessor ("SM") 3400, in accordance with at least one embodiment. In at least one embodiment, SM 3400 is SM 3314 of FIG. 33. In at least one embodiment, SM 3400 includes, without limitation, an instruction cache 3402; one or more scheduler units 3404; a register file 3408; one or more processing cores ("cores") 3410; one or more special function units ("SFUs") 3412; one or more LSUs 3414; an interconnect network 3416; a shared memory/L1 cache 3418; and any suitable combination thereof. In at least one embodiment, a work distribution unit dispatches tasks for execution on GPCs of parallel processing units (PPUs) and each task is allocated to a particular Data Processing Cluster (DPC) within a GPC and, if a task is associated with a shader program, then the task is allocated to one of SMs 3400. In at least one embodiment, scheduler unit 3404 receives tasks from a work distribution unit and manages instruction scheduling for one or more thread blocks assigned to SM 3400. In at least one embodiment, scheduler unit 3404 schedules thread blocks for execution as warps of parallel threads, wherein each thread block is allocated at least one warp. In at least one embodiment, each warp executes threads. In at least one embodiment, scheduler unit 3404 manages a plurality of different thread blocks, allocating warps to different thread blocks and then dispatching instructions from a plurality of different cooperative groups to various functional units (e.g., processing cores 3410, SFUs 3412, and LSUs 3414) during each clock cycle.

In at least one embodiment, "cooperative groups" may refer to a programming model for organizing groups of communicating threads that allows developers to express granularity at which threads are communicating, enabling expression of richer, more efficient parallel decompositions. In at least one embodiment, cooperative launch APIs support synchronization amongst thread blocks for execution of parallel algorithms. In at least one embodiment, APIs of conventional programming models provide a single, simple construct for synchronizing cooperating threads: a barrier across all threads of a thread block (e.g., syncthreads( ) function). However, in at least one embodiment, programmers may define groups of threads at smaller than thread block granularities and synchronize within defined groups to enable greater performance, design flexibility, and software reuse in the form of collective group-wide function interfaces. In at least one embodiment, cooperative groups enable programmers to define groups of threads explicitly at sub-block and multi-block granularities, and to perform collective operations such as synchronization on threads in a cooperative group. In at least one embodiment, a sub-block granularity is as small as a single thread. In at least one embodiment, a programming model supports clean composition across software boundaries, so that libraries and utility functions can synchronize safely within their local context without having to make assumptions about convergence. In at least one embodiment, cooperative group primitives enable new patterns of cooperative parallelism, including, without limitation, producer-consumer parallelism, opportunistic parallelism, and global synchronization across an entire grid of thread blocks.

In at least one embodiment, a dispatch unit 3406 is configured to transmit instructions to one or more of functional units and scheduler unit 3404 includes, without limitation, two dispatch units 3406 that enable two different instructions from same warp to be dispatched during each clock cycle. In at least one embodiment, each scheduler unit 3404 includes a single dispatch unit 3406 or additional dispatch units 3406.

In at least one embodiment, each SM 3400, in at least one embodiment, includes, without limitation, register file 3408 that provides a set of registers for functional units of SM 3400. In at least one embodiment, register file 3408 is divided between each of the functional units such that each functional unit is allocated a dedicated portion of register file 3408. In at least one embodiment, register file 3408 is divided between different warps being executed by SM 3400 and register file 3408 provides temporary storage for operands connected to data paths of functional units. In at least one embodiment, each SM 3400 comprises, without limitation, a plurality of L processing cores 3410. In at least one embodiment, SM 3400 includes, without limitation, a large number (e.g., 128 or more) of distinct processing cores 3410. In at least one embodiment, each processing core 3410 includes, without limitation, a fully-pipelined, single-precision, double-precision, and/or mixed precision processing unit that includes, without limitation, a floating point arithmetic logic unit and an integer arithmetic logic unit. In at least one embodiment, floating point arithmetic logic units implement IEEE 754-2008 standard for floating point arithmetic. In at least one embodiment, processing cores 3410 include, without limitation, 64 single-precision (32-bit) floating point cores, 64 integer cores, 32 double-precision (64-bit) floating point cores, and 8 tensor cores.

In at least one embodiment, tensor cores are configured to perform matrix operations. In at least one embodiment, one or more tensor cores are included in processing cores 3410. In at least one embodiment, tensor cores are configured to perform deep learning matrix arithmetic, such as convolution operations for neural network training and inferencing. In at least one embodiment, each tensor core operates on a 4×4 matrix and performs a matrix multiply and accumulate operation $D=A\times B+C$, where A, B, C, and D are 4×4 matrices.

In at least one embodiment, matrix multiply inputs A and B are 16-bit floating point matrices and accumulation matrices C and D are 16-bit floating point or 32-bit floating point matrices. In at least one embodiment, tensor cores operate on 16-bit floating point input data with 32-bit floating point accumulation. In at least one embodiment, 16-bit floating point multiply uses 64 operations and results in a full precision product that is then accumulated using 32-bit floating point addition with other intermediate products for a 4×4×4 matrix multiply. Tensor cores are used to perform much larger two-dimensional or higher dimensional matrix operations, built up from these smaller elements, in at least one embodiment. In at least one embodiment, an API, such as a CUDA-C++ API, exposes specialized matrix load, matrix multiply and accumulate, and matrix store operations to efficiently use tensor cores from a CUDA-C++ program. In at least one embodiment, at the CUDA level, a warp-level interface assumes 16×16 size matrices spanning all 32 threads of a warp.

In at least one embodiment, each SM 3400 comprises, without limitation, M SFUs 3412 that perform special functions (e.g., attribute evaluation, reciprocal square root, and like). In at least one embodiment, SFUs 3412 include, without limitation, a tree traversal unit configured to traverse a hierarchical tree data structure. In at least one embodiment, SFUs 3412 include, without limitation, a texture unit configured to perform texture map filtering operations. In at least one embodiment, texture units are configured to load texture maps (e.g., a 2D array of texels) from memory and sample texture maps to produce sampled texture values for use in shader programs executed by SM 3400. In at least one embodiment, texture maps are stored in shared memory/L1 cache 3418. In at least one embodiment, texture units implement texture operations such as filtering operations using mip-maps (e.g., texture maps of varying levels of detail). In at least one embodiment, each SM 3400 includes, without limitation, two texture units.

In at least one embodiment, each SM 3400 comprises, without limitation, N LSUs 3414 that implement load and store operations between shared memory/L1 cache 3418 and register file 3408. In at least one embodiment, each SM 3400 includes, without limitation, interconnect network 3416 that connects each of the functional units to register file 3408 and LSU 3414 to register file 3408 and shared memory/L1 cache 3418. In at least one embodiment, interconnect network 3416 is a crossbar that can be configured to connect any of the functional units to any of the registers in register file 3408 and connect LSUs 3414 to register file 3408 and memory locations in shared memory/L1 cache 3418.

In at least one embodiment, shared memory/L1 cache 3418 is an array of on-chip memory that allows for data storage and communication between SM 3400 and a primitive engine and between threads in SM 3400. In at least one embodiment, shared memory/L1 cache 3418 comprises, without limitation, 128 KB of storage capacity and is in a path from SM 3400 to a partition unit. In at least one embodiment, shared memory/L1 cache 3418 is used to cache reads and writes. In at least one embodiment, one or more of shared memory/L1 cache 3418, L2 cache, and memory are backing stores.

In at least one embodiment, combining data cache and shared memory functionality into a single memory block provides improved performance for both types of memory accesses. In at least one embodiment, capacity is used or is usable as a cache by programs that do not use shared memory, such as if shared memory is configured to use half of capacity, texture and load/store operations can use remaining capacity. In at least one embodiment, integration within shared memory/L1 cache 3418 enables shared memory/L1 cache 3418 to function as a high-throughput conduit for streaming data while simultaneously providing high-bandwidth and low-latency access to frequently reused data. In at least one embodiment, when configured for general purpose parallel computation, a simpler configuration can be used compared with graphics processing. In at least one embodiment, fixed function GPUs are bypassed, creating a much simpler programming model. In at least one embodiment and in a general purpose parallel computation configuration, a work distribution unit assigns and distributes blocks of threads directly to DPCs. In at least one embodiment, threads in a block execute the same program, using a unique thread ID in a calculation to ensure each thread generates unique results, using SM 3400 to execute a program and perform calculations, shared memory/L1 cache 3418 to communicate between threads, and LSU 3414 to read and write global memory through shared memory/L1 cache 3418 and a memory partition unit. In at least one embodiment, when configured for general purpose parallel computation, SM 3400 writes commands that scheduler unit 3404 can use to launch new work on DPCs.

In at least one embodiment, PPU is included in or coupled to a desktop computer, a laptop computer, a tablet computer, servers, supercomputers, a smart-phone (e.g., a wireless, hand-held device), a PDA, a digital camera, a vehicle, a head mounted display, a hand-held electronic device, and more. In at least one embodiment, PPU is embodied on a single semiconductor substrate. In at least one embodiment, PPU is included in an SoC along with one or more other devices such as additional PPUs, memory, a RISC CPU, an MMU, a digital-to-analog converter ("DAC"), and like.

In at least one embodiment, PPU may be included on a graphics card that includes one or more memory devices. In at least one embodiment, a graphics card may be configured to interface with a PCIe slot on a motherboard of a desktop computer. In at least one embodiment, PPU may be an integrated GPU ("iGPU") included in chipset of motherboard.

Software Constructions for General-Purpose Computing

The following figures set forth, without limitation, exemplary software constructs for implementing at least one embodiment.

In at least one embodiment, an application programming interface ("API") is software comprising executable instructions stored in memory on a computer system. In at least one embodiment, various software constructions may be used to make the APU including software stack 3500, CUDA software stack 3600, ROCm software stack 3700, OpenCL software stack 3800, or programming platform 3904. In at least one embodiment, performance of an API causes instructions to be performed that instantiate an execution graph with a child graph node. In at least one embodiment, performance of an API causes instructions to be performed that update an execution graph with a child graph node using systems and methods such as those described herein. In at least one embodiment, performance of an API causes instructions to be performed that store topology information for an execution graph with a child graph node.

Figure 35:
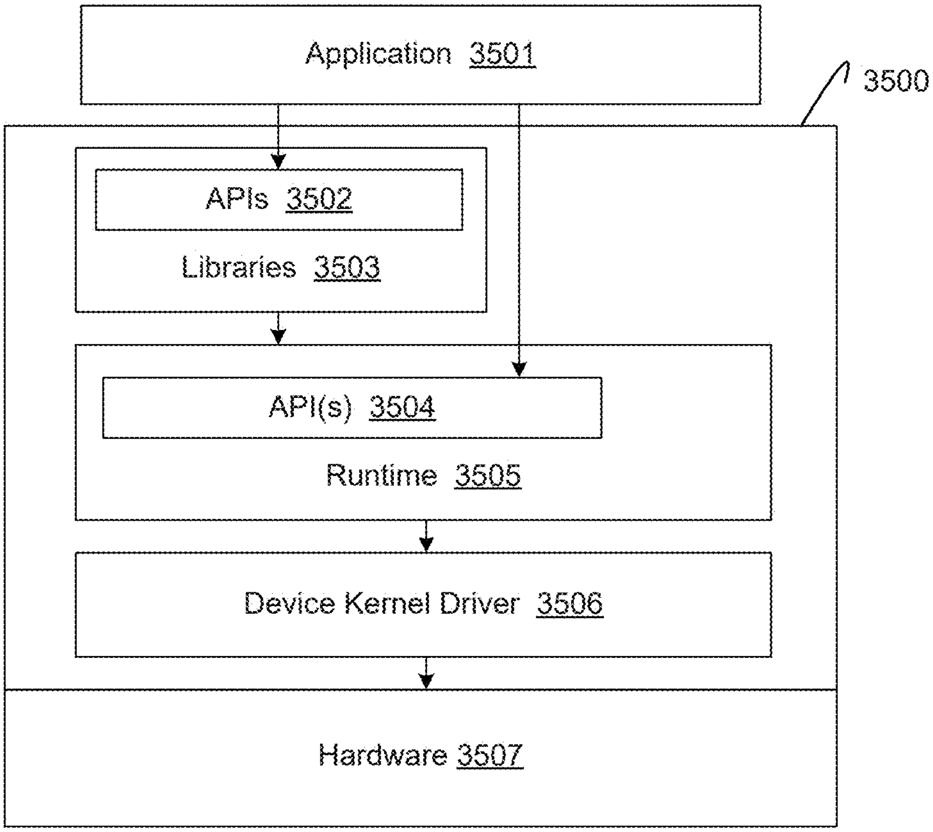
FIG. 35 illustrates a software stack of a programming platform, in accordance with at least one embodiment.

FIG. 35 illustrates a software stack of a programming platform, in accordance with at least one embodiment. In at least one embodiment, a programming platform is a platform for leveraging hardware on a computing system to accelerate computational tasks. A programming platform may be accessible to software developers through libraries, compiler directives, and/or extensions to programming languages, in at least one embodiment. In at least one embodiment, a programming platform may be, but is not limited to, CUDA, Radeon Open Compute Platform ("ROCm"), OpenCL (OpenCLIM is developed by Khronos group), SYCL, or Intel One API.

In at least one embodiment, a software stack 3500 of a programming platform provides an execution environment for an application 3501. In at least one embodiment, application 3501 may include any computer software capable of being launched on software stack 3500. In at least one embodiment, application 3501 may include, but is not limited to, an artificial intelligence ("AI")/machine learning ("ML") application, a high performance computing ("HPC") application, a virtual desktop infrastructure ("VDI"), or a data center workload.

In at least one embodiment, application 3501 and software stack 3500 run on hardware 3507. Hardware 3507 may include one or more GPUs, CPUs, FPGAs, AI engines, and/or other types of compute devices that support a programming platform, in at least one embodiment. In at least one embodiment, such as with CUDA, software stack 3500 may be vendor specific and compatible with only devices from particular vendor(s). In at least one embodiment, such as in with OpenCL, software stack 3500 may be used with devices from different vendors. In at least one embodiment, hardware 3507 includes a host connected to one more devices that can be accessed to perform computational tasks via application programming interface ("API") calls. A device within hardware 3507 may include, but is not limited to, a GPU, FPGA, AI engine, or other compute device (but may also include a CPU) and its memory, as opposed to a host within hardware 3507 that may include, but is not limited to, a CPU (but may also include a compute device) and its memory, in at least one embodiment.

In at least one embodiment, software stack 3500 of a programming platform includes, without limitation, a number of libraries 3503, a runtime 3505, and a device kernel driver 3506. Each of libraries 3503 may include data and programming code that can be used by computer programs and leveraged during software development, in at least one embodiment. In at least one embodiment, libraries 3503 may include, but are not limited to, pre-written code and subroutines, classes, values, type specifications, configuration data, documentation, help data, and/or message templates. In at least one embodiment, libraries 3503 include functions that are optimized for execution on one or more types of devices. In at least one embodiment, libraries 3503 may include, but are not limited to, functions for performing mathematical, deep learning, and/or other types of operations on devices. In at least one embodiment, libraries 3503 are associated with corresponding APIs 3502, which may include one or more APIs, that expose functions implemented in libraries 3503.

In at least one embodiment, application 3501 is written as source code that is compiled into executable code, as discussed in greater detail below in conjunction with FIGS. 40-42. Executable code of application 3501 may run, at least in part, on an execution environment provided by software stack 3500, in at least one embodiment. In at least one embodiment, during execution of application 3501, code may be reached that needs to run on a device, as opposed to a host. In such a case, runtime 3505 may be called to load and launch requisite code on the device, in at least one embodiment. In at least one embodiment, runtime 3505 may include any technically feasible runtime system that is able to support execution of application S01.

In at least one embodiment, runtime 3505 is implemented as one or more runtime libraries associated with corresponding APIs, which are shown as API(s) 3504. One or more of such runtime libraries may include, without limitation, functions for memory management, execution control, device management, error handling, and/or synchronization, among other things, in at least one embodiment. In at least one embodiment, memory management functions may include, but are not limited to, functions to allocate, deallocate, and copy device memory, as well as transfer data between host memory and device memory. In at least one embodiment, execution control functions may include, but are not limited to, functions to launch a function (sometimes referred to as a "kernel" when a function is a global function callable from a host) on a device and set attribute values in a buffer maintained by a runtime library for a given function to be executed on a device.

Runtime libraries and corresponding API(s) 3504 may be implemented in any technically feasible manner, in at least one embodiment. In at least one embodiment, one (or any number of) API may expose a low-level set of functions for fine-grained control of a device, while another (or any number of) API may expose a higher-level set of such functions. In at least one embodiment, a high-level runtime API may be built on top of a low-level API. In at least one embodiment, one or more of runtime APIs may be language-specific APIs that are layered on top of a language-independent runtime API.

In at least one embodiment, device kernel driver 3506 is configured to facilitate communication with an underlying device. In at least one embodiment, device kernel driver 3506 may provide low-level functionalities upon which APIs, such as API(s) 3504, and/or other software relies. In at least one embodiment, device kernel driver 3506 may be configured to compile intermediate representation ("IR") code into binary code at runtime. For CUDA, device kernel driver 3506 may compile Parallel Thread Execution ("PTX") IR code that is not hardware specific into binary code for a specific target device at runtime (with caching of compiled binary code), which is also sometimes referred to as "finalizing" code, in at least one embodiment. Doing so may permit finalized code to run on a target device, which may not have existed when source code was originally compiled into PTX code, in at least one embodiment. Alternatively, in at least one embodiment, device source code may be compiled into binary code offline, without requiring device kernel driver 3506 to compile IR code at runtime.

Figure 36:
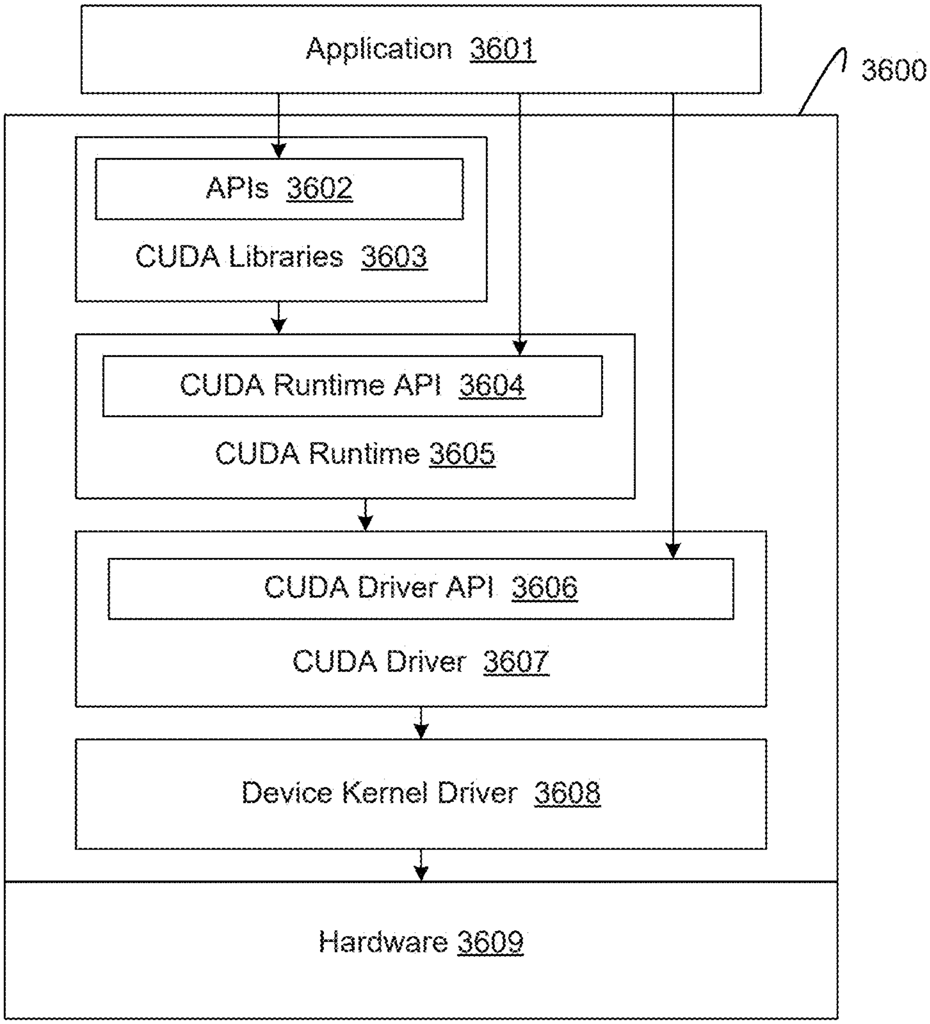
FIG. 36 illustrates a CUDA implementation of a software stack of FIG. 35, in accordance with at least one embodiment.

FIG. 36 illustrates a CUDA implementation of software stack 3500 of FIG. 35, in accordance with at least one embodiment. In at least one embodiment, a CUDA software stack 3600, on which an application 3601 may be launched, includes CUDA libraries 3603 including various APIs 3602, a CUDA runtime 3605, a CUDA driver 3607, and a device kernel driver 3608. In at least one embodiment, CUDA software stack 3600 executes on hardware 3609, which may include a GPU that supports CUDA and is developed by NVIDIA Corporation of Santa Clara, CA.

In at least one embodiment, application 3601, CUDA runtime 3605, and device kernel driver 3608 may perform similar functionalities as application 3501, runtime 3505, and device kernel driver 3506, respectively, which are described above in conjunction with FIG. 35. In at least one embodiment, CUDA driver 3607 includes a library (libcuda.so) that implements a CUDA driver API 3606. Similar to a CUDA runtime API 3604 implemented by a CUDA runtime library (cudart), CUDA driver API 3606 may, without limitation, expose functions for memory management, execution control, device management, error handling, synchronization, and/or graphics interoperability, among other things, in at least one embodiment. In at least one. embodiment, CUDA driver API 3606 differs from CUDA runtime API 3604 in that CUDA runtime API 3604 simplifies device code management by providing implicit initialization, context (analogous to a process) management, and module (analogous to dynamically loaded libraries) management. In contrast to high-level CUDA runtime API 3604, CUDA driver API 3606 is a low-level API providing more fine-grained control of the device, particularly with respect to contexts and module loading, in at least one embodiment. In at least one embodiment, CUDA driver API 3606 may expose functions for context management that are not exposed by CUDA runtime API 3604. In at least one embodiment, CUDA driver API 3606 is also language-independent and supports, e.g., OpenCL in addition to CUDA runtime API 3604. Further, in at least one embodiment, development libraries, including CUDA runtime 3605, may be considered as separate from driver components, including user-mode CUDA driver 3607 and kernel-mode device driver 3608 (also sometimes referred to as a "display" driver).

In at least one embodiment, CUDA libraries 3603 may include, but are not limited to, mathematical libraries, deep learning libraries, parallel algorithm libraries, and/or signal/image/video processing libraries, which parallel computing applications such as application 3601 may utilize. In at least one embodiment, CUDA libraries 3603 may include mathematical libraries such as a cuBLAS library that is an implementation of Basic Linear Algebra Subprograms ("BLAS") for performing linear algebra operations, a cuFFT library for computing fast Fourier transforms ("FFTs"), and a cuRAND library for generating random numbers, among others. In at least one embodiment, CUDA libraries 3603 may include deep learning libraries such as a cuDNN library of primitives for deep neural networks and a TensorRT platform for high-performance deep learning inference, among others.

Figure 37:
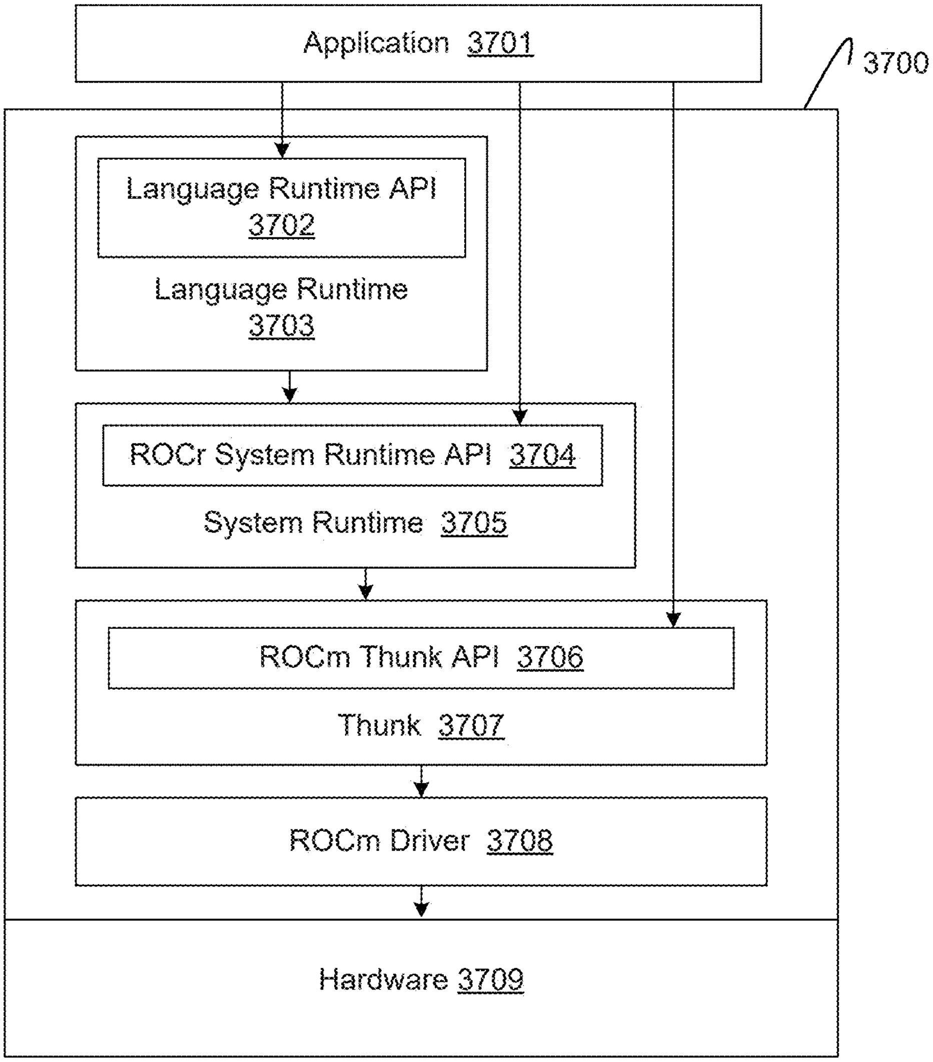
FIG. 37 illustrates a ROCm implementation of a software stack of FIG. 35, in accordance with at least one embodiment.

FIG. 37 illustrates a ROCm implementation of software stack 3500 of FIG. 35, in accordance with at least one embodiment. In at least one embodiment, a ROCm software stack 3700, on which an application 3701 may be launched, includes a language runtime 3703, a system runtime 3705, a thunk 3707, and a ROCm kernel driver 3708. In at least one embodiment, ROCm software stack 3700 executes on hardware 3709, which may include a GPU that supports ROCm and is developed by AMD Corporation of Santa Clara, CA.

In at least one embodiment, application 3701 may perform similar functionalities as application 3501 discussed above in conjunction with FIG. 35. In addition, language runtime 3703 and system runtime 3705 may perform similar functionalities as runtime 3505 discussed above in conjunction with FIG. 35, in at least one embodiment. In at least one embodiment, language runtime 3703 and system runtime 3705 differ in that system runtime 3705 is a language-independent runtime that implements a ROCr system runtime API 3704 and makes use of a Heterogeneous System Architecture ("HSA") Runtime API. HSA runtime API is a thin, user-mode API that exposes interfaces to access and interact with an AMD GPU, including functions for memory management, execution control via architected dispatch of kernels, error handling, system and agent information, and runtime initialization and shutdown, among other things, in at least one embodiment. In contrast to system runtime 3705, language runtime 3703 is an implementation of a language-specific runtime API 3702 layered on top of ROCr system runtime API 3704, in at least one embodiment. In at least one embodiment, language runtime API may include, but is not limited to, a Heterogeneous compute Interface for Portability ("HIP") language runtime API, a Heterogeneous Compute Compiler ("HCC") language runtime API, or an OpenCL API, among others. HIP language in particular is an extension of C++ programming language with functionally similar versions of CUDA mechanisms, and, in at least one embodiment, a HIP language runtime API includes functions that are similar to those of CUDA runtime API 3604 discussed above in conjunction with FIG. 36, such as functions for memory management, execution control, device management, error handling, and synchronization, among other things.

In at least one embodiment, thunk (ROCt) 3707 is an interface 3706 that can be used to interact with underlying ROCm driver 3708. In at least one embodiment, ROCm driver 3708 is a ROCK driver, which is a combination of an AMDGPU driver and a HSA kernel driver (amdkfd). In at least one embodiment, AMDGPU driver is a device kernel driver for GPUS developed by AMD that performs similar functionalities as device kernel driver 3506 discussed above in conjunction with FIG. 35. In at least one embodiment, HSA kernel driver is a driver permitting different types of processors to share system resources more effectively via hardware features.

In at least one embodiment, various libraries (not shown) may be included in ROCm software stack 3700 above language runtime 3703 and provide functionality similarity to CUDA libraries 3603, discussed above in conjunction with FIG. 36. In at least one embodiment, various libraries may include, but are not limited to, mathematical, deep learning, and/or other libraries such as a hipBLAS library that implements functions similar to those of CUDA cuBLAS, a rocFFT library for computing FFTs that is similar to CUDA cuFFT, among others.

Figure 38:
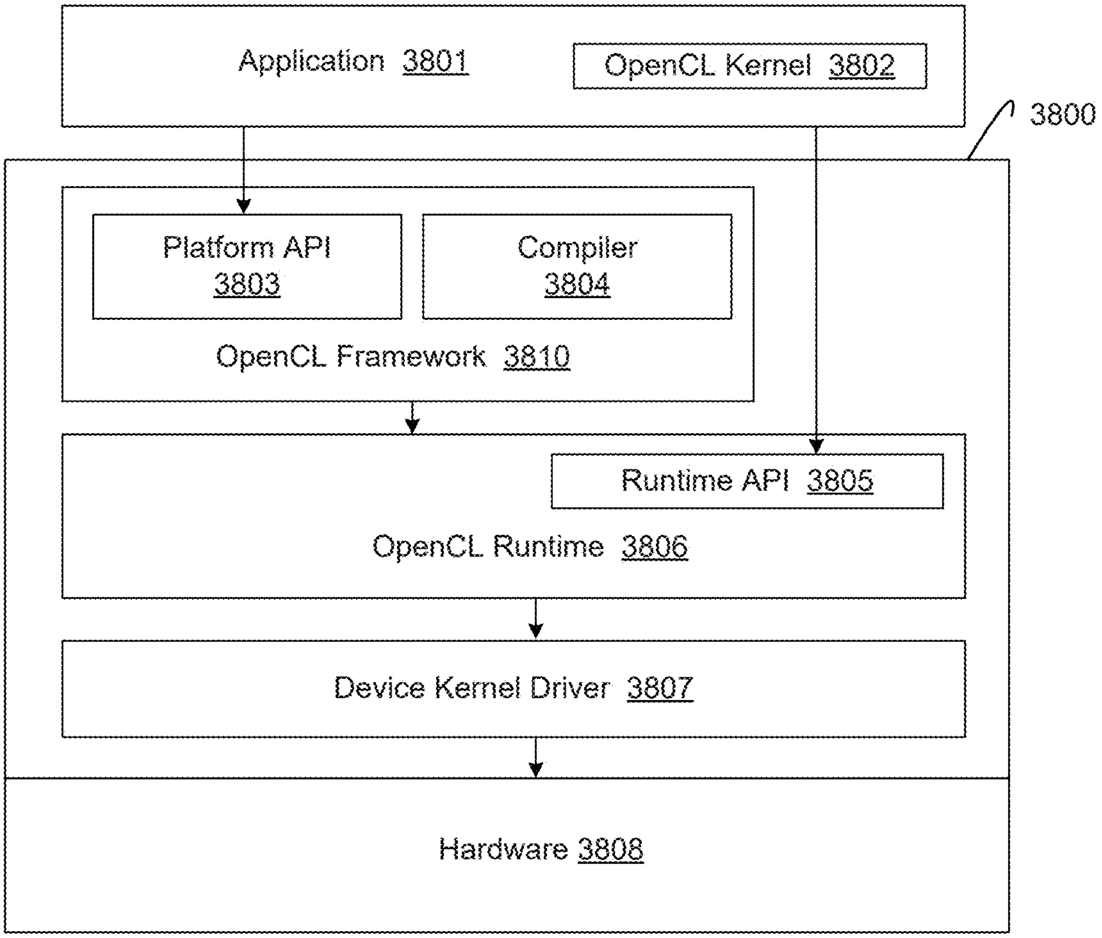
FIG. 38 illustrates an OpenCL implementation of a software stack of FIG. 35, in accordance with at least one embodiment.

FIG. 38 illustrates an OpenCL implementation of software stack 3500 of FIG. 35, in accordance with at least one embodiment. In at least one embodiment, an OpenCL software stack 3800, on which an application 3801 may be launched, includes an OpenCL framework 3810, an OpenCL runtime 3806, and a driver 3807. In at least one embodiment, OpenCL software stack 3800 executes on hardware 3609 that is not vendor-specific. As OpenCL is supported by devices developed by different vendors, specific OpenCL drivers may be required to interoperate with hardware from such vendors, in at least one embodiment.

In at least one embodiment, application 3801, OpenCL runtime 3806, device kernel driver 3807, and hardware 3808 may perform similar functionalities as application 3501, runtime 3505, device kernel driver 3506, and hardware 3507, respectively, that are discussed above in conjunction with FIG. 35. In at least one embodiment, application 3801 further includes an OpenCL kernel 3802 with code that is to be executed on a device.

In at least one embodiment, OpenCL defines a "platform" that allows a host to control devices connected to the host. In at least one embodiment, an OpenCL framework provides a platform layer API and a runtime API, shown as platform API 3803 and runtime API 3805. In at least one embodiment, runtime API 3805 uses contexts to manage execution of kernels on devices. In at least one embodiment, each identified device may be associated with a respective context, which runtime API 3805 may use to manage command queues, program objects, and kernel objects, share memory objects, among other things, for that device. In at least one embodiment, platform API 3803 exposes functions that permit device contexts to be used to select and initialize devices, submit work to devices via command queues, and enable data transfer to and from devices, among other things. In addition, OpenCL framework provides various built-in functions (not shown), including math functions, relational functions, and image processing functions, among others, in at least one embodiment.

In at least one embodiment, a compiler 3804 is also included in OpenCL framework 3810. Source code may be compiled offline prior to executing an application or online during execution of an application, in at least one embodiment. In contrast to CUDA and ROCm, OpenCL applications in at least one embodiment may be compiled online by compiler 3804, which is included to be representative of any number of compilers that may be used to compile source code and/or IR code, such as Standard Portable Intermediate Representation ("SPIR-V") code, into binary code. Alternatively, in at least one embodiment, OpenCL ap-plications may be compiled offline, prior to execution of such applications.

Figure 39:
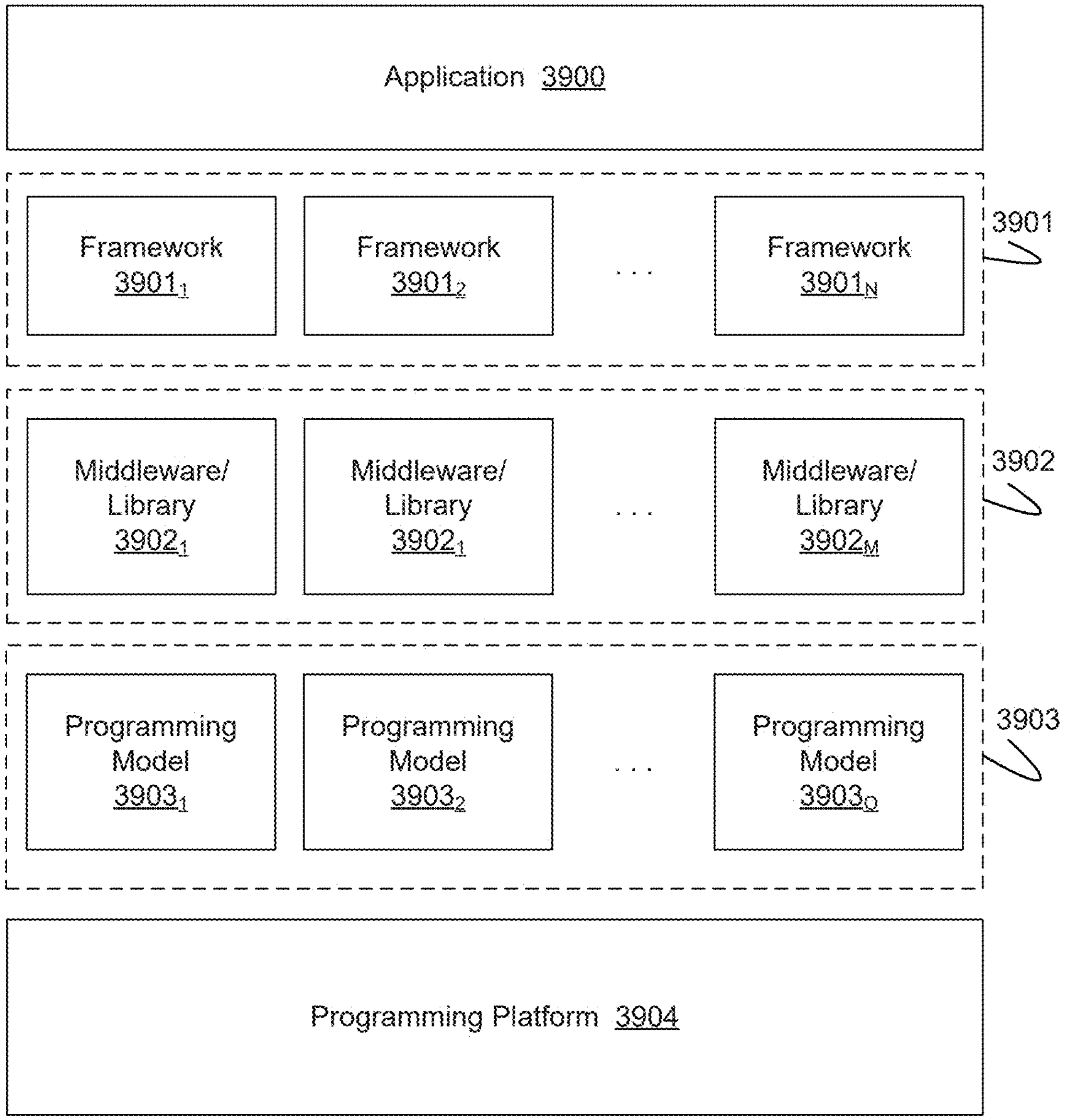
FIG. 39 illustrates software that is supported by a programming platform, in accordance with at least one embodiment.

FIG. 39 illustrates software that is supported by a programming platform, in accordance with at least one embodiment. In at least one embodiment, a programming platform 3904 is configured to support various programming models 3903, middlewares and/or libraries 3902, and frameworks 3901 that an application 3900 may rely upon. In at least one embodiment, application 3900 may be an AI/ML application implemented using, for example, a deep learning framework such as MXNet, PyTorch, or TensorFlow, which may rely on libraries such as cuDNN, NVIDIA Collective Communications Library ("NCCL"), and/or NVIDA Developer Data Loading Library ("DALI") CUDA libraries to provide accelerated computing on underlying hardware.

In at least one embodiment, programming platform 3904 may be one of a CUDA, ROCm, or OpenCL platform described above in conjunction with FIG. 36, FIG. 37, and FIG. 38, respectively. In at least one embodiment, programming platform 3904 supports multiple programming models 3903, which are abstractions of an underlying computing system permitting expressions of algorithms and data structures. Programming models 3903 may expose features of underlying hardware in order to improve performance, in at least one embodiment. In at least one embodiment, programming models 3903 may include, but are not limited to, CUDA, HIP, OpenCL, C++ Accelerated Massive Parallelism ("C++ AMP"), Open Multi-Processing ("OpenMP"), Open Accelerators ("OpenACC"), and/or Vulcan Compute.

In at least one embodiment, libraries and/or middlewares 3902 provide implementations of abstractions of programming models 3904. In at least one embodiment, such libraries include data and programming code that may be used by computer programs and leveraged during software development. In at least one embodiment, such middlewares include software that provides services to applications beyond those available from programming platform 3904. In at least one embodiment, libraries and/or middlewares 3902 may include, but are not limited to, cuBLAS, cuFFT, cuRAND, and other CUDA libraries, or rocBLAS, rocFFT, rocRAND, and other ROCm libraries. In addition, in at least one embodiment, libraries and/or middlewares 3902 may include NCCL and ROCm Communication Collectives Library ("RCCL") libraries providing communication routines for GPUs, a MIOpen library for deep learning acceleration, and/or an Eigen library for linear algebra, matrix and vector operations, geometrical transformations, numerical solvers, and related algorithms.

In at least one embodiment, application frameworks 3901 depend on libraries and/or middlewares 3902. In at least one embodiment, each of application frameworks 3901 is a software framework used to implement a standard structure of application software. Returning to the AI/ML example discussed above, an AI/ML application may be implemented using a framework such as Caffe, Caffe2, TensorFlow, Keras, PyTorch, or MxNet deep learning frameworks, in at least one embodiment.

Figure 40:
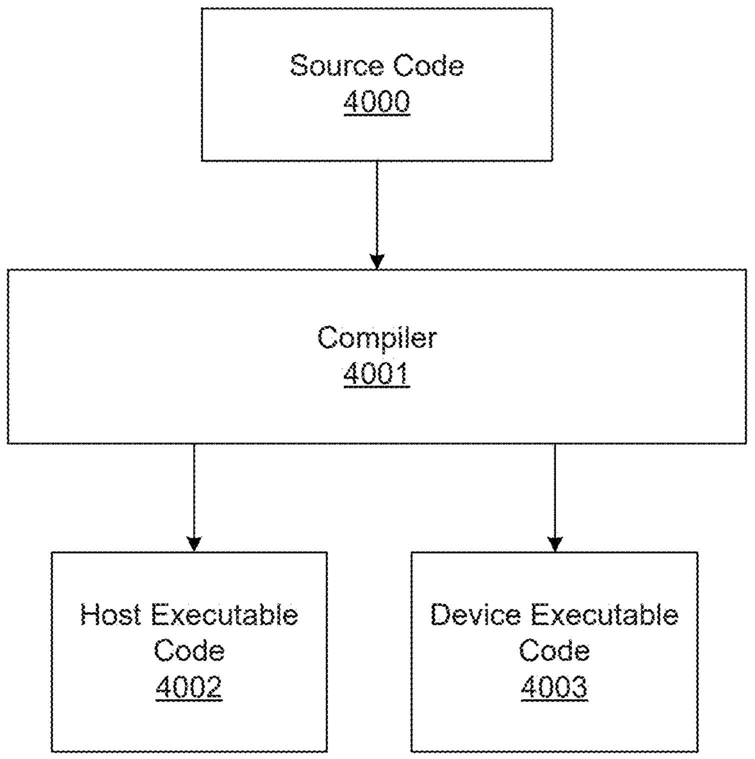
FIG. 40 illustrates compiling code to execute on programming platforms of FIGS. 35-38, in accordance with at least one embodiment.

FIG. 40 illustrates compiling code to execute on one of programming platforms of FIGS. 35-38, in accordance with at least one embodiment. In at least one embodiment, a compiler 4001 receives source code 4000 that includes both host code as well as device code. In at least one embodiment, complier 4001 is configured to convert source code 4000 into host executable code 4002 for execution on a host and device executable code 4003 for execution on a device. In at least one embodiment, source code 4000 may either be compiled offline prior to execution of an application, or online during execution of an application.

In at least one embodiment, source code 4000 may include code in any programming language supported by compiler 4001, such as C++, C, Fortran, etc. In at least one embodiment, source code 4000 may be included in a single-source file having a mixture of host code and device code, with locations of device code being indicated therein. In at least one embodiment, a single-source file may be a.cu file that includes CUDA code or a hip.cpp file that includes HIP code. Alternatively, in at least one embodiment, source code 4000 may include multiple source code files, rather than a single-source file, into which host code and device code are separated.

In at least one embodiment, compiler 4001 is configured to compile source code 4000 into host executable code 4002 for execution on a host and device executable code 4003 for execution on a device. In at least one embodiment, compiler 4001 performs operations including parsing source code 4000 into an abstract system tree (AST), performing optimizations, and generating executable code. In at least one embodiment in which source code 4000 includes a single-source file, compiler 4001 may separate device code from host code in such a single-source file, compile device code and host code into device executable code 4003 and host executable code 4002, respectively, and link device executable code 4003 and host executable code 4002 together in a single file, as discussed in greater detail below with respect to FIG. 41.

In at least one embodiment, host executable code 4002 and device executable code 4003 may be in any suitable format, such as binary code and/or IR code. In the case of CUDA, host executable code 4002 may include native object code and device executable code 4003 may include code in PTX intermediate representation, in at least one embodiment. In the case of ROCm, both host executable code 4002 and device executable code 4003 may include target binary code, in at least one embodiment.

Figure 41:
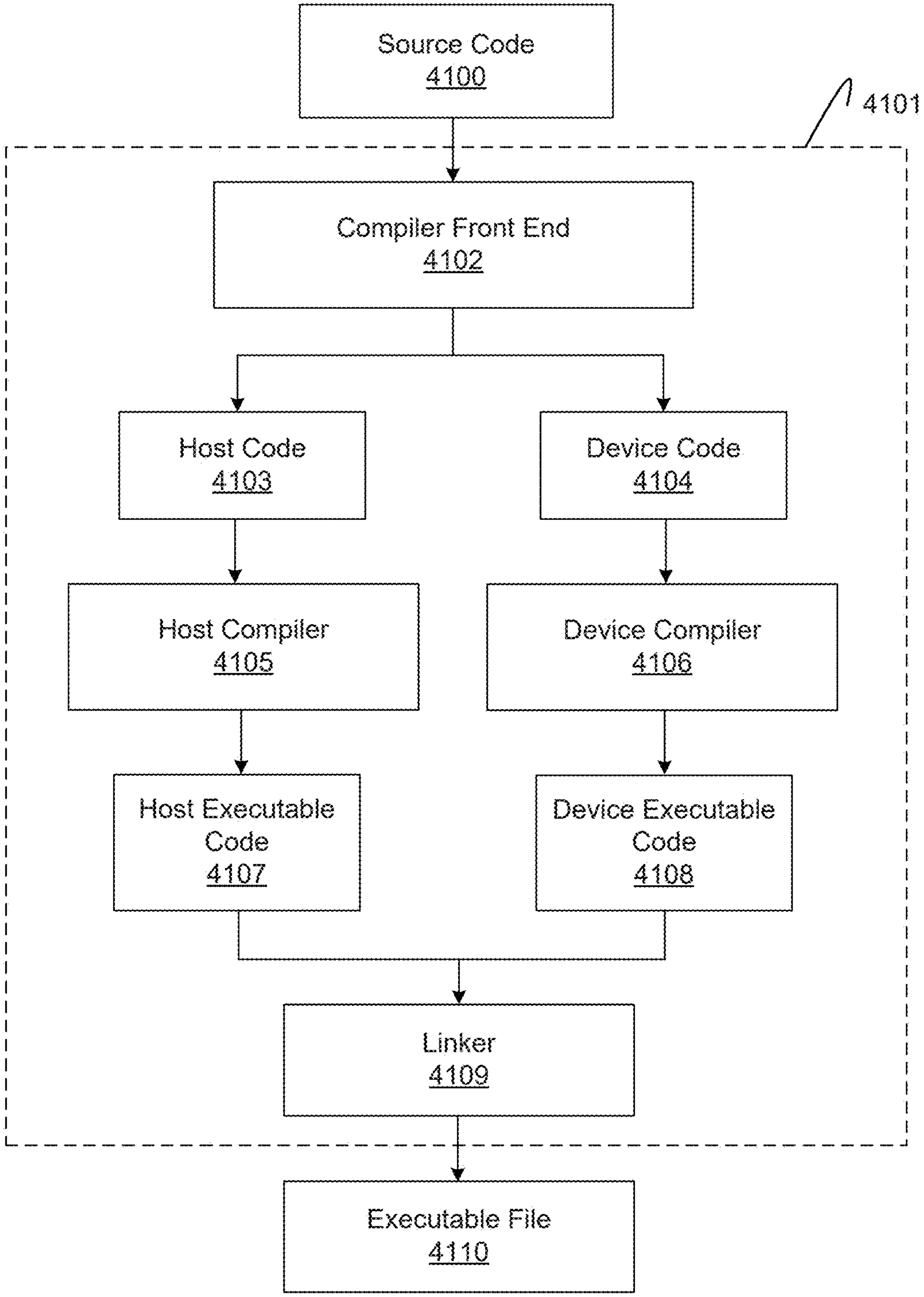
FIG. 41 illustrates in greater detail compiling code to execute on programming platforms of FIGS. 35-38, in accordance with at least one embodiment.

FIG. 41 is a more detailed illustration of compiling code to execute on one of programming platforms of FIGS. 35-38, in accordance with at least one embodiment. In at least one embodiment, a compiler 4101 is configured to receive source code 4100, compile source code 4100, and output an executable file 4110. In at least one embodiment, source code 4100 is a single-source file, such as a.cu file, a.hip.cpp file, or a file in another format, that includes both host and device code. In at least one embodiment, compiler 4101 may be, but is not limited to, an NVIDIA CUDA compiler ("NVCC") for compiling CUDA code in.cu files, or a HCC compiler for compiling HIP code in.hip.cpp files.

In at least one embodiment, compiler 4101 includes a compiler front end 4102, a host compiler 4105, a device compiler 4106, and a linker 4109. In at least one embodiment, compiler front end 4102 is configured to separate device code 4104 from host code 4103 in source code 4100. Device code 4104 is compiled by device compiler 4106 into device executable code 4108, which as described may include binary code or IR code, in at least one embodiment. Separately, host code 4103 is compiled by host compiler 4105 into host executable code 4107, in at least one embodiment. For NVCC, host compiler 4105 may be, but is not limited to, a general purpose C/C++ compiler that outputs native object code, while device compiler 4106 may be, but is not limited to, a Low Level Virtual Machine ("LLVM")-based compiler that forks a LLVM compiler infrastructure and outputs PTX code or binary code, in at least one embodiment. For HCC, both host compiler 4105 and device compiler 4106 may be, but are not limited to, LLVM-based compilers that output target binary code, in at least one embodiment.

Subsequent to compiling source code 4100 into host executable code 4107 and device executable code 4108, linker 4109 links host and device executable code 4107 and 4108 together in executable file 4110, in at least one embodiment. In at least one embodiment, native object code for a host and PTX or binary code for a device may be linked together in an Executable and Linkable Format ("ELF") file, which is a container format used to store object code.

Figure 42:
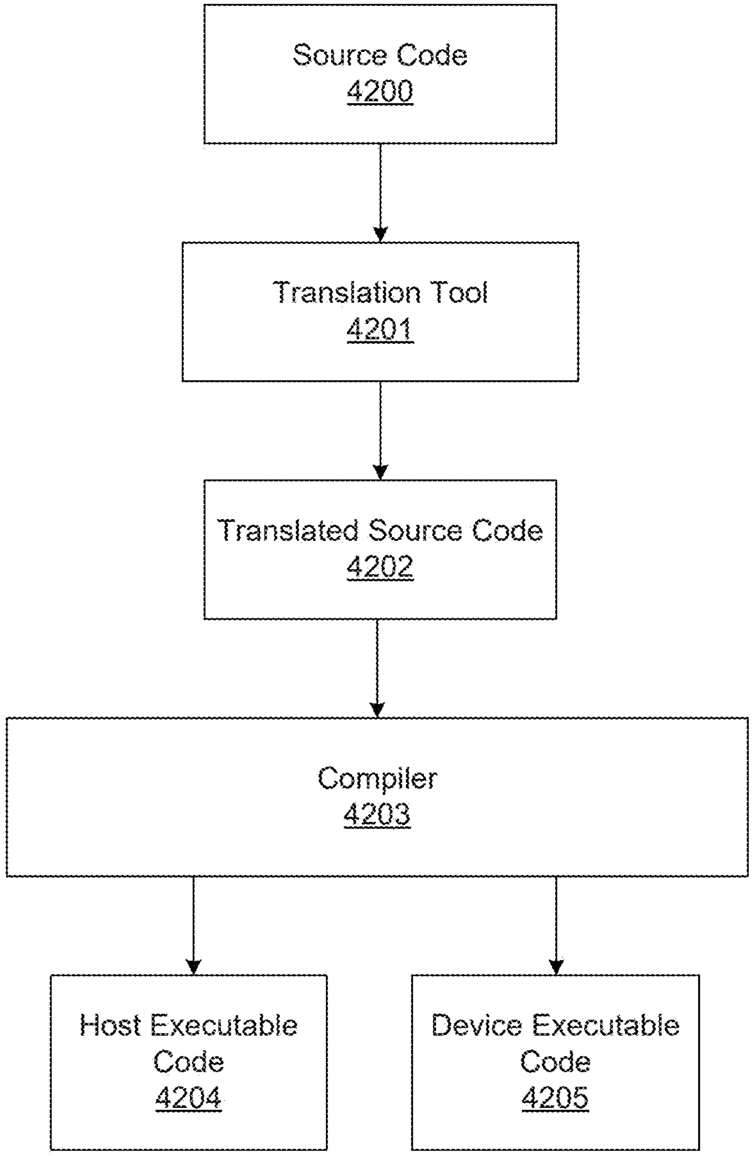
FIG. 42 illustrates translating source code prior to compiling source code, in accordance with at least one embodiment.

FIG. 42 illustrates translating source code prior to compiling source code, in accordance with at least one embodiment. In at least one embodiment, source code 4200 is passed through a translation tool 4201, which translates source code 4200 into translated source code 4202. In at least one embodiment, a compiler 4203 is used to compile translated source code 4202 into host executable code 4204 and device executable code 4205 in a process that is similar to compilation of source code 4000 by compiler 4001 into host executable code 4002 and device executable 4003, as discussed above in conjunction with FIG. 40.

In at least one embodiment, a translation performed by translation tool 4201 is used to port source 4200 for execution in a different environment than that in which it was originally intended to run. In at least one embodiment, translation tool 4201 may include, but is not limited to, a HIP translator that is used to "hipify" CUDA code intended for a CUDA platform into HIP code that can be compiled and executed on a ROCm platform. In at least one embodiment, translation of source code 4200 may include parsing source code 4200 and converting calls to API(s) provided by one programming model (e.g., CUDA) into corresponding calls to API(s) provided by another programming model (e.g., HIP), as discussed in greater detail below in conjunction with FIGS. 43A-44. Returning to the example of hipifying CUDA code, calls to CUDA runtime API, CUDA driver API, and/or CUDA libraries may be converted to corresponding HIP API calls, in at least one embodiment. In at least one embodiment, automated translations performed by translation tool 4201 may sometimes be incomplete, requiring additional, manual effort to fully port source code 4200.

Configuring GPUs for General-Purpose Computing

The following figures set forth, without limitation, exemplary architectures for compiling and executing compute source code, in accordance with at least one embodiment.

In at least one embodiment, an application programming interface ("API") is software comprising executable instructions stored in memory on a computer system. In at least one embodiment, a computer system is a system 4300 configured to compile and execute CUDA source code 4310. In at least one embodiment, a computer system is a system 4304 configured to compile and execute CUDA source code 4310 of FIG. 43A using CPU 4390 and CUDA-enabled GPU 4394. In at least one embodiment, a computer system is a system 4306 configured to compile and execute CUDA source code 4310 of FIG. 43A using CPU 4390 and non-CUDA-enabled GPU 4392. In at least one embodiment, as a result of being executed, an API causes instructions to be performed using a computing system that instantiate an execution graph with a child graph node In at least one embodiment, as a result of being executed, an API causes instructions to be performed using a computing system that update an execution graph with a child graph node using systems and methods such as those described herein. In at least one embodiment, as a result of being executed, an API causes instructions to be performed using a computing system that that store topology information for an execution graph with a child graph node.

Figure 43A:
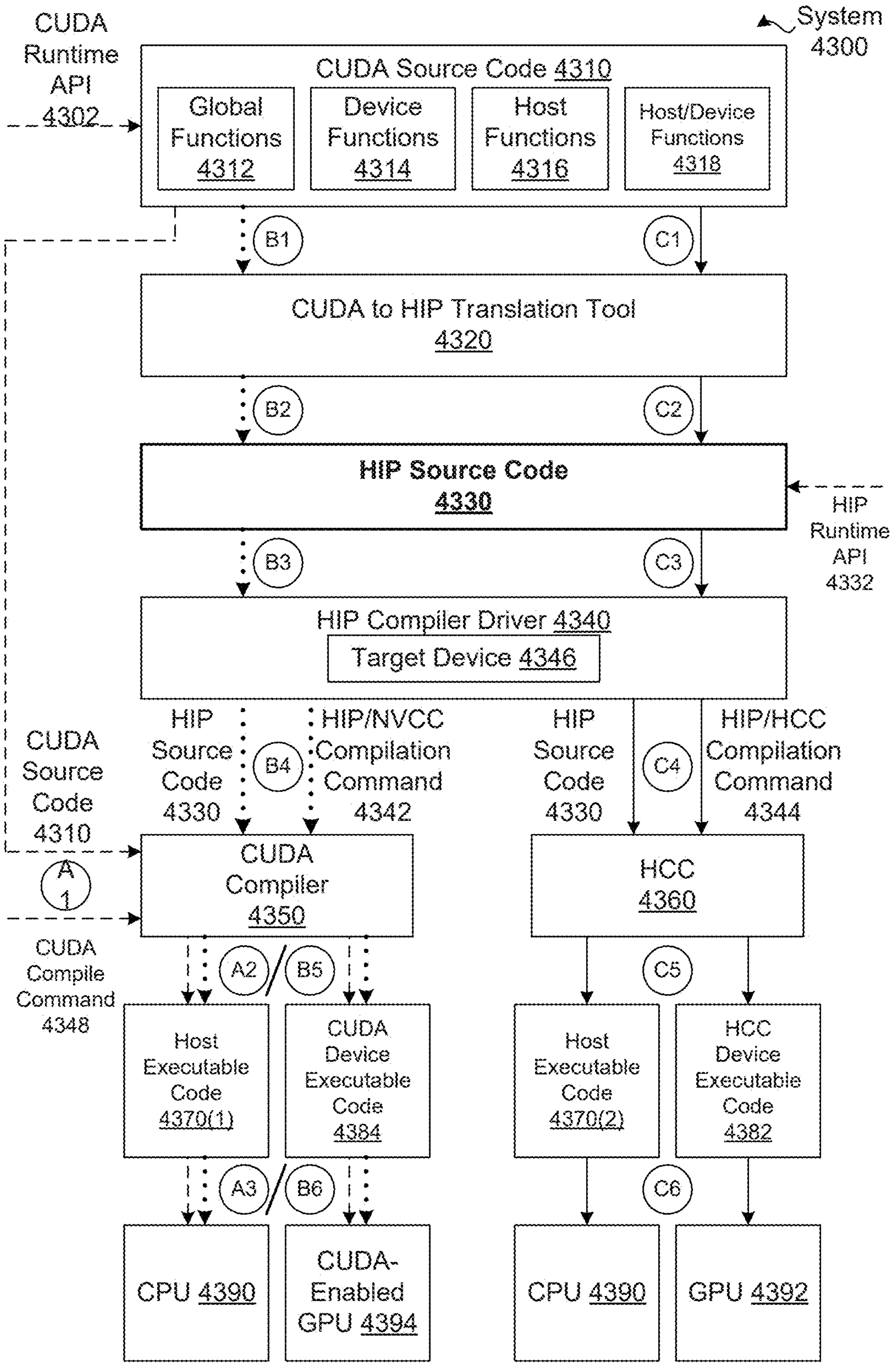
FIG. 43A illustrates a system configured to compile and execute CUDA source code using different types of processing units, in accordance with at least one embodiment.

FIG. 43A illustrates a system 4300 configured to compile and execute CUDA source code 4310 using different types of processing units, in accordance with at least one embodiment. In at least one embodiment, system 4300 includes, without limitation, CUDA source code 4310, a CUDA compiler 4350, host executable code 4370(1), host executable code 4370(2), CUDA device executable code 4384, a CPU 4390, a CUDA-enabled GPU 4394, a GPU 4392, a CUDA to HIP translation tool 4320, HIP source code 4330, a HIP compiler driver 4340, an HCC 4360, and HCC device executable code 4382.

In at least one embodiment, CUDA source code 4310 is a collection of human-readable code in a CUDA programming language. In at least one embodiment, CUDA code is human-readable code in a CUDA programming language. In at least one embodiment, a CUDA programming language is an extension of the C++ programming language that includes, without limitation, mechanisms to define device code and distinguish between device code and host code. In at least one embodiment, device code is source code that, after compilation, is executable in parallel on a device. In at least one embodiment, a device may be a processor that is optimized for parallel instruction processing, such as CUDA-enabled GPU 4390, GPU 43192, or another GPGPU, etc. In at least one embodiment, host code is source code that, after compilation, is executable on a host. In at least one embodiment, a host is a processor that is optimized for sequential instruction processing, such as CPU 4390.

In at least one embodiment, CUDA source code 4310 includes, without limitation, any number (including zero) of global functions 4312, any number (including zero) of device functions 4314, any number (including zero) of host functions 4316, and any number (including zero) of host/device functions 4318. In at least one embodiment, global functions 4312, device functions 4314, host functions 4316, and host/device functions 4318 may be mixed in CUDA source code 4310. In at least one embodiment, each of global functions 4312 is executable on a device and callable from a host. In at least one embodiment, one or more of global functions 4312 may therefore act as entry points to a device. In at least one embodiment, each of global functions 4312 is a kernel. In at least one embodiment and in a technique known as dynamic parallelism, one or more of global functions 4312 defines a kernel that is executable on a device and callable from such a device. In at least one embodiment, a kernel is executed N (where Nis any positive integer) times in parallel by N different threads on a device during execution.

In at least one embodiment, each of device functions 4314 is executed on a device and callable from such a device only. In at least one embodiment, each of host functions 4316 is executed on a host and callable from such a host only. In at least one embodiment, each of host/device functions 4316 defines both a host version of a function that is executable on a host and callable from such a host only and a device version of the function that is executable on a device and callable from such a device only.

In at least one embodiment, CUDA source code 4310 may also include, without limitation, any number of calls to any number of functions that are defined via a CUDA runtime API 4302. In at least one embodiment, CUDA runtime API 4302 may include, without limitation, any number of functions that execute on a host to allocate and deallocate device memory, transfer data between host memory and device memory, manage systems with multiple devices, etc. In at least one embodiment, CUDA source code 4310 may also include any number of calls to any number of functions that are specified in any number of other CUDA APIs. In at least one embodiment, a CUDA API may be any API that is designed for use by CUDA code. In at least one embodiment, CUDA APIs include, without limitation, CUDA runtime API 4302, a CUDA driver API, APIs for any number of CUDA libraries, etc. In at least one embodiment and relative to CUDA runtime API 4302, a CUDA driver API is a lower-level API but provides finer-grained control of a device. In at least one embodiment, examples of CUDA libraries include, without limitation, cuBLAS, cuFFT, cuRAND, cuDNN, etc.

In at least one embodiment, CUDA compiler 4350 compiles input CUDA code (e.g., CUDA source code 4310) to generate host executable code 4370(1) and CUDA device executable code 4384. In at least one embodiment, CUDA compiler 4350 is NVCC. In at least one embodiment, host executable code 4370(1) is a compiled version of host code included in input source code that is executable on CPU 4390. In at least one embodiment, CPU 4390 may be any processor that is optimized for sequential instruction processing.

In at least one embodiment, CUDA device executable code 4384 is a compiled version of device code included in input source code that is executable on CUDA-enabled GPU 4394. In at least one embodiment, CUDA device executable code 4384 includes, without limitation, binary code. In at least one embodiment, CUDA device executable code 4384 includes, without limitation, IR code, such as PTX code, that is further compiled at runtime into binary code for a specific target device (e.g., CUDA-enabled GPU 4394) by a device driver. In at least one embodiment, CUDA-enabled GPU 4394 may be any processor that is optimized for parallel instruction processing and that supports CUDA. In at least one embodiment, CUDA-enabled GPU 4394 is developed by NVIDIA Corporation of Santa Clara, CA.

In at least one embodiment, CUDA to HIP translation tool 4320 is configured to translate CUDA source code 4310 to functionally similar HIP source code 4330. In a least one embodiment, HIP source code 4330 is a collection of human-readable code in a HIP programming language. In at least one embodiment, HIP code is human-readable code in a HIP programming language. In at least one embodiment, a HIP programming language is an extension of the C++ programming language that includes, without limitation, functionally similar versions of CUDA mechanisms to define device code and distinguish between device code and host code. In at least one embodiment, a HIP programming language may include a subset of functionality of a CUDA programming language. In at least one embodiment, for example, a HIP programming language includes, without limitation, mechanism(s) to define global functions 4312, but such a HIP programming language may lack support for dynamic parallelism and therefore global functions 4312 defined in HIP code may be callable from a host only.

In at least one embodiment, HIP source code 4330 includes, without limitation, any number (including zero) of global functions 4312, any number (including zero) of device functions 4314, any number (including zero) of host functions 4316, and any number (including zero) of host/device functions 4318. In at least one embodiment, HIP source code 4330 may also include any number of calls to any number of functions that are specified in a HIP runtime API 4332. In at least one embodiment, HIP runtime API 4332 includes, without limitation, functionally similar versions of a subset of functions included in CUDA runtime API 4302. In at least one embodiment, HIP source code 4330 may also include any number of calls to any number of functions that are specified in any number of other HIP APIs. In at least one embodiment, a HIP API may be any API that is designed for use by HIP code and/or ROCm. In at least one embodiment, HIP APIs include, without limitation, HIP runtime API 4332, a HIP driver API, APIs for any number of HIP libraries, APIs for any number of ROCm libraries, etc.

In at least one embodiment, CUDA to HIP translation tool 4320 converts each kernel call in CUDA code from a CUDA syntax to a HIP syntax and converts any number of other CUDA calls in CUDA code to any number of other functionally similar HIP calls. In at least one embodiment, a CUDA call is a call to a function specified in a CUDA API, and a HIP call is a call to a function specified in a HIP API. In at least one embodiment, CUDA to HIP translation tool 4320 converts any number of calls to functions specified in CUDA runtime API 4302 to any number of calls to functions specified in HIP runtime API 4332.

In at least one embodiment, CUDA to HIP translation tool 4320 is a tool known as hipify-perl that executes a text-based translation process. In at least one embodiment, CUDA to HIP translation tool 4320 is a tool known as hipify-clang that, relative to hipify-perl, executes a more complex and more robust translation process that involves parsing CUDA code using clang (a compiler front-end) and then translating resulting symbols. In at least one embodiment, properly converting CUDA code to HIP code may require modifications (e.g., manual edits) in addition to those performed by CUDA to HIP translation tool 4320.

In at least one embodiment, HIP compiler driver 4340 is a front end that determines a target device 4346 and then configures a compiler that is compatible with target device 4346 to compile HIP source code 4330. In at least one embodiment, target device 4346 is a processor that is optimized for parallel instruction processing. In at least one embodiment, HIP compiler driver 4340 may determine target device 4346 in any technically feasible fashion.

In at least one embodiment, if target device 4346 is compatible with CUDA (e.g., CUDA-enabled GPU 4394), then HIP compiler driver 4340 generates a HIP/NVCC compilation command 4342. In at least one embodiment and as described in greater detail in conjunction with FIG. 43B, HIP/NVCC compilation command 4342 configures CUDA compiler 4350 to compile HIP source code 4330 using, without limitation, a HIP to CUDA translation header and a CUDA runtime library. In at least one embodiment and in response to HIP/NVCC compilation command 4342, CUDA compiler 4350 generates host executable code 4370(1) and CUDA device executable code 4384.

In at least one embodiment, if target device 4346 is not compatible with CUDA, then HIP compiler driver 4340 generates a HIP/HCC compilation command 4344. In at least one embodiment and as described in greater detail in conjunction with FIG. 43C, HIP/HCC compilation command 4344 configures HCC 4360 to compile HIP source code 4330 using, without limitation, an HCC header and a HIP/HCC runtime library. In at least one embodiment and in response to HIP/HCC compilation command 4344, HCC 4360 generates host executable code 4370(2) and HCC device executable code 4382. In at least one embodiment, HCC device executable code 4382 is a compiled version of device code included in HIP source code 4330 that is executable on GPU 4392. In at least one embodiment, GPU 4392 may be any processor that is optimized for parallel instruction processing, is not compatible with CUDA, and is compatible with HCC. In at least one embodiment, GPU 4392 is developed by AMD Corporation of Santa Clara, CA. In at least one embodiment GPU, 4392 is a non-CUDA-enabled GPU 4392.

For explanatory purposes only, three different flows that may be implemented in at least one embodiment to compile CUDA source code 4310 for execution on CPU 4390 and different devices are depicted in FIG. 43A. In at least one embodiment, a direct CUDA flow compiles CUDA source code 4310 for execution on CPU 4390 and CUDA-enabled GPU 4394 without translating CUDA source code 4310 to HIP source code 4330. In at least one embodiment, an indirect CUDA flow translates CUDA source code 4310 to HIP source code 4330 and then compiles HIP source code 4330 for execution on CPU 4390 and CUDA-enabled GPU 4394. In at least one embodiment, a CUDA/HCC flow translates CUDA source code 4310 to HIP source code 4330 and then compiles HIP source code 4330 for execution on CPU 4390 and GPU 4392.

A direct CUDA flow that may be implemented in at least one embodiment is depicted via dashed lines and a series of bubbles annotated A1-A3. In at least one embodiment and as depicted with bubble annotated A1, CUDA compiler 4350 receives CUDA source code 4310 and a CUDA compile command 4348 that configures CUDA compiler 4350 to compile CUDA source code 4310. In at least one embodiment, CUDA source code 4310 used in a direct CUDA flow is written in a CUDA programming language that is based on a programming language other than C++ (e.g., C, Fortran, Python, Java, etc.). In at least one embodiment and in response to CUDA compile command 4348, CUDA compiler 4350 generates host executable code 4370(1) and CUDA device executable code 4384 (depicted with bubble annotated A2). In at least one embodiment and as depicted with bubble annotated A3, host executable code 4370(1) and CUDA device executable code 4384 may be executed on, respectively, CPU 4390 and CUDA-enabled GPU 4394. In at least one embodiment, CUDA device executable code 4384 includes, without limitation, binary code. In at least one embodiment, CUDA device executable code 4384 includes, without limitation, PTX code and is further compiled into binary code for a specific target device at runtime.

An indirect CUDA flow that may be implemented in at least one embodiment is depicted via dotted lines and a series of bubbles annotated B1-B6. In at least one embodiment and as depicted with bubble annotated B1, CUDA to HIP translation tool 4320 receives CUDA source code 4310. In at least one embodiment and as depicted with bubble annotated B2, CUDA to HIP translation tool 4320 translates CUDA source code 4310 to HIP source code 4330. In at least one embodiment and as depicted with bubble annotated B3, HIP compiler driver 4340 receives HIP source code 4330 and determines that target device 4346 is CUDA-enabled.

In at least one embodiment and as depicted with bubble annotated B4, HIP compiler driver 4340 generates HIP/NVCC compilation command 4342 and transmits both HIP/NVCC compilation command 4342 and HIP source code 4330 to CUDA compiler 4350. In at least one embodiment and as described in greater detail in conjunction with FIG. 43B, HIP/NVCC compilation command 4342 configures CUDA compiler 4350 to compile HIP source code 4330 using, without limitation, a HIP to CUDA translation header and a CUDA runtime library. In at least one embodiment and in response to HIP/NVCC compilation command 4342, CUDA compiler 4350 generates host executable code 4370 (1) and CUDA device executable code 4384 (depicted with bubble annotated BS). In at least one embodiment and as depicted with bubble annotated B6, host executable code 4370(1) and CUDA device executable code 4384 may be executed on, respectively, CPU 4390 and CUDA-enabled GPU 4394. In at least one embodiment, CUDA device executable code 4384 includes, without limitation, binary code. In at least one embodiment, CUDA device executable code 4384 includes, without limitation, PTX code and is further compiled into binary code for a specific target device at runtime.

A CUDA/HCC flow that may be implemented in at least one embodiment is depicted via solid lines and a series of bubbles annotated C1-C6. In at least one embodiment and as depicted with bubble annotated C1, CUDA to HIP translation tool 4320 receives CUDA source code 4310. In at least one embodiment and as depicted with bubble annotated C2, CUDA to HIP translation tool 4320 translates CUDA source code 4310 to HIP source code 4330. In at least one embodiment and as depicted with bubble annotated C3, HIP compiler driver 4340 receives HIP source code 4330 and determines that target device 4346 is not CUDA-enabled.

In at least one embodiment, HIP compiler driver 4340 generates HIP/HCC compilation command 4344 and transmits both HIP/HCC compilation command 4344 and HIP source code 4330 to HCC 4360 (depicted with bubble annotated C4). In at least one embodiment and as described in greater detail in conjunction with FIG. 43C, HIP/HCC compilation command 4344 configures HCC 4360 to compile HIP source code 4330 using, without limitation, an HCC header and a HIP/HCC runtime library. In at least one embodiment and in response to HIP/HCC compilation command 4344, HCC 4360 generates host executable code 4370(2) and HCC device executable code 4382 (depicted with bubble annotated C5). In at least one embodiment and as depicted with bubble annotated C6, host executable code 4370(2) and HCC device executable code 4382 may be executed on, respectively, CPU 4390 and GPU 4392.

In at least one embodiment, after CUDA source code 4310 is translated to HIP source code 4330, HIP compiler driver 4340 may subsequently be used to generate executable code for either CUDA-enabled GPU 4394 or GPU 4392 without re-executing CUDA to HIP translation tool 4320. In at least one embodiment, CUDA to HIP translation tool 4320 translates CUDA source code 4310 to HIP source code 4330 that is then stored in memory. In at least one embodiment, HIP compiler driver 4340 then configures HCC 4360 to generate host executable code 4370(2) and HCC device executable code 4382 based on HIP source code 4330. In at least one embodiment, HIP compiler driver 4340 subsequently configures CUDA compiler 4350 to generate host executable code 4370(1) and CUDA device executable code 4384 based on stored HIP source code 4330.

Figure 43B:
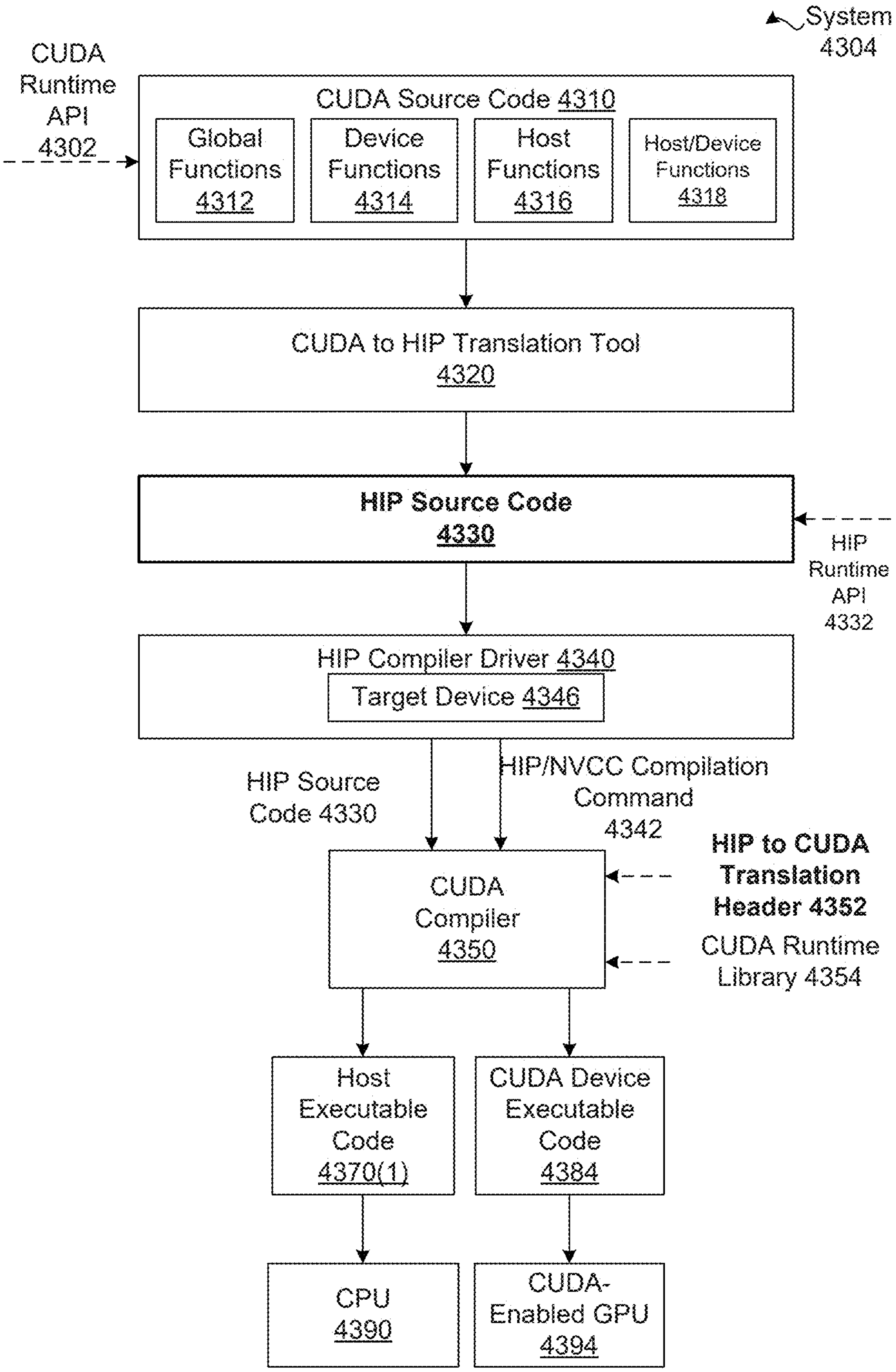
FIG. 43B illustrates a system configured to compile and execute CUDA source code of FIG. 43A using a CPU and a CUDA-enabled GPU, in accordance with at least one embodiment.

FIG. 43B illustrates a system 4304 configured to compile and execute CUDA source code 4310 of FIG. 43A using CPU 4390 and CUDA-enabled GPU 4394, in accordance with at least one embodiment. In at least one embodiment, system 4304 includes, without limitation, CUDA source code 4310, CUDA to HIP translation tool 4320, HIP source code 4330, HIP compiler driver 4340, CUDA compiler 4350, host executable code 4370(1), CUDA device executable code 4384, CPU 4390, and CUDA-enabled GPU 4394.

In at least one embodiment and as described previously herein in conjunction with FIG. 43A, CUDA source code 4310 includes, without limitation, any number (including zero) of global functions 4312, any number (including zero)

of device functions 4314, any number (including zero) of host functions 4316, and any number (including zero) of host/device functions 4318. In at least one embodiment, CUDA source code 4310 also includes, without limitation, any number of calls to any number of functions that are specified in any number of CUDA APIs.

In at least one embodiment, CUDA to HIP translation tool 4320 translates CUDA source code 4310 to HIP source code 4330. In at least one embodiment, CUDA to HIP translation tool 4320 converts each kernel call in CUDA source code 4310 from a CUDA syntax to a HIP syntax and converts any number of other CUDA calls in CUDA source code 4310 to any number of other functionally similar HIP calls.

In at least one embodiment, HIP compiler driver 4340 determines that target device 4346 is CUDA-enabled and generates HIP/NVCC compilation command 4342. In at least one embodiment, HIP compiler driver 4340 then configures CUDA compiler 4350 via HIP/NVCC compilation command 4342 to compile HIP source code 4330. In at least one embodiment, HIP compiler driver 4340 provides access to a HIP to CUDA translation header 4352 as part of configuring CUDA compiler 4350. In at least one embodiment, HIP to CUDA translation header 4352 translates any number of mechanisms (e.g., functions) specified in any number of HIP APIs to any number of mechanisms specified in any number of CUDA APIs. In at least one embodiment, CUDA compiler 4350 uses HIP to CUDA translation header 4352 in conjunction with a CUDA runtime library 4354 corresponding to CUDA runtime API 4302 to generate host executable code 4370(1) and CUDA device executable code 4384. In at least one embodiment, host executable code 4370(1) and CUDA device executable code 4384 may then be executed on, respectively, CPU 4390 and CUDA-enabled GPU 4394. In at least one embodiment, CUDA device executable code 4384 includes, without limitation, binary code. In at least one embodiment, CUDA device executable code 4384 includes, without limitation, PTX code and is further compiled into binary code for a specific target device at runtime.

Figure 43C:
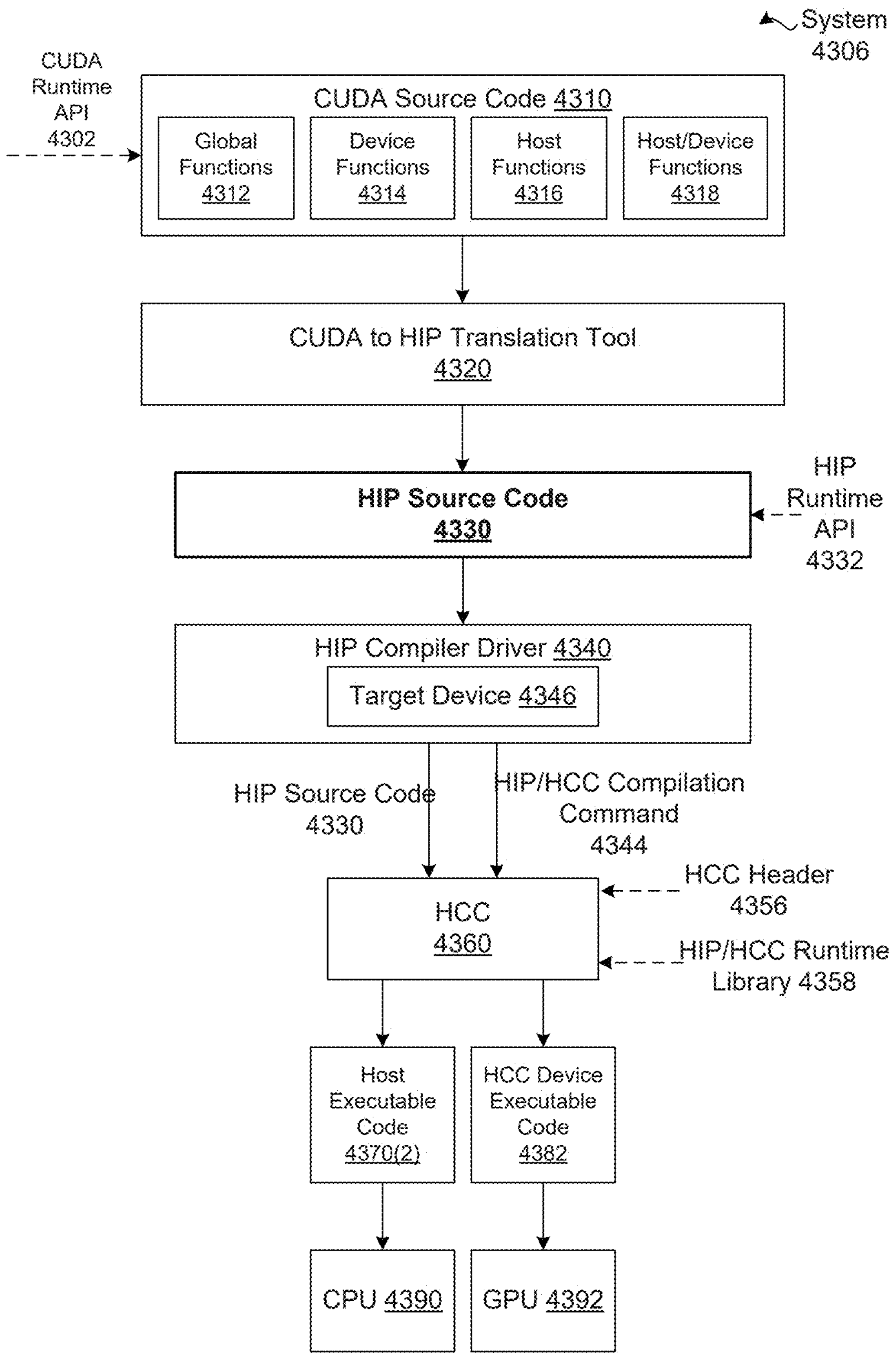
FIG. 43C illustrates a system configured to compile and execute CUDA source code of FIG. 43A using a CPU and a non-CUDA-enabled GPU, in accordance with at least one embodiment.

FIG. 43C illustrates a system 4306 configured to compile and execute CUDA source code 4310 of FIG. 43A using CPU 4390 and non-CUDA-enabled GPU 4392, in accordance with at least one embodiment. In at least one embodiment, system 4306 includes, without limitation, CUDA source code 4310, CUDA to HIP translation tool 4320, HIP source code 4330, HIP compiler driver 4340, HCC 4360, host executable code 4370(2), HCC device executable code 4382, CPU 4390, and GPU 4392.

In at least one embodiment and as described previously herein in conjunction with FIG. 43A, CUDA source code 4310 includes, without limitation, any number (including zero) of global functions 4312, any number (including zero) of device functions 4314, any number (including zero) of host functions 4316, and any number (including zero) of host/device functions 4318. In at least one embodiment, CUDA source code 4310 also includes, without limitation, any number of calls to any number of functions that are specified in any number of CUDA APIs.

In at least one embodiment, CUDA to HIP translation tool 4320 translates CUDA source code 4310 to HIP source code 4330. In at least one embodiment, CUDA to HIP translation tool 4320 converts each kernel call in CUDA source code 4310 from a CUDA syntax to a HIP syntax and converts any number of other CUDA calls in source code 4310 to any number of other functionally similar HIP calls.

In at least one embodiment, HIP compiler driver 4340 subsequently determines that target device 4346 is not CUDA-enabled and generates HIP/HCC compilation command 4344.

In at least one embodiment, HIP compiler driver 4340 then configures HCC 4360 to execute HIP/HCC compilation command 4344 to compile HIP source code 4330. In at least one embodiment, HIP/HCC compilation command 4344 configures HCC 4360 to use, without limitation, a HIP/HCC runtime library 4358 and an HCC header 4356 to generate host executable code 4370(2) and HCC device executable code 4382. In at least one embodiment, HIP/HCC runtime library 4358 corresponds to HIP runtime API 4332. In at least one embodiment, HCC header 4356 includes, without limitation, any number and type of interoperability mechanisms for HIP and HCC. In at least one embodiment, host executable code 4370(2) and HCC device executable code 4382 may be executed on, respectively, CPU 4390 and GPU 4392.

Figure 44:
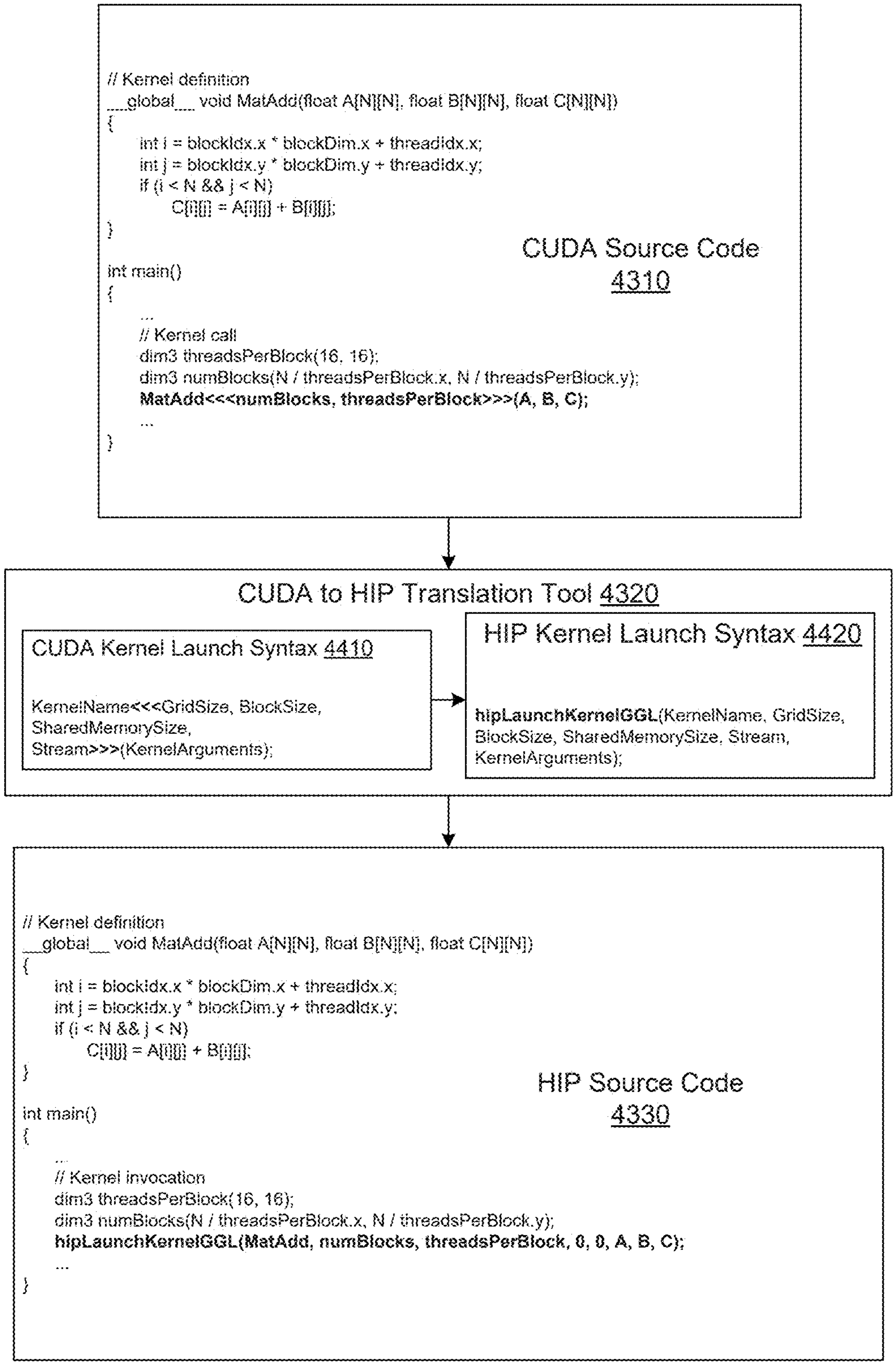
FIG. 44 illustrates an exemplary kernel translated by CUDA-to-HIP translation tool of FIG. 43C, in accordance with at least one embodiment.

FIG. 44 illustrates an exemplary kernel translated by CUDA-to-HIP translation tool 4320 of FIG. 43C, in accordance with at least one embodiment. In at least one embodiment, CUDA source code 4310 partitions an overall problem that a given kernel is designed to solve into relatively coarse sub-problems that can independently be solved using thread blocks. In at least one embodiment, each thread block includes, without limitation, any number of threads. In at least one embodiment, each sub-problem is partitioned into relatively fine pieces that can be solved cooperatively in parallel by threads within a thread block. In at least one embodiment, threads within a thread block can cooperate by sharing data through shared memory and by synchronizing execution to coordinate memory accesses.

In at least one embodiment, CUDA source code 4310 organizes thread blocks associated with a given kernel into a one-dimensional, a two-dimensional, or a three-dimensional grid of thread blocks. In at least one embodiment, each thread block includes, without limitation, any number of threads, and a grid includes, without limitation, any number of thread blocks.

In at least one embodiment, a kernel is a function in device code that is defined using a "__global__" declaration specifier. In at least one embodiment, the dimension of a grid that executes a kernel for a given kernel call and associated streams are specified using a CUDA kernel launch syntax 4410. In at least one embodiment, CUDA kernel launch syntax 4410 is specified as "KernelName<<<GridSize, BlockSize, SharedMemory Size, Stream>>>(KernelArguments);". In at least one embodiment, an execution configuration syntax is a "<<< . . . >>>" construct that is inserted between a kernel name ("KernelName") and a parenthesized list of kernel arguments ("KernelArguments"). In at least one embodiment, CUDA kernel launch syntax 4410 includes, without limitation, a CUDA launch function syntax instead of an execution configuration syntax.

In at least one embodiment, "GridSize" is of a type dim3 and specifies the dimension and size of a grid. In at least one embodiment, type dim3 is a CUDA-defined structure that includes, without limitation, unsigned integers x, y, and z. In at least one embodiment, if z is not specified, then z defaults to one. In at least one embodiment, if y is not specified, then y defaults to one. In at least one embodiment, the number of thread blocks in a grid is equal to the product of GridSize.x, GridSize.y, and GridSize.z. In at least one embodiment, "BlockSize" is of type dim3 and specifies the dimension and size of each thread block. In at least one embodiment, the number of threads per thread block is equal to the product of BlockSize.x, BlockSize.y, and BlockSize.z. In at least one embodiment, each thread that executes a kernel is given a unique thread ID that is accessible within the kernel through a built-in variable (e.g., “threadIdx”).

In at least one embodiment and with respect to CUDA kernel launch syntax 4410, “SharedMemorySize” is an optional argument that specifies a number of bytes in a shared memory that is dynamically allocated per thread block for a given kernel call in addition to statically allocated memory. In at least one embodiment and with respect to CUDA kernel launch syntax 4410, SharedMemorySize defaults to zero. In at least one embodiment and with respect to CUDA kernel launch syntax 4410, “Stream” is an optional argument that specifies an associated stream and defaults to zero to specify a default stream. In at least one embodiment, a stream is a sequence of commands (possibly issued by different host threads) that execute in order. In at least one embodiment, different streams may execute commands out of order with respect to one another or concurrently.

In at least one embodiment, CUDA source code 4310 includes, without limitation, a kernel definition for an exemplary kernel “MatAdd” and a main function. In at least one embodiment, main function is host code that executes on a host and includes, without limitation, a kernel call that causes kernel MatAdd to execute on a device. In at least one embodiment and as shown, kernel MatAdd adds two matrices A and B of size N×N, where Nis a positive integer, and stores the result in a matrix C. In at least one embodiment, main function defines a threadsPerBlock variable as 16 by 16 and a numBlocks variable as N/16 by N/16. In at least one embodiment, main function then specifies kernel call “MatAdd<<<numBlocks, threadsPerBlock>>>(A, B, C);”. In at least one embodiment and as per CUDA kernel launch syntax 4410, kernel MatAdd is executed using a grid of thread blocks having a dimension N/16 by N/16, where each thread block has a dimension of 16 by 16. In at least one embodiment, each thread block includes 256 threads, a grid is created with enough blocks to have one thread per matrix element, and each thread in such a grid executes kernel MatAdd to perform one pair-wise addition.

In at least one embodiment, while translating CUDA source code 4310 to HIP source code 4330, CUDA to HIP translation tool 4320 translates each kernel call in CUDA source code 4310 from CUDA kernel launch syntax 4410 to a HIP kernel launch syntax 4420 and converts any number of other CUDA calls in source code 4310 to any number of other functionally similar HIP calls. In at least one embodiment, HIP kernel launch syntax 4420 is specified as “hipLaunchKernelGGL (KernelName,GridSize, BlockSize, SharedMemory Size, Stream, KernelArguments);”. In at least one embodiment, each of KernelName, GridSize, BlockSize, ShareMemorySize, Stream, and Kemel Arguments has the same meaning in HIP kernel launch syntax 4420 as in CUDA kernel launch syntax 4410 (described previously herein). In at least one embodiment, arguments SharedMemorySize and Stream are required in HIP kernel launch syntax 4420 and are optional in CUDA kernel launch syntax 4410.

In at least one embodiment, a portion of HIP source code 4330 depicted in FIG. 44 is identical to a portion of CUDA source code 4310 depicted in FIG. 44 except for a kernel call that causes kernel MatAdd to execute on a device. In at least one embodiment, kernel MatAdd is defined in HIP source code 4330 with the same “_global__” declaration specifier with which kernel MatAdd is defined in CUDA source code 4310. In at least one embodiment, a kernel call in HIP source code 4330 is “hipLaunchKernelGGL (MatAdd, numBlocks, threadsPerBlock, 0, 0, A, B, C);”, while a corresponding kernel call in CUDA source code 4310 is “MatAdd<<<numBlocks, threadsPerBlock>>>(A, B, C);”.

Figure 45:
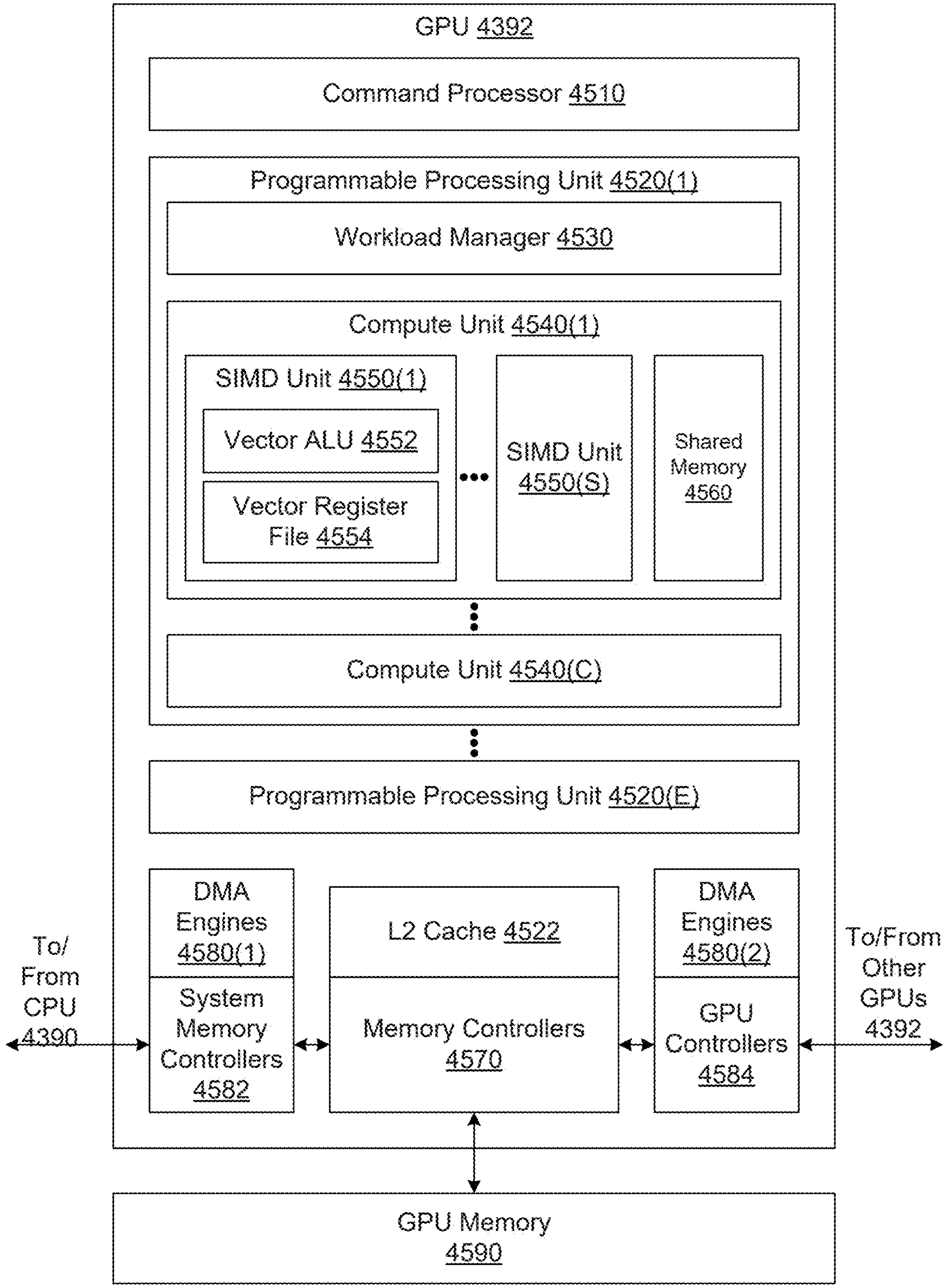
FIG. 45 illustrates non-CUDA-enabled GPU of FIG. 43C in greater detail, in accordance with at least one embodiment.

FIG. 45 illustrates non-CUDA-enabled GPU 4392 of FIG. 43C in greater detail, in accordance with at least one embodiment. In at least one embodiment, GPU 4392 is developed by AMD corporation of Santa Clara. In at least one embodiment, GPU 4392 can be configured to perform compute operations in a highly-parallel fashion. In at least one embodiment, GPU 4392 is configured to execute graphics pipeline operations such as draw commands, pixel operations, geometric computations, and other operations associated with rendering an image to a display. In at least one embodiment, GPU 4392 is configured to execute operations unrelated to graphics. In at least one embodiment, GPU 4392 is configured to execute both operations related to graphics and operations unrelated to graphics. In at least one embodiment, GPU 4392 can be configured to execute device code included in HIP source code 4330.

In at least one embodiment, GPU 4392 includes, without limitation, any number of programmable processing units 4520, a command processor 4510, an L2 cache 4522, memory controllers 4570, DMA engines 4580(1), system memory controllers 4582, DMA engines 4580(2), and GPU controllers 4584. In at least one embodiment, each programmable processing unit 4520 includes, without limitation, a workload manager 4530 and any number of compute units 4540. In at least one embodiment, command processor 4510 reads commands from one or more command queues (not shown) and distributes commands to workload managers 4530. In at least one embodiment, for each programmable processing unit 4520, associated workload manager 4530 distributes work to compute units 4540 included in programmable processing unit 4520. In at least one embodiment, each compute unit 4540 may execute any number of thread blocks, but each thread block executes on a single compute unit 4540. In at least one embodiment, a workgroup is a thread block.

In at least one embodiment, each compute unit 4540 includes, without limitation, any number of SIMD units 4550 and a shared memory 4560. In at least one embodiment, each SIMD unit 4550 implements a SIMD architecture and is configured to perform operations in parallel. In at least one embodiment, each SIMD unit 4550 includes, without limitation, a vector ALU 4552 and a vector register file 4554. In at least one embodiment, each SIMD unit 4550 executes a different warp. In at least one embodiment, a warp is a group of threads (e.g., 16 threads), where each thread in the warp belongs to a single thread block and is configured to process a different set of data based on a single set of instructions. In at least one embodiment, predication can be used to disable one or more threads in a warp. In at least one embodiment, a lane is a thread. In at least one embodiment, a work item is a thread. In at least one embodiment, a wavefront is a warp. In at least one embodiment, different wavefronts in a thread block may synchronize together and communicate via shared memory 4560.

In at least one embodiment, programmable processing units 4520 are referred to as “shader engines.” In at least one embodiment, each programmable processing unit 4520 includes, without limitation, any amount of dedicated graphics hardware in addition to compute units 4540. In at least one embodiment, each programmable processing unit 4520 includes, without limitation, any number (including zero) of geometry processors, any number (including zero) of rasterizers, any number (including zero) of render back ends, workload manager 4530, and any number of compute units 4540.

In at least one embodiment, compute units 4540 share L2 cache 4522. In at least one embodiment, L2 cache 4522 is partitioned. In at least one embodiment, a GPU memory 4590 is accessible by all compute units 4540 in GPU 4392. In at least one embodiment, memory controllers 4570 and system memory controllers 4582 facilitate data transfers between GPU 4392 and a host, and DMA engines 4580(1) enable asynchronous memory transfers between GPU 4392 and such a host. In at least one embodiment, memory controllers 4570 and GPU controllers 4584 facilitate data transfers between GPU 4392 and other GPUs 4392, and DMA engines 4580(2) enable asynchronous memory transfers between GPU 4392 and other GPUs 4392.

In at least one embodiment, GPU 4392 includes, without limitation, any amount and type of system interconnect that facilitates data and control transmissions across any number and type of directly or indirectly linked components that may be internal or external to GPU 4392. In at least one embodiment, GPU 4392 includes, without limitation, any number and type of I/O interfaces (e.g., PCIe) that are coupled to any number and type of peripheral devices. In at least one embodiment, GPU 4392 may include, without limitation, any number (including zero) of display engines and any number (including zero) of multimedia engines. In at least one embodiment, GPU 4392 implements a memory subsystem that includes, without limitation, any amount and type of memory controllers (e.g., memory controllers 4570 and system memory controllers 4582) and memory devices (e.g., shared memories 4560) that may be dedicated to one component or shared among multiple components. In at least one embodiment, GPU 4392 implements a cache subsystem that includes, without limitation, one or more cache memories (e.g., L2 cache 4522) that may each be private to or shared between any number of components (e.g., SIMD units 4550, compute units 4540, and programmable processing units 4520).

Figure 46:
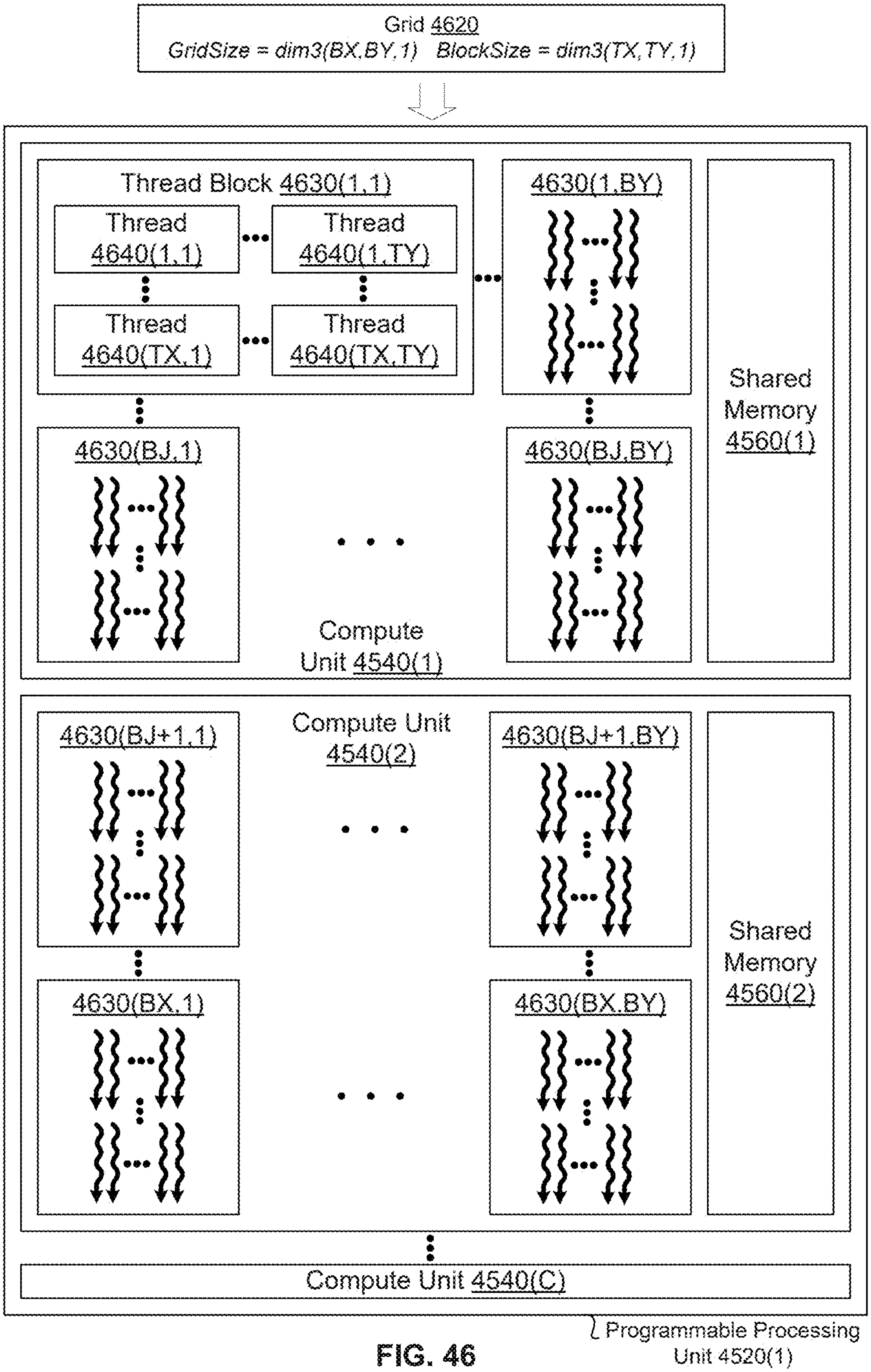
FIG. 46 illustrates how threads of an exemplary CUDA grid are mapped to different compute units of FIG. 45, in accordance with at least one embodiment.

FIG. 46 illustrates how threads of an exemplary CUDA grid 4620 are mapped to different compute units 4540 of FIG. 45, in accordance with at least one embodiment. In at least one embodiment and for explanatory purposes only, grid 4620 has a GridSize of BX by BY by 1 and a BlockSize of TX by TY by 1. In at least one embodiment, grid 4620 therefore includes, without limitation, (BX*BY) thread blocks 4630 and each thread block 4630 includes, without limitation, (TX*TY) threads 4640. Threads 4640 are depicted in FIG. 46 as squiggly arrows.

In at least one embodiment, grid 4620 is mapped to programmable processing unit 4520(1) that includes, without limitation, compute units 4540(1)-4540(C). In at least one embodiment and as shown, (BJ*BY) thread blocks 4630 are mapped to compute unit 4540(1), and the remaining thread blocks 4630 are mapped to compute unit 4540(2). In at least one embodiment, each thread block 4630 may include, without limitation, any number of warps, and each warp is mapped to a different SIMD unit 4550 of FIG. 45.

In at least one embodiment, warps in a given thread block 4630 may synchronize together and communicate through shared memory 4560 included in associated compute unit 4540. For example and in at least one embodiment, warps in thread block 4630 (BJ,1) can synchronize together and communicate through shared memory 4560(1). For example and in at least one embodiment, warps in thread block 4630 (BJ+1,1) can synchronize together and communicate through shared memory 4560(2).

Figure 47:
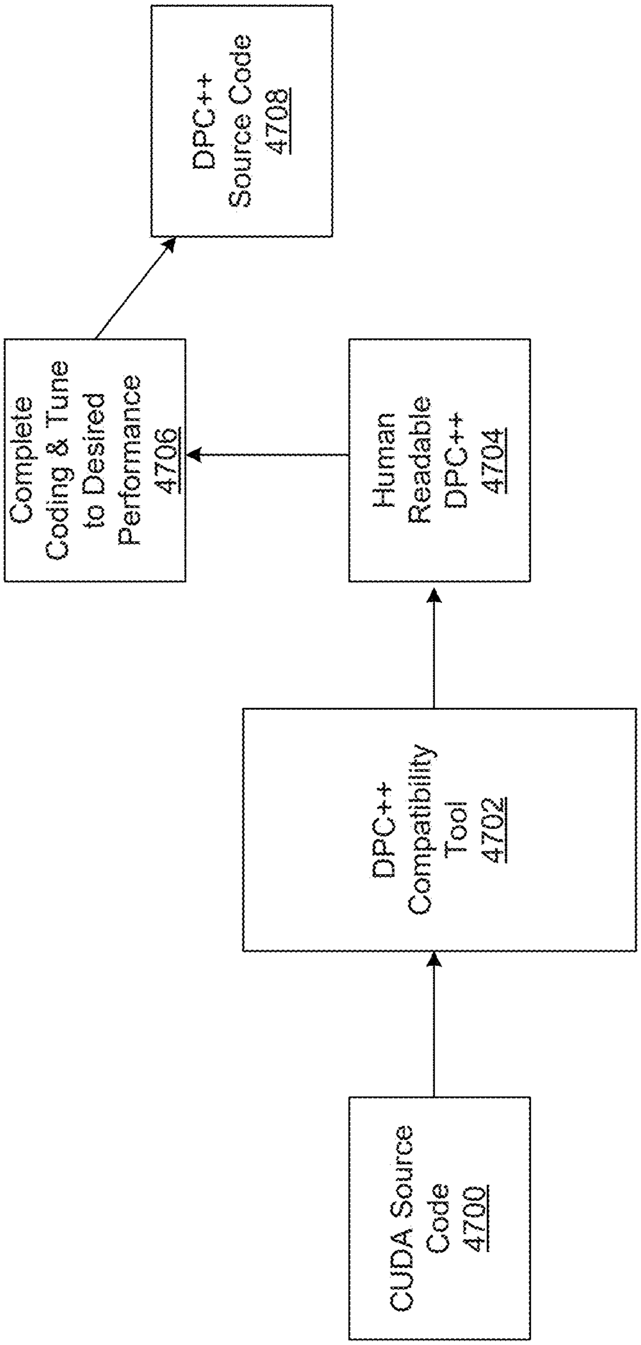
FIG. 47 illustrates how to migrate existing CUDA code to Data Parallel C++ code, in accordance with at least one embodiment.

FIG. 47 illustrates how to migrate existing CUDA code to Data Parallel C++ code, in accordance with at least one embodiment. Data Parallel C++ (DPC++) may refer to an open, standards-based alternative to single-architecture proprietary languages that allows developers to reuse code across hardware targets (CPUs and accelerators such as GPUs and FPGAs) and also perform custom tuning for a specific accelerator. DPC++ use similar and/or identical C and C++ constructs in accordance with ISO C++ which developers may be familiar with. DPC++ incorporates standard SYCL from The Khronos Group to support data parallelism and heterogeneous programming. SYCL refers to a cross-platform abstraction layer that builds on underlying concepts, portability and efficiency of OpenCL that enables code for heterogeneous processors to be written in a "single-source" style using standard C++. SYCL may enable single source development where C++ template functions can contain both host and device code to construct complex algorithms that use OpenCL acceleration, and then re-use them throughout their source code on different types of data.

In at least one embodiment, a DPC++ compiler is used to compile DPC++ source code which can be deployed across diverse hardware targets. In at least one embodiment, a DPC++ compiler is used to generate DPC++ applications that can be deployed across diverse hardware targets and a DPC++ compatibility tool can be used to migrate CUDA applications to a multiplatform program in DPC++. In at least one embodiment, a DPC++ base tool kit includes a DPC++ compiler to deploy applications across diverse hardware targets; a DPC++ library to increase productivity and performance across CPUs, GPUs, and FPGAs; a DPC++ compatibility tool to migrate CUDA applications to multiplatform applications; and any suitable combination thereof.

In at least one embodiment, a DPC++ programming model is utilized to simply one or more aspects relating to programming CPUs and accelerators by using modern C++ features to express parallelism with a programming language called Data Parallel C++. DPC++ programming language may be utilized to code reuse for hosts (e.g., a CPU) and accelerators (e.g., a GPU or FPGA) using a single source language, with execution and memory dependencies being clearly communicated. Mappings within DPC++ code can be used to transition an application to run on a hardware or set of hardware devices that best accelerates a workload. A host may be available to simplify development and debugging of device code, even on platforms that do not have an accelerator available.

In at least one embodiment, CUDA source code 4700 is provided as an input to a DPC++ compatibility tool 4702 to generate human readable DPC++ 4704. In at least one embodiment, human readable DPC++ 4704 includes inline comments generated by DPC++ compatibility tool 4702 that guides a developer on how and/or where to modify DPC++ code to complete coding and tuning to desired performance 4706, thereby generating DPC++ source code 4708.

In at least one embodiment, CUDA source code 4700 is or includes a collection of human-readable source code in a CUDA programming language. In at least one embodiment, CUDA source code 4700 is human-readable source code in a CUDA programming language. In at least one embodiment, a CUDA programming language is an extension of the C++ programming language that includes, without limitation, mechanisms to define device code and distinguish between device code and host code. In at least one embodiment, device code is source code that, after compilation, is executable on a device (e.g., GPU or FPGA) and may include or more parallelizable workflows that can be executed on one or more processor cores of a device. In at least one embodiment, a device may be a processor that is optimized for parallel instruction processing, such as CUDA-enabled GPU, GPU, or another GPGPU, etc. In at least one embodiment, host code is source code that, after compilation, is executable on a host. In least one embodiment, some or all of host code and device code can be executed in parallel across a CPU and GPU/FPGA. In at least one embodiment, a host is a processor that is optimized for sequential instruction processing, such as CPU. CUDA source code 4700 described in connection with FIG. 47 may be in accordance with those discussed elsewhere in this document.

In at least one embodiment, DPC++ compatibility tool 4702 refers to an executable tool, program, application, or any other suitable type of tool that is used to facilitate migration of CUDA source code 4700 to DPC++ source code 4708. In at least one embodiment, DPC++ compatibility tool 4702 is a command-line-based code migration tool available as part of a DPC++ tool kit that is used to port existing CUDA sources to DPC++. In at least one embodiment, DPC++ compatibility tool 4702 converts some or all source code of a CUDA application from CUDA to DPC++ and generates a resulting file that is written at least partially in DPC++, referred to as human readable DPC++ 4704. In at least one embodiment, human readable DPC++ 4704 includes comments that are generated by DPC++ compatibility tool 4702 to indicate where user intervention may be necessary. In at least one embodiment, user intervention is necessary when CUDA source code 4700 calls a CUDA API that has no analogous DPC++ API; other examples where user intervention is required are discussed later in greater detail.

In at least one embodiment, a workflow for migrating CUDA source code 4700 (e.g., application or portion thereof) includes creating one or more compilation database files; migrating CUDA to DPC++ using a DPC++ compatibility tool 4702; completing migration and verifying correctness, thereby generating DPC++ source code 4708; and compiling DPC++ source code 4708 with a DPC++ compiler to generate a DPC++ application. In at least one embodiment, a compatibility tool provides a utility that intercepts commands used when Makefile executes and stores them in a compilation database file. In at least one embodiment, a file is stored in JSON format. In at least one embodiment, an intercept-built command converts Makefile command to a DPC compatibility command.

In at least one embodiment, intercept-build is a utility script that intercepts a build process to capture compilation options, macro defs, and include paths, and writes this data to a compilation database file. In at least one embodiment, a compilation database file is a JSON file. In at least one embodiment, DPC++ compatibility tool 4702 parses a compilation database and applies options when migrating input sources. In at least one embodiment, use of intercept-build is optional, but highly recommended for Make or CMake based environments. In at least one embodiment, a migration database includes commands, directories, and files: command may include necessary compilation flags; directory may include paths to header files; file may include paths to CUDA files.

In at least one embodiment, DPC++ compatibility tool 4702 migrates CUDA code (e.g., applications) written in CUDA to DPC++ by generating DPC++ wherever possible. In at least one embodiment, DPC++ compatibility tool 4702 is available as part of a tool kit. In at least one embodiment, a DPC++ tool kit includes an intercept-build tool. In at least one embodiment, an intercept-built tool creates a compilation database that captures compilation commands to migrate CUDA files. In at least one embodiment, a compilation database generated by an intercept-built tool is used by DPC++ compatibility tool 4702 to migrate CUDA code to DPC++. In at least one embodiment, non-CUDA C++ code and files are migrated as is. In at least one embodiment, DPC++ compatibility tool 4702 generates human readable DPC++ 4704 which may be DPC++ code that, as generated by DPC++ compatibility tool 4702, cannot be compiled by DPC++ compiler and requires additional plumbing for verifying portions of code that were not migrated correctly, and may involve manual intervention, such as by a developer. In at least one embodiment, DPC++ compatibility tool 4702 provides hints or tools embedded in code to help developers manually migrate additional code that could not be migrated automatically. In at least one embodiment, migration is a one-time activity for a source file, project, or application.

In at least one embodiment, DPC++ compatibility tool 47002 is able to successfully migrate all portions of CUDA code to DPC++ and there may simply be an optional step for manually verifying and tuning performance of DPC++ source code that was generated. In at least one embodiment, DPC++ compatibility tool 4702 directly generates DPC++ source code 4708 which is compiled by a DPC++ compiler without requiring or utilizing human intervention to modify DPC++ code generated by DPC++ compatibility tool 4702. In at least one embodiment, DPC++ compatibility tool generates compile-able DPC++ code which can be optionally tuned by a developer for performance, readability, maintainability, other various considerations; or any combination thereof.

In at least one embodiment, one or more CUDA source files are migrated to DPC++ source files at least partially using DPC++ compatibility tool 4702. In at least one embodiment, CUDA source code includes one or more header files which may include CUDA header files. In at least one embodiment, a CUDA source file includes a <cuda.h> header file and a <stdio.h> header file which can be used to print text. In at least one embodiment, a portion of a vector addition kernel CUDA source file may be written as or related to:

```
#include <cuda.h>
#include <stdio.h>
#define VECTOR_SIZE 256
[ ] global_void VectorAddKernel(float* A, float* B, float* C)
{
  A[threadIdx.x] = threadIdx.x + 1.0f;
  B[threadIdx.x] = threadIdx.x + 1.0f;
  C[threadIdx.x] = A[threadIdx.x] + B[threadIdx.x];
}
int main( )
{
  float *d_A, *d_B, * d_C;
  cudaMalloc(&d_A, VECTOR_SIZE*sizeof(float));
  cudaMalloc(&d_B, VECTOR_SIZE*sizeof(float));
  cudaMalloc(&d_C, VECTOR_SIZE*sizeof(float));
  VectorAddKernel<<<1, VECTOR_SIZE>>>(d_A, d_B, d_C);
  float Result[VECTOR_SIZE] = { };
  cudaMemcpy(Result, d_C, VECTOR_SIZE*sizeof(float),
cudaMemcpyDeviceToHost);
  cudaFree(d_A);
  cudaFree(d_B);
  cudaFree(d_C);
  for (int i=0; i<VECTOR_SIZE; i++ {
    if (1 % 16 == 0) {
      printf("\n");
    }
```

-continued

```
    printf("%f ", Result[i]);
  }
  return 0;
}
```

In at least one embodiment and in connection with CUDA source file presented above, DPC++ compatibility tool 4702 parses a CUDA source code and replaces header files with appropriate DPC++ and SYCL header files. In at least one embodiment, DPC++ header files includes helper declarations. In CUDA, there is a concept of a thread ID and correspondingly, in DPC++ or SYCL, for each element there is a local identifier.

In at least one embodiment and in connection with CUDA source file presented above, there are two vectors A and B which are initialized and a vector addition result is put into vector C as part of VectorAddKernel( ) In at least one embodiment, DPC++ compatibility tool 4702 converts CUDA thread IDs used to index work elements to SYCL standard addressing for work elements via a local ID as part of migrating CUDA code to DPC++ code. In at least one embodiment, DPC++ code generated by DPC++ compatibility tool 4702 can be optimized—for example, by reducing dimensionality of an nd_item, thereby increasing memory and/or processor utilization.

In at least one embodiment and in connection with CUDA source file presented above, memory allocation is migrated. In at least one embodiment, cudaMalloc( ) is migrated to a unified shared memory SYCL call malloc_device( ) to which a device and context is passed, relying on SYCL concepts such as platform, device, context, and queue. In at least one embodiment, a SYCL platform can have multiple devices (e.g., host and GPU devices); a device may have multiple queues to which jobs can be submitted; each device may have a context; and a context may have multiple devices and manage shared memory objects.

In at least one embodiment and in connection with CUDA source file presented above, a main( ) function invokes or calls VectorAddKernel( ) to add two vectors A and B together and store result in vector C. In at least one embodiment, CUDA code to invoke VectorAddKernel( ) is replaced by DPC++ code to submit a kernel to a command queue for execution. In at least one embodiment, a command group handler cgh passes data, synchronization, and computation that is submitted to the queue, parallel_for is called for a number of global elements and a number of work items in that work group where VectorAddKernel( ) is called.

In at least one embodiment and in connection with CUDA source file presented above, CUDA calls to copy device memory and then free memory for vectors A, B, and C are migrated to corresponding DPC++ calls. In at least one embodiment, C++ code (e.g., standard ISO C++ code for printing a vector of floating point variables) is migrated as is, without being modified by DPC++ compatibility tool 4702. In at least one embodiment, DPC++ compatibility tool 4702 modify CUDA APIs for memory setup and/or host calls to execute kernel on the acceleration device. In at least one embodiment and in connection with CUDA source file presented above, a corresponding human readable DPC++ 4704 (e.g., which can be compiled) is written as or related to:

```
#include <CL/sycl.hpp>
#include <dpct/dpct.hpp>
#define VECTOR_SIZE 256
void VectorAddKernel(float* A, float* B, float* C,
                                    sycl::nd_item<3> item_ct1)
{
  A[item_ct1.get_local_id(2)] = item_ct1.get_local_id(2) + 1.0f;
  B[item_ct1.get_local_id(2)] = item_ct1.get_local_id(2) + 1.0f;
  C[item_ct1.get_local_id(2)] =
    A[item_ct1.get_local_id(2)] + B[item_ct1.get_local_id(2)];
}
int main( )
{
  float *d_A, *d_B, *d_C;
  d_A = (float *)sycl::malloc_device(VECTOR_SIZE * sizeof(float),
    dpct::get_current_device( ),
    dpct::get_default_context( ));
  d_B = (float *)sycl::malloc_device(VECTOR_SIZE * sizeof(float),
    dpct::get_current_device( ),
    dpct::get_default_context( ));
  d_C = (float *)sycl :: malloc_device(VECTOR_SIZE * sizeof(float),
    dpct::get_current_device( ),
    dpct::get_default_context( ));
  dpct::get_default_queue_wait( ). submit([&](sycl::handler &cgh) {
    cgh.parallel_for(
      sycl:nd_range<3>(sycl::range<3>(1, 1, 1) *
                          sycl::range<3>(1, 1, VECTOR SIZE) *
                          sycl::range<3>(1, 1, VECTOR_SIZE)),
      [=](sycl:nd_items<3> item_ct1) {
        VectorAddKernel(d_A, d_B, d_C, item_ct1);
      })
})
float Result[VECTOR_SIZE] = { };
dpct::get_default_queue_wait( )
  .memcpy(Result, d_C, VECTOR_SIZE * sizeof(float))
  .wait( );
sycl::free(d_A, dpct::get_default_context( );
sycl::free(d_B, dpct::get_default_context( );
sycl::free(d_C, dpct::get_default_context( ));
  for (int i=0; i<VECTOR_SIZE; i++ {
    if (1 % 16 == 0) {
      printf("\n");
    }
    printf("%f ", Result[i]);
  }
  return 0;
}
```

In at least one embodiment, human readable DPC++ 4704 refers to output generated by DPC++ compatibility tool 4702 and may be optimized in one manner or another. In at least one embodiment, human readable DPC++ 4704 generated by DPC++ compatibility tool 4702 can be manually edited by a developer after migration to make it more maintainable, performance, or other considerations. In at least one embodiment, DPC++ code generated by DPC++ compatibility tool 47002 such as DPC++ disclosed can be optimized by removing repeat calls to get_current_device( ) and/or get_default_context( ) for each malloc_device( ) call. In at least one embodiment, DPC++ code generated above uses a 3 dimensional nd_range which can be refactored to use only a single dimension, thereby reducing memory usage. In at least one embodiment, a developer can manually edit DPC++ code generated by DPC++ compatibility tool 4702 replace uses of unified shared memory with accessors. In at least one embodiment, DPC++ compatibility tool 4702 has an option to change how it migrates CUDA code to DPC++ code. In at least one embodiment, DPC++ compatibility tool 4702 is verbose because it is using a general template to migrate CUDA code to DPC++ code that works for a large number of cases.

In at least one embodiment, a CUDA to DPC++ migration workflow includes steps to: prepare for migration using intercept-build script; perform migration of CUDA projects to DPC++ using DPC++ compatibility tool 4702; review and edit migrated source files manually for completion and correctness; and compile final DPC++ code to generate a DPC++ application. In at least one embodiment, manual review of DPC++ source code may be required in one or more scenarios including but not limited to: migrated API does not return error code (CUDA code can return an error code which can then be consumed by the application but SYCL uses exceptions to report errors, and therefore does not use error codes to surface errors); CUDA compute capability dependent logic is not supported by DPC++; statement could not be removed. In at least one embodiment, scenarios in which DPC++ code requires manual intervention may include, without limitation: error code logic replaced with (*,0) code or commented out; equivalent DPC++ API not available; CUDA compute capability-dependent logic; hardware-dependent API (clock( )); missing features unsupported API; execution time measurement logic; handling built-in vector type conflicts; migration of cuBLAS API; and more.

In at least one embodiment, one or more techniques described herein utilize a oneAPI programming model. In at least one embodiment, a oneAPI programming model refers to a programming model for interacting with various compute accelerator architectures. In at least one embodiment, oneAPI refers to an application programming interface (API) designed to interact with various compute accelerator architectures. In at least one embodiment, a oneAPI programming model utilizes a DPC++ programming language. In at least one embodiment, a DPC++ programming language refers to a high-level language for data parallel programming productivity. In at least one embodiment, a DPC++ programming language is based at least in part on C and/or C++ programming languages. In at least one embodiment, a oneAPI programming model is a programming model such as those developed by Intel Corporation of Santa Clara, CA.

In at least one embodiment, oneAPI and/or oneAPI programming model is utilized to interact with various accelerator, GPU, processor, and/or variations thereof, architectures. In at least one embodiment, oneAPI includes a set of libraries that implement various functionalities. In at least one embodiment, oneAPI includes at least a oneAPI DPC++ library, a oneAPI math kernel library, a oneAPI data analytics library, a oneAPI deep neural network library, a oneAPI collective communications library, a oneAPI threading building blocks library, a oneAPI video processing library, and/or variations thereof.

In at least one embodiment, a oneAPI DPC++ library, also referred to as oneDPL, is a library that implements algorithms and functions to accelerate DPC++ kernel programming. In at least one embodiment, oneDPL implements one or more standard template library (STL) functions. In at least one embodiment, oneDPL implements one or more parallel STL functions. In at least one embodiment, oneDPL provides a set of library classes and functions such as parallel algorithms, iterators, function object classes, range-based API, and/or variations thereof. In at least one embodiment, oneDPL implements one or more classes and/or functions of a C++ standard library. In at least one embodiment, oneDPL implements one or more random number generator functions.

In at least one embodiment, a oneAPI math kernel library, also referred to as oneMKL, is a library that implements various optimized and parallelized routines for various mathematical functions and/or operations. In at least one embodiment, oneMKL implements one or more basic linear algebra subprograms (BLAS) and/or linear algebra package (LAPACK) dense linear algebra routines. In at least one embodiment, oneMKL implements one or more sparse BLAS linear algebra routines. In at least one embodiment, oneMKL implements one or more random number generators (RNGs). In at least one embodiment, oneMKL implements one or more vector mathematics (VM) routines for mathematical operations on vectors. In at least one embodiment, oneMKL implements one or more Fast Fourier Transform (FFT) functions.

In at least one embodiment, a oncAPI data analytics library, also referred to as oneDAL, is a library that implements various data analysis applications and distributed computations. In at least one embodiment, oneDAL implements various algorithms for preprocessing, transformation, analysis, modeling, validation, and decision making for data analytics, in batch, online, and distributed processing modes of computation. In at least one embodiment, oneDAL implements various C++ and/or Java APIs and various connectors to one or more data sources. In at least one embodiment, oneDAL implements DPC++ API extensions to a traditional C++ interface and enables GPU usage for various algorithms.

In at least one embodiment, a oneAPI deep neural network library, also referred to as oneDNN, is a library that implements various deep learning functions. In at least one embodiment, oneDNN implements various neural network, machine learning, and deep learning functions, algorithms, and/or variations thereof.

In at least one embodiment, a oneAPI collective communications library, also referred to as oneCCL, is a library that implements various applications for deep learning and machine learning workloads. In at least one embodiment, oneCCL is built upon lower-level communication middleware, such as message passing interface (MPI) and libfabrics. In at least one embodiment, oneCCL enables a set of deep learning specific optimizations, such as prioritization, persistent operations, out of order executions, and/or variations thereof. In at least one embodiment, oneCCL implements various CPU and GPU functions.

In at least one embodiment, a oneAPI threading building blocks library, also referred to as oneTBB, is a library that implements various parallelized processes for various applications. In at least one embodiment, oneTBB is utilized for task-based, shared parallel programming on a host. In at least one embodiment, oneTBB implements generic parallel algorithms. In at least one embodiment, oneTBB implements concurrent containers. In at least one embodiment, oneTBB implements a scalable memory allocator. In at least one embodiment, oneTBB implements a work-stealing task scheduler. In at least one embodiment, oneTBB implements low-level synchronization primitives. In at least one embodiment, oneTBB is compiler-independent and usable on various processors, such as GPUs, PPUs, CPUs, and/or variations thereof.

In at least one embodiment, a oneAPI video processing library, also referred to as one VPL, is a library that is utilized for accelerating video processing in one or more applications. In at least one embodiment, oneVPL implements various video decoding, encoding, and processing functions. In at least one embodiment, one VPL implements various functions for media pipelines on CPUs, GPUs, and other accelerators. In at least one embodiment, one VPL implements device discovery and selection in media centric and video analytics workloads. In at least one embodiment, one VPL implements API primitives for zero-copy buffer sharing.

In at least one embodiment, a oneAPI programming model utilizes a DPC++ programming language. In at least one embodiment, a DPC++ programming language is a programming language that includes, without limitation, functionally similar versions of CUDA mechanisms to define device code and distinguish between device code and host code. In at least one embodiment, a DPC++ programming language may include a subset of functionality of a CUDA programming language. In at least one embodiment, one or more CUDA programming model operations are performed using a oneAPI programming model using a DPC++ programming language.

It should be noted that, while example embodiments described herein may relate to a CUDA programming model, techniques described herein can be utilized with any suitable programming model, such HIP, oneAPI, and/or variations thereof.

At least one embodiment of the disclosure can be described in view of the following clauses:

Clause 1. A processor comprising:

one or more circuits to perform an application programming interface ("API") to modify one or more second graph nodes within one or more first graph nodes.

Clause 2. The processor of clause 1, wherein:

the one or more first graph nodes are added to an execution graph using a second API;

the second API receives parameters including: the execution graph, a graph node of the one or more first graph nodes, and one or more dependencies associated with the graph node; and the second API stores topology information of the execution graph.

Clause 3. The processor of clause 1 or 2, wherein the one or more second graph nodes are modified based at least in part on the topology information of the execution graph.

Clause 4. The processor of any of clauses 1-3, wherein:

the one or more first graph nodes include a graph node that represents a sub-graph; and instantiating the graph node that represents the sub-graph includes replacing the graph node with the sub-graph.

Clause 5. The processor of any of clauses 1-4, wherein the one or more first graph nodes are nodes of an execution graph instantiated from an execution graph template.

Clause 6. The processor of any of clauses 1-5, wherein: the one or more first graph nodes are nodes of an execution graph instantiated using a third API; the third API adds, to the execution graph, a graph node of the one or more first graph nodes; and the third API receives parameters including: the execution graph, the graph node, and one or more dependencies associated with the graph node.

Clause 7. The processor of any of clauses 1-6, wherein the one or more first graph nodes are nodes of an execution graph instantiated from an execution stream.

Clause 8. A computer-implemented method, comprising performing an application programming interface ("API") to modify one or more second graph nodes within one or more first graph nodes.

Clause 9. The computer-implemented method of clause 8, further comprising:

adding the one or more first graph nodes to an execution graph using a second API;

receiving parameters in the second API including: the execution graph, a graph node of the one or more first graph nodes, and one or more dependencies associated with the graph node;

storing topology information of the execution graph using the second API; and modifying the one or more second graph nodes based at least in part on the topology information.

Clause 10. The computer-implemented method of clause 8 or 9, further comprising instantiating an execution graph that includes the one or more first graph nodes.

Clause 11. The computer-implemented method of any of clauses 8-10, further comprising updating parameters associated with the one or more second graph nodes.

Clause 12. The computer-implemented method of any of clauses 8-11, wherein the API to modify the one or more second graph nodes is received from a process executing on a central processing unit ("CPU").

Clause 13. The computer-implemented method of any of clauses 8-12, wherein the API to modify the one or more second graph nodes is received from a process executing on a graphics processing unit ("GPU").

Clause 14. The computer-implemented method of any of clauses 8-13, further comprising validating an execution graph that includes the one or more first graph nodes.

Clause 15. The computer-implemented method of any of clauses 8-14, further comprising launching an execution graph that includes the one or more first graph nodes before performing the API to modify the one or more second graph nodes.

Clause 16. The computer-implemented method of any of clauses 8-15, further comprising launching an execution graph that includes the one or more first graph nodes after performing the API to modify the one or more second graph nodes.

Clause 17. A computer system comprising one or more processors and memory storing executable instructions that, as a result of being executed by the one or more processors, cause the computer system to perform an application programming interface ("API") to modify one or more second graph nodes within one or more first graph nodes.

Clause 18. The computer system of clause 17, wherein the API to modify the one or more second graph nodes is a graph update API.

Clause 19. The computer system of clause 17 or 18, wherein:

the one or more second graph nodes represent sub-graphs; and the executable instructions that cause the computer system to perform the API to modify the one or more second graph nodes cause the computer system to modify the sub-graphs.

Clause 20. The computer system of any of clauses 17-19, wherein the one or more first graph nodes are nodes of an execution graph.

Clause 21. The computer system of any of clauses 17-20, wherein the API to modify the one or more second graph nodes executes on a central processing unit ("CPU").

Clause 22. The computer system of any of clauses 17-21, wherein the API to modify the one or more second graph nodes executes on a graphics processing unit ("GPU").

Clause 23. A machine-readable medium having stored thereon a set of instructions, which if performed by one or more processors, cause the one or more processors to perform an application programming interface ("API") to modify one or more second graph nodes within one or more first graph nodes.

Clause 24. The machine-readable medium of clause 23, wherein the set of instructions further cause the one or more processors to perform an API to store topology information of the one or more first graph nodes.

Clause 25. The machine-readable medium of clause 23 or 24, wherein: the one or more second graph nodes represent sub-graphs, and the set of instructions further cause the one or more processors to perform an API to store topology information of the sub-graphs represented by the one or more second graph nodes.

Clause 26. The machine-readable medium of any of clauses 23-25, wherein the API to modify the one or more second graph nodes, modifies the one or more second graph nodes using an execution graph template.

Clause 27. The machine-readable medium of any of clauses 23-26, wherein the set of instructions further cause the one or more processors to launch an execution graph that includes the one or more first graph nodes.

Clause 28. The machine-readable medium of any of clauses 23-27, wherein: the one or more second graph nodes represent sub-graphs; and the set of instructions further cause the one or more processors to launch the sub-graphs.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. Use of term "set" (e.g., "a set of items") or "subset" unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, term "plurality" indicates a state of being plural (e.g., "a plurality of items" indicates multiple items). A number of items in a plurality is at least two, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (e.g., as a result of being executed) by one or more processors of a computer system, cause computer system to perform operations described herein. A set of non-transitory computer-readable storage media, in at least one embodiment, comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed.

No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. Terms "system" and "method" are used herein interchangeably insofar as system may embody one or more methods and methods may be considered a system.

In at least one embodiment, an arithmetic logic unit is a set of combinational logic circuitry that takes one or more inputs to produce a result. In at least one embodiment, an arithmetic logic unit is used by a processor to implement mathematical operation such as addition, subtraction, or multiplication. In at least one embodiment, an arithmetic logic unit is used to implement logical operations such as logical AND/OR or XOR. In at least one embodiment, an arithmetic logic unit is stateless, and made from physical switching components such as semiconductor transistors arranged to form logical gates. In at least one embodiment, an arithmetic logic unit may operate internally as a stateful logic circuit with an associated clock. In at least one embodiment, an arithmetic logic unit may be constructed as an asynchronous logic circuit with an internal state not maintained in an associated register set. In at least one embodiment, an arithmetic logic unit is used by a processor to combine operands stored in one or more registers of the processor and produce an output that can be stored by the processor in another register or a memory location.

In at least one embodiment, as a result of processing an instruction retrieved by the processor, the processor presents one or more inputs or operands to an arithmetic logic unit, causing the arithmetic logic unit to produce a result based at least in part on an instruction code provided to inputs of the arithmetic logic unit. In at least one embodiment, the instruction codes provided by the processor to the ALU are based at least in part on the instruction executed by the processor. In at least one embodiment combinational logic in the ALU processes the inputs and produces an output which is placed on a bus within the processor. In at least one embodiment, the processor selects a destination register, memory location, output device, or output storage location on the output bus so that clocking the processor causes the results produced by the ALU to be sent to the desired location.

In present document, references may be made to obtaining, acquiring, receiving, or inputting analog or digital data into a subsystem, computer system, or computer-implemented machine. Process of obtaining, acquiring, receiving, or inputting analog and digital data can be accomplished in a variety of ways such as by receiving data as a parameter of a function call or a call to an application programming interface. In some implementations, process of obtaining, acquiring, receiving, or inputting analog or digital data can be accomplished by transferring data via a serial or parallel interface. In another implementation, process of obtaining, acquiring, receiving, or inputting analog or digital data can be accomplished by transferring data via a computer network from providing entity to acquiring entity. References may also be made to providing, outputting, transmitting, sending, or presenting analog or digital data. In various examples, process of providing, outputting, transmitting, sending, or presenting analog or digital data can be accomplished by transferring data as an input or output parameter of a function call, a parameter of an application programming interface or interprocess communication mechanism.

Although discussion above sets forth example implementations of described techniques, other architectures may be used to implement described functionality, and are intended to be within scope of this disclosure. Furthermore, although specific distributions of responsibilities are defined above for purposes of discussion, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. One or more processors, comprising:

circuitry to:

receive an application programming interface ("API") call, wherein an input parameter of the API call indicates a modification to be made to a sub-graph represented by one or more graph nodes of a first execution graph instantiated for execution on one or more accelerators; and in response to the API call, modify the sub-graph represented by the one or more graph nodes of the first instantiated execution graph based, at least in part, on one or more second graph nodes provided as input to the API call.

2. The one or more processors of claim 1, wherein:

a sub-graph node that represents the sub-graph is added to the first execution graph using a second API;

the second API receives parameters, including: the first execution graph; the sub-graph node; and one or more dependencies associated with the sub-graph node; and the second API stores topology information of the first execution graph.

3. The one or more processors of claim 2, wherein the sub-graph is modified based, at least in part, on the topology information of the first execution graph.

4. The one or more processors of claim 1, wherein the circuitry is further to:

replace a graph node that represents the sub-graph with an instantiated version of one or more second execution graphs represented by the one or more second graph nodes.

5. The one or more processors of claim 1, wherein the first execution graph is instantiated from an execution graph template.

6. The one or more processors of claim 1, wherein:

the first execution graph is instantiated using a third API;

the third API adds, to the first execution graph, a sub-graph node that represents the sub-graph; and the third API receives parameters, including: the first execution graph; the sub-graph node; and one or more dependencies associated with the sub-graph node.

7. The one or more processors of claim 1, wherein the first execution graph is instantiated from an execution stream.

8. A computer-implemented method, comprising:

receiving an Application Programming Interface ("API") call, wherein an input parameter of the API call indicates a modification to be made to a sub-graph represented by one or more graph nodes of a first execution graph instantiated for execution on one or more accelerators; and in response to the API call, modifying the sub-graph represented by the one or more graph nodes of the first instantiated execution graph based, at least in part, on one or more second graph nodes provided as input to the API call.

9. The computer-implemented method of claim 8, further comprising:

adding a sub-graph node that represents the sub-graph to the first execution graph using a second API receiving parameters in the second API, including: the first execution graph; the sub-graph node; and one or more dependencies associated with the sub-graph node;

storing topology information of the first execution graph using the second API; and modifying the sub-graph based, at least in part, on the topology information.

10. The computer-implemented method of claim 8, further comprising instantiating the first execution graph that includes the one or more graph nodes that represent the sub-graph.

11. The computer-implemented method of claim 8, further comprising updating parameters associated with the sub-graph.

12. The computer-implemented method of claim 8, wherein the API call is received from a process executing on a central processing unit ("CPU").

13. The computer-implemented method of claim 8, wherein the API call is received from a process executing on a graphics processing unit ("GPU").

14. The computer-implemented method of claim 8, further comprising validating the first execution graph that includes the one or more graph nodes that represent the sub-graph.

15. The computer-implemented method of claim 8, further comprising launching the first execution graph that includes the one or more graph nodes that represent the sub-graph before modifying the sub-graph.

16. The computer-implemented method of claim 8, further comprising launching an execution graph that includes the one or more graph nodes that represent the sub-graph after modifying the sub-graph.

17. A computer system comprising one or more processors and memory storing executable instructions that, as a result of being executed by the one or more processors, cause the computer system to:

receive an application programming interface ("API") call, wherein an input parameter of the API call indicates a modification to be made to a sub-graph represented by one or more graph nodes of a first execution graph instantiated for execution on one or more accelerators; and in response to the API call, modify the sub-graph represented by the one or more graph nodes of the first instantiated execution graph based, at least in part, on one or more second graph nodes provided as input to the API call.

18. The computer system of claim 17, wherein the API call is included in a graph update API.

19. The computer system of claim 17, wherein the first execution graph is instantiated from an execution graph template.

20. The computer system of claim 17, wherein the modification of the sub-graph is performed by a central processing unit ("CPU").

21. The computer system of claim 17, wherein the modification of the sub-graph is performed by a graphics processing unit ("GPU").

22. A machine-readable medium having stored thereon a set of instructions which, if performed by one or more processors, cause one or more processors to:

receive an application programming interface ("API") call, wherein an input parameter of the API call indicates a modification to be made to a sub-graph represented by one or more graph nodes of a first execution graph instantiated for execution on one or more accelerators; and in response to the API call, modify the sub-graph represented by the one or more graph nodes of the first instantiated execution graph based, at least in part, on one or more second graph nodes provided as input to the API call.

23. The machine-readable medium of claim 22, wherein the set of instructions, if performed by the one or more processors, further cause the one or more processors to perform an API to store topology information of the first execution graph.

24. The machine-readable medium of claim 22, wherein the sub-graph is modified using an execution graph template.

25. The machine-readable medium of claim 22, wherein the set of instructions, if performed by the one or more processors, further cause the one or more processors to launch the first execution graph.

26. The machine-readable medium of claim 22, wherein:

the set of instructions, if performed by the one or more processors, further cause the one or more processors to launch the sub-graph.

* * * * *